US012747617B2

(12) United States Patent
Marsh et al.

(10) Patent No.: US 12,747,617 B2
(45) Date of Patent: Sep. 29, 2026

(54) DOOR LOCK ASSEMBLY FOR A DWELLING

(71) Applicant: WedgeTLS LLC, Ketchum, ID (US)

(72) Inventors: Robby A. Marsh, Fort Lauderdale, FL (US); Eric Jadallah, Ketchum, ID (US)

(73) Assignee: WedgeTLS LLC, Ketchum, ID (US)

( * ) Notice: Subject to any disclaimer, the term of this patent is extended or adjusted under 35 U.S.C. 154(b) by 246 days.

(21) Appl. No.: 18/115,284

(22) Filed: Feb. 28, 2023

(65) Prior Publication Data

US 2023/0272647 A1 Aug. 31, 2023

Related U.S. Application Data

(60) Provisional application No. 63/314,811, filed on Feb. 28, 2022.

(51) Int. Cl.

| | |
|---|---|
| ***E05C 19/00*** | (2006.01) |
| ***E05C 3/00*** | (2006.01) |
| ***E05C 3/10*** | (2006.01) |

(52) U.S. Cl.

CPC ............ *E05C 19/002* (2013.01); *E05C 3/008* (2013.01); *E05C 3/10* (2013.01)

(58) Field of Classification Search

CPC .......... E05C 19/002; E05C 3/008; E05C 3/10; E05B 63/06

See application file for complete search history.

(56) References Cited

U.S. PATENT DOCUMENTS

| | | | | |
|---|---|---|---|---|
| 4,593,542 A * | 6/1986 | Rotondi | E05B 63/06 | 292/DIG. 60 |
| RE34,240 E * | 5/1993 | Lin | E05B 63/06 | 292/1.5 |
| 5,257,837 A * | 11/1993 | Bishop | E05B 63/06 | 292/DIG. 60 |

(Continued)

FOREIGN PATENT DOCUMENTS

| | | | |
|---|---|---|---|
| CA | 2434131 A1 * | 1/2005 | E05B 63/06 |
| CN | 202090720 U | 12/2011 | |

(Continued)

OTHER PUBLICATIONS

International Search Report and Written Opinion, PCT/US2023/014100, dated Sep. 12, 2023, 16 pages.

*Primary Examiner* — Christine M Mills
*Assistant Examiner* — Faria F Ahmad
(74) *Attorney, Agent, or Firm* — Nelson Mullins Riley & Scarborough LLP; Anthony A. Laurentano

(57) ABSTRACT

A door assembly is provided having a latch assembly. The latch assembly includes a head portion, a first latch housing, a second latch housing, a latch hub, and a hub cradle. The latch housings both define a respective opening. The hub cradle defines a recess offset from a center of the hub cradle. The hub cradle is positioned between the latch housings, and the latch hub is positioned in the hub cradle so that it is aligned with the recess. The hub cradle is configured to be received in the openings of the latch housings to provide a latch assembly having a short backset panel configuration or (Continued)

a long backset panel configuration. A distance from the head portion to the latch hub in the long backset panel configuration is larger than a distance from the head portion to the latch hub in the short backset panel configuration.

10 Claims, 86 Drawing Sheets

(56) References Cited

U.S. PATENT DOCUMENTS

| | | | | |
|---|---|---|---|---|
| 5,257,838 | A * | 11/1993 | Lin | E05B 63/06 292/1.5 |
| 6,185,871 | B1 * | 2/2001 | Wang | E05C 9/14 49/501 |
| 6,419,288 | B1 * | 7/2002 | Wheatland | E05C 1/163 292/DIG. 60 |
| 6,494,504 | B1 * | 12/2002 | Fan | E05B 63/0017 292/1.5 |
| 7,393,022 | B1 * | 7/2008 | Shan | E05C 1/06 292/DIG. 60 |
| 8,091,282 | B2 * | 1/2012 | Speyer | E05C 9/063 49/316 |
| 9,702,168 | B2 * | 7/2017 | Jadallah | E05B 63/0052 |
| 10,214,947 | B2 * | 2/2019 | Marsh | E05B 63/12 |
| 11,802,429 | B2 * | 10/2023 | Marsh | E05B 63/0052 |
| 2001/0038209 | A1 * | 11/2001 | Chiu | E05B 63/06 292/1.5 |
| 2003/0075930 | A1 * | 4/2003 | Mak | E05B 63/06 292/1.5 |
| 2004/0130162 | A1 * | 7/2004 | Don | E05B 63/06 292/1.5 |
| 2005/0006911 | A1 * | 1/2005 | Wu | E05B 63/06 292/337 |
| 2007/0205606 | A1 * | 9/2007 | Shen | E05B 63/06 292/1.5 |
| 2007/0216167 | A1 * | 9/2007 | Wu | E05C 1/06 292/1.5 |
| 2009/0064737 | A1 * | 3/2009 | Fan | E05B 63/06 70/169 |
| 2015/0052835 | A1 * | 2/2015 | Falter | E05C 19/002 49/394 |
| 2015/0211280 | A1 * | 7/2015 | Loperfido | E05B 9/02 74/89.17 |
| 2016/0215525 | A1 * | 7/2016 | Ramakrishna | E05B 63/06 |
| 2017/0254119 | A1 * | 9/2017 | Raz | E05B 17/2057 |
| 2018/0266153 | A1 | 9/2018 | Marsh | |
| 2022/0162885 | A1 * | 5/2022 | Chen | E05B 63/06 |

FOREIGN PATENT DOCUMENTS

| | | | | |
|---|---|---|---|---|
| EP | 1234939 | A2 * | 8/2002 | E05B 17/0025 |
| JP | 2014 001564 | A | 1/2014 | |
| WO | 2018/217779 | A1 | 11/2018 | |

* cited by examiner

320

314

374

372

370

368

DOOR LOCK ASSEMBLY FOR A DWELLING

CROSS REFERENCE TO RELATED APPLICATIONS

The present disclosure claims priority to U.S. provisional patent application Ser. No. 63/314,811, filed on Feb. 28, 2022, and entitled "Door Lock Assembly for a Dwelling," the entire contents of which are incorporated herein by reference.

FIELD OF THE INVENTION

Embodiments of the present invention relate generally to a latch assembly and a drive interface assembly that are configured for use in multiple configurations using the same components.

BACKGROUND OF THE INVENTION

Traditional entryways into a dwelling typically contain an entry door system. The entry door allows ingress and egress to the dwelling. A typical entry door system includes a door frame that includes a plurality of hinge mechanisms that pivotably mount a door panel. The door panel typically includes a handle that has a latch mechanism that cooperates with a strike plate mounted in the frame to hold the door in a closed position. One or more locks can be provided to secure or lock the door in the close position. These conventional locks typically include a handle based or mounted lock that locks or secures the latch in the deployed position, thus locking the door relative to the frame. In addition, entry door systems can also include a deadbolt that provides a further and separate means for locking the door in the closed position.

A disadvantage of traditional door entry systems of this type are that they have a single or at most dual point of locking connection between the door panel and the frame. Hence, by applying the appropriate amount of force to the door panel at the locking sites, the door panel can typically be forced open. Further, the entry door system typically provides one or more seals between the frame and the door in an attempt to provide a fluid tight seal. However, the locking mechanisms themselves do not function as sealing elements, and there is typically an issue associated with these types of door panel seals. In many instances, the seals are not effective at preventing the transfer of environmental elements such as noise, weather, water, and insects from one side of the panel to the other side.

Prior attempts have been made to address these issues by using various types of weather stripping between the panels and frame. For example, the weather stripping may be a strip of felt, foam, or a pile of flexible synthetic material. In many instances, however, this weather stripping fails to act as a sufficient seal between the door panel and the frame. Another prevalent issue associated with seals formed between the door frame and the door panel or between adjacent panels is that these seals can become disjoined. Either intentionally or unintentionally, the alignment between the frame and the panel or between adjacent panels may be disturbed which can degrade the quality of the seal, since, in many instances, the integrity of the seal relies upon these members having certain positional relationships relative to one another.

SUMMARY OF THE INVENTION

Embodiments of the present invention are directed towards a door panel based or a frame based door lock assembly or system that can lock, seal and secure an entrance to a dwelling. The door lock assembly can be formed and mounted within a door panel and has a movable locking element that, when deployed, locks and seals the door to the frame.

Embodiments of the present invention are directed to a door lock assembly that includes a deadbolt or drive assembly 720 that is adapted to mechanically cooperate with a movable locking assembly 520 so as to move the locking assembly between a locked position and an unlocked position. Embodiments of the present invention also include a door latch assembly 810 that has integrated therewith a coupler element for coupling to the locking elements 522 of the movable locking assembly 520. The door latch assembly 810 operates independent of the operation of the movable locking assembly 520.

In some embodiments, the drive assembly 720 includes opposed housing parts that are adapted to mount or seat a hub element, a slider element, and a drive arm. The hub element is adapted to operate in connection with a manual operating element, such as a latch element of a deadbolt, to move the locking elements between the locked and unlocked positions. The drive arm includes a drive interface pin that is adapted to sit within a connector portion that is mounted within a chamber or cavity formed in at least one of the locking elements. The movable locking elements can include any selected number of locking elements and preferably has a wedge-like shape.

In some embodiments, the door latch assembly has opposed housing parts that are adapted to house and seat a latch hub, a latch arm, and a biasing element. A wedge coupler and a latch element are also coupled to the housing to form an integrated latch unit. The wedge coupler is adapted to couple to an upper locking element at an upper end to a lower locking element at a lower end. The latch housing, wedge coupler, and latch element are coupled together through a series of hinge portions that are coupled together via a latch pin.

According to another embodiment, a door lock assembly for use with a door is provided. The door lock assembly includes a movable locking assembly having one or more elongated locking elements movable between a locked position and an unlocked position, a drive assembly coupled to the movable locking assembly for moving the locking assembly between the locked position and the unlocked position, and a latch assembly configured for coupling the door to a door frame. The locking elements are elongated in an axial direction that corresponds to the height or vertical direction of the door panel.

The door lock assembly further includes an elongated frame element having a main body and a pair of opposed sides forming a channel therebetween, where one of the sides has a first connector portion formed integrally therewith and the frame element is sized and configured for mounting within an edge of the door. Specifically, a vertical channel is formed along one side edge of the door panel, and the frame element is mounted therein. Likewise, a vertical channel is formed along a corresponding edge or side of the door frame for mounting a second frame member. The frame member within the door frame is adapted to seat at least a portion of the locking elements when disposed in the locked position.

According to another practice, the movable locking assembly includes a second connector portion sized and configured for coupling to the first connector portion of the frame element, and wherein the movable locking assembly includes two or more elongated wedge shaped locking elements movable between the locked position and the unlocked position. The first connector portion of the frame element has a substantially C-shaped configuration.

Further, the second connector portion of the movable locking assembly and the first connector portion of the frame element form a pivot region when coupled together, thus enabling the wedge shaped locking elements to move between the locked and unlocked positions. Also, when disposed in the unlocked position, the locking elements are disposed substantially within the channel formed in the frame element, and when disposed in the locked position, at least a portion of the locking elements extend outwardly from the channel of the frame element. Preferably, the wedge shaped locking elements seat within the channel formed in the door frame.

According to another practice, the drive assembly comprises a housing having opposed first and second housing parts, a hub element having a latch element formed thereon, a slider element having a first end with a groove sized and configured for seating the latch element of the hub element and a second end having a hinge portion formed thereon, a drive arm having a first end with a hinge portion formed thereon that is adapted to mate with the hinge portion of the slider element and a second end having a drive interface pin formed thereon. The drive interface pin is adapted to be coupled to the movable locking assembly for moving the locking assembly between the locked and unlocked positions.

The drive assembly comprises a housing formed from first and second opposed housing parts that are configured to be mounted together, where the first housing part includes a first end having a head plate formed thereon, the head plate having a cut-out formed therein, and a second end having a first aperture and a first tab groove formed therein. The second housing part has a first end and a second end having a second aperture and a second tab groove formed therein.

The drive assembly further comprises a hub element having a latch element formed thereon where the hub element is sized and configured for seating within the first and second apertures, and a slider element having a main body having a first end with a groove sized and configured for seating the latch element of the hub element and a pair of tab elements extending outwardly therefrom from opposed sides of the main body. The tab elements are sized and configured for seating within the first and second tab grooves and the tab elements are movable within the first and second tab grooves. The main body also has a second end having a hinge portion formed thereon.

The drive assembly further comprises a drive arm having a first end with a hinge portion formed thereon that is adapted to couple with the hinge portion of the slider element, and a second end having a drive interface pin formed thereon, where the drive interface pin is sized and configured for seating within the cut-out of the head plate and extends outwardly therefrom. The drive interface pin is adapted to be coupled to the movable locking assembly for moving the locking assembly between the locked and unlocked positions.

The door lock also includes a locking element connector portion that is coupled to the locking element and has an aperture formed therein. The drive interface pin is sized and configured for seating within the aperture.

According to another embodiment, the latch assembly may include a housing having opposed first and second housing parts where the first housing part has a head plate having a hinge portion formed thereon; a rotatable latch hub element having an engagement portion formed thereon; and a latch arm having a first end with first and second opposed leg elements where the engagement portion of the latch hub element is adapted to engage the first leg of the latch arm, and upon rotation of the latch hub, the engagement portion moves the latch arm in a linear direction, and a second end having a piston element formed thereon. The latch assembly further includes a wedge coupler disposed adjacent to the head plate of the first housing part and having a hinge portion formed thereon, and a latch element having a hinge portion formed thereon and a recess formed on an opposed end for seating a least a portion of the piston element of the latch arm. The hinged portions of the first housing part, the wedge coupler, and the latch element cooperate together to form a single hinged assembly.

Specifically, the latch assembly includes a housing having opposed first and second housing parts. The first housing part has a first end having a head plate formed thereon where the head plate has a cut-out and has a hinge portion formed thereon, and a second end having a first aperture formed therein. The second housing part has a first end and a second end where the second end has a second aperture formed therein. The second housing part forms in part a chamber having an inner surface having a seat element integrally formed thereon, where the seat element has a boss element.

The latch assembly further includes a rotatable latch hub element having a main body and an engagement portion formed on the main body and extending outwardly therefrom. The main body of the latch hub element is sized and configured for seating within the first and second apertures of the first and second housing parts.

The latch assembly also includes a latch arm having a main body with a first end and an opposed second end. The main body further includes a cavity formed on a bottom surface thereof for seating a biasing element. The first end has formed thereon first and second opposed leg elements, wherein the engagement portion of the latch hub element is adapted to engage the first leg of the latch arm, and upon rotation of the latch hub, the engagement portion moves the latch arm in a linear direction. The second end has a piston element formed thereon that is adapted to seat within the cut-out of the head plate of the first housing part, and wherein the piston element includes a piston head that extends outwardly from the head plate.

The movable locking assembly includes first and second elongated locking elements movable between the locked position and the unlocked position, and wherein the latch assembly further comprises a wedge coupler disposed adjacent to the head plate of the first housing part, wherein the wedge coupler has a main body having a first end, an opposed second end, and an intermediate portion. The intermediate portion has a hinge portion formed thereon, wherein the hinge portion is configured to be coupled to the hinge portion of the head plate of the first housing part. The first end of the wedge coupler is adapted to be coupled to the first locking element and the second end of the wedge coupler is adapted to be coupled to the second locking element.

The latch assembly further comprises a latch element having a main body, wherein the main body includes a first end having formed thereon a hinge portion and a second end having a recess formed therein for seating the piston head of the latch arm. The hinged portions of the first housing part, the wedge coupler, and the latch element are coupled to each other and cooperate together to form a single hinged assembly for coupling the wedge coupler to the latch assembly in an integrated manner.

According to still another embodiment, a door lock assembly for use with a door is provided, with the door lock assembly comprising a movable locking assembly disposed within a recess formed in an edge of a door panel having one or more movable wedge shaped locking elements disposable between a locked position and an unlocked position, a drive assembly operatively coupled to the movable locking assembly for moving the movable locking elements between the locked and unlocked positions, and a latch assembly configured for coupling the door to a door frame and operable independently of the movable locking assembly.

According to another feature that can be combined with one or more features of the above-described embodiments, a door lock assembly for use with a door comprised a first frame element configured for mounting within the door having a main body and a pair of opposed sides forming a first channel therebetween, wherein one of the sides has a connector portion coupled thereto; a movable locking assembly pivotally coupled to the connector portion of the frame element and having one or more elongated locking elements movable between a locked position and an unlocked position, wherein the movable locking assembly includes one or more locking elements having a main body having (i) a locking element connector portion disposed at one end thereof that is sized and dimensioned for mating engagement with the connector portion of the frame element, and (ii) a plurality of first teeth formed on an outer surface of the main body at a location different than the locking element connector portion; and a second frame element having a main body and forming a second channel therein and being coupled to a support element having a plurality of second teeth formed thereon. When assembled, the locking element is disposed substantially within the first channel formed in the first frame element when disposed in the unlocked position, and extends outwardly from the first channel of the first frame element and extends at least partly into the second channel formed in the second frame element when disposed in the locked position. Optionally and yet further one or more of the plurality of first teeth of the locking element are adapted to selectively engage with one or more of the plurality of second teeth formed on the support element when a force is applied to the door. Optionally and still yet further, the plurality of first teeth of the locking element do not engage with the plurality of second teeth formed on the support element when a force is not applied to the door.

The movable locking assembly further comprises at least first and second locking elements each of which has a main body having a locking element connector portion disposed at one end thereof that is sized and dimensioned for mating engagement with the connector portion of the frame element, a coupler element having a main body having a first end and a second end, and a drive element having a main body having a first end and a second end. When assembled, the first end of the drive element is coupled to the first end of the coupler element, the first locking element is coupled to the second end of the drive element, and the second end of the coupler element is coupled to the second locking element, and wherein the first end of the drive element forms a coupler receiving end and has a cut-out formed therein.

The second channel of the second frame element is formed at a first end thereof, and the main body further comprises a third channel formed at an opposed end that is sized and configured for seating at least a portion of the door frame. The support element is integrally formed with the main body of the second frame element and is mounted within the second channel, and the support element is formed for example as a cross-brace, although other shapes are contemplated by the current invention. The cross-brace has a first leg portion and a second leg portion, and wherein the first and second leg portions of the cross-brace are inclined relative to each other, and wherein the plurality of second teeth are formed on one of the first and second leg portions.

The movable locking assembly of claim 1, can also include a drive assembly coupled to the movable locking assembly for moving the locking assembly between the locked position and the unlocked position, and a latch assembly configured for coupling the door to the door frame.

Still further, some embodiments contemplate a door lock assembly for use with a door, comprising a first frame element configured for mounting within the door having a main body forming a first channel therein; a movable locking assembly disposed within the channel formed in the first frame portion and having one or more movable wedge shaped locking elements disposable between a locked position and an unlocked position, wherein the locking element has a main body having a plurality of first teeth formed on an outer surface thereof; and a second frame element associated with a door frame and having a main body and forming a second channel therein and being coupled to a support element having a plurality of second teeth formed thereon.

The door assembly also includes a drive assembly operatively coupled to the movable locking assembly for moving the movable locking elements between the locked and unlocked positions, and a latch assembly configured for coupling the door to the door frame and operable independently of the movable locking assembly. When assembled, the locking element is disposed substantially within the first channel formed in the first frame element when disposed in the unlocked position, and extends outwardly from the first channel of the first frame element and extends at least partly into the second channel formed in the second frame element when disposed in the locked position, and wherein one or more of the plurality of first teeth of the locking element are adapted to selectively engage with one or more of the plurality of second teeth formed on the support element when a force is applied to the door.

Latch assemblies and drive interface assemblies may be provided in some embodiments that are configured to be easily installed and/or adjusted to be used in a short backset panel configuration or a long backset panel configuration. While the long backset panel configuration may be utilized for most standard doors, short backset panel configuration may be beneficial for doors having large amounts of glass such as French doors. Regardless of whether a short backset panel configuration or a long backset panel configuration is used, latch assemblies and drive interface assemblies may be assembled using the same components, and some of these components may be positioned differently depending on the configuration. For example, a drive interface hub may be positioned in different locations within a drive interface assembly depending on whether a long backset panel configuration or a short backset panel configuration are used. As another example, a hub cradle may comprise a first hub cradle portion and a second hub cradle portion that retain the latch hub between the two portions, and the two portions may both be provided in a first orientation when a long backset panel configuration and may be rotated 180 degrees so that they are in a second orientation where a short backset panel configuration is used.

In some embodiments, a latch hub may be provided having a removable insert therein. When the insert is removed, the latch hub defines a first cavity therein that is configured to receive a spindle having a first size. When the insert is added in the first cavity of the latch hub, the latch hub defines a second cavity that is configured to receive a spindle having a second size that is smaller than the first size. By using an insert, the latch hub may be configured to be used with a larger number of spindles, and the use of the removable insert allows for the latch hub to be used with spindles having different shapes such as a C-shape spindle or a rectangular shaped spindle.

Additionally, a wedge guide may be provided in a frame assembly in some embodiments. The frame assembly may comprise a frame element and a locking element, with both elements having teeth. Furthermore, the frame assembly may comprise a wedge guide on a locking element of the frame assembly. When the locking element and the frame element are aligned appropriately and when a force is applied on a door, the teeth of the frame element and the teeth of the locking element may engage each other so that force is transferred from one component to the other. When the locking element and the frame element are misaligned, the wedge guide may be configured to engage the teeth of the frame element before the teeth of the locking element come in contact with the frame element teeth. In this way, the wedge guide may aid in guiding the contact between the teeth. The wedge guide may be symmetrical in shape so that it may be used regardless of whether a left swing configuration or a right swing configuration are used for a frame assembly.

In an example embodiment, a door assembly is provided. The door assembly comprises a latch assembly. The latch assembly includes a head portion. The latch assembly also includes a first latch housing defining a first opening, with the first latch housing being attached to the head portion. The latch assembly also includes a second latch housing defining a second opening, with the second latch housing being attached to the head portion. The latch assembly also includes a latch hub and a hub cradle. The hub cradle comprises a first hub cradle portion and a second hub cradle portion. The first hub cradle portion defines a first recess that is offset from a center of the first hub cradle portion, and the second hub cradle portion defines a second recess that is offset from a center of the second hub cradle portion. The first hub cradle portion and the second hub cradle portion are positioned between the first latch housing and the second latch housing. The first opening of the first latch housing is configured to partially receive the first hub cradle portion with the first hub cradle portion in either a short orientation or a long orientation, and the second opening of the second latch housing is configured to partially receive the second hub cradle portion with the second hub cradle portion in either a short orientation or a long orientation. The latch hub is positioned between the first hub cradle portion and the second hub cradle portion, with the latch hub being aligned with the first recess and the second recess. The latch assembly is configured to operate in a short backset panel configuration when the first hub cradle portion is in the short orientation and when the second hub cradle portion is in the short orientation. Furthermore, the latch assembly is configured to operate in a long backset panel configuration when the first hub cradle portion is in the long orientation and when the second hub cradle portion is in the long orientation. A distance from the head portion to the latch hub in the long backset panel configuration is larger than a distance from the head portion to the latch hub in the short backset panel configuration.

In some embodiments, the latch assembly may be configured to be assembled in either the short backset panel configuration or the long backset panel configuration using an identical set of components.

In some embodiments, the first hub cradle portion may comprise an extension that extends from other portions of the first hub cradle portion, and the extension may be configured to engage a wall of the first opening to position the first hub cradle portion relative to the first latch housing. Additionally, in some embodiments, the first opening may define a first extended portion on a first side of the first opening and a second extended portion on a second side of the first opening. The first side may be opposite to the second side, and the first opening may be configured to receive a portion of the first hub cradle portion so that the extension of the first hub cradle portion extends into one of the first extended portion or the second extended portion.

In some embodiments, the latch hub may comprise an outer component and an insert. The outer component may define a first cavity in an internal portion of the outer component, and the outer component may be configured to receive the insert within the first cavity. The latch hub may define a second cavity when the insert is received within the first cavity of the outer component, and the second cavity may be smaller in cross-sectional size relative to the first cavity. The latch hub may be configured to receive a first spindle in the first cavity when the insert is removed, and the latch hub may be configured to receive a second spindle in the second cavity when the insert is added. Furthermore, in some embodiments, the first spindle may be a Kwikset C-shape spindle. Additionally, in some embodiments, the second spindle may be a Schlage spindle or a Baldwin spindle.

In some embodiments, the door assembly may also include a drive interface assembly. The drive interface assembly may include a first drive interface housing, a second drive interface housing, and a drive interface hub. The first drive interface housing may define a first aperture therein, and the first aperture may define a first portion and a second portion. The second drive interface housing may define a second aperture therein, and the second aperture may define a first portion and a second portion. The drive interface hub may be positioned between the first drive interface housing and the second drive interface housing. The drive interface hub may be positioned at the first portion of the first aperture and at the first portion of the second aperture when the door assembly is operating in the long backset panel configuration. Additionally, when the door assembly is operating in the short backset panel configuration, the drive interface hub may be positioned at the second portion of the first aperture and at the second portion of the second aperture. Additionally, in some embodiments, the drive interface assembly may be configured to be assembled in either a left swing configuration or a right swing configuration using an identical group of components. In some embodiments, the drive interface assembly may comprise a drive arm and an arm guide. The arm guide may be positioned at a first position relative to the drive arm in the left swing configuration, and the arm guide may be positioned at a second position relative to the drive arm in the right swing configuration.

In some embodiments, the door assembly may also include a frame assembly. The frame assembly may include a locking element, a support element, and at least one wedge guide. The locking element may define a first end and a second end, and a locking element axis may extend from the first end of the locking element to the second end of the locking element. The locking element may comprise locking element teeth extending between the first end of the locking element and the second end of the locking element. The support element may define a first end and a second end, and a support element axis may extend from the first end of the support element to the second end of the support element. The support element may comprise support element teeth extending between the first end of the support element and the second end of the support element. The wedge guide(s) may be provided at the locking element. When the locking element axis and the support element axis are misaligned, a wedge guide of the wedge guide(s) may be configured to contact the support element teeth before the locking element teeth come in contact with the support element teeth.

In some embodiments, the wedge guide(s) may comprise a first wedge guide and a second wedge guide. The first wedge guide may be configured to be partially received at the first end of the locking element, and the second wedge guide may be configured to be partially received at the second end of the locking element. Each wedge guide of the wedge guide(s) may be configured to prevent a grating sound caused by contact between the support element teeth and the locking element teeth where the locking element axis and the support element axis are misaligned.

In another example embodiment, a door assembly is provided. The door assembly includes a drive interface assembly. The drive interface assembly includes a first drive interface housing, a second drive interface housing, and a drive interface hub. The first drive interface housing defines a first aperture therein, and the first aperture defines a first portion and a second portion. The second drive interface housing defines a second aperture therein, and the second aperture defines a first portion and a second portion. The drive interface hub is positioned between the first drive interface housing and the second drive interface housing. When the door assembly is operating in a long backset panel configuration, the drive interface hub is positioned at the first portion of the first aperture and at the first portion of the second aperture. When the door assembly is operating in a short backset panel configuration, the drive interface hub is positioned at the second portion of the first aperture and at the second portion of the second aperture.

In some embodiments, the drive interface assembly may be configured to be assembled in either a left swing configuration or a right swing configuration using an identical group of components. Additionally, the drive interface assembly may comprise a drive arm and an arm guide. The arm guide may be positioned at a first position relative to the drive arm in the left swing configuration, and the arm guide may be positioned at a second position relative to the drive arm in the right swing configuration.

In another example embodiment, a frame assembly for use with a door is provided. The frame assembly comprises a locking element, a support element, and at least one wedge guide. The locking element defines a first end and a second end, and a locking element axis extends from the first end of the locking element to the second end of the locking element. The locking element comprises locking element teeth extending between the first end of the locking element and the second end of the locking element. The support element defines a first end and a second end, and a support element axis extends from the first end of the support element to the second end of the support element. The support element comprises support element teeth extending between the first end of the support element and the second end of the support element. The at least one wedge guide is configured to be provided at the locking element. When the locking element axis and the support element axis are misaligned, a wedge guide of the wedge guide(s) is configured to contact the support element teeth before the locking element teeth come in contact with the support element teeth.

In some embodiments, the wedge guide(s) may comprise a first wedge guide and a second wedge guide. The first wedge guide may be configured to be partially received in a first internal chamber at the first end of the locking element, and the second wedge guide may be configured to be partially received at the second end of the locking element in the first internal chamber or a second internal chamber.

In some embodiments, each wedge guide of the wedge guide(s) may comprise a head portion and a body portion. The body portion may be received in the locking element, and the head portion may be configured to contact the support element teeth when the locking element axis and the support element axis are misaligned before the locking element teeth come in contact with the support element teeth. Additionally, in some embodiments, each wedge guide of the wedge guide(s) may be configured to prevent a grating sound caused by contact between the support element teeth and the locking element teeth where the locking element axis and the support element axis are misaligned. In some embodiments, each wedge guide of the wedge guide(s) comprises plastic material.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

DETAILED DESCRIPTION OF THE INVENTION

Certain embodiments of the present invention are directed towards a frame based door lock assembly or system that can lock, seal and secure an entrance to a dwelling. The door lock assembly may be formed and mounted within a door frame and may have a movable locking element that, when deployed, locks and seals the door to the frame. As used herein, the term "dwelling" is intended to include any partially or fully enclosed space that requires a door, such as a residential or commercial structure. Examples of dwellings contemplated include houses.

Certain embodiments of the present invention are also directed towards a door panel based door lock assembly or system that can also lock, seal and secure an entrance to a dwelling. The door lock assembly may be formed and mounted within a door panel and may have a movable locking element that, when deployed, locks and seals the door to the frame.

Some embodiments of the present invention are also directed towards a system and method for a user to register a door lock assembly and to control and manage the state and access rights of the door lock assembly.

Figure 1A:
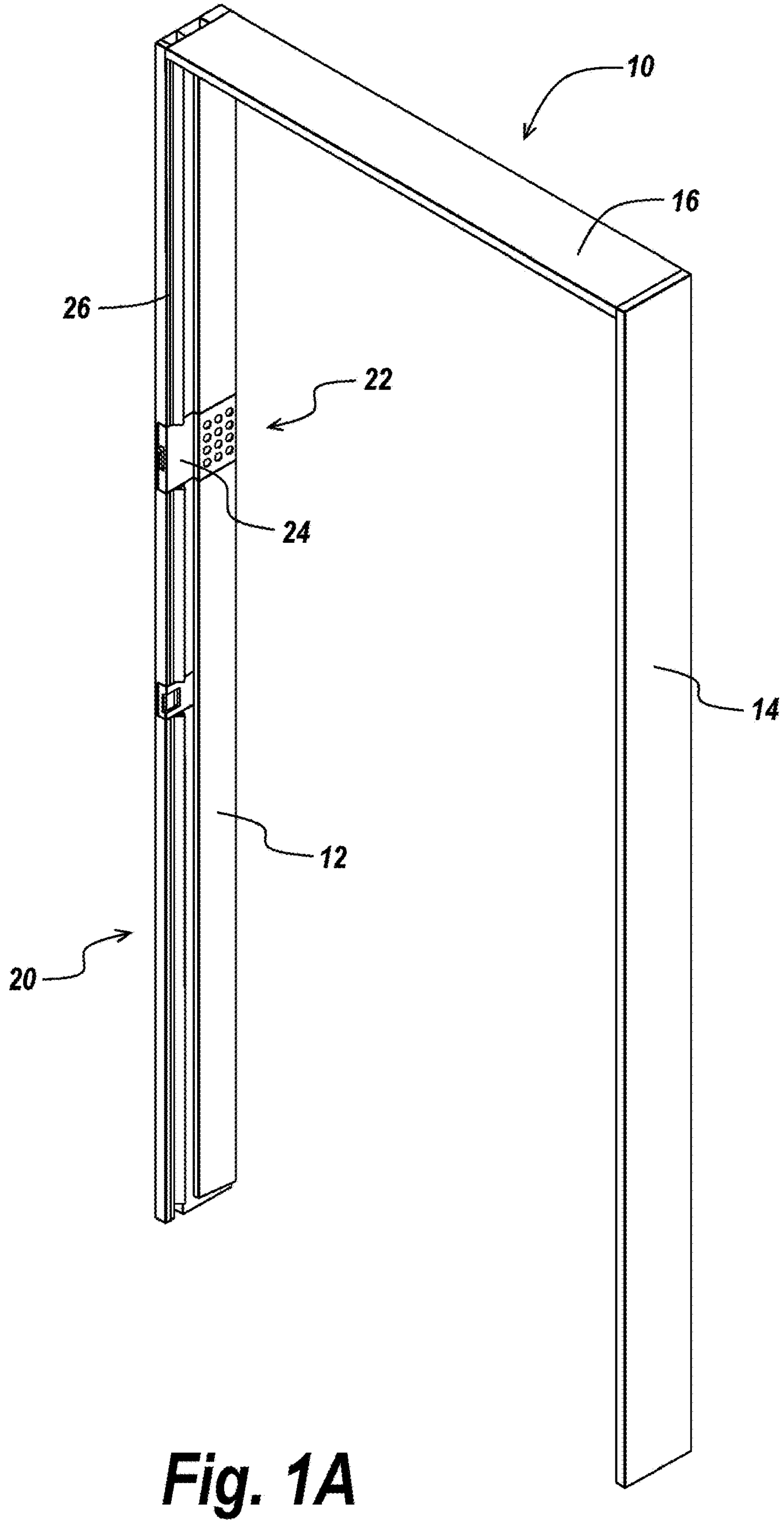
FIG. 1A is a perspective inner dwelling view of one embodiment of the door lock assembly or system, and clearly illustrates the door lock assembly mounted within a door frame.
Figure 1B:
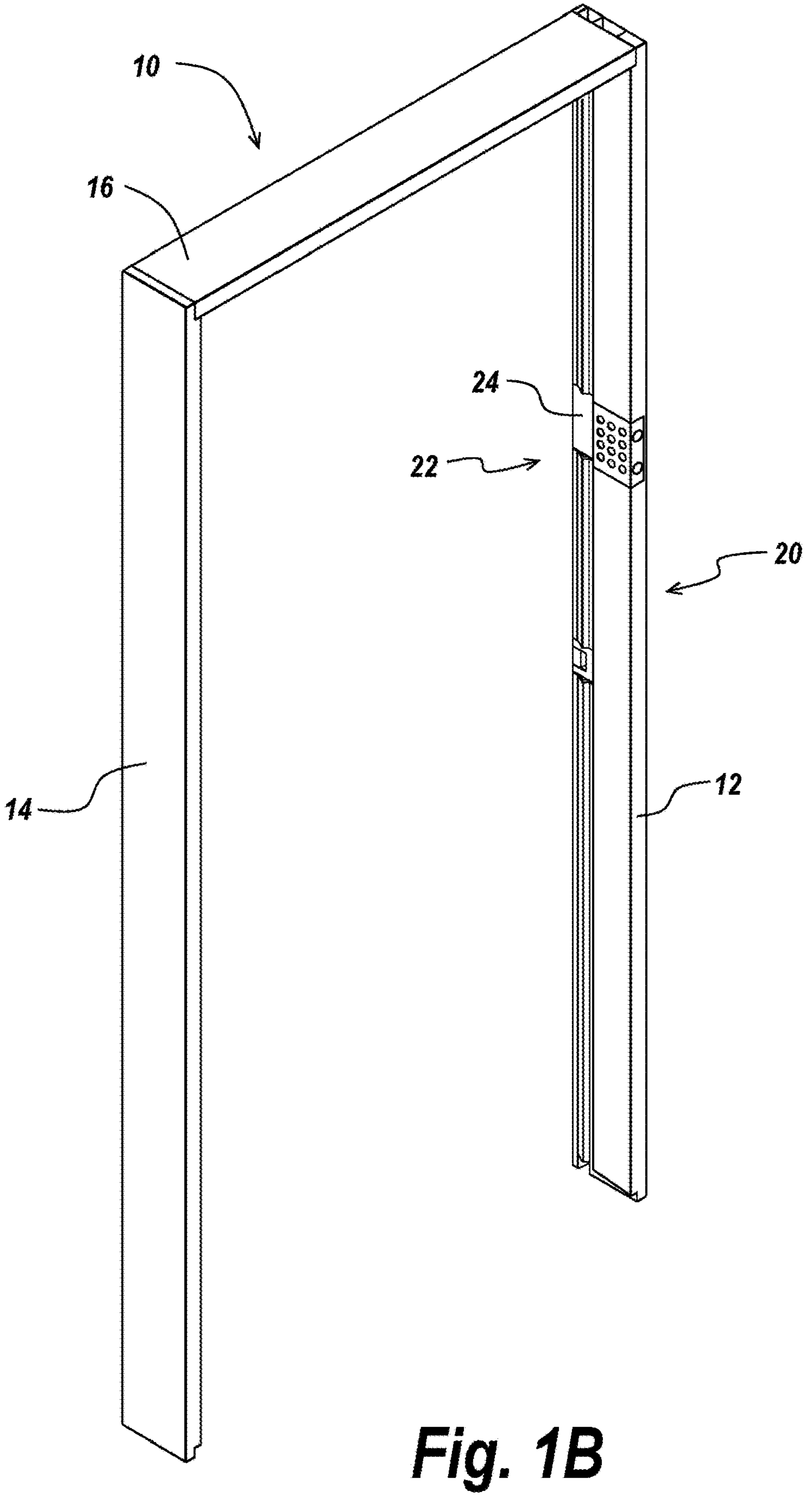
FIG. 1B is a perspective view from outside the dwelling of the frame based door lock assembly of FIG. 1A according to one embodiment of the present invention.

FIGS. 1A and 1B are perspective views of one embodiment of the door lock assembly. According to this embodiment, the door lock assembly is a frame based door lock assembly 20 that is primarily and essentially mounted within a door frame 10. The illustrated door frame has a pair of door jambs 12, 14 and a header 16. Although not illustrated, the door frame can also include a door sill and can form part of an assembly that includes a pre-mounted or pre-hung door panel. The illustrated door jamb 14 is presently shown as the hinged door jamb for mounting door hinges and the door jamb 12 is presently shown as the strike plate door jamb since it is configured to mount the strike plate of a door handle assembly. Although presently shown as a right mounted and hence swinging door, those of ordinary skill in the art will readily recognize that the door panel and hence the door lock assembly can be mounted on or to either door jamb depending on whether the door is a left or right swinging door.

As shown in FIGS. 2A-2F and 3, the door lock assembly 20 includes a frame element 26 that forms part of the door jamb 12 of the door frame. The frame element can be mated to any particular exterior skin in order to give the frame element a finished appearance. The frame element can be formed from any suitable material capable of supporting and retaining the necessary door lock components, while providing the door frame with the required strength and rigidity. According to a preferred embodiment, the door frame is made of extruded aluminum.

The illustrated frame element 26 includes a relatively flat portion 27 having a front surface and a back surface. The front surface of the frame element has formed thereon a number of surface features or protrusions. Specifically, the front surface of the frame element includes a channel housing 29 that forms a channel 28 therein. The channel is sized for accommodating any suitable wiring that needs to run along the door jamb. For example, according to one embodiment, the channel accommodates power conduits that connect at one end to the control panel and at the other end to a suitable power source. Examples of suitable power sources include door bell wiring and the like. The power conduits can include any suitable wiring or cable, such as electrical wiring, Ethernet cables and the like.

Figure 2A:
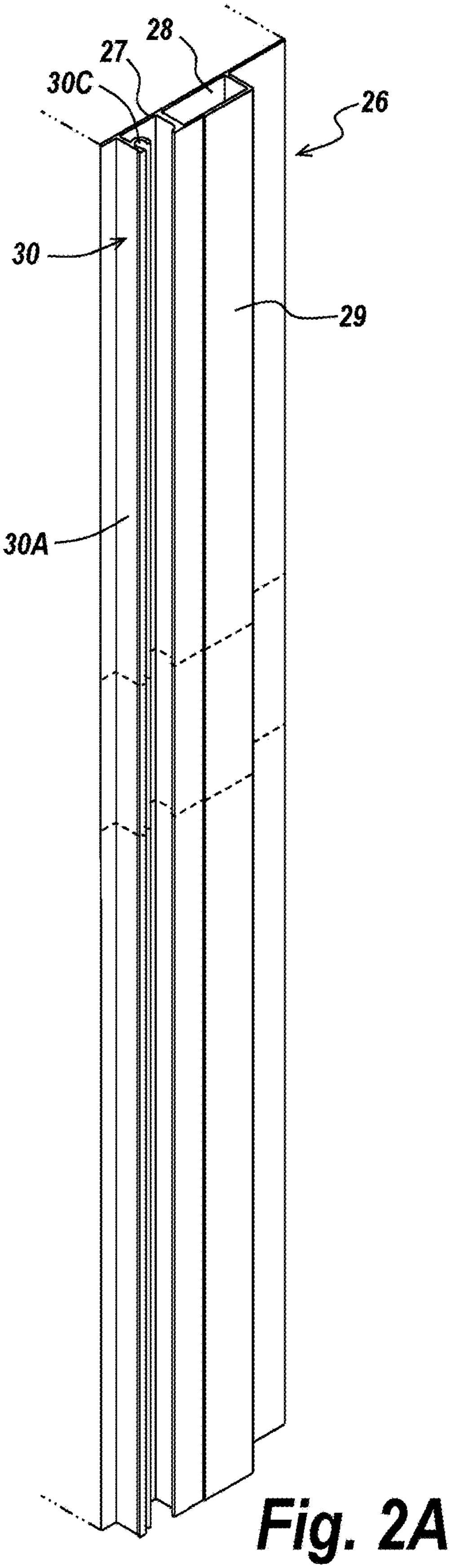
FIG. 2A is a perspective view of the frame portion of the door lock assembly according to one embodiment of the present invention.
Figure 2B:
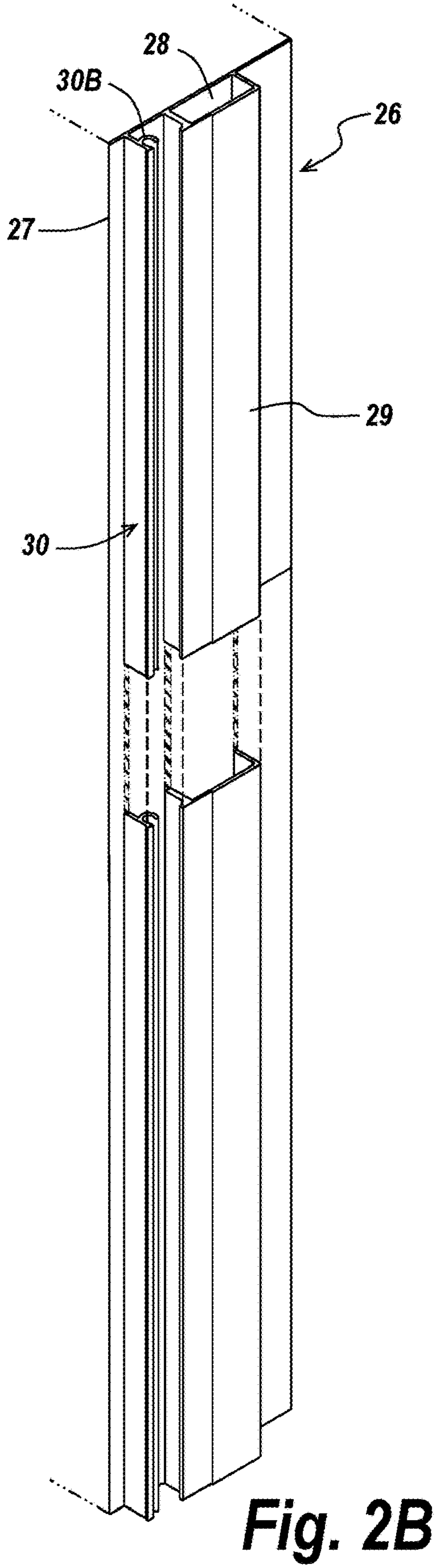
FIG. 2B is a perspective view of the frame portion of the door lock assembly with a portion removed for seating a modular control panel according to one embodiment of the present invention.
Figure 2C:
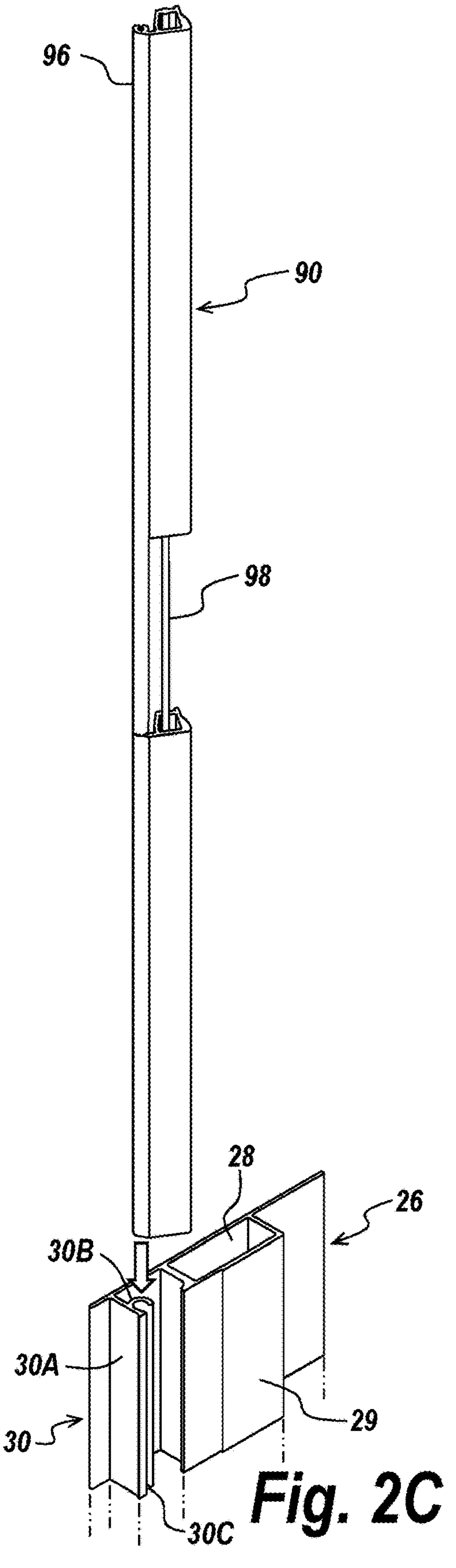
FIG. 2C is an unassembled perspective view illustrating the mounting of a movable locking element in the frame portion of the door lock assembly according to one embodiment of the present invention.
Figure 2D:
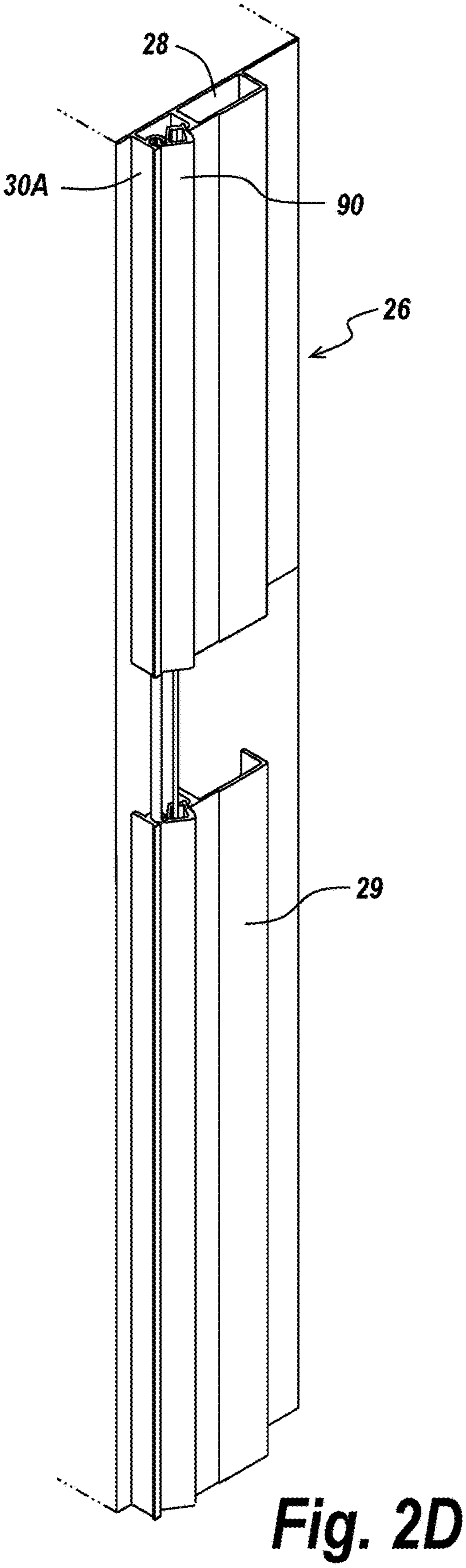
FIG. 2D is an assembled perspective view illustrating the mounting of the movable locking element in the frame portion of the door lock assembly with a portion removed for seating the modular control panel according to one embodiment of the present invention.

The front surface of the flat portion 27 of the frame also includes an integrally formed outwardly projecting lock connector portion 30 that includes a relatively flat extension 30A that has integrally formed therewith a curved connector element 30B that forms a lock receiving groove 30C. The lock receiving groove 30C is adapted to seat and mount a portion of the movable locking element 90 (FIGS. 2C-2D). The locking element 90 is coupled to the groove 30C by slidingly inserting the locking element into the groove from a top portion of the frame. Once seated within the groove 30C, the locking element 90 is captured and retained therein. The locking element portion that seats within the groove forms a pivoting portion that allows the locking element to move between the unlocked (FIGS. 9A, 9B, and 11A) and locked (FIGS. 2D, 10A, 10B, and 11B) positions as described in detail below. Moreover, the spatial separation between the channel housing 29 and the lock connector portion 30 forms a channel 92 that is sized for seating and housing the movable locking element. The locking element 90 can be any suitable rail-type locking element that is capable of moving when actuated between the locked and unlocked positions. According to this embodiment, the locking element has a generally wedge shaped configuration.

Figure 2E:
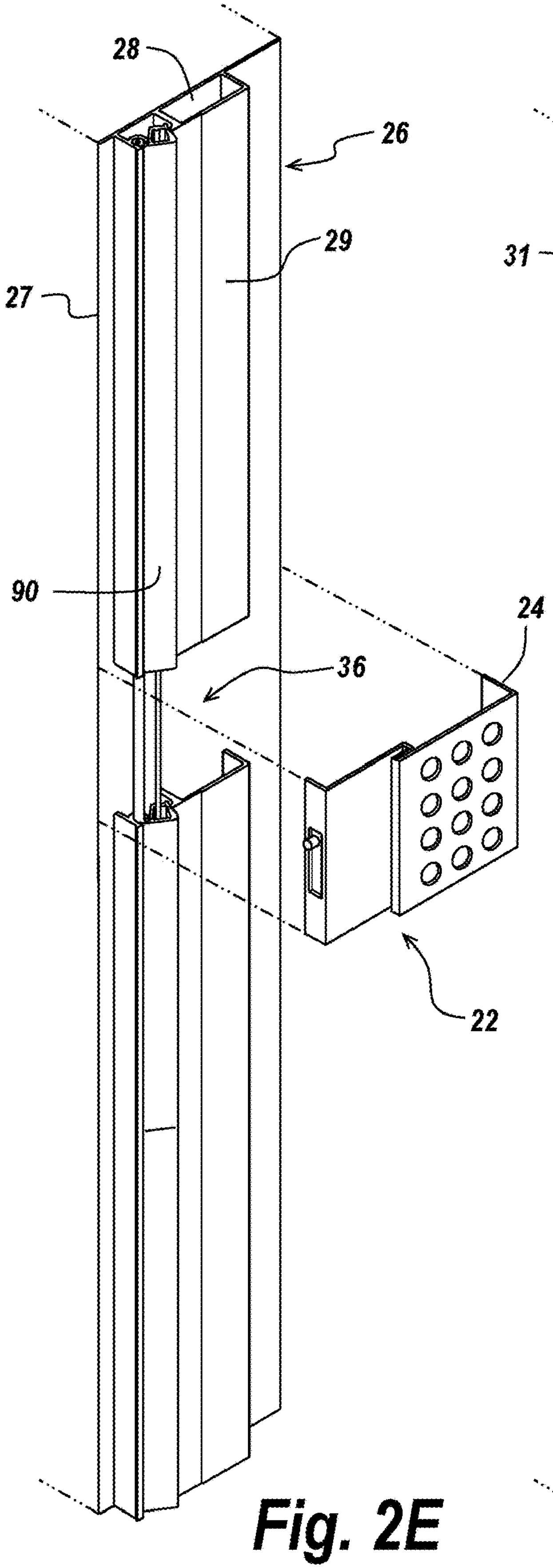
FIG. 2E is an unassembled perspective view illustrating the mounting of the control panel to the frame and movable locking assembly of FIG. 2D according to one embodiment of the present invention.
Figure 2F:
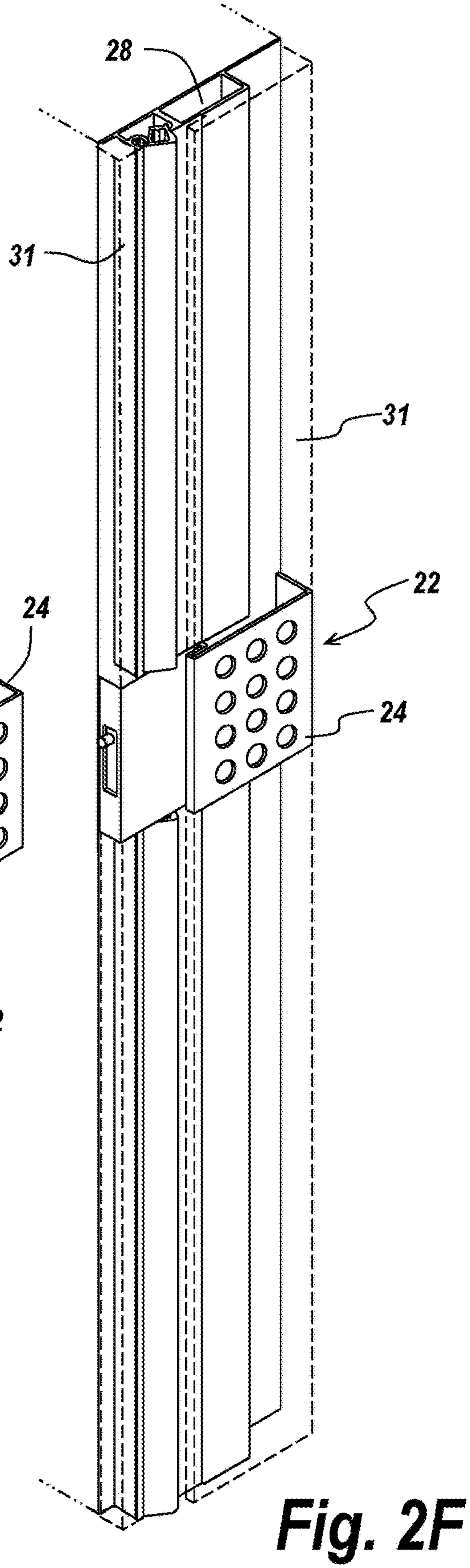
FIG. 2F is an assembled perspective view illustrating the mounting of the control panel to the frame and movable locking assembly of FIG. 2E according to one embodiment of the present invention.
Figure 3:
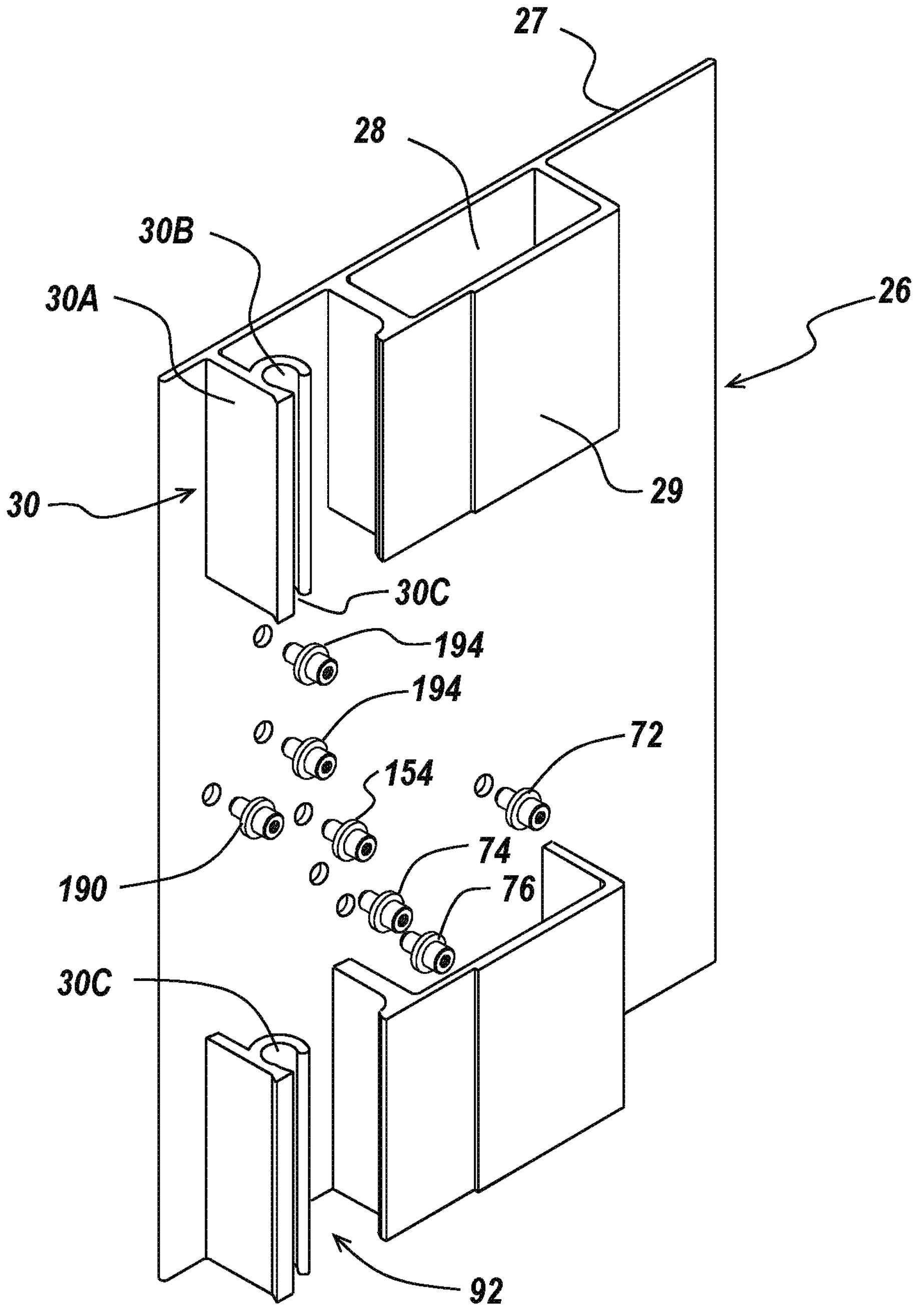
FIG. 3 is a perspective view of a partial portion of the frame of the door lock assembly showing the mounting of guide pins for securing various components to the frame according to one embodiment of the present invention.

With reference to FIGS. 2E and 2F, the illustrated frame element 26 also has a cut-out portion 36 that is sized and dimensioned so as to receive the control panel 22. The control panel is configured so as to seat on the multi-contoured frame element, and hence has a surface that is complementary in shape to at least portions of the frame element. The control panel also mounts a portion of the door lock assembly, such as the actuation mechanisms as well as most of the electronics of the assembly. The control panel can be a modular component that is relatively easily removable and replaceable. When mounted to the frame element 26, the control panel is also adapted to integrate with any decorative finish assembly or skin 31. As will be readily understood by those of ordinary skill in the art, the skin is a finish surface that is intended to match the interior finish of the dwelling or is relatively paintable.

As shown in FIGS. 3 through 7, the door lock assembly 20 includes a control panel 22 that includes most of the electronics of the door lock assembly 20. Those of ordinary skill will readily recognize that the electronics can also be distributed throughout the door frame. The control panel 22 includes a cover panel 24 (see FIGS. 1 and 2) that covers the components mounted therein while concomitantly being integrated with the frame in such a manner as not to interfere with the operation of the door panel and door locking assembly. The cover panel 24 can be configured to mount or display any desired combination of components. For example, the cover panel 22 of the control panel 22 can be configured to seat a keypad for key pad initiated communication with the control panel (see FIGS. 1 and 2). Alternatively, the cover panel 24 can include a display, such as a touch screen, for allowing a user to communicate with the control panel. The cover panel can also have selected ports formed therein that are sized and dimensioned for mounting any suitable device, such as for example a visual indicator such as an LED, an audio indicator such as a speaker, a battery 58, a microphone, a camera, one or more detectors such as a motion detector, one or more optical sensors, a circuit board having a processor and storage elements, other suitable electronics and the like. Those of ordinary skill will readily recognize that the cover panel can be configured to accommodate any suitable device necessary or desired for communication with the control panel or actuation of the door lock assembly.

The control panel 22 includes a motor 32 for providing the power necessary to actuate the door locking assembly. The motor 32 includes a cam 34 that mounts to a shaft 33 of the motor. The cam is formed as an eccentric member that has a flanged end with a pin receiving aperture formed therein. The cam 34 is in turn coupled to a drive plate 40 via a cam pin 38 that serves to directly connect the plate to the cam. The cam when rotated by the motor shaft moves in a reciprocating manner, and this reciprocating motion is transferred to the drive plate 40. The shape of the cam element helps limit or define the axial movement of the drive plate 40.

The illustrated drive plate 40 includes, when viewed from the front, a substantially vertically disposed and axially extending lock connector portion 42 and an integrally formed, substantially horizontally disposed and axially extending cam connector portion 44. According to one embodiment, the lock connector portion 42 and the cam connector portion 44 are perpendicular relative to each other. The illustrated lock connector portion 42 includes a series of channels that allow for substantially linear movement of the drive plate when driving a locking element between the locked and unlocked positions, as explained below in further detail. Specifically, the drive plate 40 includes a first elongated channel 50 that is sized and configured for seating a fastener 62. The fastener is adapted to couple to a guide pin 72 for securing the drive plate to the frame element 26 of the lock assembly 20. The fastener 62 when mounted and seated within the channel 50 is adapted to travel within the channel upon movement of the drive plate, thus guiding the drive plate when moving in the axial direction A. The fastener thus operates to help secure the drive plate to the door frame while concomitantly ensuring that the drive plate moves or translates in a horizontal or axial direction (e.g., a direction perpendicular to the axis of the motor and the door frame).

The lock connector portion 42 of the drive plate 40 also includes a pair of parallel channels 52, 54 that are horizontally spaced in the axial direction from the channel 50. The channels 52 and 54 are also sized and configured for seating fasteners 64 and 66, respectively. The length of the channels 52, 54 are sized to allow translation of the drive plate in the axial direction without impeding movement thereof. The fasteners 64 and 66 threadingly engage with the guide pins 74 and 76, respectively, for also securing the drive plate to the frame element. The lock connector portion of the drive plate also includes a vertically extending groove 56 that seats an end portion of a drive pin 80. The drive plate at a terminal or axially outwardly most end terminates in a cut-out or groove. The groove 86 is sized and configured for seating a portion of a ramp assembly 100. Those of ordinary skill will readily recognize that the illustrated drive plate 40 can have any shape or configuration suitable for converting the rotational movement of the motor into linear movement of the plate, while concomitantly seating or mounting the required mechanical components.

Figure 4:
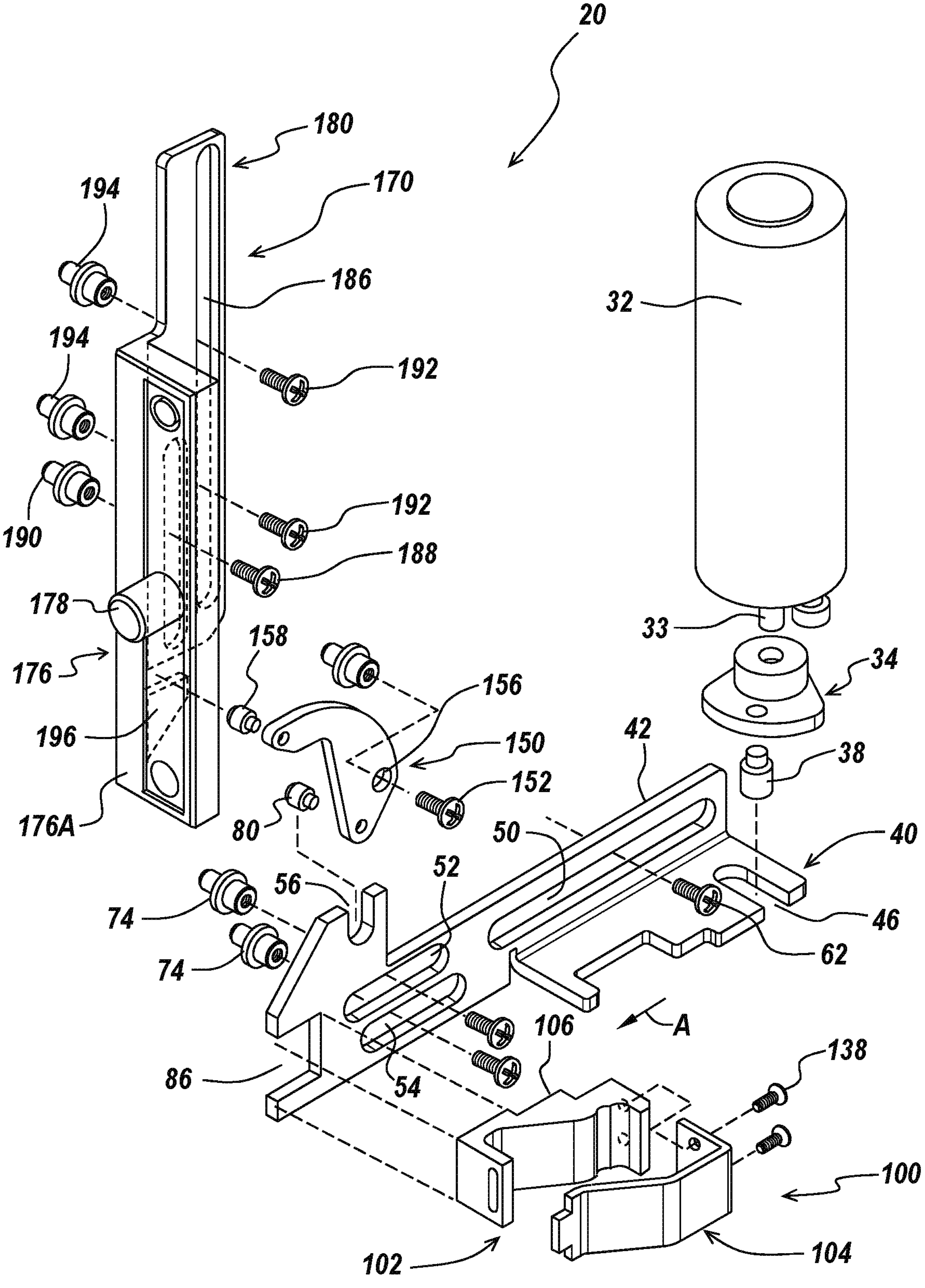
FIG. 4 is an exploded view of a portion of the elements of the door lock assembly that move the movable locking element between locked and unlocked positions according to one embodiment of the present invention.
Figure 5:
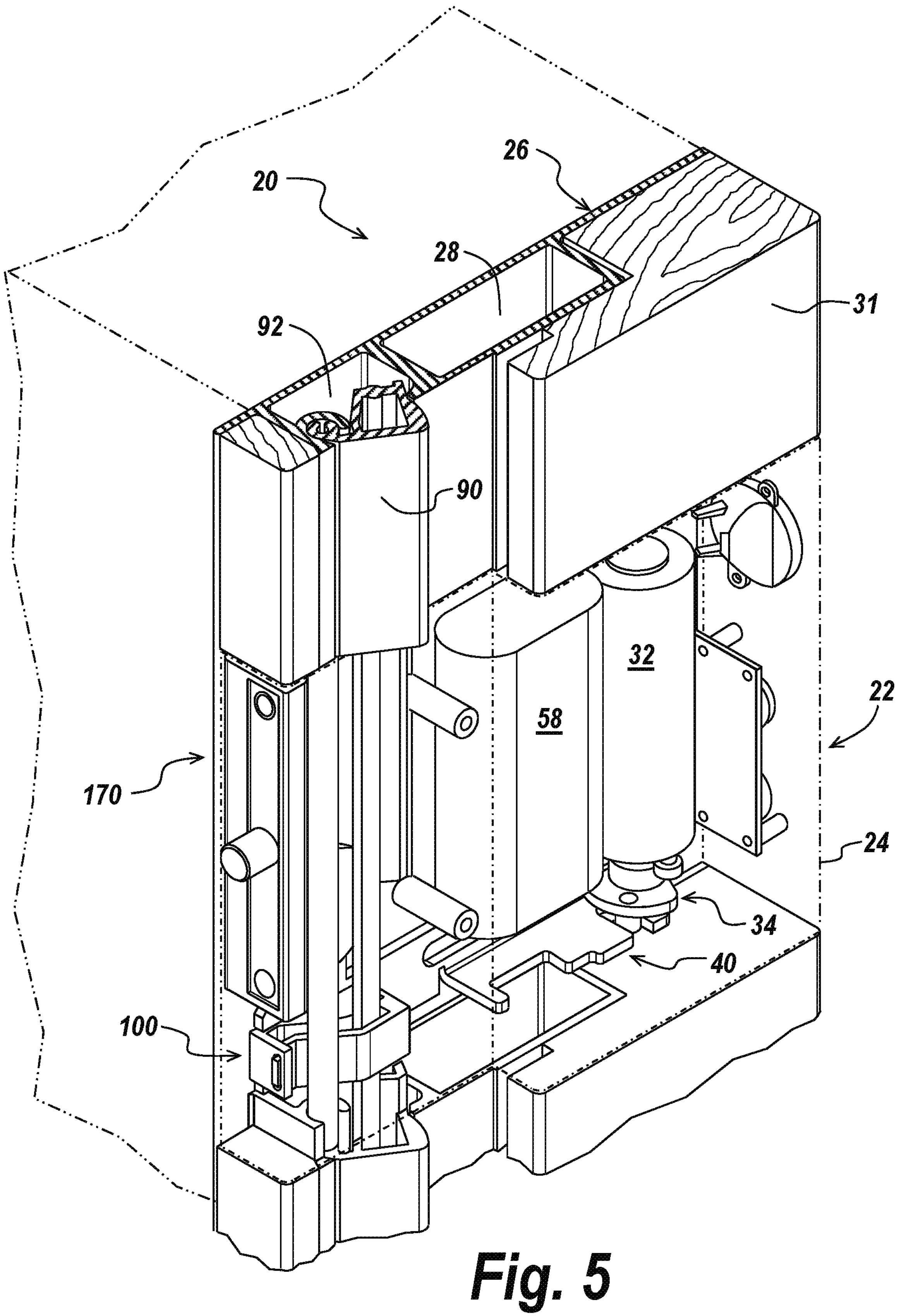
FIG. 5 is a partially cut away view of the control panel of the door lock assembly of one embodiment of the present invention with the control panel removed.
Figure 6:
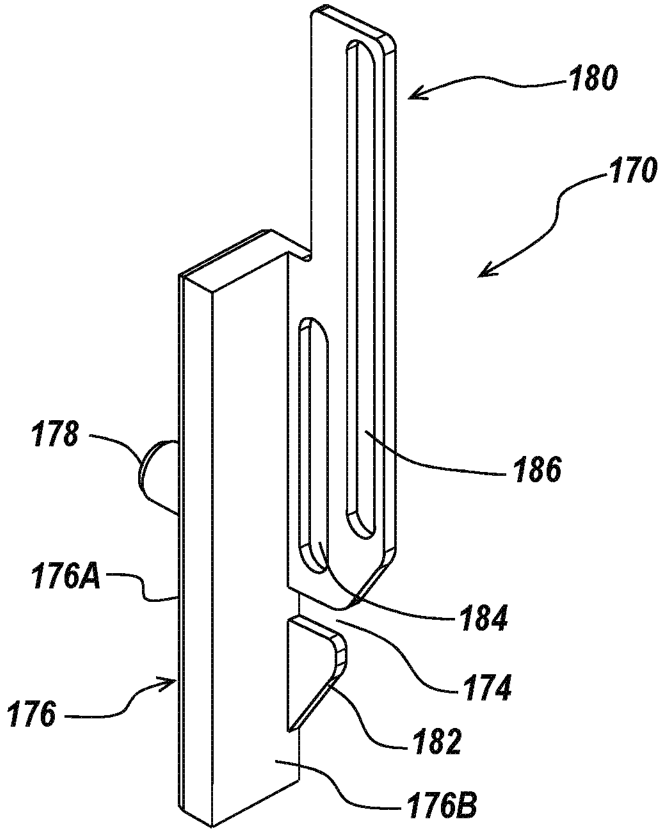
FIG. 6 is a perspective view of the manual control element according to one embodiment of the present invention.
Figure 7:
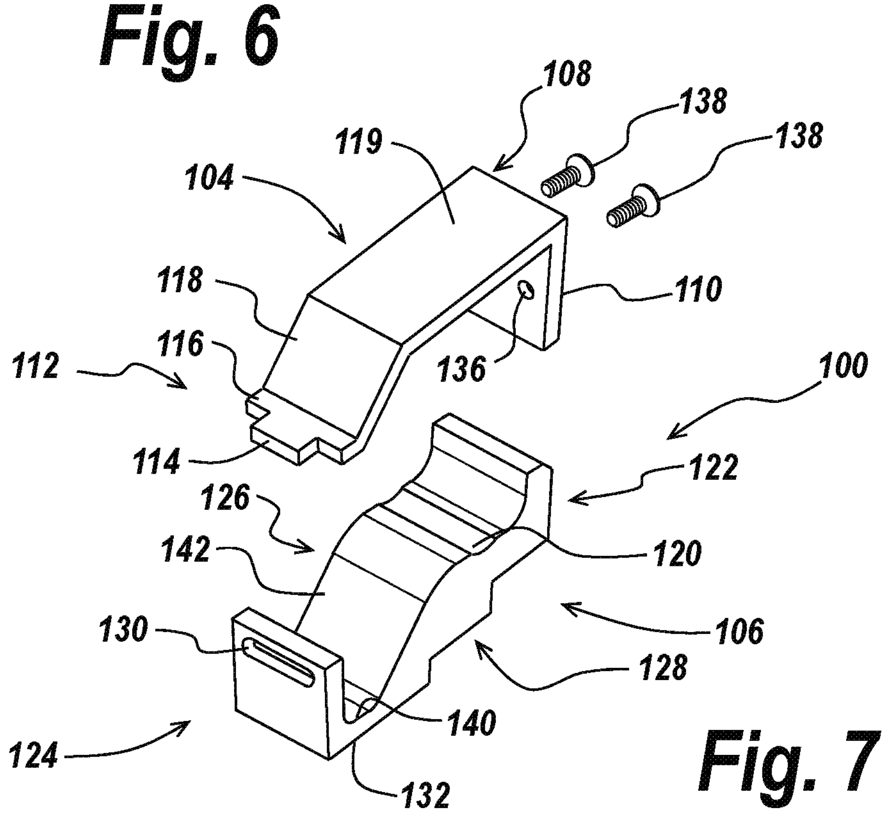
FIG. 7 is an unassembled view of the ramp assembly according to one embodiment of the present invention.
Figure 8A:
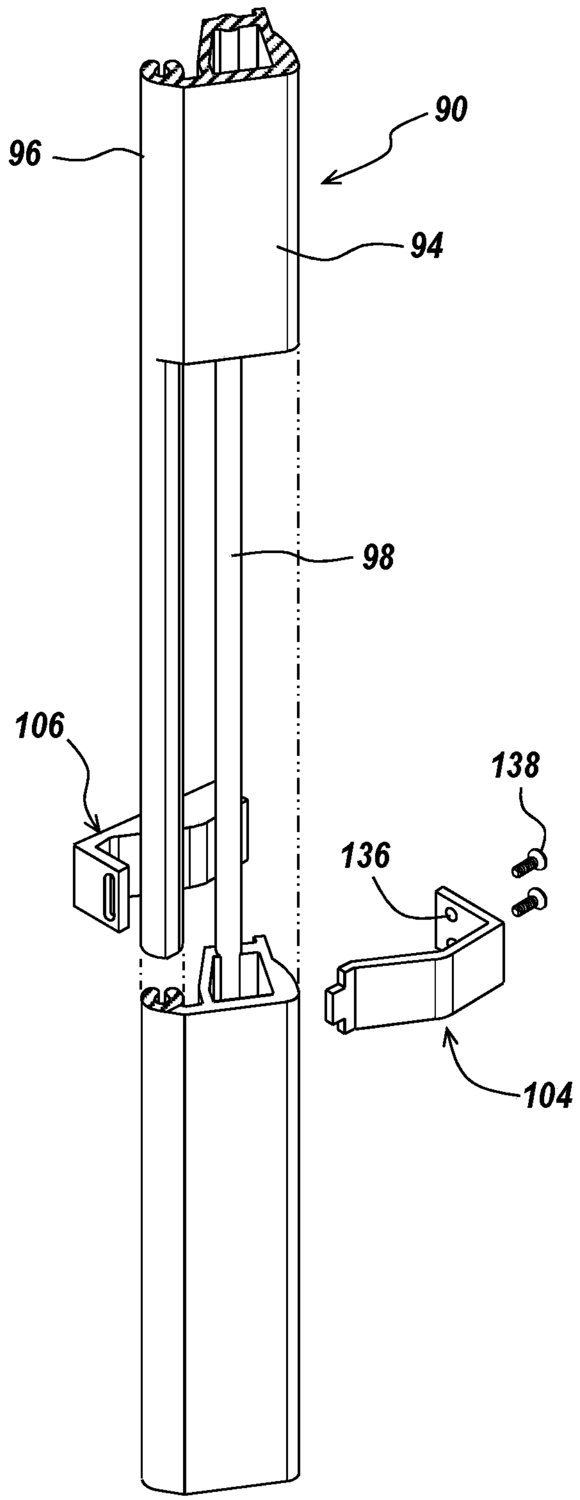
FIGS. 8A and 8B are perspective views of the movable locking element with the ramp assembly in unassembled and assembled form according to one embodiment of the present invention.
Figure 8B:
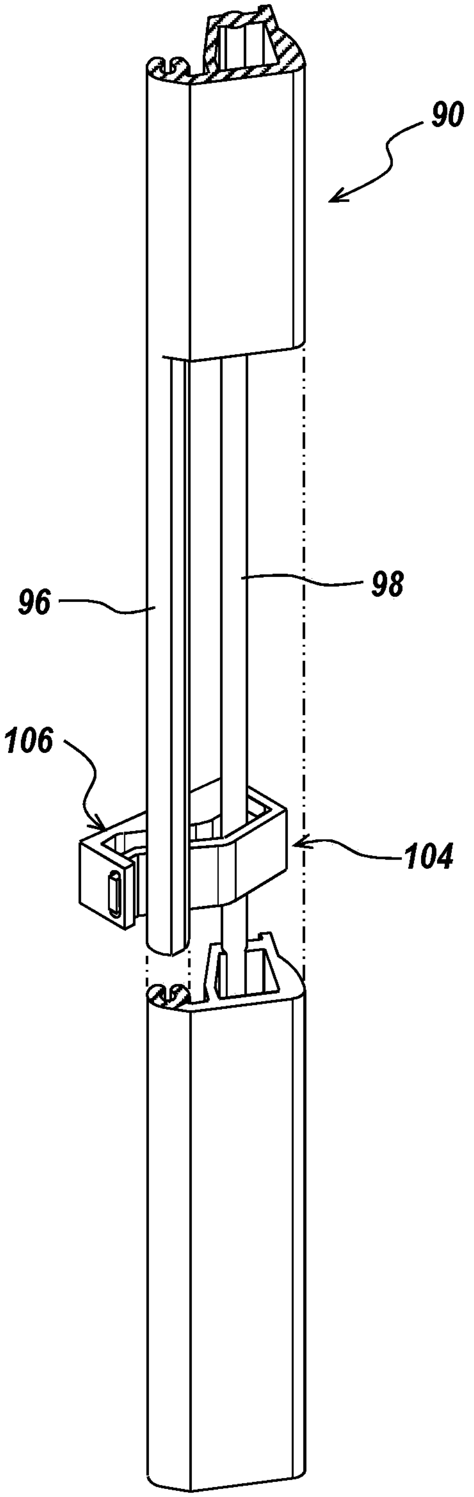

As further illustrated in FIGS. 3 through 7, and with particular reference to FIGS. 4 and 7, the door lock assembly 20 further includes a ramp assembly 100. The ramp assembly 100 includes a ramp member 102 that is formed from a top portion 104 and a bottom portion 106. The top portion 104 is a multi-angled component that has formed at a first axial end 108 a generally flat overlay portion 110 that is adapted to overlay and be disposed in intimate facing contact with one end of the bottom portion 106 of the ramp member. The flat overlay portion 110 has formed therein one or more fastener receiving apertures 136 for receiving one or more fasteners, such as the illustrated fasteners 138. The top portion 104 has formed at an opposed second terminal end 112 a flattened portion 116 that terminates in a tab portion 114. The top portion also includes a pair of intermediate sections including a sloped surface 118 that transitions to an intermediate portion 119. The intermediate portions extend between the opposed terminal ends 108, 112. The sloped surface is configured and positioned to engage the movable locking member in a manner such that the movable locking member moves along the sloped surface, displacing at least a portion of the locking member from the channel 92.

The bottom portion 106 of the ramp member 102 includes a multi contoured top surface 126 and a multi-stepped bottom surface 128 that are bounded at each end by a flattened first terminal end 122 and a flattened second terminal end 124. The first terminal end 122 includes one or more fastener receiving apertures that are also adapted to seat the fasteners 138, and the opposed second terminal end 124 includes a flattened portion that has a tab engaging channel formed therein. The bottom surface 128 includes a series of steps that extend between the terminal ends and the step surface disposed adjacent the second terminal end 124 forms a drive plate engaging surface 132 sized and configured for seating within the groove 86 of the drive plate 40.

The multi contoured top surface 126 includes an initial flat surface 140 disposed adjacent the second terminal end 124 that transitions to a sloped surface 142 that has a rounded top portion that transitions to a detent groove 120 for seating a portion of the movable locking element when engaged therewith.

The bottom portion 106 and the top portion 104 of the ramp member 102 can be assembled together by inserting the tab portion 114 of the top portion of the ramp member into the tab engaging channel 130. When so assembled, the overlay portion 110 of the top portion overlies and mates with the first terminal end 122 of the bottom portion 106. When so assembled, the holes formed in the first ends of the top and bottom portion are aligned so as to receive the fasteners 138. The fasteners and the tab portion disposed in the channel 130 help secure the top and bottom portions of the ramp member together.

The illustrated door lock assembly also includes a pivot mechanism 150. The pivot mechanism 150 includes an aperture 156 formed at one end. The pivot mechanism is secured to the frame by way of fastener 152 that passes through the aperture 156 and seats within the guide pin 154. The guide pin in turn is secured to the frame element 26. A pair of drive pins 80, 158 can also be coupled to the pivot mechanism. The first drive pin 80 seats within a corresponding aperture formed in a bottom portion of the pivot mechanism and is sized and configured for seating in the U-shaped channel 56 of the drive plate. The second drive pin 158 seats within an aperture formed in a top portion, and specifically, an extension portion, of the pivot mechanism and is sized for seating in a channel 174 formed on a rear surface of a manual control element 170.

With reference to FIGS. 4-6 and 9A-9B, the manual control element 170 is adapted to seat within the door jamb in the vicinity of the control panel. As such, the control panel can be formed with a corresponding cut-out that exposes a portion of the manual control element. When mounted within the doorjamb, one or more portions of the manual control element are movable in the vertical direction between locked and unlocked positions. According to a preferred embodiment, the manual control element is disposed along the interior side of the door jamb. The illustrated manual control element 170 includes a latch portion 176 that has a front surface 176A and a back surface 176B. The front surface of the latch portion includes a recess 196 that seats a manipulation element 178, such as a knob, for allowing a user to manipulate the manual control element 170 so as to move the element between the locked and unlocked positions. Those of ordinary skill will readily recognize that the manipulation element can have any suitable shape, such as a lever, tab and the like. The manipulation element is movable in a longitudinal direction within the recess.

The illustrated manual control element 170 also includes a guide portion 180 and a flange 182 extending outwardly the back surface 176B of the latch portion 176. The guide portion 180 includes a pair of substantially parallel channels 184, 186. The inner channel 184 has an overall length that is smaller than the length of the outer channel 186, and the inner channel 184 is offset from the outer channel 186 in the longitudinal direction of the guide portion. The inner channel 184 is adapted to seat a fastener 188 that is coupled to a guide pin 190 disposed on the opposed side of the channel. The outer channel 186 is adapted to seat a pair of fasteners 192, each of which is coupled to a guide pin 194. Similar to the other guide pins, the guide pins 190, 194 secure selected elements of the door lock assembly to the frame element.

As shown in FIGS. 2C-2F, 3, 7 and 8A-8B, the movable locking element 90 can be formed as a single integrated component and is adapted to seat within both of the receiving groove 30C of the lock connector portion 30 of the frame element and the channel 92. The movable locking element 90 includes a main body that has formed on a first side a pivoting rail 96 sized and dimensioned for seating by way of an interference fit in the lock receiving groove 30C. The movable locking element 90 has formed on an opposed side a ramp rail 98 adapted for engagement with the ramp assembly 100. Those of ordinary skill in the art will readily recognize that the movable locking element can be formed from separate and distinct components that are secured or coupled together. The ramp assembly is coupled to the illustrated movable locking element 90. Specifically, the bottom portion 106 of the ramp member 102 is positioned so that the ramp rail 98 of the movable locking element 90 contacts a top surface of the bottom portion, and specifically seats within the detent groove 120 formed on the top surface of the ramp element portion 106. The top portion 104 of the ramp assembly 100 is then seated over the ramp rail portion and the second terminal end 112 is positioned beneath the pivoting rail 96. Specifically, the tab portion 114 of the flattened end portion 116 is seated within the channel 130 formed in the second terminal end 124 of the bottom portion 106. The fasteners are seated within the apertures 136 to secure the top and bottom ramp portions together. When assembled, the pivoting rail 96 contacts the top surface of the ramp portion 104. The ramp rail 98 is freely movable within or between the assembled top and bottom ramp portions.

In operation, when the door lock assembly is fully assembled and integrated within the door frame, the movable locking element 90 can be moved between an unlocked position where the element is stored within the frame and specifically within the groove 92, and a locked position where the movable locking element is moved pivotably outwardly from the groove 92 so as to seat within a channel formed in a side of the door panel. With reference to the foregoing Figures, and with particular reference to FIGS. 9A-11B, the control panel 22 includes suitable electronics for actuating the door lock assembly 20. The door lock assembly can be actuated by any suitable actuation device, either electrical or mechanical or both, such as a wireless component, including for example, a key fob, smartphone, tablet, watch or any other suitable mobile electronic or mechanical device. The wireless device can communicate with the door lock assembly either through radio frequency waves such as WiFi or Bluetooth, or through infrared. The actuation device hence is capable of operating as a universal key in the sense that the device is not restricted to opening a particular entry into a dwelling, but rather operates as an identity based device since it is personal to the user.

Figure 9A:
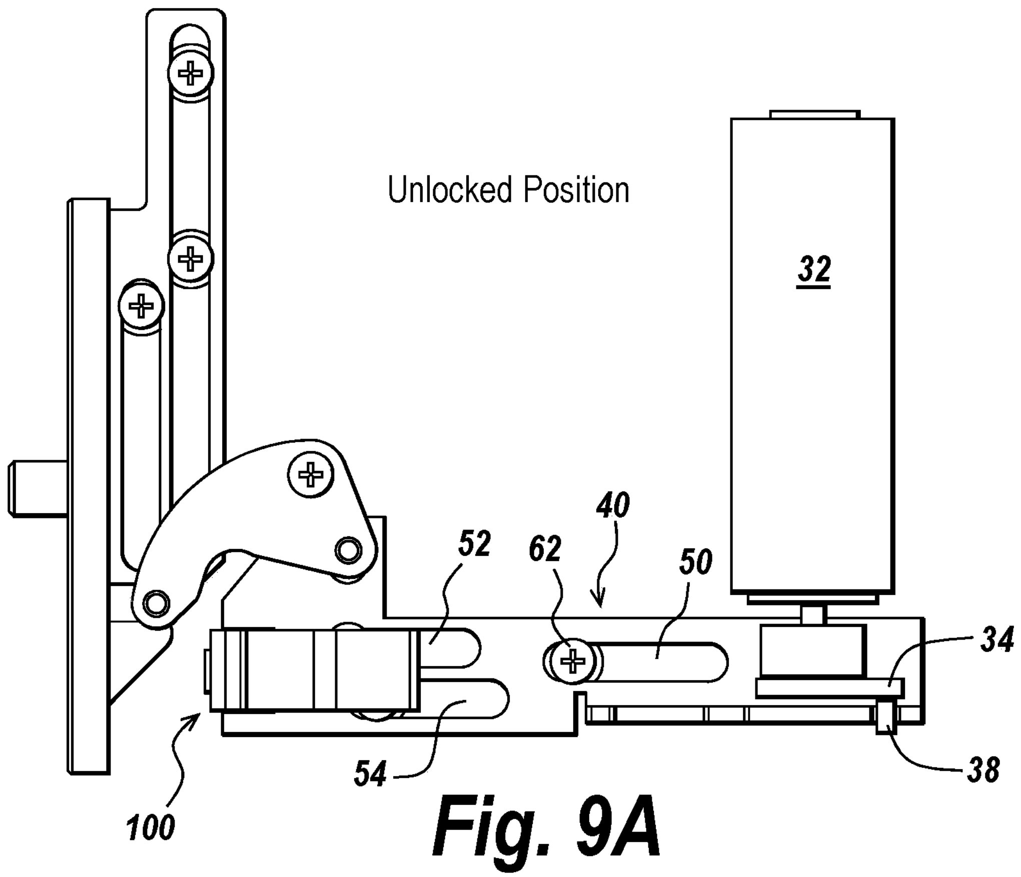
FIG. 9A is a front perspective view of selected components of the door lock assembly of one embodiment of the present invention disposed in the unlocked position.
Figure 9B:
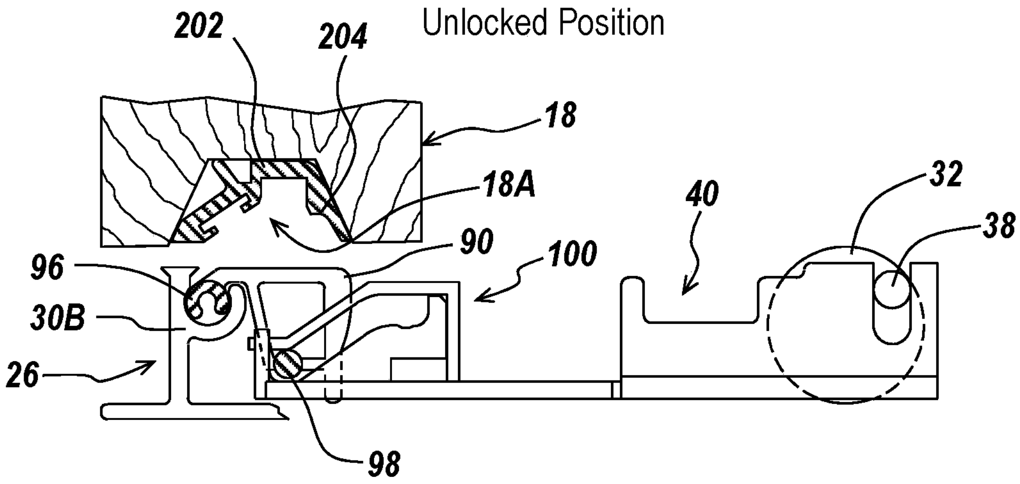
FIG. 9B is a top cross-sectional view of selected components of the door lock assembly of one embodiment of the present invention disposed in the unlocked position.
Figure 11A:
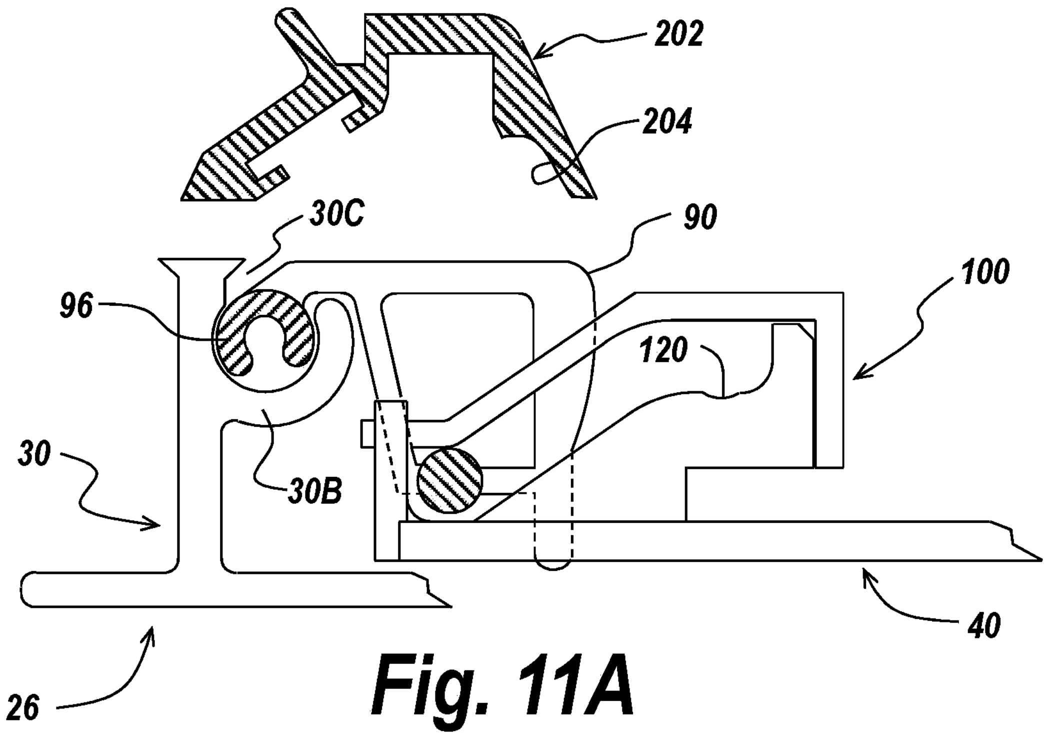
FIG. 11A is a top cross-sectional view of selected components of the door lock assembly of one embodiment of the present invention disposed in the unlocked position and showing the position of the movable locking element relative to a door panel.

When the unit is not actuated, the lock can be disposed for example in the unlocked position (FIGS. 9A-9B and 11A). When disposed in this position, the cam portion of the motor is disposed in a rightward most position so that the cam pin 38 coupled thereto pulls or moves the drive plate into a rightward most position. The fastener 62 is positioned within the drive plate channel 50 at a leftmost end. The ramp assembly 100 that is seated within the cut-out 86 of the drive plate is also disposed in a rightward most position. In this position, the ramp rail is removed from the detent groove and seats in a lower region of the top surface of the bottom portion 106 of the ramp assembly 100. In this position, the movable lock element is stowed or seated within the channel 92 and does not extend outwardly therefrom to seat within a channel 18A formed within the door panel 18.

Figure 10A:
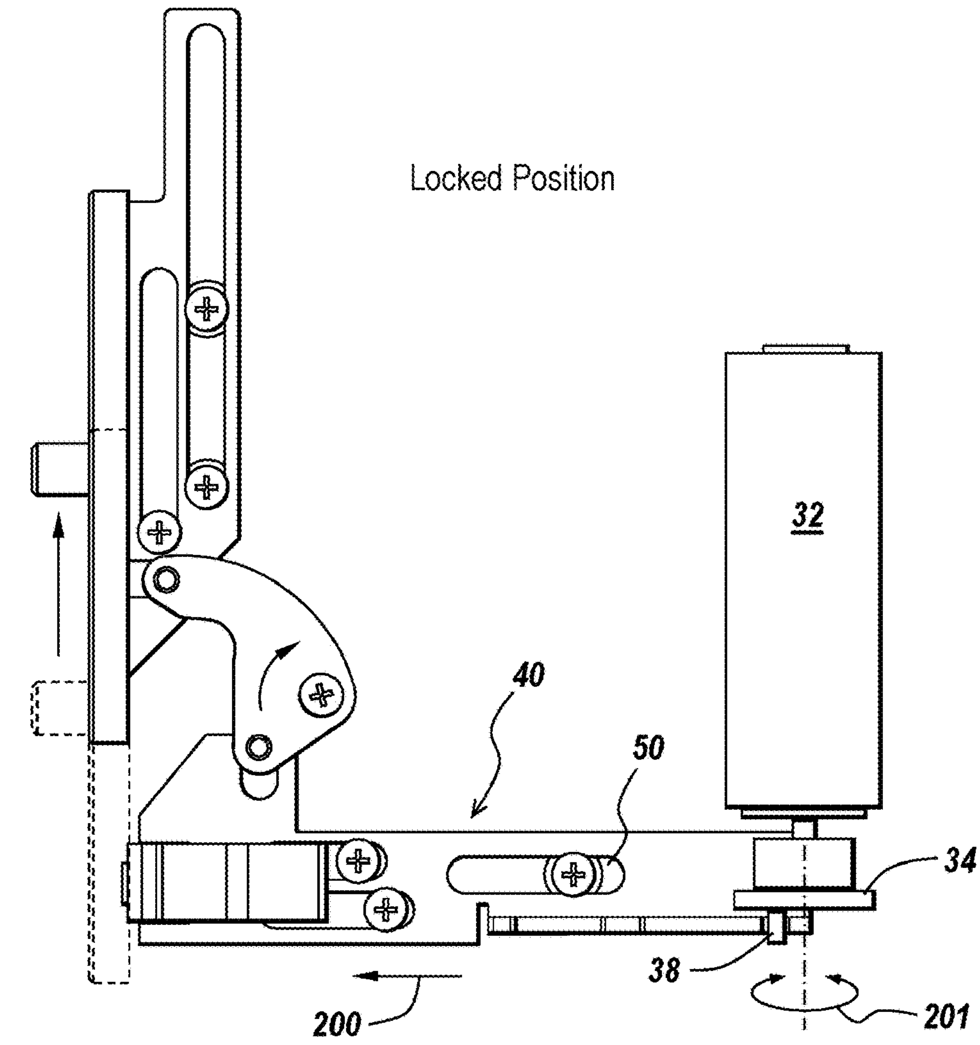
FIG. 10A is a front perspective view of selected components of the door lock assembly of one embodiment of the present invention disposed in the locked position.
Figure 10B:
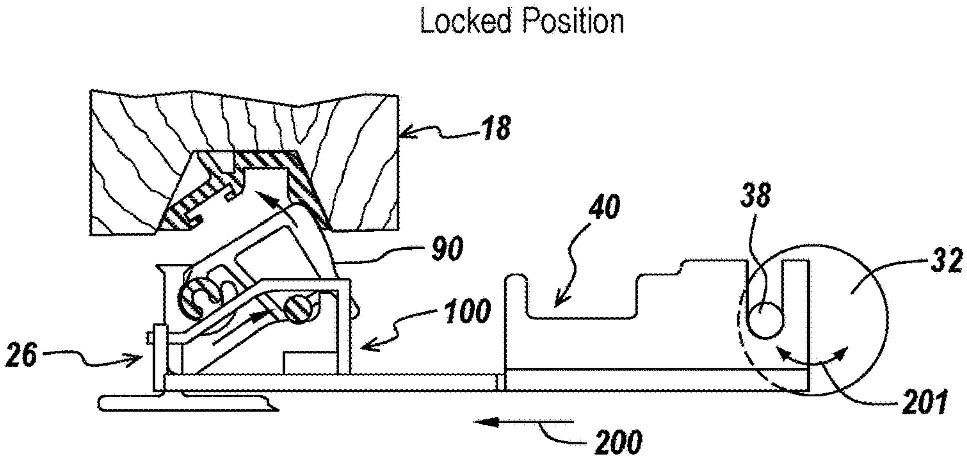
FIG. 10B is a top cross-sectional view of selected components of the door lock assembly of one embodiment of the present invention disposed in the locked position.
Figure 11B:
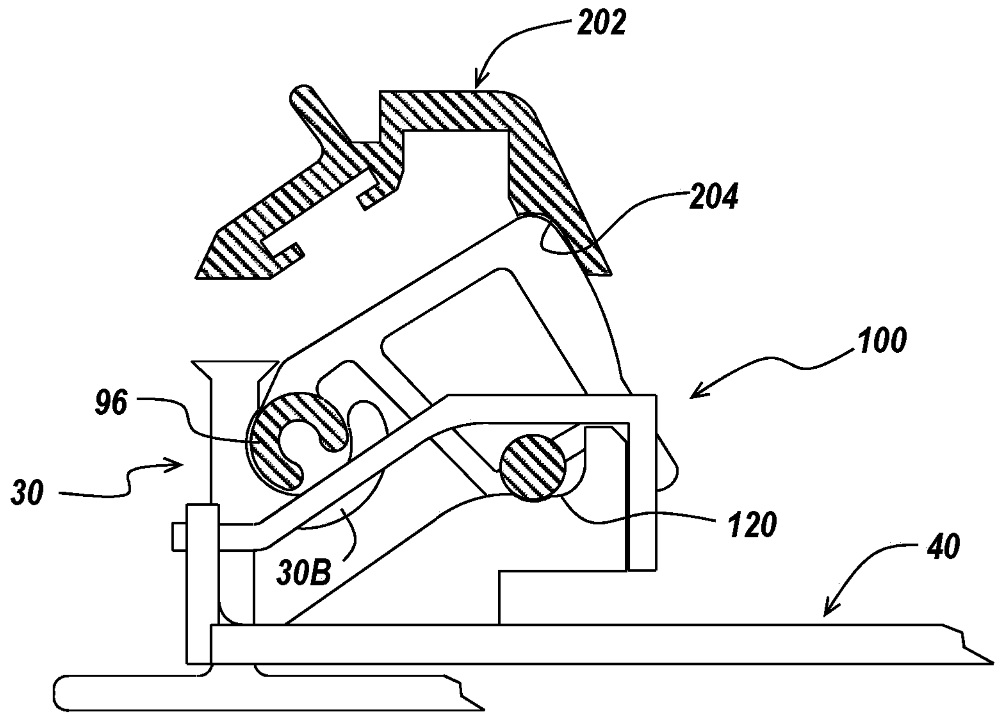
FIG. 11B is a top cross-sectional view of selected components of the door lock assembly of one embodiment of the present invention disposed in the locked position and showing the position of the movable locking element relative to the door panel.

When the unit is actuated, as shown in FIGS. 10A, 10B and 11B, the movable locking element is moved from the unlocked position into the locked position. In order to actuate the locking element, a signal is sent from an actuation device (not shown) to the door lock assembly 20. The electronics within the door lock assembly actuate the motor 32. The motor rotates its axis, as indicated by arrow 201, so as to move the attached cam element 34 in a lateral direction from the rightmost position to a leftmost position, as indicated by arrow 200. As the cam element moves in this direction, it drives the drive plate 40 in the lateral direction 200, which in turn moves the ramp assembly 100. When the ramp assembly 100 is moved in the lateral direction, the ramp rail 98 captured between the top and bottom portion of the ramp assembly moves along the inclined outer surface of the bottom portion 106 until the ramp rail seats within the detent groove 120. As the ramp rail is moving along the top surface of the bottom ramp portion, the pivoting rail 96 of the movable locking element 90 pivots within the lock receiving groove 30C. This combined movement moves the movable locking element 90 from the stowed (retracted) unlocked position into the deployed locked position. The outer surface of the locking element moves into the channel 18*a* formed in the door panel and sealingly engages or mates with an engaging portion 204 of the sealing element 202 mounted within the channel 18A. The sealing element can be any suitable weather stripping element.

When the locking element 90 contacts the engaging portion 204 of the sealing element 202, the locking element forms a strong sealing and locking connection. Indeed, any additional force applied to the door panel from an outside surface or side enhances and strengthens the sealing contact between the locking element 90 and the sealing element 202.

Those of ordinary skill will readily recognize that the battery 58 housed within the door lock assembly 20 can power one or more of the other components of the assembly either directly or indirectly. The battery can be charged during periods of non-use by a power source, such as through any local electrical connection.

The control panel 22 which forms part of an overall control box can be formed as a modular component. As such, if the control box needs to be replaced, the old box can be disconnected or removed from the frame and a new box can be installed. Hence, the control box is a removable and replaceable component of the door lock assembly 20.

Another feature is that the door lock assembly 20 can be constructed so that the motor drives the drive plate, cam and hence locking element into the locked or unlocked position to provide a final sealing function, if moved into the locked position, or a final stowing function if moved into the unlocked position.

In further operation, the door lock assembly may be controlled by a suitably programmed computing device. In one exemplary embodiment, the computing device may be a mobile computing device such as a cell phone, smart phone, watch, tablet computer, or customized device such as a fob, or any other suitable electronic device. The computing device may include a wireless transmitter, such as a radio antenna, for wirelessly communicating with the lock. It should be noted that the lock may be controlled by any alternative means which include a method for identifying a user, such as by entering a user-assigned pin number on a keypad, or biometric authentication (e.g., using a fingerprint, facial recognition, voice commands, or other means), among other possibilities.

The computing device may be programmed to set up and manage a door lock assembly at one or more access points in a dwelling or other secured area, which may include identifying the specific lock, designating an owner or administrator for the lock, and registering users who have rights to perform actions with respect to the lock. Such actions may include locking or unlocking the door lock assembly, viewing the current status of the lock (e.g., "locked" or "unlocked"), accessing a camera associated with the lock, viewing a log of when the lock's status was changed, etc. Furthermore, such actions may include administrative actions, such as recognizing and registering a new lock, inviting users to have access rights to the lock, restricting users from using the lock and/or limiting access rights for existing users of the lock.

Actions and rights may be applied to a particular door lock assembly, or may be applied together to a group of locks organized into common locations (e.g., the "My House" location may have a Front Door lock, a Back Door lock, and a Garage Door lock). Similarly, individual users may be managed using the computing device, or users may be grouped together and managed as a group.

Access and/or administrative rights over locks may be restricted to certain times for particular users. For example, a user may be assigned "guest" access rights which last for a specified period of time (e.g., one week) or until a specified time (e.g., until April 1 at 6:00 PM).

Exemplary interfaces for setting up and administering a lock and managing users of the lock are described below, with reference to FIGS. 12-18. Although FIGS. 12-18 depict exemplary interfaces such as those that might be found on actuation devices, such as smart phones or key fobs, one of ordinary skill in the art will readily recognize that the interfaces of FIGS. 12-18 are intended to be exemplary. Any of the exemplary interfaces described below may be implemented on any suitable device. Suitable interfaces for controlling and/or administering locks implemented as part of a door lock assembly may include more, fewer, or different elements than those depicted in FIGS. 12-18.

Figure 12:
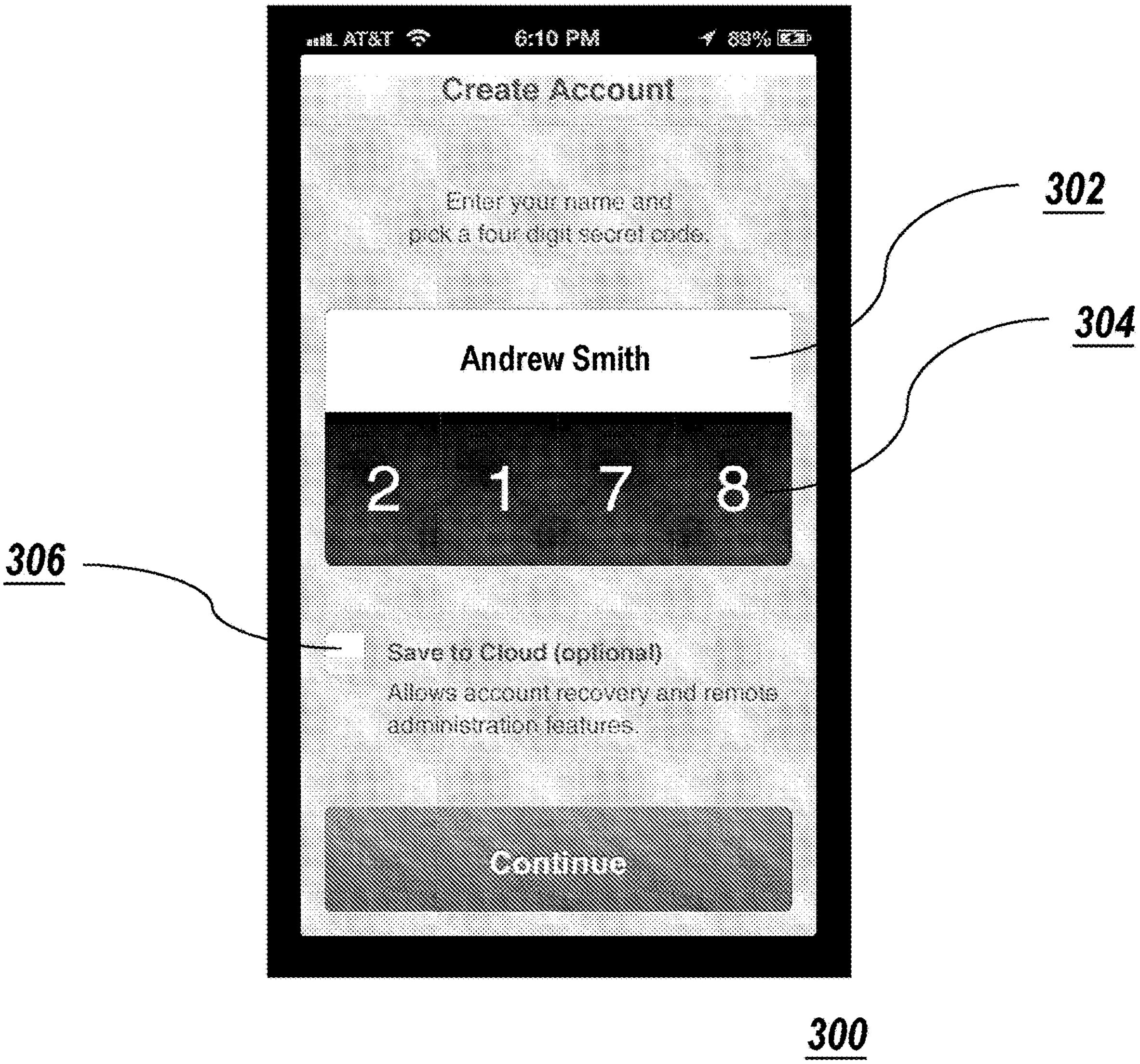
FIG. 12 is a representation of an exemplary account registration interface for use with a suitable electronic device according to one embodiment of the present invention.

In order to gain rights to access and manage locks, a user may first register an account, as shown in the exemplary account registration interface 300 of FIG. 12.

The account registration interface 300 may include an identification dialog 302 for entering an identifier, such as a name. The identifier may be, for example, an alphanumeric string. The identifier may be used to identify the account associated with the user.

The account registration interface 300 may further include a code entry 304 for entering a secret or non-public code associated with the user's account. The code may be required in order to take actions related to the account, such as changing the status of a lock to which the account has access rights and/or administering a lock (e.g., adding guest users to the lock). The code may be selected by the user, or may be assigned by the registration software (e.g., by choosing a random number). The pin may be, for example, alphanumerical or strictly numerical.

Optionally, the account registration interface 300 may include a remote administration option 306. The remote administration option may allow the user's account settings to be stored in a remote location, such as a centralized server. This option allows for account recovery, in case the user's account information is accidentally deleted from the local actuation or mobile device. Furthermore, by saving the user's account information remotely, the user can access the account from a device that is different than the actuation device on which the original account registration was completed.

In one embodiment, no account or lock information is saved remotely. Rather, the account and lock information resides solely on the user actuation devices and the locks themselves. For example, the lock may be provided with a non-transitory storage medium which is in physical contact or short range wireless communication (e.g., less than 100', or as determined by typical ranges associated with a short-range wireless protocol such as a typical WiFi transmitter or Bluetooth® transmitter) with the locking mechanism. Thus, all the "keys" associated with the lock may be stored securely in the locking mechanism itself. In this way, there is no central storage location which could be compromised, thereby also compromising all the locks and user accounts stored in the central storage location. Hence, the actuation or mobile device operates or functions as a universal key since it can be programmed to open any particular lock in any particular dwelling. As such, the actuation device can be deemed to be an identity based device since it is associated with the user and whether that user has permission to enter a specific dwelling rather than a lock specific device.

When a user wishes to register a new lock so that the lock may be managed, the user may perform an initial setup procedure for the lock using registration software, as shown in FIGS. 13A-13E.

Figure 13A:
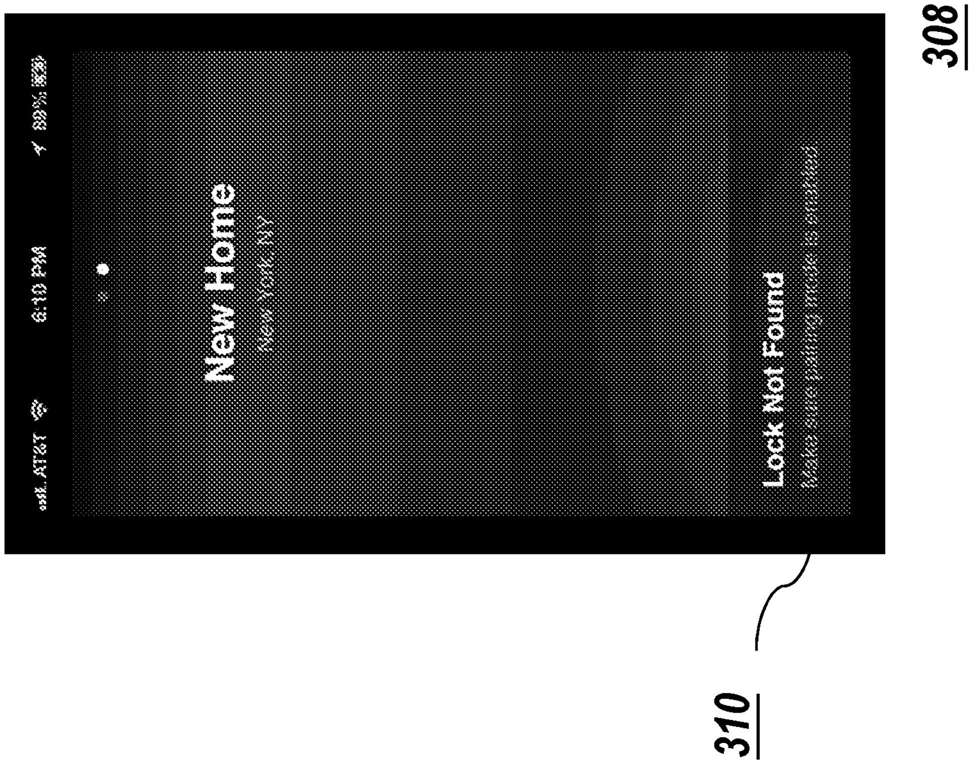
FIGS. 13A-13E are representations of an exemplary initial setup procedure employing set-up interfaces for the door lock assembly according to one embodiment of the present invention.

FIG. 13A depicts an exemplary search interface 308 for locating a new door lock assembly. A status bar 310 may indicate whether the registration software has identified the lock. For example, the registration software may attempt to contact the lock using a suitable protocol and/or algorithm, such as a WiFi or Bluetooth® "handshake."

The lock and/or registration software may be provided with authentication capabilities to ensure that only an authorized user sets up the lock. For example, the lock may be configured to respond only to a handshake from a predetermined setup account. Upon purchasing the lock, the user may be provided with information allowing the user to access the predetermined setup account (e.g., an access code unique to the lock which, when entered into the registration software, allows the registration software to communicate with the lock), and thereby set up the lock.

Figure 13B:
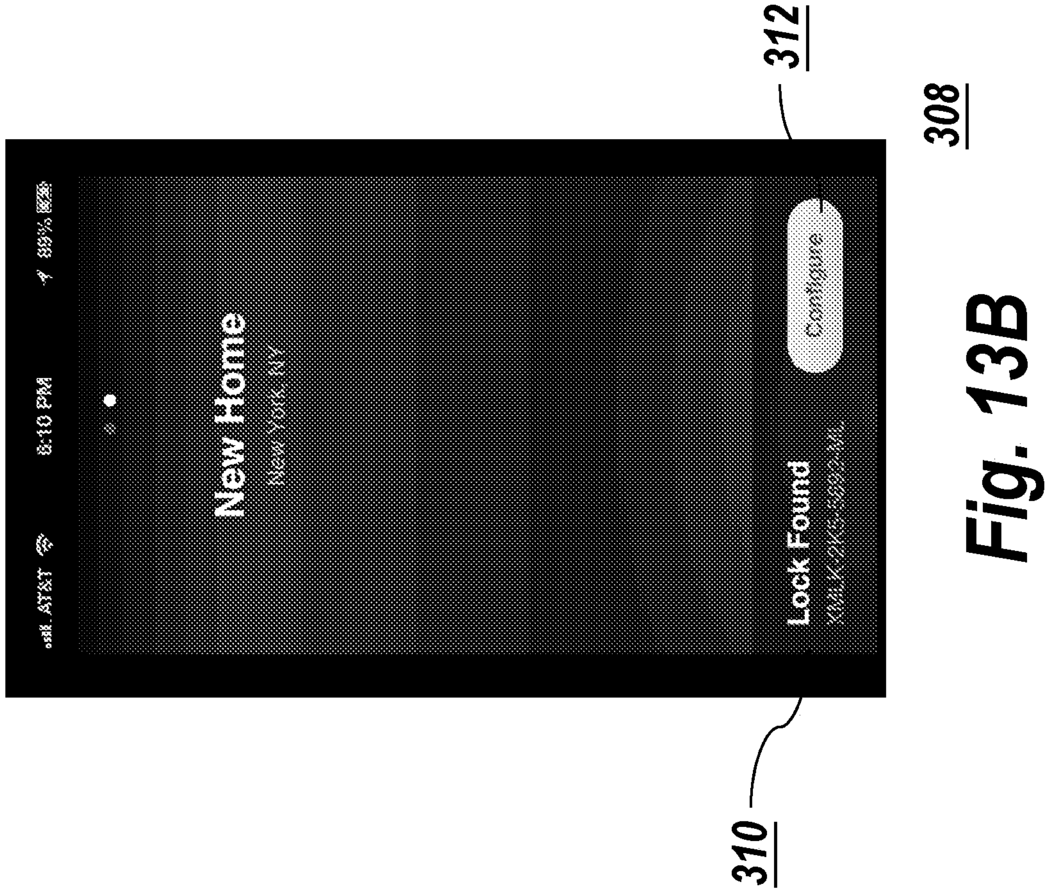

Once the registration software has successfully connected to the lock, the interface 308 may be updated so that the status bar indicates the identity of the lock, as shown in FIG. 13B. The lock may be identified, for example, by a registration number or name. An interface configuration element 312, such as a button or slider, may be provided for configuring the lock.

Figure 13D:
Figure 13C:
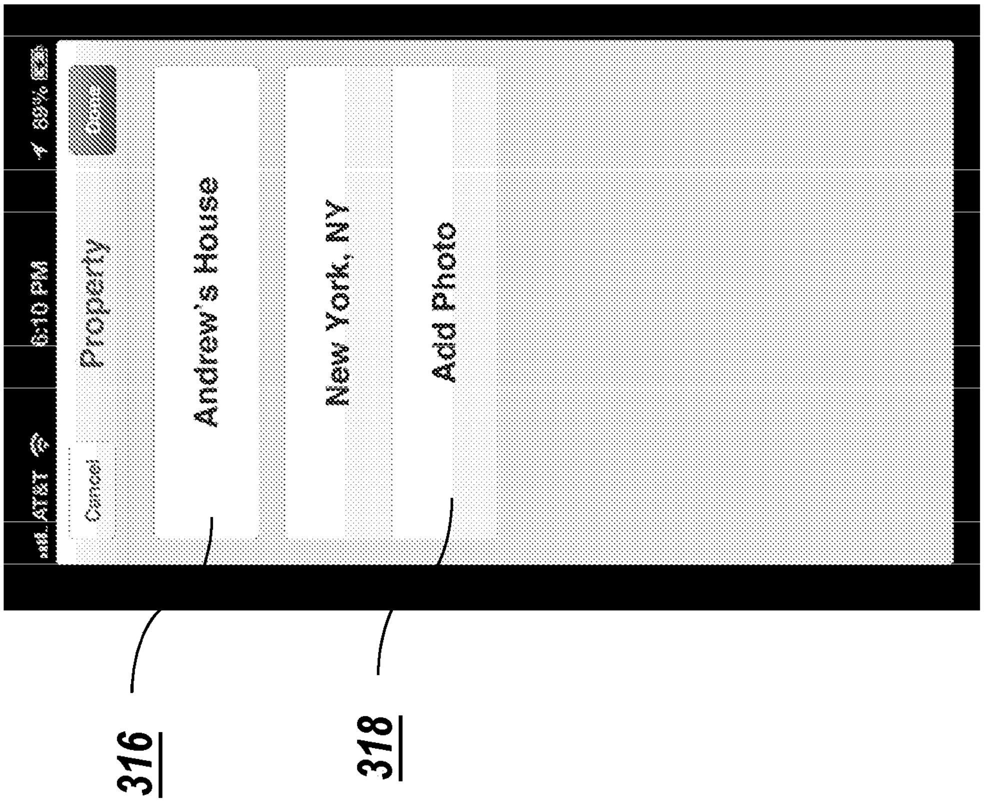

Upon selecting the interface configuration element 312, a configuration interface 314 may be presented for configuring basic information about the lock, as depicted in FIG. 13C. The configuration interface 314 may include fields, such as field 316, for entering a name for the lock and a location for the lock.

Multiple door lock assemblies may be associated with a particular location, such as by assigning the locks a common location identifier. In one embodiment, locks with a common location identifier may be administered and/or accessed together as a group or a single entity. For example, if a user is given access rights to lock/unlock a particular location (e.g., "John's House"), then the user may lock or unlock any and/or all locks associated with the location (e.g., "John's Front Door" or "John's Back Door").

A graphic identification element 318 may be provided for allowing a user to create or select a graphic representing the lock. For example, the graphic identification element 318 may present an option to select an existing photograph, such as a photograph stored on the user's mobile phone or on a remote server, to represent the lock. Alternatively or in addition, if the registration software detects that it is running on a device (such as a mobile phone) that is equipped with a camera, the graphic identification element 318 may prompt the user to take a picture of the lock or the fixture in which the lock is installed (e.g., a door, garage door, window, etc.). The picture may be used to identify the lock. Alternatively or in addition, the registration software may be provided with preconfigured graphics that may be used to represent the lock. Upon selecting the graphic identification element 318, the user may be presented with the preconfigured graphics and prompted to select a preconfigured graphic to represent the lock.

Upon selecting or creating a graphic to represent the lock, an editing interface 320 may optionally be presented, as shown in FIG. 13D. The user may use the editing interface 320 to, for example, scale, crop, brighten or darken, or otherwise adjust the created or selected graphic.

Figure 13E:
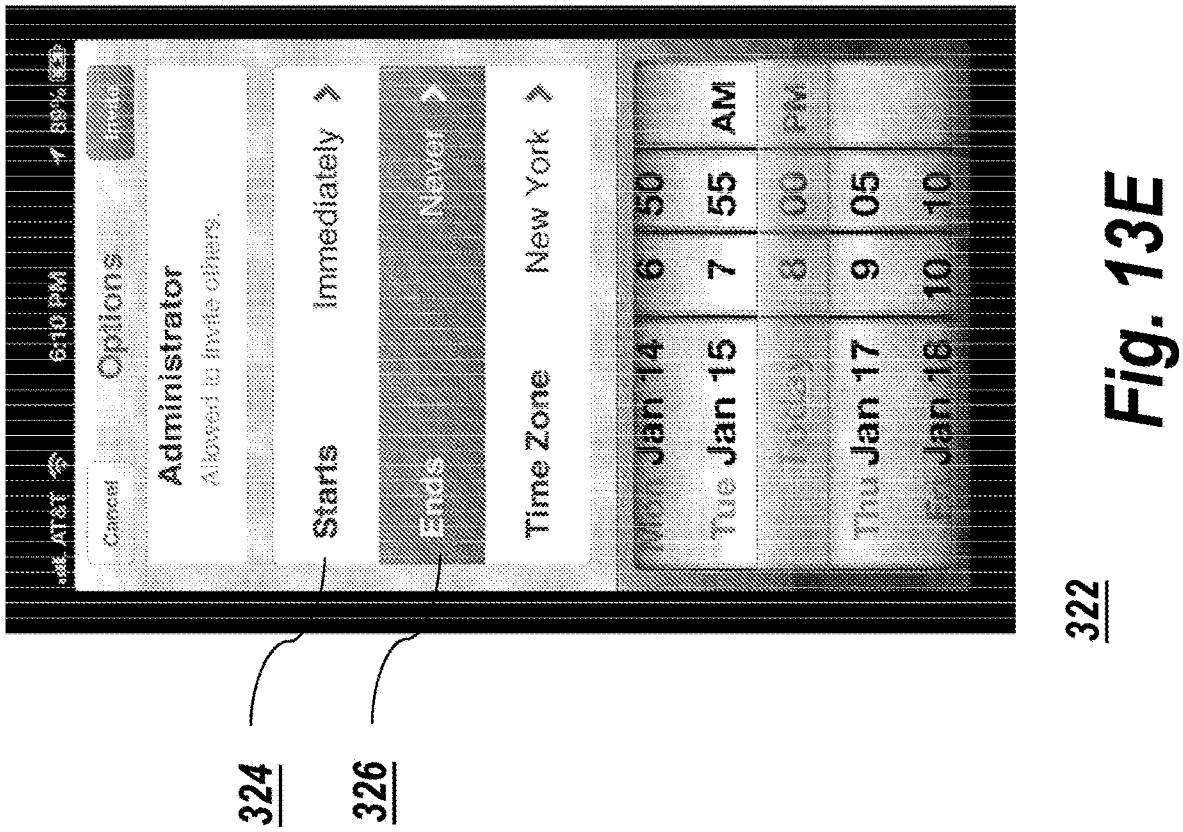

After the lock is set up, the registration software may prompt the user to define an administrator for the lock in an administrator interface 322, as depicted in FIG. 13E. The lock administrator is entitled to change lock settings, view logs associated with the lock, and invite other users to use (e.g., lock and unlock) the lock, among other possibilities. A lock may have more than one administrator.

The administrator may be a permanent administrator, or a temporary administrator may be defined. The administrator interface may include a timeline configuration tool with a starting input 324 and an ending input 326. The starting input 324 and the ending input 326 may be used to identify, respectively, when the administrator's term as an administrator begins and ends. A permanent administrator may be established by setting, for example, the starting input 324 to "immediately" and the ending input 326 to "never." A temporary administrator may be established by setting specific starting and ending times defining the temporary administrator's term. If a temporary administrator is established and the temporary administrator's term expires without providing a new administrator, then the temporary administrator may be prompted to select a new administrator.

When an administrator is removed from a lock, the lock may optionally be placed into escrow. This may be particularly applicable when a property such as a house is sold and administration of the locks on the house is passed to a new owner. Secure ownership of locks associated with a particular location may be transferred to a third party, such as an escrow company. When ownership of the property is transferred to a new owner, the escrow company may transfer ownership and administration privileges for the locks to the new owner as well.

Similarly, if a transfer is made directly from the old owner to the new owner, the old owner may securely relinquish access rights directly to the new owner by specifying that the new owner should become an administrator on a certain date, and by specifying that the old owner's administration privileges expire on that date.

Alternatively, the old owner may relinquish administration privileges without specifying a new administrator. In this case, the lock may return to a factory-default setting and await a claim by an owner with the lock's original predetermined setup information. In another embodiment, the old owner may specify a code that, when entered by the new owner, causes ownership and/or administration privileges of the lock or locks at a particular location to pass to the new owner.

In the above-described embodiments, a user device such as a mobile phone may be configured to function with (e.g., administer or access) a lock by registering the lock with a user account associated with the user device. It should be noted that multiple user devices may be registered with the user account.

For example, if a user account is initially set up on a mobile device such as a phone, the user may also authorize a custom fob to work with the user account. The mobile device may take ownership of the fob by programming the fob with a group ID or location ID associated with a location (e.g., a group of locks that are related to each other or in proximity to each other, such as locks on a particular house), or an account ID associated with the user account. A device ID and/or token associated with the fob may similarly be added to the user account (e.g., in a database or data structure on the mobile device or a central server which stores registration information for user accounts). Any number of hardware devices and/or access methods may be associated with a user account.

In a similar manner, a hardware device that is associated with a user account may be removed from the user account and/or associated with a different user account. Thus, ownership of the hardware device may be securely transferred between users.

Alternatively or in addition to the above registration procedures, a user who initially does not have access rights to access a particular lock may request such access rights.

The lock may be a private lock associated with one or more owners, as noted above, or may be a common, public, or shared lock which may be accessible by a user if the user meets certain criteria. For example, a restroom may have a lock that is only accessible by users of the appropriate gender. In some cases, any member of the public may request access to the public lock, while in other cases access to the lock may be restricted (e.g., an employees' restroom may be accessible only to people who work at a particular company).

The user may approach the lock with a mobile device, fob, or other device and place both the lock and the device into a pairing mode. This may be accomplished in a single action, for instance by tapping the device to the lock. Alternatively, the lock and device may be separately placed into pairing mode by issuing commands to the lock and/or device.

The lock and device may attempt to pair with each other and, if successful, the lock and/or device may identify that the device is not authorized to access the lock. Accordingly, a message may be displayed to the user on the device indicating that the user does not have access to the lock, and querying whether the user would like to request access. The device may accept the user's request to access the lock.

If the lock is a private lock, the request may be transmitted to one or more owners of the lock, who may then approve or deny the request. If the request is approved, the user may be provided with the necessary privileges to access the lock, as described in more detail below. Alternatively or in addition, the owner may simply be notified that the user is waiting at the lock (e.g., through a bell or chime similar to a doorbell), in which case the owner may remotely unlock the door. In another embodiment, tapping an unauthorized device to the lock may cause the device to initiate a telephone call or video chat with the owner of the lock.

If the lock is a public lock, an interface may be presented for entering information about the user of the device. The information may include identifying information, such as a name and/or a phone number, and/or may be descriptive. The descriptive information may be used to determine whether the user is permitted to access the lock. In the example above regarding the restroom, the user may be queried as to whether they are male or female. Once the information is entered, the lock, device, and/or a remote server may determine, based on the user's responses, the user is authorized to access the lock. The lock may store records, including the entered information and/or a timestamp, relating to attempts to access the lock by the electronic device. In this way, a history of which users entered the room secured by the lock may be maintained.

In some situations, the user may be requested to provide authenticating information to determine whether the user is permitted to access the lock. For example, if the lock secures an employees' restroom as in the example above, the user may be asked to provide their employee ID number, login password, or another identifier.

Accordingly, users without access to a private or public lock may request that they be granted access to the lock.

Figure 14:
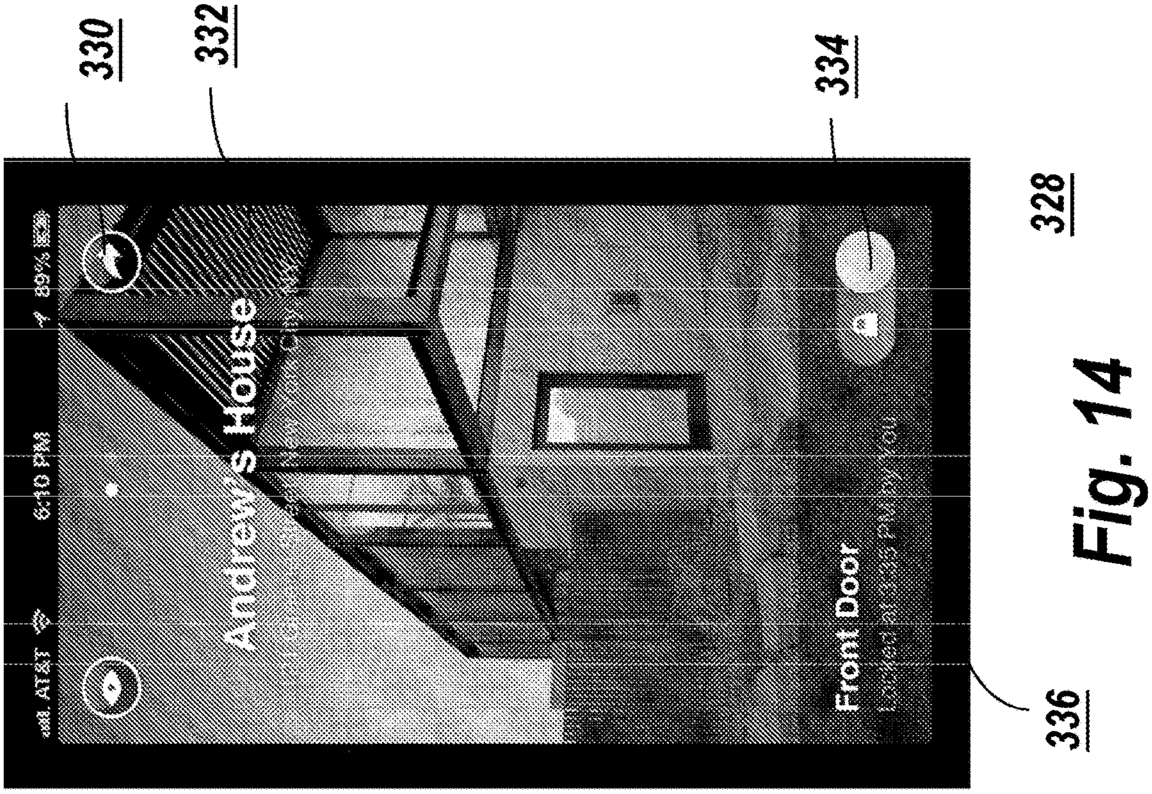
FIG. 14 is a representation of an exemplary management interface 328 for managing the state of the door lock assembly according to one embodiment of the present invention.

After initial setup, users with appropriate access rights to the lock may manage the state of the lock through a suitable interface. For example, FIG. 14 depicts an exemplary management interface 328 for managing the state of the lock.

The management interface 328 may include a selection mechanism 330 for choosing a particular lock associated with the user's account. In the exemplary management interface 328, two locks are associated with the user account, as indicated by the two dots in the center/top of the display, and the selection mechanism allows for a selection of one of the two locks to be made. Identification indicia 332 provides general information about the currently-selected lock, such as a name and/or address of the lock and a graphic representing the lock.

A locking mechanism 334, such as a button or a slider, may be presented for changing the status of the lock (e.g., to "locked" or "unlocked"). The locking mechanism 334 may display the current status of the lock, or the current status may be displayed separately from the locking mechanism 334.

Upon activating the locking mechanism 334, a signal may be sent to a processing device associated with the lock, which actuates the lock to change the lock's status to reflect the user's selection. In exemplary embodiments, the user device may communicate with the lock through a wireless signal, such as a Bluetooth® signal. The user device may be pre-paired with the lock or otherwise preauthorized to use the lock so that the user device can simply transmit a "lock" or "unlock" signal without the requirement of discovering the lock and performing initial setup when the lock is first encountered.

In one embodiment, the lock may communicate with user devices through a courier that connects the lock to a secure remote server. Accordingly, user devices may not communicate with the lock except through a secure connection. In other embodiments, the lock may communicate directly with user devices using a secure protocol.

Upon receiving a lock or unlock signal, the lock may automatically take action to actuate the internal locking mechanism (as described in detail above), thereby locking or unlocking the lock.

A log of actions taken with respect to the lock may be maintained and viewed by certain users who have the right to access the log. For example, every time the lock is unlocked or locked, the time and user who initiated the action may be noted in the log. When additional users are given rights to the lock or when existing users are restricted from using the lock or have access rights restricted, such administrative changes may also be noted in the log. The log may be stored on a computing device associated with an administrator of the lock, at a central location connected to the lock and/or users of the lock through a network, or on the lock itself.

The management interface 328 may include a log summary 336 describing the most recent action take with respect to the lock. For example, the log summary 336 may display the last time the lock's status was changed, what the status was changed to, and which user changed the status. This information may be retrieved from the log if the user has sufficient privileges to view the information in the log. If the user does not have sufficient access rights to view the log, then the registration software may abstain from displaying the log summary 336.

Figure 15B:
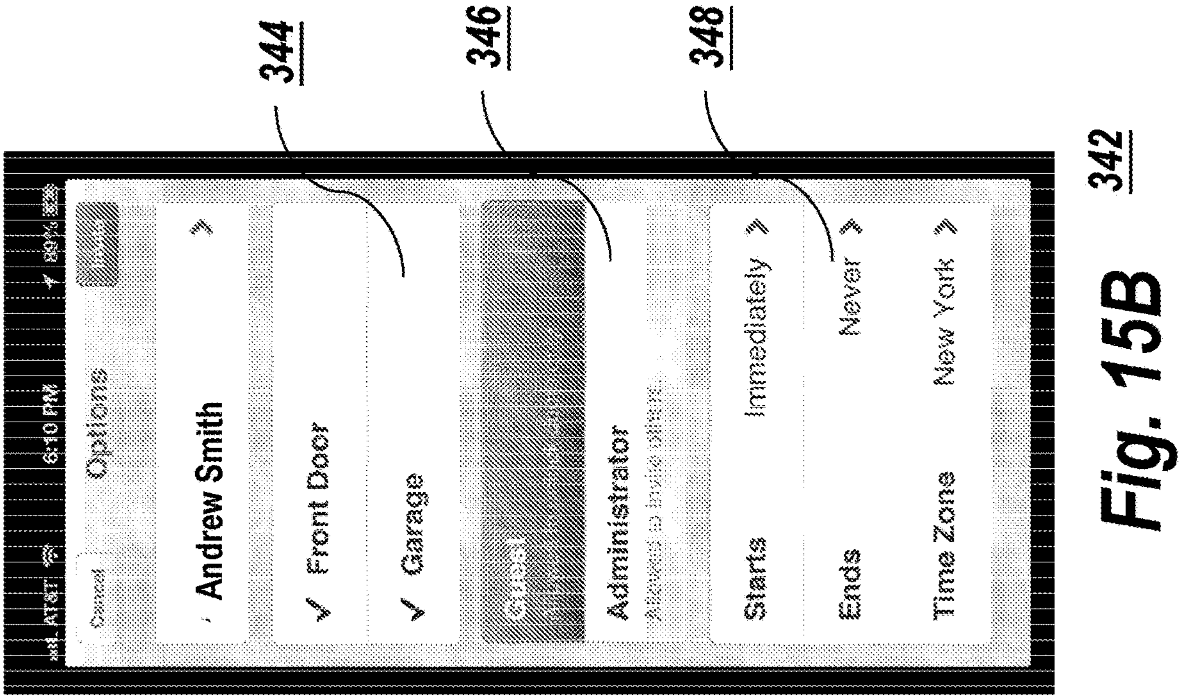
FIGS. 15A-15C are representations of exemplary interfaces for offering access rights to a user that is not currently registered with the door lock assembly according to one embodiment of the present invention.

A user with administrator rights to a lock may invite additional users to have access rights to the lock. For example, FIGS. 15A-15C show exemplary interfaces for offering access rights to a user that is not currently registered with the lock.

Figure 15A:
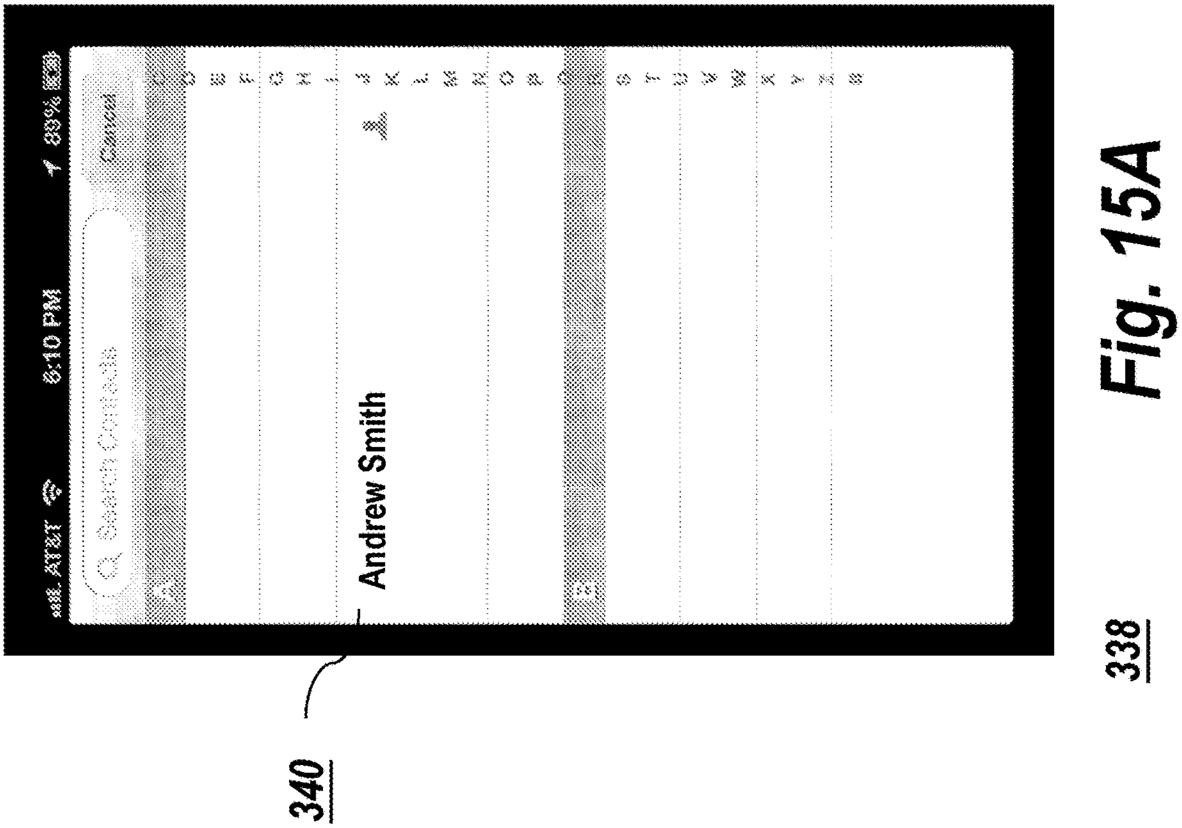
Figure 15C:

The registration software may access a contacts list 338 of the administrator, as shown in FIG. 15A. The contacts list may display one or more contacts 340 which may be selected by the administrator to assign the contact 340 access rights to the lock. The contacts list 338 may be derived, for example, from a contacts list on the administrator's mobile device (e.g., a phone directory or email contacts list) or any other suitable electronic device, such as a computer.

Upon selecting a user 340, the administrator may be presented with a user administration interface 342, as shown in FIG. 15B. The user administration interface 342 may include a list 344 of locks to which the user may be given access rights. The list 344 may include each lock that the administrator is capable of assigning access rights to. The list 344 may also include the locks associated with a particular location (e.g., "Home"). Checkboxes on the list 344 may allow the administrator to select which locks, from those available, to which the user will be given rights.

An access rights level selector 346 may be provided to assign different sets of access rights to the user. For example, a user who is designated is a "guest" may have rights to change the status of a lock (e.g., to lock or unlock the door lock assembly). A user who is designated as an "administrator" may be permitted to invite other users to have access rights over the lock.

A temporal limitation selector 348 may allow the administrator to define a time period for which the invited user is permitted to access or administer the lock. The user may be given permanent rights to the lock by assigning a start time of "immediately" and an end time of "never." Alternatively, the user may be given temporary rights by defining a particular time frame in which the user is permitted to access the lock.

Upon selecting a user and configuring the user's rights with respect to the lock, an invitation may be generated and transmitted to the user. For example, the invitation may be sent to a mobile device defined by an identifier associated with the user in the contacts list 338 (e.g., a phone number or an email address).

When the invitation is sent to the user, the user may be presented with an invitation interface 350, as depicted in FIG. 15C. The user may be presented with an indication of the location 352 of the lock, the name of the administrator 354 who sent the invitation, and an option 356 to accept or decline the invitation.

If the invitation is accepted, the lock may be added to the user's account. For example, the user's mobile device or fob may include a non-transitory storage medium storing one or more tokens, where each token represents a lock or group of locks to which the user has access rights.

In one embodiment, locks may be represented on a client-side storage medium as participants in a "chat room." One or more chat rooms on the client device may represent locations to which the client has access rights (e.g., "My House"). Within the chat room, one or more locks may be represented as participants (e.g., in the "My House" chat room, participants may include "My Garage," "My Front Door," "My Back Door," etc.). When approaching a particular location defined by a chat room (as determined, e.g., by GPS coordinates), the members of the chat room may be determined and any requisite setup may be performed (e.g., pre-pairing the user device with the lock, as described in more detail below) so that the user can simply approach the lock and request that the lock be opened.

Thus, details about which locks a user has access to may be stored directly on the user's device, thereby turning a single "key" (e.g., the user's device) into an access mechanism opening any lock to which the user has rights. Instead of the conventional technique where a key provides access to a single lock, in some embodiments, a key is tied to a user's identity and may open any lock to which the user has been assigned access rights.

The lock may be pre-paired with the user's device so that the user will be able to immediately change the status of the lock without the need to search for, discover, and/or initially pair with the lock. For example, the invitation may include pairing information for the lock (such as an identifier, access code, protocol, and/or frequency which may be used to communicate with the lock) so that the user's device may be preconfigured with sufficient information to allow the user's device to communicate with the lock immediately. In this manner, the user device may be preauthorized to communicate with the lock.

Figure 16:
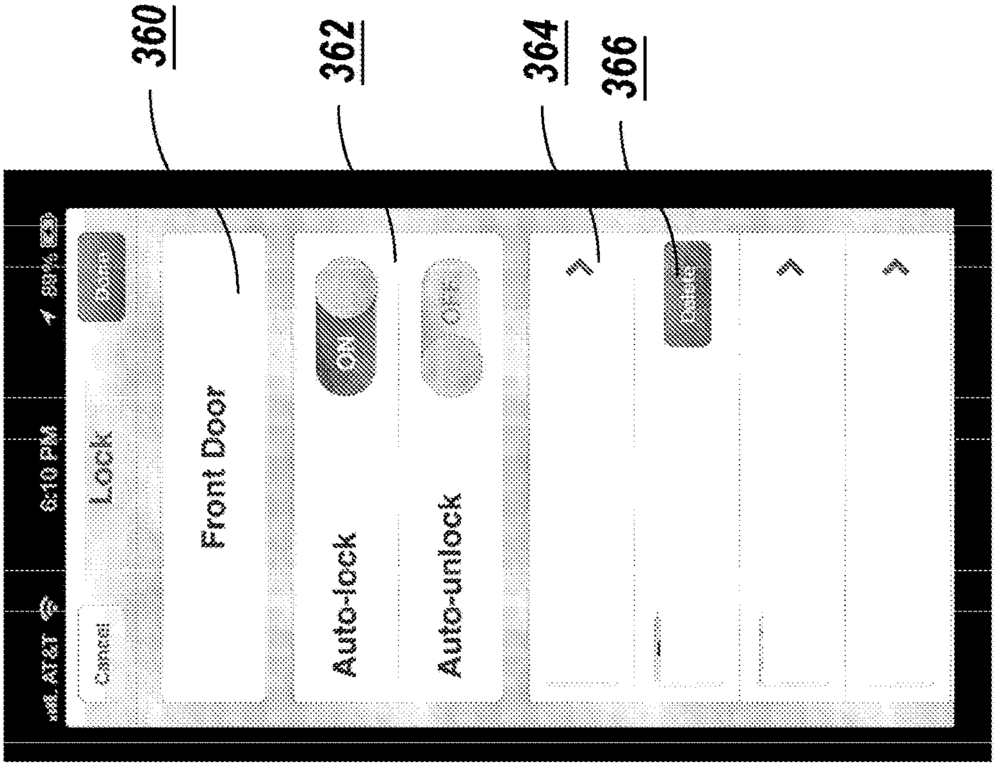
FIG. 16 is a representation of an exemplary administrative interface for a particular door lock assembly as identified in an identification frame assembly according to one embodiment of the present invention.

A user with sufficient rights may be presented with administrative details regarding the lock. For example, FIG. 16 depicts an exemplary administrative interface 358 for a particular lock as identified in an identification frame 360.

The administrative details may include options 362 for enabling auto-locking and auto-unlocking of the door lock assembly. When auto-locking or auto-unlocking is enabled, the status of the lock may be changed based on the proximity of the user's device to the lock. When the user's device approaches to within a predetermined distance of a door panel of the dwelling or enclosure where the door lock assembly is disposed in the locked position, the lock may detect the presence of the user's device and automatically move the lock into the unlocked position. The presence of the user's device may be determined, for example, by using a predetermined wireless signal such as a Bluetooth® signal or a Wi-Fi signal. The distance to the device may be determined, among other options, using a Global Positioning System (GPS) signal, triangulation with cellular towers or other wireless transmitters/receivers.

Furthermore, the administrative details may include a list 364 of users who have access rights (as administrators and/or as guests) to the door lock assembly. Using the list 364, the user accessing the administrative interface 358 may access a profile of the selected user to determine what rights the user has with respect to the identified lock 360. If the user accessing the administrative interface 358 has sufficient rights, the user may be presented with a removal option 366 to remove all access rights from a selected user in the list 364.

Thus, a user with administrator privileges may remove a user's registration from a particular lock, thereby eliminating the removed user's rights to access the lock. Alternatively, a user may remain registered with the lock, but their rights may be modified (e.g., by adding or removing administrator privileges from the user, by changing a temporary guest user into a permanent user, or by changing a permanent user into a temporary guest user, among other possibilities).

Figure 17:
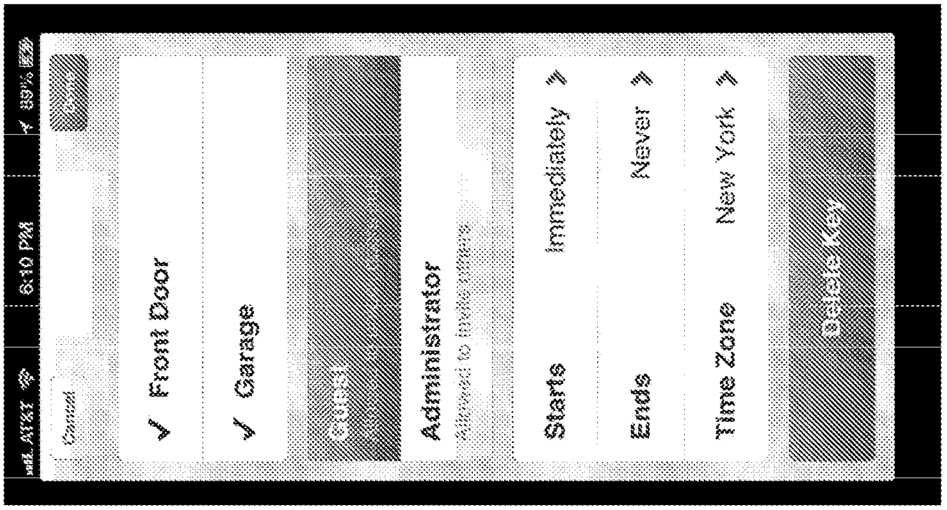
FIG. 17 is a representation of an exemplary modification interface for modifying a user's rights assembly according to one embodiment of the present invention.

FIG. 17 depicts an exemplary modification interface 1700 for modifying a user's rights. As shown in FIG. 17, the modification interface 368 is similar to the registration interface 322 of FIG. 13E. Using the modification interface 368, the administrator may modify which locks the selected user has access rights to, the level of access rights that the selected user is provided, and the timeframe in which the user is permitted to exercise the access rights.

A user may also wish to determine whether they have access rights in a particular lock. Accordingly, a user may search for existing locks in order to (for example) request access to the lock from the lock's owner or identify the presence or level of access rights that the user has with respect to a particular lock.

Figure 18:
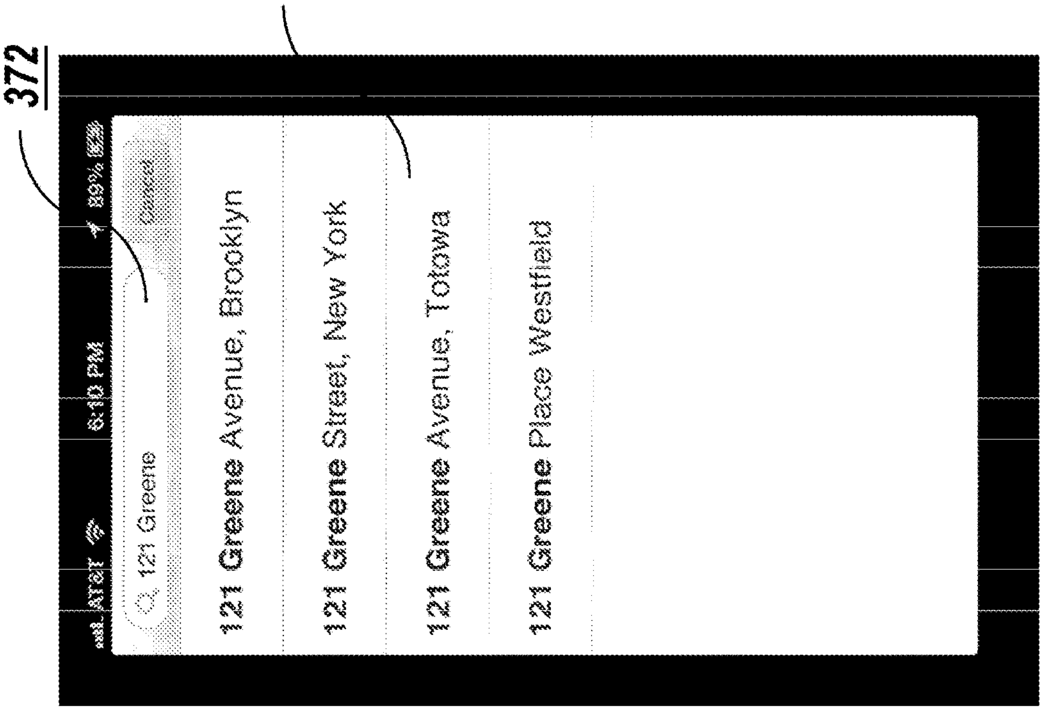
FIG. 18 is a representation of an exemplary search interface for searching for available locks according to one embodiment of the present invention.

FIG. 18 depicts an exemplary search interface 370 for searching for available locks. The search interface 370 may include a search bar 372. A user may enter identifying information, such as a name of a lock or an address or location, into the search bar 372 in order to locate locks matching the identifying information. The user device may search among known locks, either from information stored locally on the user device or centrally on a remote server, to determine which locks match the searched identifying information. Matching results may be shown in a results list 374.

A lock administrator may choose to have their lock appear in search results, or not appear in search results. In one embodiment, locks may appear in a user's search results only if the lock is administered by a person in the user's contact list (e.g., on the user's mobile phone).

One or more of the above-described acts may be encoded as computer-executable instructions executable by processing logic. The computer-executable instructions may be stored on one or more non-transitory computer readable media. One or more of the above described acts may be performed in a suitably-programmed electronic device.

Figure 19:
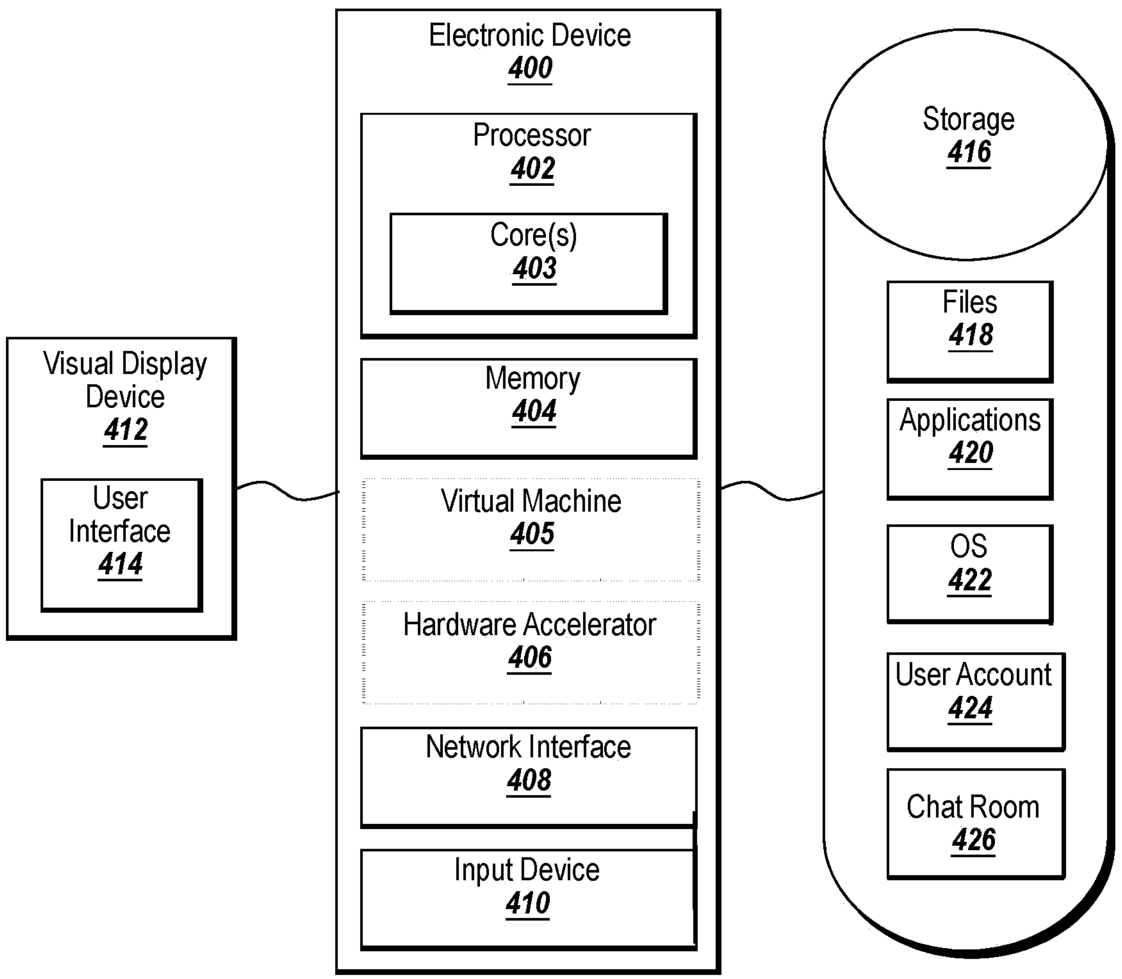
FIG. 19 is a schematic representation of an electronic device suitable for use with the door lock assembly of one embodiment of the present invention and for performing one or more lock operations according to the teachings of one embodiment of the present invention.

FIG. 19 depicts an example of an electronic device 400 that may be suitable for use with one or more acts disclosed herein. The electronic device 400 may take many forms, including but not limited to a computer, workstation, server, network computer, Internet appliance, mobile device, a smart phone, a pager, a tablet computer, application specific processing device, etc.

The electronic device 400 is illustrative and may take other forms. For example, an alternative implementation of the electronic device 400 may have fewer components, more components, or components that are in a configuration that differs from the configuration of FIG. 19. The components of FIG. 19 and/or other figures described herein may be implemented using hardware based logic, software based logic and/or logic that is a combination of hardware and software based logic (e.g., hybrid logic); therefore, components illustrated in FIG. 19 and/or other figures are not limited to a specific type of logic.

The processor 402 may include hardware based logic or a combination of hardware based logic and software to execute instructions on behalf of the electronic device 400. The processor 402 may include logic that may interpret, execute, and/or otherwise process information contained in, for example, the memory 404. The information may include computer-executable instructions and/or data that may implement one or more embodiments of the invention. The processor 402 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor may include a single core or multiple cores 403. Moreover, the processor 402 may include a system-on-chip (SoC) or system-in-package (SiP).

The electronic device 400 may include one or more tangible non-transitory computer-readable storage media for storing one or more computer-executable instructions or software that may implement one or more embodiments of the invention. The non-transitory computer-readable storage media may be, for example, the memory 404 or the storage 416. The memory 404 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (FeRAM) devices, magneto-resistive RAM (MRAM) devices, phase change memory RAM (PRAM) devices, or other types of RAM devices.

One or more computing devices 400 may include a virtual machine (VM) 405 for executing the instructions loaded in the memory 404. A virtual machine 405 may be provided to handle a process running on multiple processors so that the process may appear to be using only one computing resource rather than multiple computing resources. Virtualization may be employed in the electronic device 400 so that infrastructure and resources in the electronic device may be shared dynamically. Multiple VMs 405 may be resident on a single computing device 400.

A hardware accelerator 406 may be implemented in an ASIC, FPGA, or some other device. The hardware accelerator 406 may be used to reduce the general processing time of the electronic device 400.

The electronic device 400 may include a network interface 408 to interface to a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11, Bluetooth®), high-speed interconnects (e.g., InfiniBand, gigabit Ethernet, Myrinet) or some combination of any or all of the above. The network interface 408 may include a built-in network adapter, network interface card, personal computer memory card international association (PCMCIA) network card, card bus network adapter, wireless network adapter, universal serial bus (USB) network adapter, modem or any other device suitable for interfacing the electronic device 400 to any type of network capable of communication and performing the operations described herein.

The electronic device 400 may include one or more input devices 410, such as a keyboard, a multi-point touch interface, a pointing device (e.g., a mouse), a gyroscope, an accelerometer, a haptic device, a tactile device, a neural device, a microphone, or a camera that may be used to receive input from, for example, a user. Note that electronic device 400 may include other suitable I/O peripherals.

The input devices 410 may allow a user to provide input that is registered on a visual display device 412. A graphical user interface (GUI) 414 may be shown on the display device 412.

A storage device 416 may also be associated with the computer 400. The storage device 416 may be accessible to the processor 402 via an I/O bus. The information may be executed, interpreted, manipulated, and/or otherwise processed by the processor 402. The storage device 416 may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the invention The storage device 416 may store files 418, applications 420, and the electronic device 1900 can be running an operating system (OS) 1926. Examples of OS 422 may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

The storage device 416 may store details relating to a user account 424 associated with the electronic device 400. For example, the user account 424 may include an account ID and information pertaining to the user who owns or operates the electronic device 400.

The storage device 416 may further include one or more data structures corresponding to the above-described chat room 426. The chat room 426 may be represented, for example, as a database, table, matrix, or other data structure which identifies a location or user account, and an identifier representing locks within the location, or locks to which the user account a user who has access rights to the lock. The identifier may be, for example, an alphanumeric string or a token. Alternatively, the chat room 426 may identify a user, and furthermore identify all of the locks to which the user associated with the user account 424 has access rights.

One or more embodiments of the invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

Figure 20:
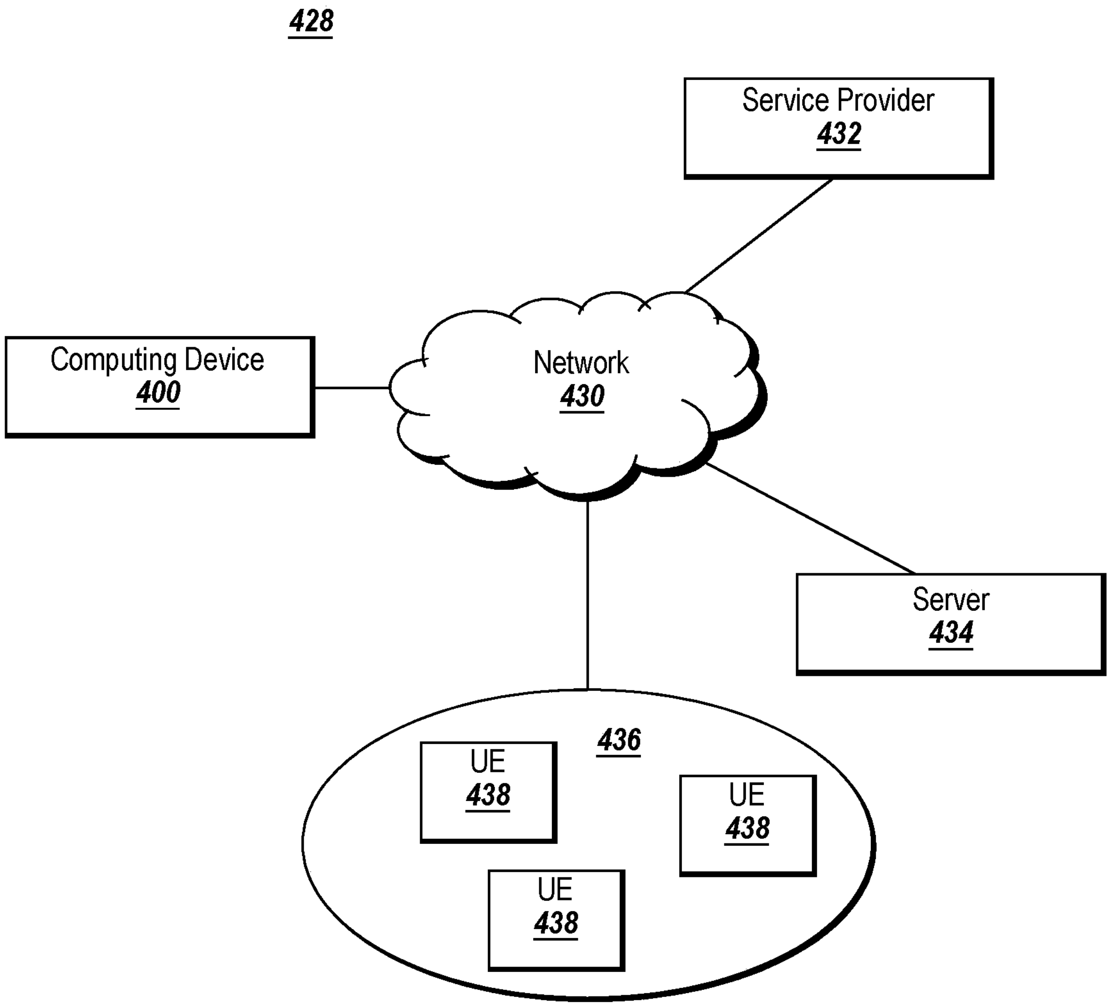
FIG. 20 is a schematic representation of a network implementation for use with the door lock assembly of one embodiment of the present invention that may be implemented in one or more embodiments.

FIG. 20 depicts a network implementation that may implement one or more embodiments of the invention. A system 428 may include a computing device 400, a network 430, a service provider 432, a server 434, and a cluster 436. The embodiment of FIG. 20 is exemplary, and other embodiments can include more devices, fewer devices, or devices in arrangements that differ from the arrangement of FIG. 20.

The network 430 may transport data from a source to a destination. Embodiments of the network 430 may use network devices, such as routers, switches, firewalls, and/or servers (not shown) and connections (e.g., links) to transport data. Data may refer to any type of machine-readable information having substantially any format that may be adapted for use in one or more networks and/or with one or more devices (e.g., the computing device 400, the service provider 432, etc.). Data may include digital information or analog information. Data may further be packetized and/or non-packetized.

The network 430 may be a hardwired network using wired conductors and/or optical fibers and/or may be a wireless network using free-space optical, radio frequency (RF), and/or acoustic transmission paths. In one implementation, the network 430 may be a substantially open public network, such as the Internet. In another implementation, the network 430 may be a more restricted network, such as a corporate virtual network. The network 2012 may include Internet, intranet, Local Area Network (LAN), Wide Area Network (WAN), Metropolitan Area Network (MAN), wireless network (e.g., using IEEE 802.11), or other type of network The network 2012 may use middleware, such as Common Object Request Broker Architecture (CORBA) or Distributed Component Object Model (DCOM). Implementations of networks and/or devices operating on networks described herein are not limited to, for example, any particular data type, protocol, and/or architecture/configuration.

The service provider 432 may include a device that makes a service available to another device. For example, the service provider 432 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

The server 434 may include a device that receives information over the network 430. For example, the server 434 may be a device that receives user input from the computer 400. The cluster 436 may include a number of units of execution (UEs) 438 and may perform processing on behalf of the computer 400 and/or another device, such as the service provider 432 or server 434. For example, the cluster 436 may perform parallel processing on an operation received from the computer 400. The cluster 436 may include UEs 438 that reside on a single device or chip or that reside on a number of devices or chips.

The units of execution (UEs) 438 may include processing devices that perform operations on behalf of a device, such as a requesting device. A UE may be a microprocessor, field programmable gate array (FPGA), and/or another type of processing device. UE 438 may include code, such as code for an operating environment. For example, a UE may run a portion of an operating environment that pertains to parallel processing activities. The service provider 432 may operate the cluster 436 and may provide interactive optimization capabilities to the computer 400 on a subscription basis (e.g., via a web service).

Units of Execution (UEs) may provide remote/distributed processing capabilities for the applications 420. A hardware unit of execution may include a device (e.g., a hardware resource) that may perform and/or participate in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, a hardware unit of execution may include a single processing device that includes multiple cores or a number of processors. A hardware unit of execution may also be a programmable device, such as a field programmable gate array (FPGA), an application specific integrated circuit (ASIC), a digital signal processor (DSP), or other programmable device. Devices used in a hardware unit of execution may be arranged in many different configurations (or topologies), such as a grid, ring, star, or other configuration. A hardware unit of execution may support one or more threads (or processes) when performing processing operations.

A software unit of execution may include a software resource (e.g., a technical computing environment) that may perform and/or participate in one or more parallel programming activities. A software unit of execution may perform and/or participate in one or more parallel programming activities in response to a receipt of a program and/or one or more portions of the program. A software unit of execution may perform and/or participate in different types of parallel programming using one or more hardware units of execution. A software unit of execution may support one or more threads and/or processes when performing processing operations.

The term 'parallel programming' may be understood to include multiple types of parallel programming, e.g. task parallel programming, data parallel programming, and stream parallel programming. Parallel programming may include various types of processing that may be distributed across multiple resources (e.g., software units of execution, hardware units of execution, processors, microprocessors, clusters, labs) and may be performed at the same time.

For example, parallel programming may include task parallel programming where a number of tasks may be processed at the same time on a number of software units of execution. In task parallel programming, a task may be processed independently of other tasks executing, for example, at the same time.

Parallel programming may include data parallel programming, where data (e.g., a data set) may be parsed into a number of portions that may be executed in parallel using, for example, software units of execution. In data parallel programming, the software units of execution and/or the data portions may communicate with each other as processing progresses.

Parallel programming may include stream parallel programming (sometimes referred to as pipeline parallel programming). Stream parallel programming may use a number of software units of execution arranged, for example, in series (e.g., a line) where a first software unit of execution may produce a first result that may be fed to a second software unit of execution that may produce a second result given the first result. Stream parallel programming may also include a state where task allocation may be expressed in a directed acyclic graph (DAG) or a cyclic graph.

Other parallel programming techniques may involve some combination of task, data, and/or stream parallel programming techniques alone or with other types of processing techniques to form hybrid-parallel programming techniques.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such. As used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of an electronic device, unless otherwise stated.

FIGS. 21 through 29B illustrate various views and components of a second embodiment of the door lock assembly 500. According to this embodiment, the door lock assembly 500 is a door panel based door lock assembly that is primarily and essentially mounted within a door panel 18. Like elements are designated with like reference numerals through out the various Figures and views. The door panel 18 can be a separately installed unit or can form part of a pre-hung or pre-mounted door assembly that includes the door frame 10. The general components of the door frame 10 have been previously described herein in connection with the first embodiment of the present invention. Although presently shown as a left side mounted and hence swinging door, those of ordinary skill in the art will readily recognize that the door panel 18 and hence the door lock assembly 500 can be mounted in either side of the door panel and door jamb depending on whether the door is a left or right swinging door.

Figure 21:
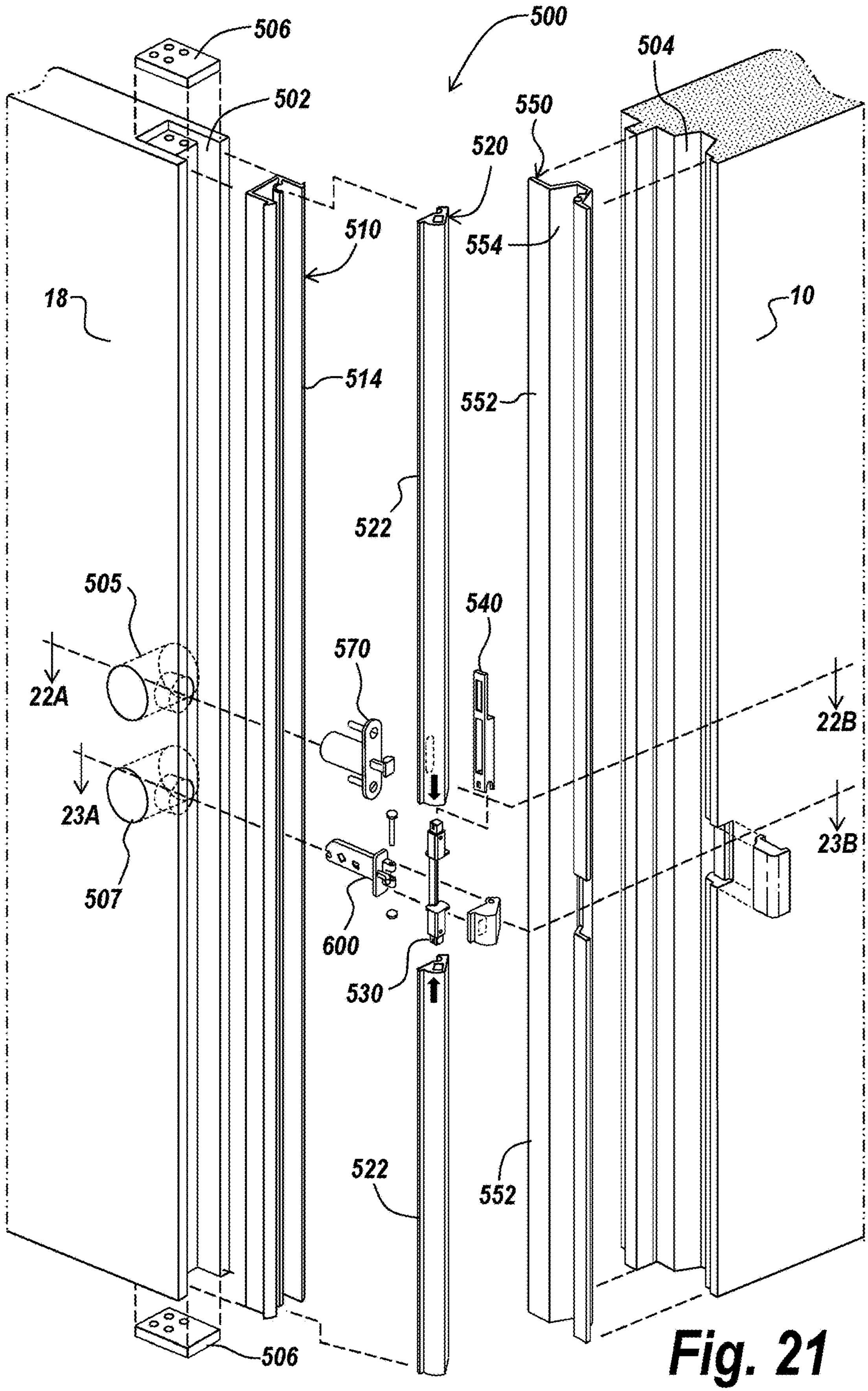
FIG. 21 is an exploded perspective view of the door lock assembly of one embodiment of the present invention according to a second embodiment, where the door lock assembly is mounted within a door panel.

FIG. 21 is an exploded perspective view of the door lock assembly 500. As illustrated, the door panel 18 has a vertical groove or channel 502 that is sized and dimensioned for seating a frame element 510 that serves to securely couple the movable locking assembly or element 520 to the door panel when assembled. The frame element 510 is secured to the door panel when mounted within the channel by a pair of header plates 506 that can be fastened to the door panel 18 by known conventional fasteners, such as screws, and which seat within corresponding grooves formed in the top and bottom of the door panel.

Similarly, a channel or groove 504 is formed within the door jamb of the door frame 10. A frame element 550 is mounted or seated within the channel 504 and is secured therein according to known techniques. For example, the frame element can be secured therein by fasteners, by an adhesive, or by known pressure fit techniques.

The door panel 18 can also have one or more holes or apertures 505, 507 formed therein for mounting for example a door handle or latch assembly 600 and a deadbolt assembly 570. The door panel apertures can be formed therein by a user or other skilled professional or can be pre-drilled by the manufacturer. As shown in FIG. 21, a first aperture 505 is formed in the door panel and is of a conventional size that is sufficient to mount a deadbolt assembly 570. The deadbolt assembly can be any conventional commercially available deadbolt assembly or can be a specially designed assembly that is customized for operation with the movable locking assembly 520 while concomitantly providing specific additional functionality, such as one or more of the functionalities set forth above in connection with the first embodiment. The door panel 18 may also have a second aperture 507 formed therein. The aperture 507 is suitable for mounting any commercially available door latch assembly or the door latch assembly 600 as described below.

Figure 22A:
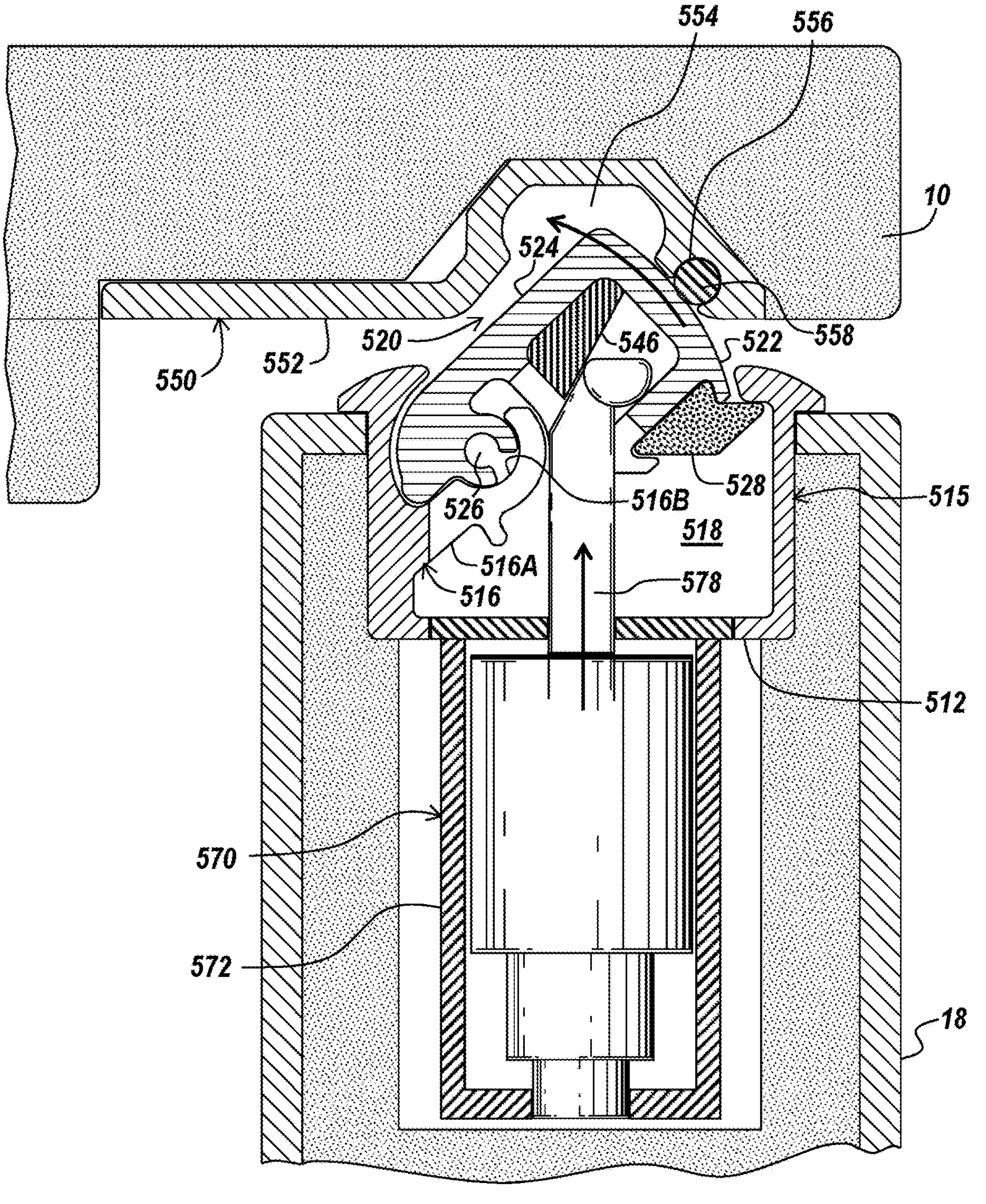
FIG. 22A is a cross-sectional view of the door panel based door lock assembly of FIG. 21 showing the lock assembly disposed in the locked position according to one embodiment of the present invention.
Figure 22B:
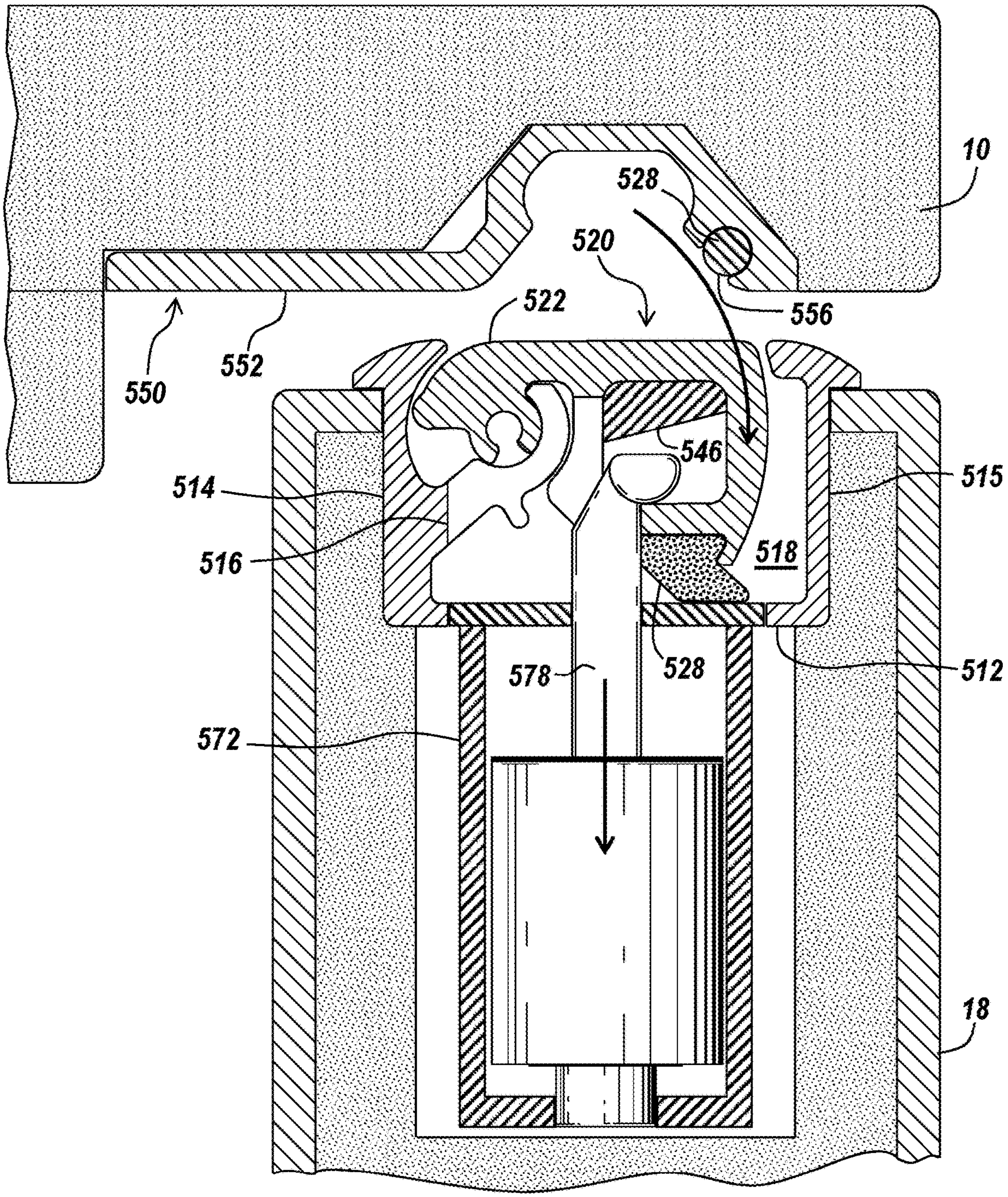
FIG. 22B is a cross-sectional view of the door lock assembly of FIG. 21 showing the lock assembly disposed in the unlocked position according to one embodiment of the present invention.

As illustrated in FIGS. 21, 22A and 22B, the illustrated frame element 510 of the door panel has a main body that includes a relatively flat back or base portion 512 and a pair of outwardly projecting sides or leg portions 514, 515. The leg portion 514 of the frame element 510 includes a lock connector portion 516 that is sized and configured for cooperatively mounting at least a portion of the movable locking assembly 520. The lock connector portion 516 includes a curved connector element or portion 516A that extends outwardly therefrom and which forms a lock receiving groove 516B. The curved connector portion 516A can have any suitable shape sufficient to receive and engage at least a portion of the movable locking assembly and to allow movement of the assembly when coupled thereto. As shown, the curved connector portion can have a generally C-shaped design. The lock receiving groove 516B is adapted to seat and mount a portion of the movable locking assembly 520. The movable locking assembly 520 is coupled to the groove 516B by slidingly inserting at least a portion of the locking assembly into the groove from a top portion of the frame element. Once seated within the groove 516B, the locking assembly 520 is captured and retained therein. The locking assembly portion that seats within the groove forms a pivoting portion that allows at least a portion of the locking assembly to pivot about a point corresponding to the lock connector portion between a locked position (FIGS. 22A and 24B) and an unlocked position (FIGS. 22B and 24A), as described in further detail below. Moreover, the spatial separation between the lock connector portion 516 and the leg portion 515 forms a channel or space 518 that is sized and dimensioned for seating and housing the locking element 522.

Those of ordinary skill in the art will readily recognize that the frame element 510 can have any suitable shape or configuration, provided that the shape is suitable for its intended purpose. The illustrated frame element 510 can be made of any suitable material, and is preferably made of aluminum.

With reference to FIGS. 21, 22A-23B, and 27-29B, the movable locking assembly 520 can comprise a plurality of interconnected components. The illustrated assembly 520 includes one or more, and preferably a pair, of movable locking elements 522, 522 that are adapted to pivot into and out of the space 518 formed by the frame element 510. Each of the movable locking elements 522 has a main body 524 that includes a connecting portion 526 formed at a first end. The connecting portion 526 is sized and dimensioned for seating within the groove 516B formed in the lock connector portion 516 of the frame element 510. The connecting portion 526 can have any suitable shape or configuration that allows the connecting portion to seat within and move relative to the lock connecting portion 516. According to one practice, the lock connector portion has a shape that is complementary to the shape of the groove 516B, and preferably has a substantially C-shaped configuration.

The opposed end or an intermediate portion of the main body 524 of the locking element 522 has a groove 586 formed therein that is adapted to mount a resilient member 528. The resilient member 528 provides a sound dampening function during operation of the door lock assembly. Specifically, the resilient member 528 is adapted to contact one leg portion 515 of the frame element when the locking assembly is disposed in the locked or protruding position, as shown in FIG. 22A. The resilient member is the only portion of the locking element to contact the frame element 510, thus helping reduce the noise created when the locking assembly contacts the frame element. This substantially eliminates a loud, unwanted clicking noise when the locking element is moved between the locked and unlocked positions.

The main body 524 of the illustrated locking element 522 has opposed ends, the first end of which, as set forth above, includes the connecting portion 526 and the opposed second end wraps around to form in essence a hollow passage 590. The actuator of the deadbolt assembly described below is positioned in part within this passage during operation. The main body of the locking element also includes a notch or cut-out portion 588. The notch allows the locking element, when assembled to the frame element 510 mounted in the door panel, to seat about the actuator of the deadbolt assembly.

The illustrated locking element 522 can have any selected size and shape, provided that the locking element is capable of contacting the frame element 550 of the door frame in order to lock or secure the door panel 18 to the frame 10. The locking element 522 can be any suitable rail-type locking element that is capable of moving when actuated between the locked and unlocked positions. According to this embodiment, the locking element has a generally wedge-shaped configuration. The locking element can be made from any suitable material, and is preferably composed of aluminum. The resilient member can also have any selected size, shape or configuration, and can be composed of any suitable material, such as rubber.

Figure 28A:
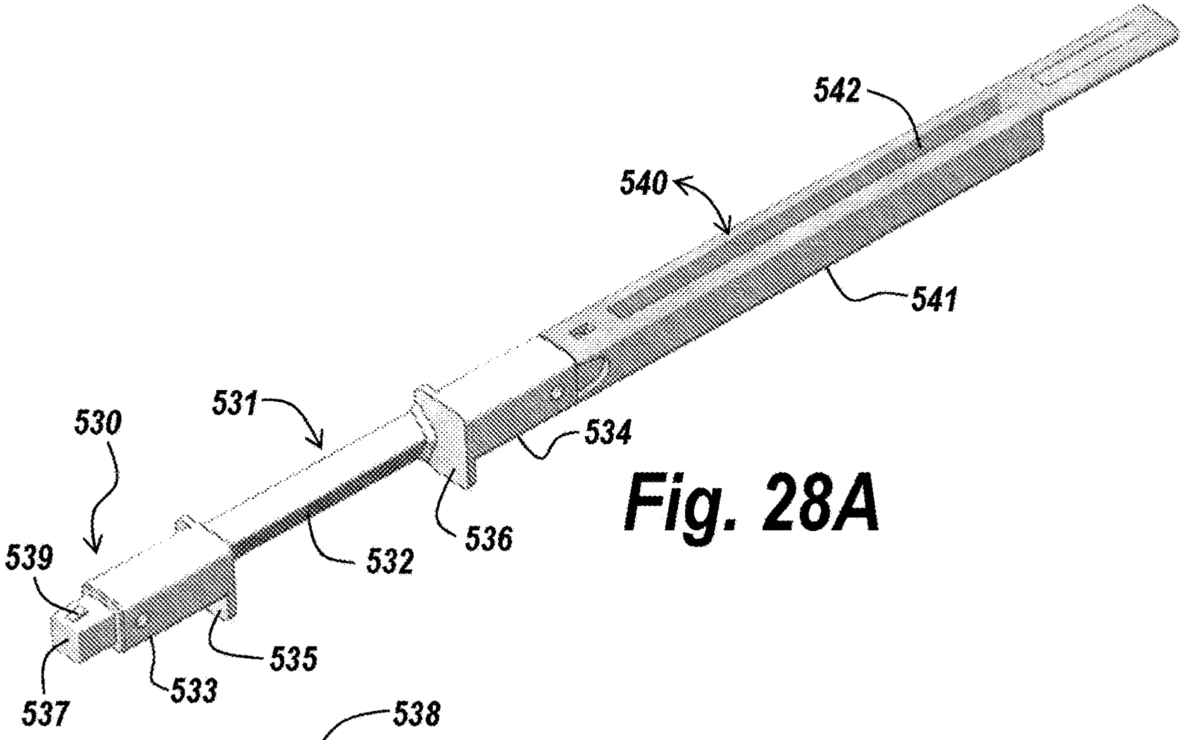
FIG. 28A is a perspective view of the coupler element attached to a drive element for use with the movable locking element of the door latch assembly of one embodiment of the present invention.
Figure 28B:
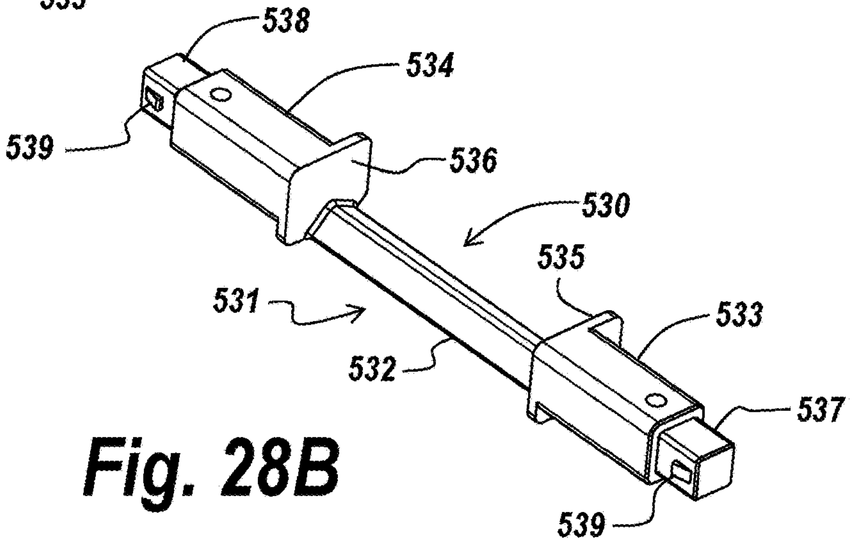
FIG. 28B is a perspective view of the coupler element suitable for use with the movable locking element of the door latch assembly of one embodiment of the present invention.
Figure 28C:
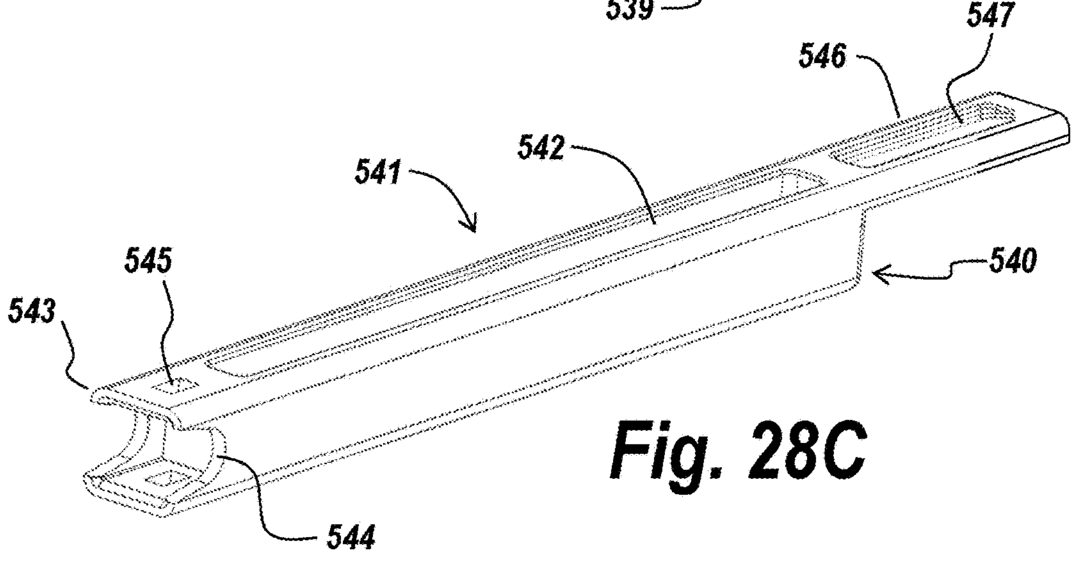
FIG. 28C is a perspective view of the coupler element suitable for use with the movable locking element of the door latch assembly of one embodiment of the present invention.
Figure 29A:
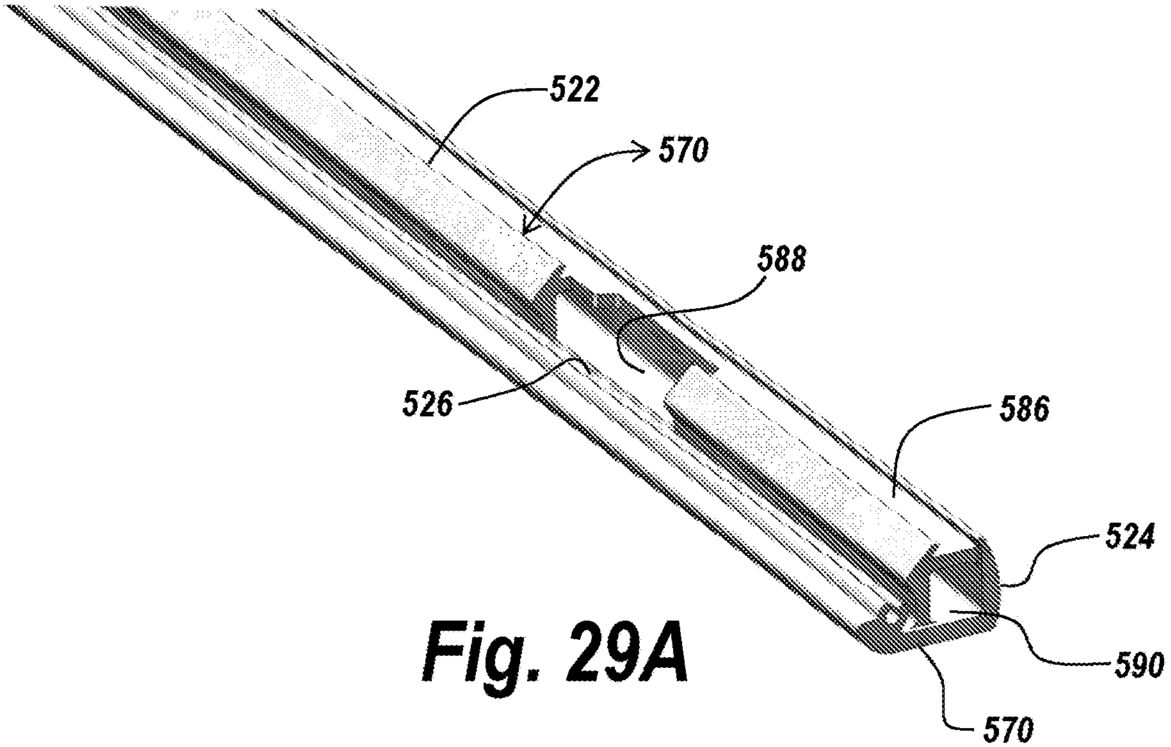
FIGS. 29A and 29B are perspective views of the movable locking element of the door latch assembly of one embodiment of the present invention showing the cut-out suitable for accommodating the actuator element of the deadbolt assembly.
Figure 29B:
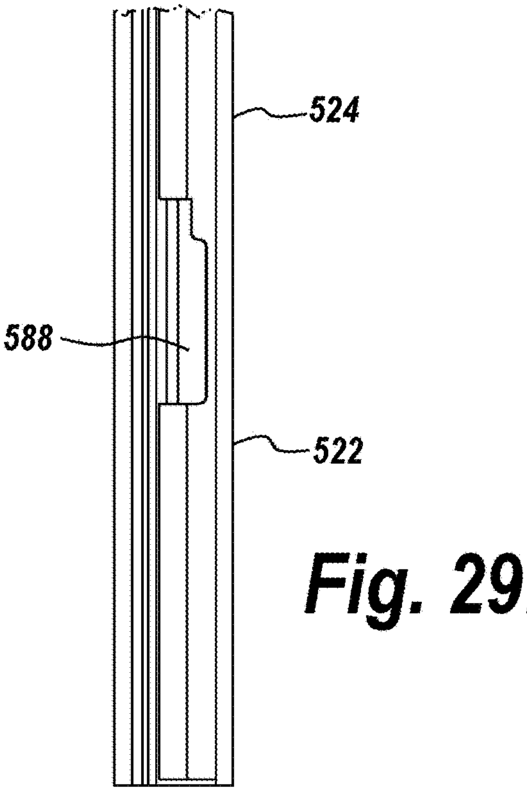
Figure 30:
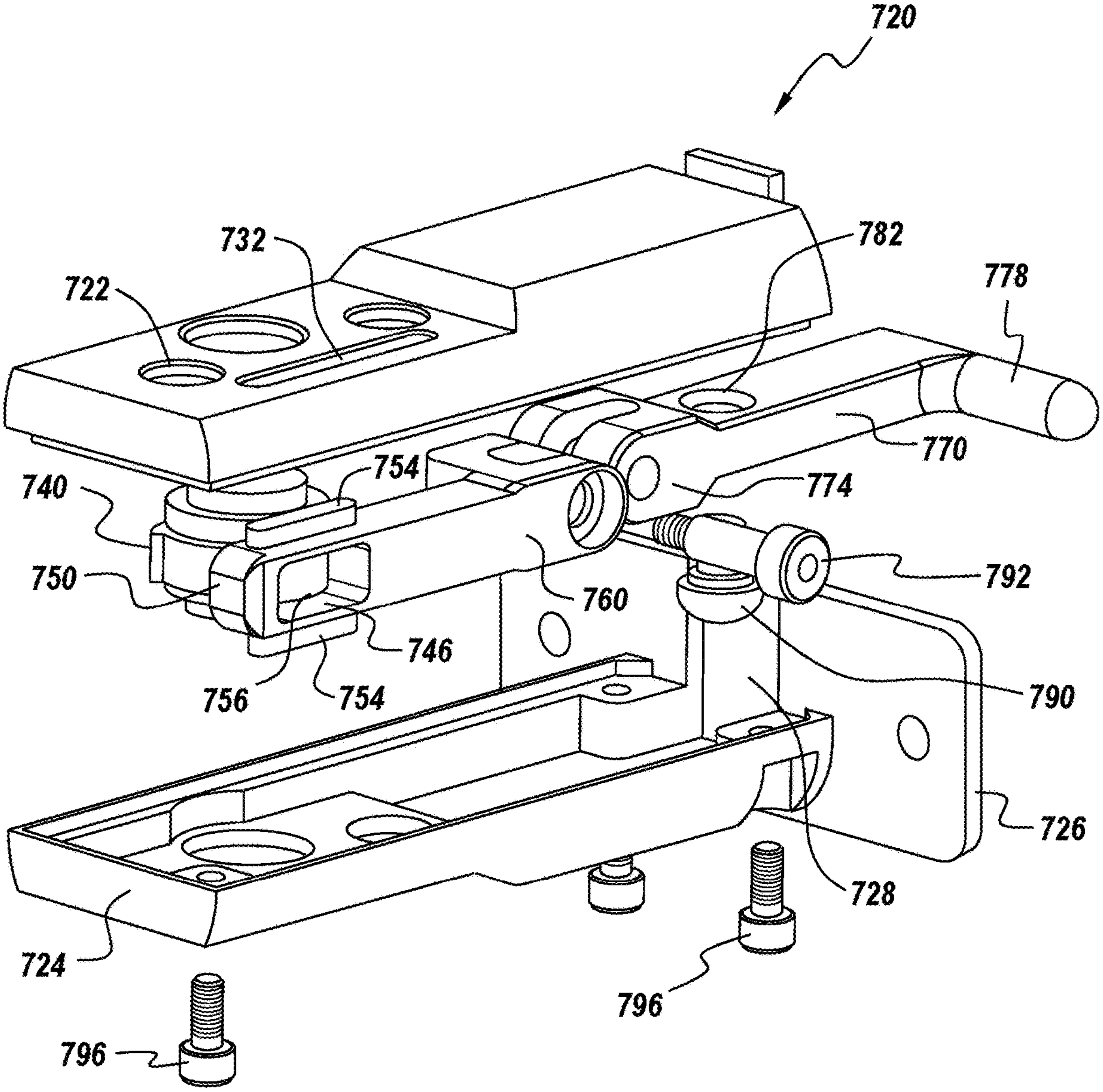
FIG. 30 illustrates a drive assembly of yet another embodiment of the door lock assembly according to one embodiment of the present invention.
Figure 31:
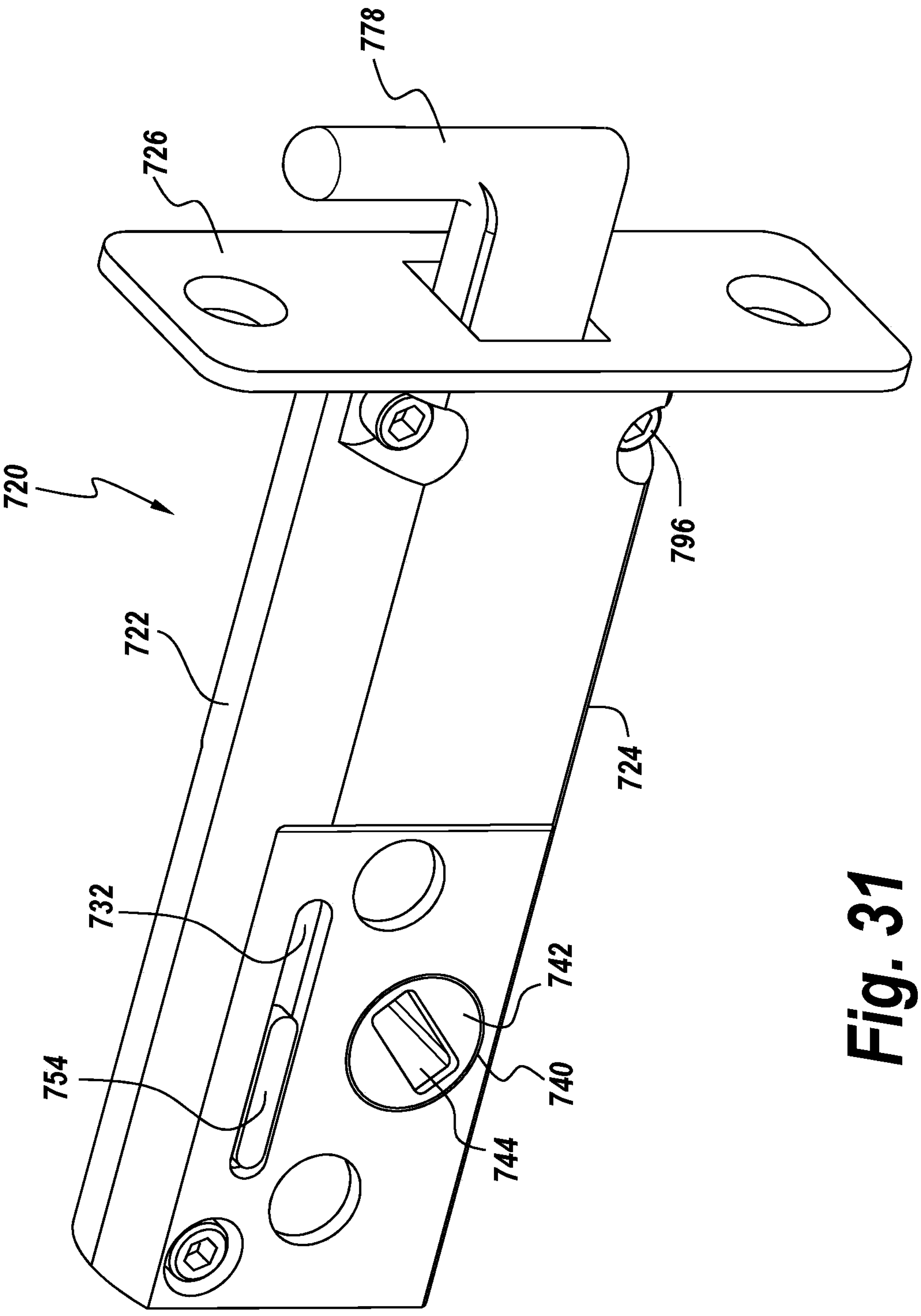
FIG. 31 is a perspective view of the assembled drive assembly of FIG. 30 disposed in an unlocked position according to one embodiment of the present invention.
Figure 32:
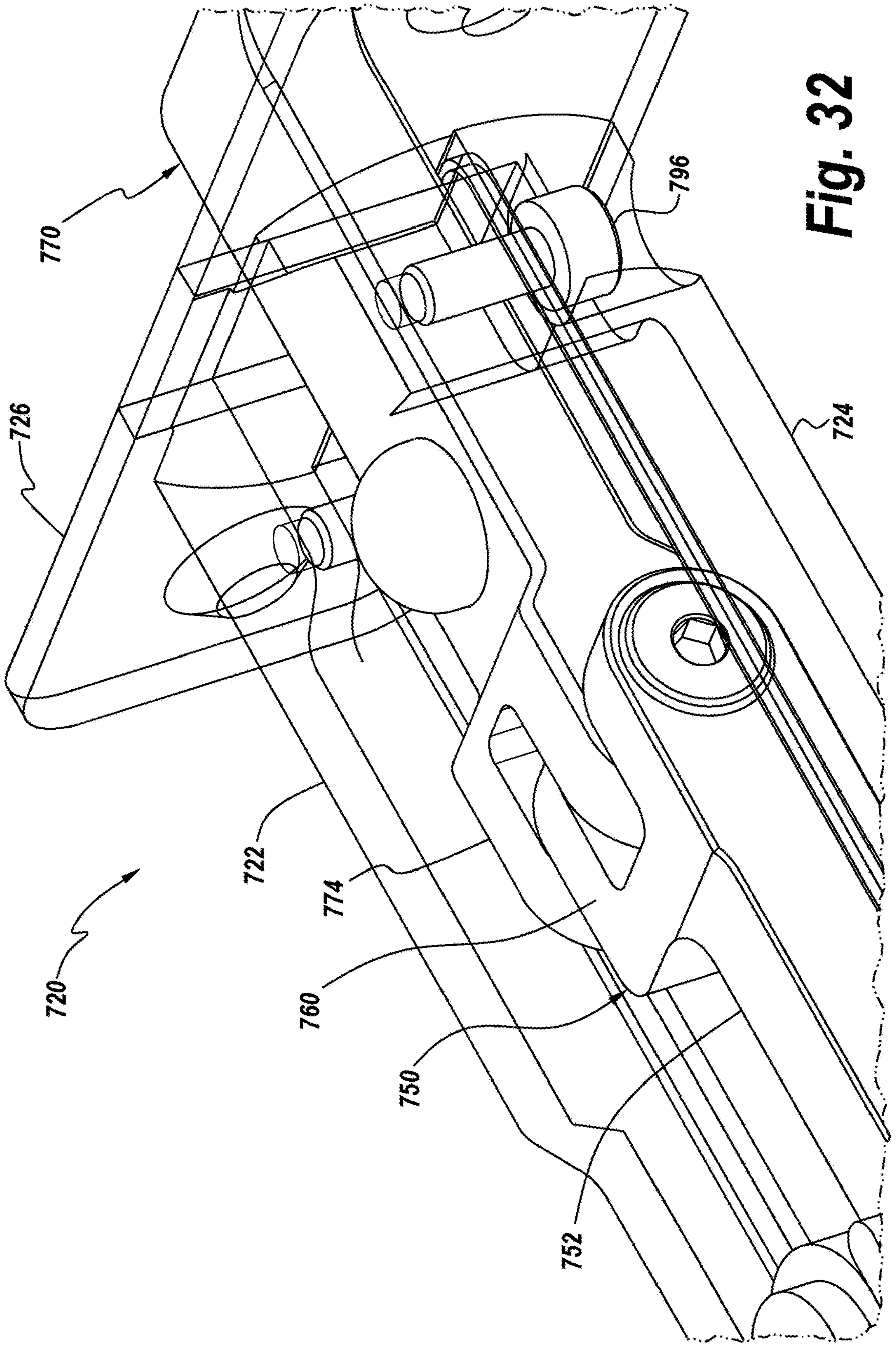
FIG. 32 is a partial perspective view of the components of the drive assembly of FIG. 30 according to one embodiment of the present invention.

The movable locking assembly 520 also includes an intermediate coupler element 530 and a drive element 540, as shown for example in FIGS. 28A-28C. The intermediate coupler element 530 has a main body 531 that has a narrow intermediate portion 532 and wider end portions 533 and 534. The end portions have a skirt or flange portion 535 and 536, respectively, formed thereon at inner portions of the end region. The end portions 533, 534 also terminate at outer end regions in narrow connecting bosses 537, 538 that are opposed to the skirt portions 535, 536. As shown the bosses are narrower than the other portion or region of the end region. The bosses can have formed thereon any suitable connecting or securing element, such as for example locking tabs 539 that enable the intermediate coupler element 530 to be securely coupled to the locking element and/or the drive element 540.

The illustrated drive element 540 also has a main body 541 that includes a central rectangular portion that has an elongated channel 542 formed therein. The drive element 540 has a first coupler receiving end 543 having a general cut-out portion 544 and a tab hole 545 that is sized and dimensioned for mounting over and engaging a respective end portion 534 of the intermediate coupler element 530. When coupled thereto, the end portion 543 of the drive element 540 seats over the boss 538 such that the tab 539 is positioned within the tab hole 545. This helps secure the drive element to the intermediate coupler element 530. The drive element 540 also includes a second opposed end 546 that extends outwardly from the main body and which has a partially formed channel or groove 547 formed thereon. The boss 537 formed on the end portion 533 of the intermediate coupler element 530 is coupled to one of the locking elements 522, and the second end of the drive element 546 when coupled to the end portion 534 of the intermediate coupler element 530 is coupled to the other locking element 522.

The drive element 540 helps constrain and trap an actuator mechanism, as described below, such that when the actuator moves the movable locking assembly into the locked position, it contacts and exerts a force on a portion of the drive element, such as the second end 546. The drive element in turn exerts a force on the locking elements 522 since they are coupled together. This in turn moves the locking elements into the locked position. Further, when the actuator mechanism moves the movable locking assembly 520 into the unlocked position, the actuator pulls back away from the drive mechanism and hence contacts (as shown in FIG. 22B) in inner portion or lip of the locking element to drive the locking elements into the unlocked position.

The various elements of the movable locking assembly 520 as illustrated in the Figures and as described herein can be formed of any suitable material, and is preferably formed of aluminum.

As illustrated in FIGS. 21, 22A and 22B, the frame element 550 is mounted in a channel that is formed in the jamb of the door frame 10. The frame element 550 has a main body 552 that has formed therein a central channel 554 that is sized and dimensioned for receiving at least a portion of the locking elements 522 when disposed in the locked position. The main body 552 of the frame element 550 also includes a secondary groove 556 that is adapted to receive a resilient member 558. During use, the locking element when moved from the unlocked position to the locked position contacts the resilient member rather than the main body 552. The resilient member 558 hence also provides a sound dampening function during operation of the door lock assembly (similar to the resilient member 528) by reducing the sound that the system makes when the locking element is moved into the locked position. Specifically, the locking elements 522 are adapted to contact the resilient member 558 rather than the frame element 550 when the locking assembly is disposed in the locked or protruding position, as shown in FIG. 22A. The resilient member 558 is the only portion of the frame element 558 to contact the locking elements 522, thus helping reduce the noise created when the locking assembly contacts the frame element. This substantially eliminates a loud, unwanted clicking noise when the locking element engages the frame element.

The door lock assembly 500 also contemplates the use of an actuator mechanism for moving the locking assembly between the locked and unlocked positions. The actuator mechanism can optionally form part of the door lock assembly, although this element can also be separately provided, such as being formed for example as part of a deadbolt assembly. According to the current embodiment, the actuator mechanism can be a deadbolt assembly 570. As illustrated in FIGS. 22A, 22B, 24A and 24B, the deadbolt assembly 570 can be mounted in the bore or aperture 505 formed in the door panel 18. The deadbolt assembly includes a general housing 572 that includes a face plate 574 that has several apertures formed therein. These apertures include fastener receiving holes for receiving fasteners, such as the illustrated screws 576, for helping secure the deadbolt assembly to the door panel 18. The apertures also include an actuator opening that allows an actuator, such as the piston 578, to pass therethrough. As indicated by the arrows in FIG. 24B, the piston moves transversely (e.g., linearly) within and through the aperture in order to move the locking assembly between the locked (FIG. 22A) and unlocked (FIG. 22B) positions. The piston 578 can include, if desired, a piston head 580 that is integrally formed therewith. The piston head 580 provides a greater force applying area thereby ensuring a greater degree of contact between the locking assembly and the deadbolt assembly.

The illustrated deadbolt assembly 570 preferably includes within a chamber formed by the assembly housing a suitable actuation assembly that is capable of moving the actuator mechanism (e.g., piston 578). The present Figures simply illustrate for the sake of convenience and simplicity a general actuation assembly, which can include the actuation assembly of a conventional deadbolt which converts manual force applied by the user, such as via a latch or a key, into translational or linear movement of the piston (e.g., bolt or actuator). Alternatively, the actuation assembly can include any suitable arrangement of mechanical and electrical components that are capable of moving the piston. For example, the actuation assembly can include a motor that is powered by a battery or by electrical power supplied at the installation site to move the actuator. Examples of potential functionality and arrangement of components were described in some respects in connection with the first embodiment. Those of ordinary skill will readily recognize that for the purposes of the present invention it does not matter the type of actuation mechanism that is used provided that the mechanism is capable of moving the actuator (piston) linearly so as to properly interact with the locking elements 522, 522. As such, the actuator mechanism hence must be able to effect movement of the locking elements between the locked and unlocked positions.

As illustrated with reference to FIGS. 22A and 24B, the piston 578 can be disposed in a deployed position thus moving the locking assembly into the locked position. In this scenario, the actuator or piston 578 is moved transversely outwardly away from the housing of the deadbolt assembly 570, as indicated by the arrow. The piston contacts the drive element 540 of the movable locking assembly, thus driving the locking elements 522 outwardly so as to move them from an unlocked position, where the locking elements are housed or stowed within the space 518 formed by the frame element 510 into a locked position (as indicated by the arrow) where the locking elements are moved outwardly into the channel 554 formed in the frame element 550 that is mounted in the door frame. As illustrated, the locking elements 522 pivot about the connecting portion 526 when mounted in the lock connector portion 516 of the frame element 510.

Figure 24A:
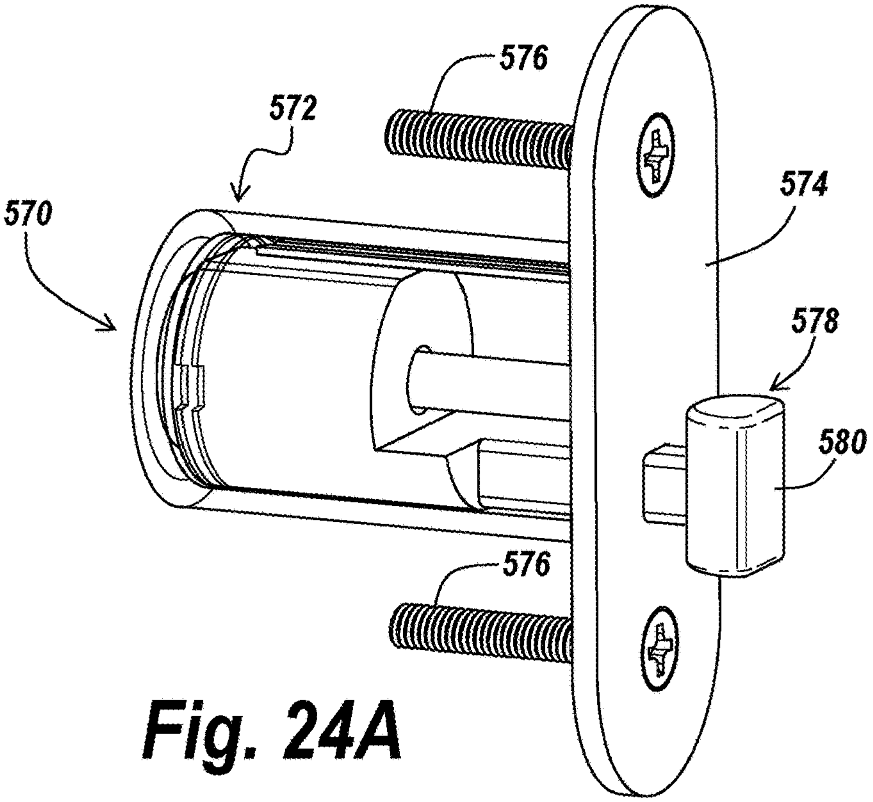
FIG. 24A is a perspective view of a suitable deadbolt assembly configured for use with the door lock assembly of one embodiment of the present invention, and specifically illustrating the actuator element of the deadbolt assembly disposed in a retracted non-engaged position.
Figure 24B:
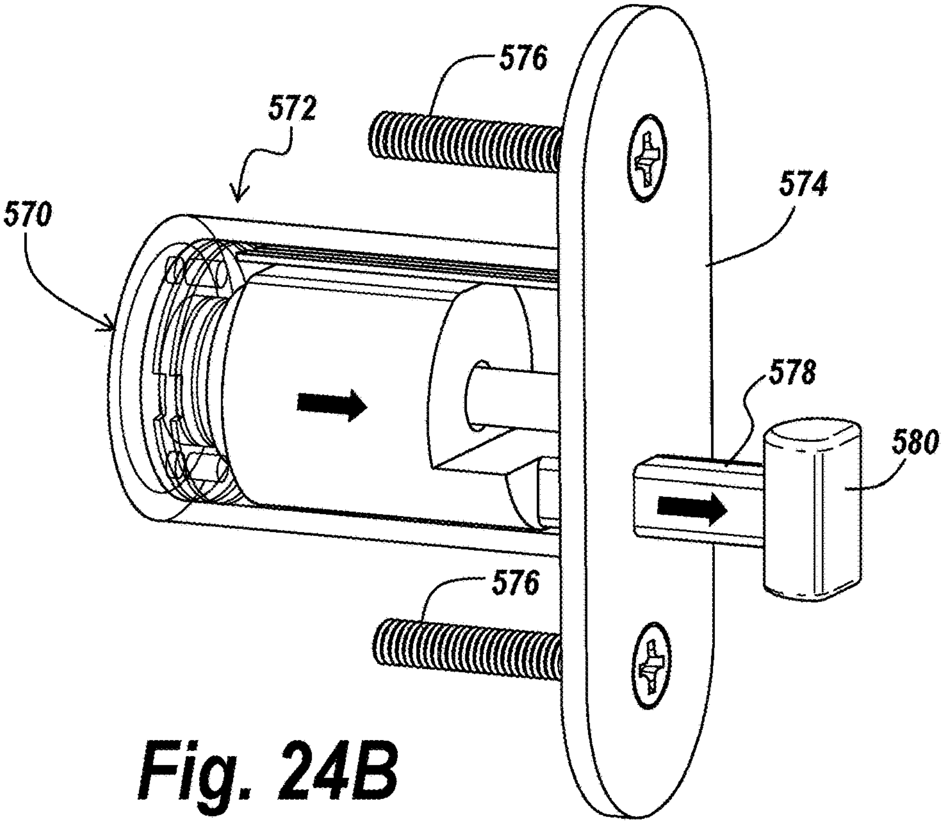
FIG. 24B is a perspective view of a suitable deadbolt assembly configured for use with the door lock assembly of one embodiment of the present invention, and specifically illustrating the actuator element of the deadbolt assembly disposed in a projecting engaged position.

Further, as illustrated in FIGS. 22B and 24A, the piston 578 can be disposed in a retracted or stowed position thus placing the locking assembly into the unlocked position. In this scenario, the piston 578 is moved transversely or linearly inwardly into or towards the housing of the deadbolt assembly 570, as indicated by the arrow. When doing so, the piston contacts the drive element 540 of the movable locking assembly, thus pulling or driving the locking elements inwardly so as to move the assembly 520 from the locked position to the unlocked position (as indicated by the arrow).

Figure 23A:
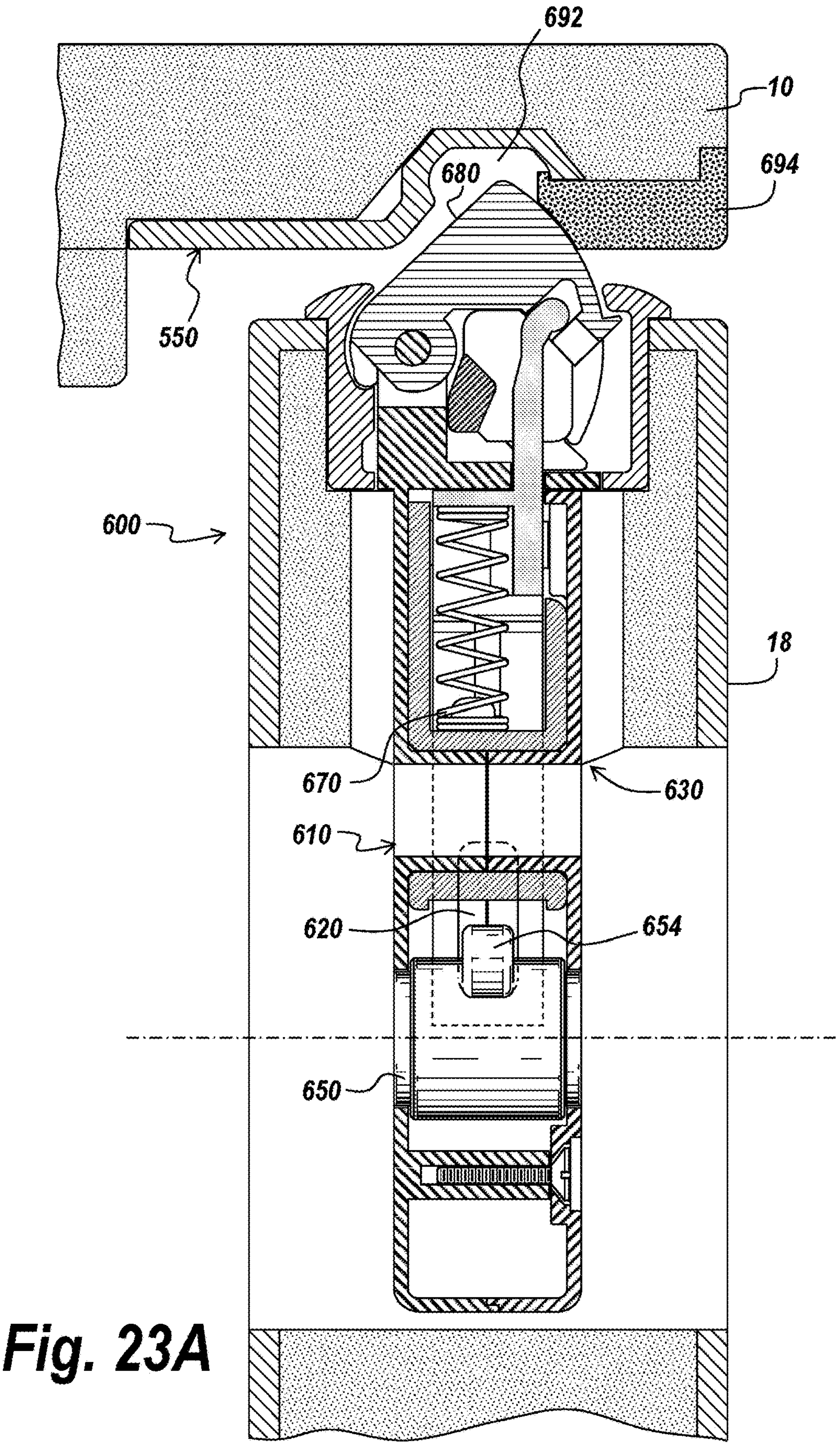
FIG. 23A is a cross-sectional view of the door lock assembly of FIG. 21 illustrating the operation of a spring latch assembly of the door lock assembly according to one embodiment of the present invention, and specifically illustrates the latch element of the latch assembly disposed in an engaged position.
Figure 23B:
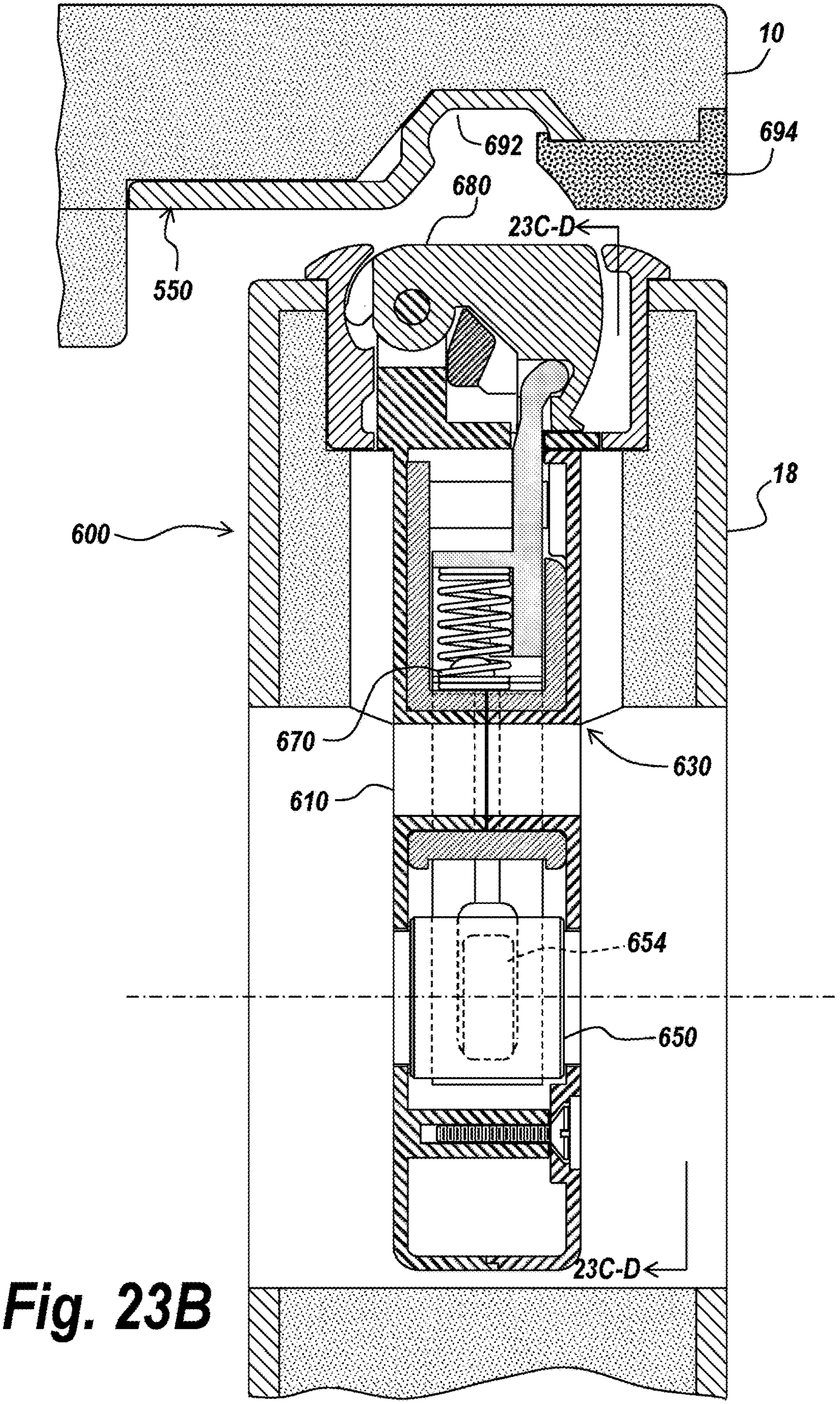
FIG. 23B is a cross-sectional view of the door lock assembly of FIG. 21 illustrating the operation of a spring latch assembly of the door lock assembly according to one embodiment of the present invention, and specifically illustrates the latch element of the latch assembly disposed in a disengaged position.
Figure 23C:
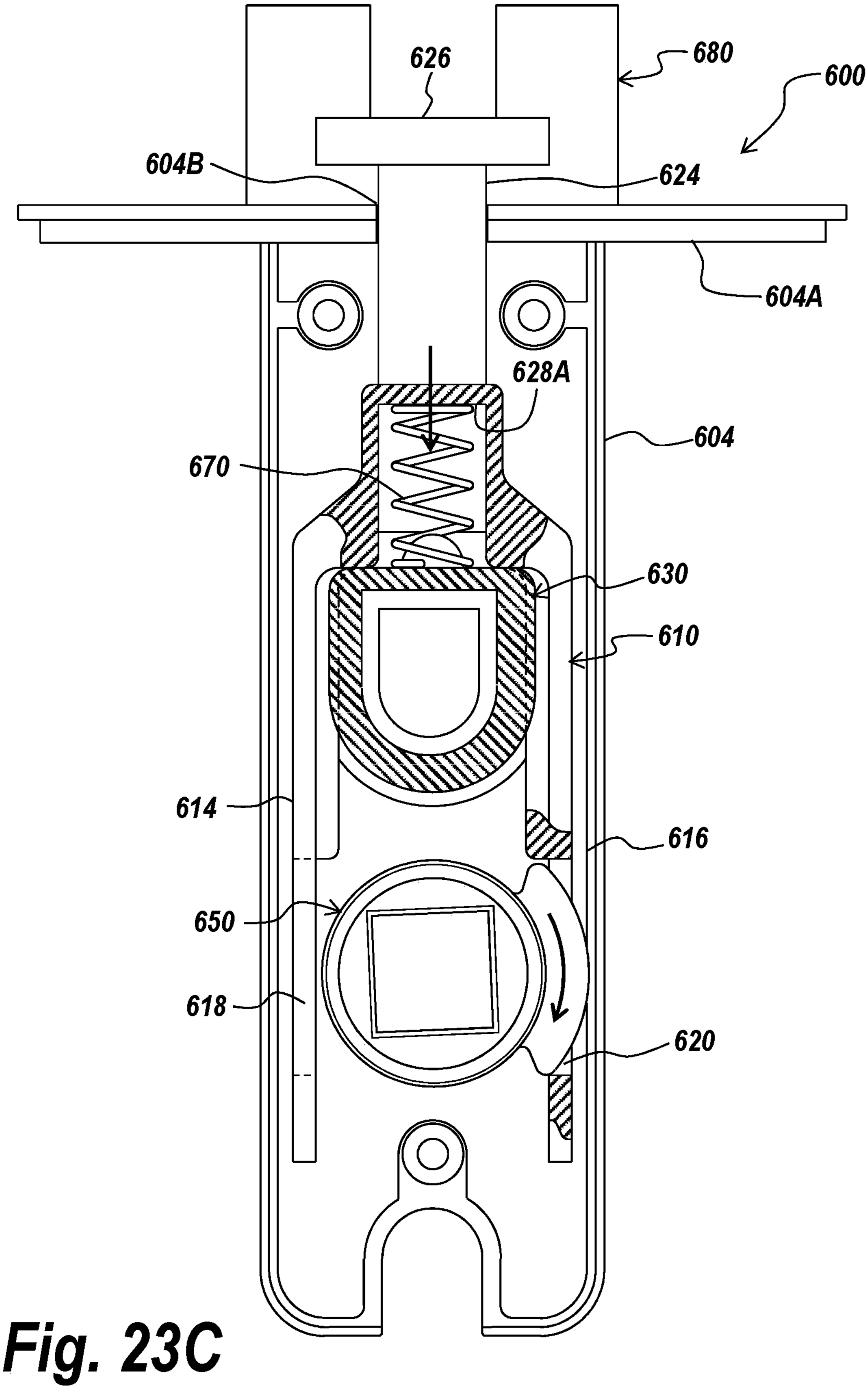
FIG. 23C is a side view of the door latch assembly of one embodiment of the present invention with a portion of the external cover removed to illustrate the internal components as the latch element of the assembly is disposed in a retracted or stowed position.
Figure 23D:
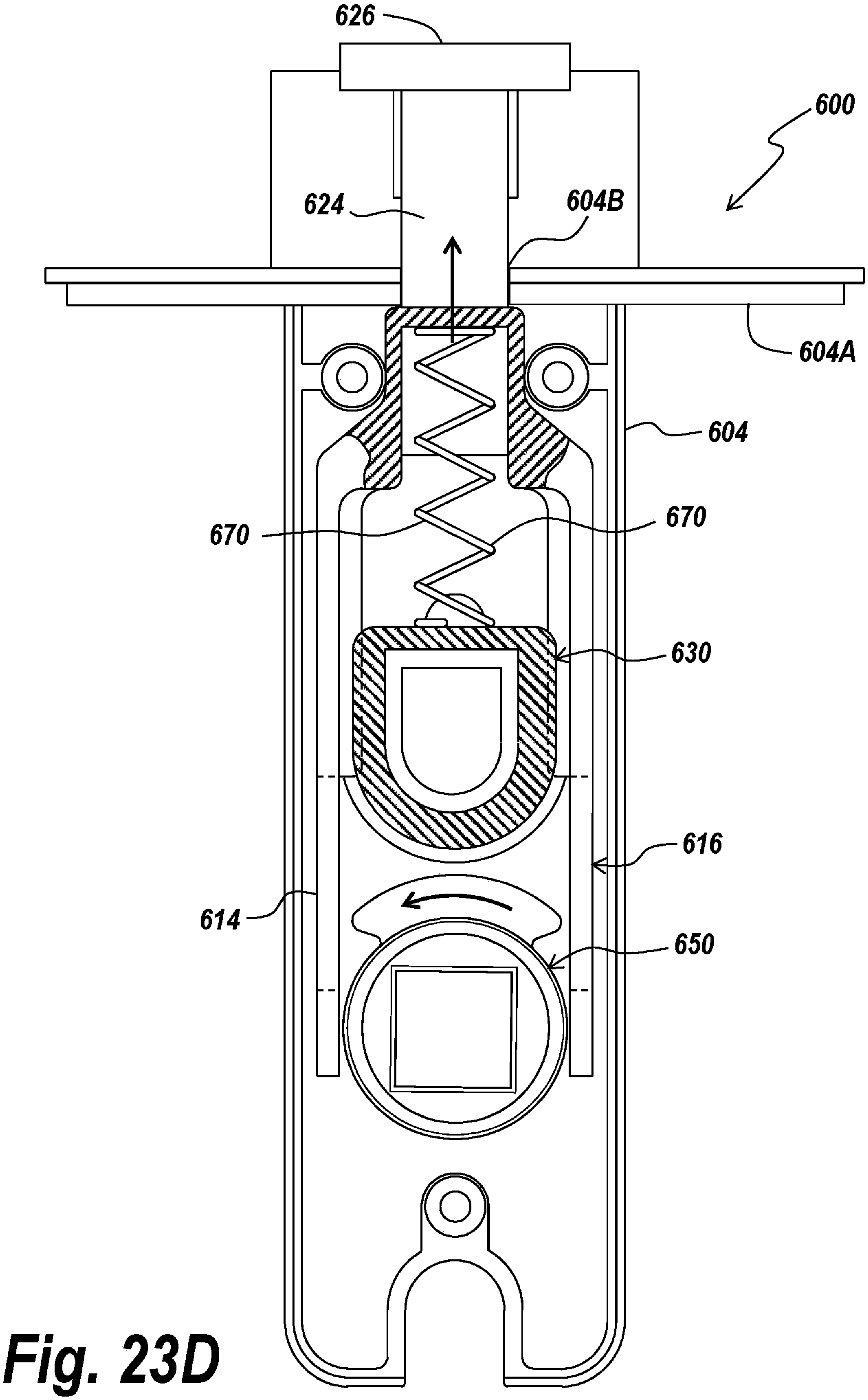
FIG. 23D is a side view of the door latch assembly of one embodiment of the present invention with a portion of the external cover removed to illustrate the internal components as the latch element of the assembly is disposed in an engaged or protruding position.
Figure 25A:
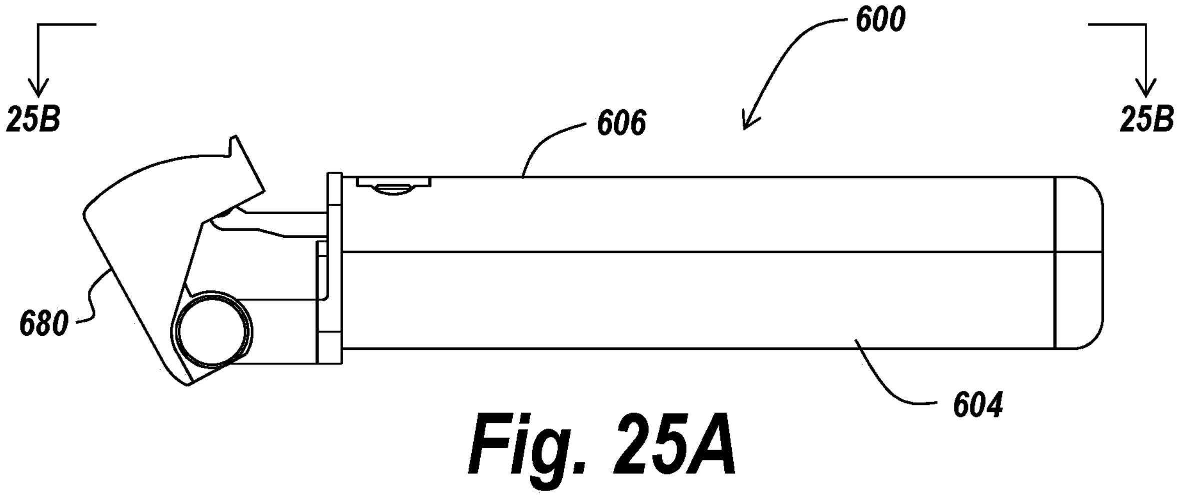
FIG. 25A is a top view of a door latch assembly of one embodiment of the present invention.
Figure 25B:
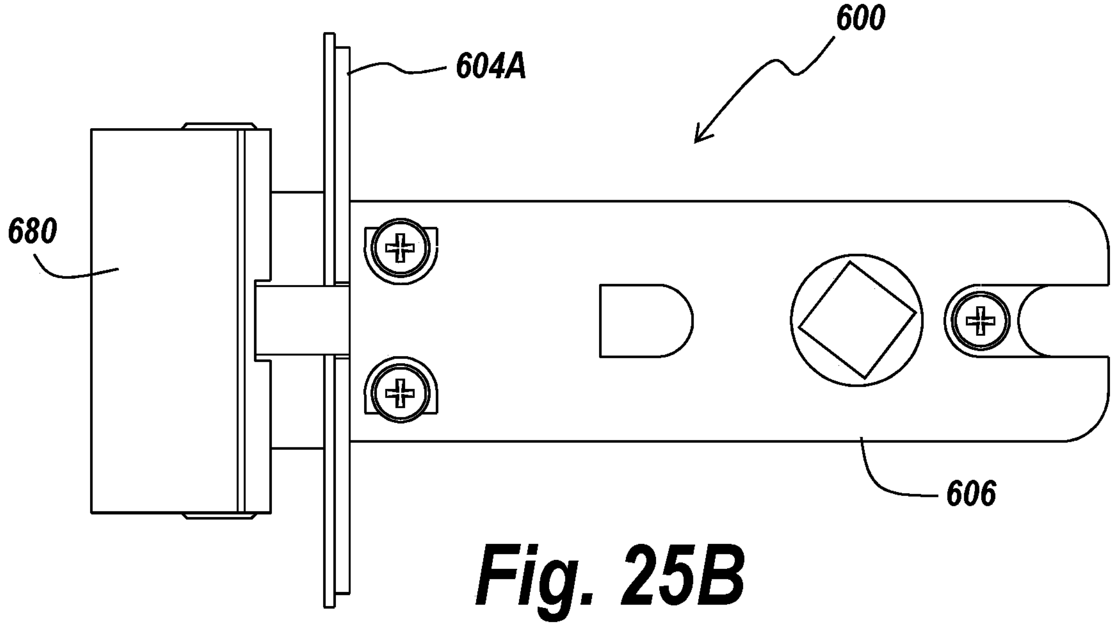
FIG. 25B is a side view of the door latch assembly of one embodiment of the present invention.
Figure 25C:
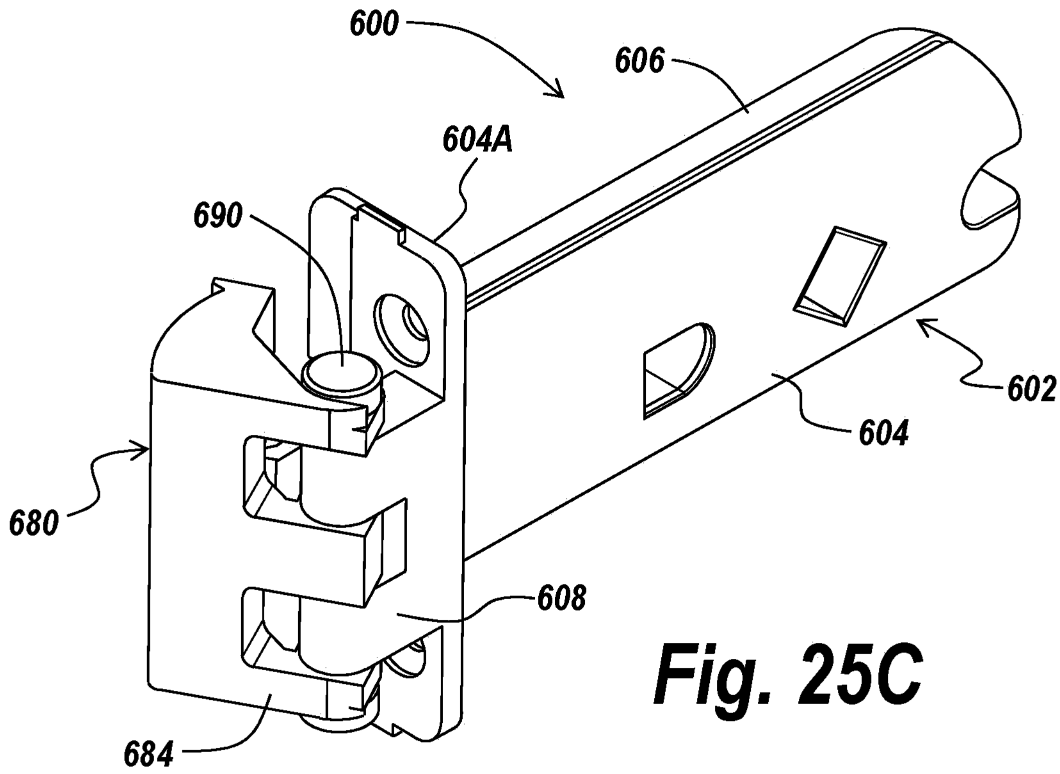
FIG. 25C is a perspective view of a first side of the door latch assembly of one embodiment of the present invention.
Figure 25D:
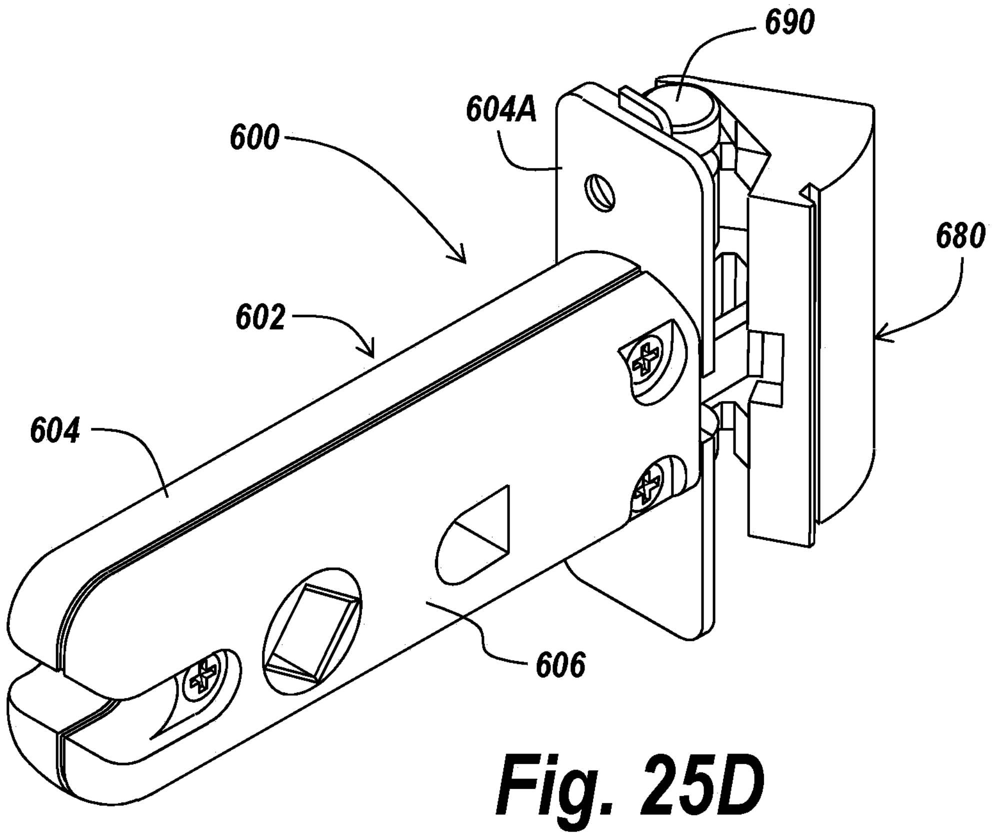
FIG. 25D is a perspective view of an opposed side of the door latch assembly of one embodiment of the present invention.

Some embodiments of the present invention also contemplate the use of a door latch assembly 600. The door latch assembly can, if desired, form part of the door lock assembly 500. The door latch assembly 600 is illustrated in FIGS. 21, 23A-23D and 25A-26D. The door latch assembly 600 includes a main body that is formed of two main body portions, a first main body portion 604 and a second main body portion 606. The first main body portion 604 seats and mounts the general components of the door latch assembly 600, and the second main body portion functions as a cover so as to essentially place and secure the components within the housing or main body. The second main body portion 606 is secured to the first main body portion 604 by fasteners, such as screws, as illustrated in FIGS. 23C, 23D and 25D. The first main body portion 604 includes a head portion 604A that has a groove 604B formed therein. The head portion 604A also includes a hinge-like protrusion 608, FIG. 25C, which extends outwardly therefrom. The hinge-like protrusion is adapted to mate with the latch element 680.

The illustrated door latch assembly 600 includes, in addition to the first and second main body portions, a latch piston element 610, a latch hub element 630, a piston actuator element 650, a biasing element 670, and a spring latch element 680. The latch piston element 610, FIG. 26C, includes a main body 612 that includes a pair of opposed legs extending from a first end, illustrated as latch guide legs 614 and 616. Each of the latch guide legs 614, 616 has a channel formed therein, although one of ordinary skill in the art will readily recognize that only one leg can have a channel formed therein. For example, the first latch guide leg 614 has a channel 618 formed therein, and the second latch guide leg 616 has a channel 620 formed therein. The channels are sized and dimensioned to seat during use a portion of the piston actuator element 650. The legs 614, 616 have formed on inner surface thereof, and which face each other, a guide rail 621 and 622, respectively. The guide rails help guide and seat the latch hub element 630. The legs 614, 616 are joined together at an opposed second end at a hub or junction portion 623. The illustrated latch piston element 610 also includes a space 626 having an inner wall or surface 628A that is formed adjacent to the hub portion for accommodating the biasing element 670. The hub has integrally formed thereon and extending outwardly therefrom a piston element 624 that terminates in a piston head 626. The latch piston element 610 is seated and positioned within the first main body portion 604 such that the piston portion 610 seats within the groove 604B formed in the head portion 604A and extends outwardly therefrom.

The latch piston element 610 is adapted to move in a linear direction as illustrated in FIGS. 23C and 23D by the associated arrows. The linear movement of the latch piston element 610 within the main body moves the piston element 624 and an associated latch element 680 between an engaged position (FIGS. 23A and 23D) and a retracted position (FIGS. 23B and 23C).

Figure 26A:
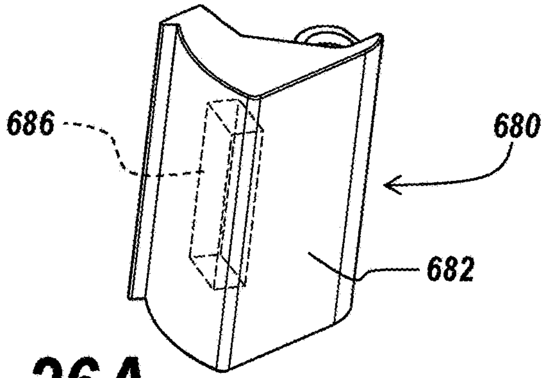
FIG. 26A is a perspective view of a spring latch element of the door latch assembly of one embodiment of the present invention.
Figure 26B:
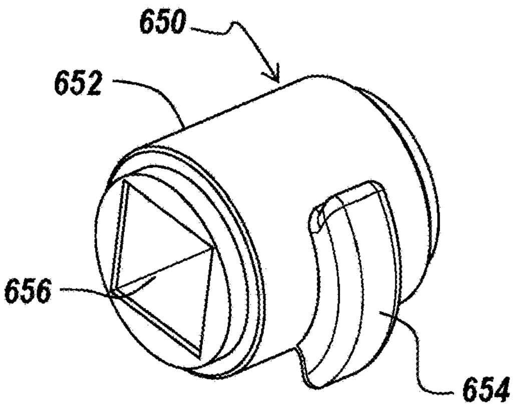
FIG. 26B is a perspective view of a piston guide or actuator element of the door latch assembly of one embodiment of the present invention.
Figure 26C:
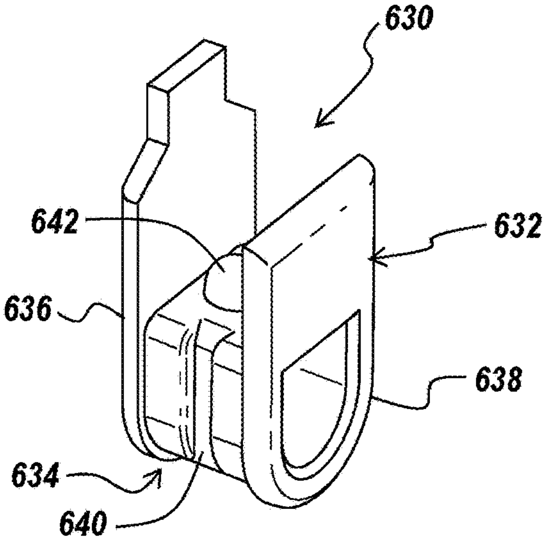
FIG. 26C is a perspective view of a latch hub element of the door latch assembly of one embodiment of the present invention.
Figure 26D:
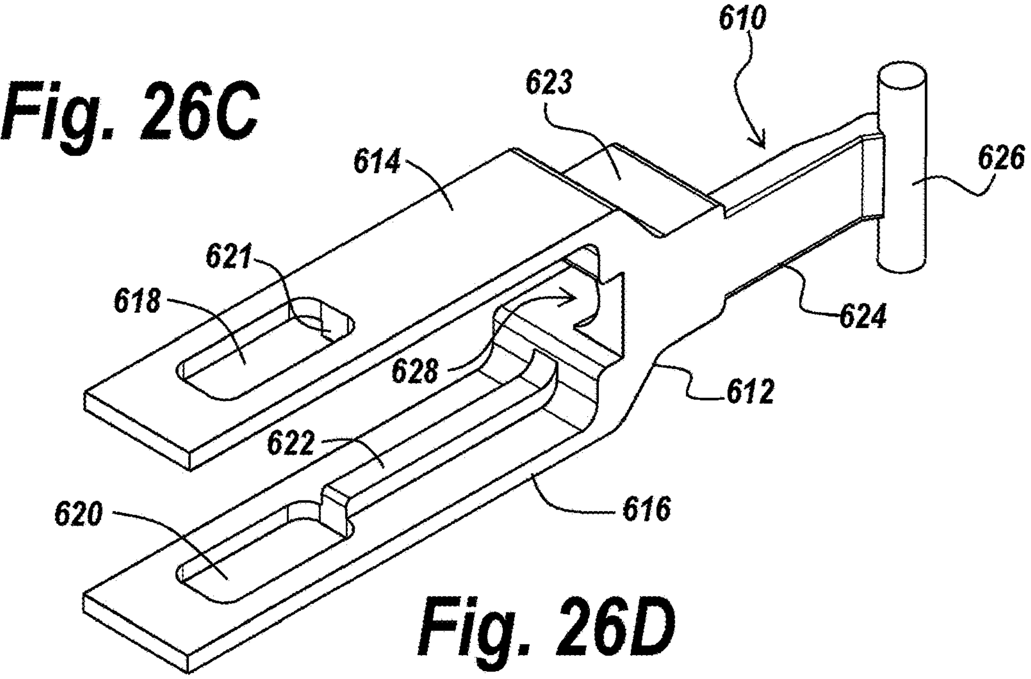
FIG. 26D is a perspective view of a latch piston element of the door latch assembly of one embodiment of the present invention.
Figure 27:
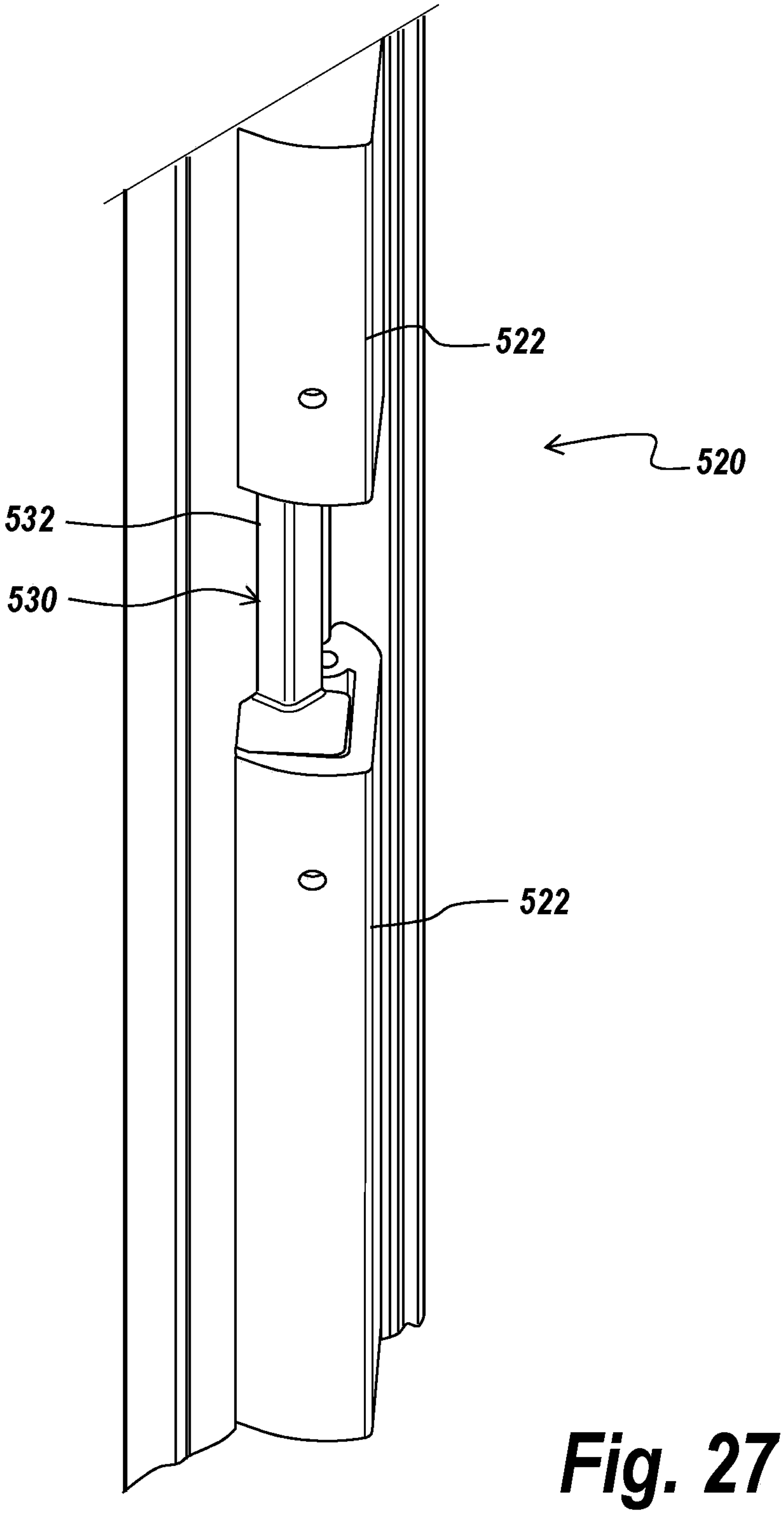
FIG. 27 is a perspective view of the movable locking element and associated coupler element of the door latch assembly of one embodiment of the present invention.

As illustrated in FIG. 26C, the latch hub element 630 has a main body 632 that has a central portion 634 and opposed first and second end portions 636 and 638. The central portion 634 has a groove 640 formed on each side thereof and the grooves are sized and dimensioned for mating engagement with the corresponding guide rail 622, 621 of the latch piston element 610. The central portion also includes a hemispherical boss 642 portion formed on a flat top portion. The boss 642 functions as a biasing element retaining feature for helping seat and retain a biasing element between the top region of the central portion 634 of the latch hub element 630 and an inner surface 628A of the space 628 defined by the latch piston element 610 and the main body 602. The legs 636 and 638 of the latch hub element 630 can have the same or different shapes and sizes, depending upon the size and shape of the various components of the door latch assembly 600. As illustrated, the legs 614, 616 have different configurations.

A biasing element 670 is mounted about the boss 642 and is coupled thereto. The boss element this functions as a biasing element seat during use. The latch hub element 630 and associated biasing element are then mounted within the main body of the door latch assembly 600 such that the end of the biasing element opposite to the end coupled to the boss 642 contacts the inner surface 628A. The biasing element can be any suitable element sufficient for applying a biasing force to the latch piston element 610. According to a preferred embodiment, the biasing element is a spring.

As illustrated in FIG. 26B, the piston actuator element 650 has a substantially circular main body 652 that has a cam feature or element 654 formed thereon and protruding outwardly therefrom. The cam feature 654 extends across a portion of the main body in an arc-like manner. The cam feature 654 is sized and dimensioned to seat within at least channel 620 of the latch piston element 610. The main body also has a central cavity 656 that is shaped and sized to receive a standard door handle attachment for use with the door latch assembly 600. The piston actuator is also mounted within the main body of the door latch assembly 600 and is positioned between the opposed latch guide legs 614 and 616 of the latch piston element 610. The cam feature is adapted to convert rotational movement of the main body, such as by the door handle, into linear movement, such as by moving the latch piston element 610 in the linear direction. Movement of the piston element in the linear direction moves the latch element between the engaged and retracted positions.

As illustrated in FIG. 26A and the other related Figures the latch element 680 can be mounted to the hinge-like protrusion 608 of the main body of the door latch assembly 600. The latch element 680 has a main body 682 that has a top or front surface having a generally wedge-shaped configuration and a back or bottom surface that has a hinge-like protrusion 684 formed thereon. The hinge-like protrusion 684 is adapted to couple to the hinge-like protrusion 608 in an inter-digitated manner so as to form a hinge assembly. The hinge-like protrusions 608 and 684 are coupled together by a pin 690. The bottom surface of the latch element 680 also includes a space or channel 686, FIG. 26A, that is adapted to seat the piston head 626 of the latch piston element 610.

The door latch assembly 600 and associated components can have any selected shape or configuration, in addition to those illustrated and described herein. The various elements other than the biasing element can be formed from any suitable material, such as plastic.

In some embodiments, the door latch assembly 600 operates as follows. With reference to FIGS. 23A-23D, the door latch assembly 600 is assembled by placing the latch piston element 610, the latch hub element 630 and associated biasing element 670, and piston actuator element 650 into the main body 602, as illustrated. The second main body portion 606 is then secured to the first main body portion 604 to secure the elements therein. The latch element 680 is then secured to the piston head and hinge-like protrusion 608 of the main body. When coupled as such, the latch element 680 is pivotably mounted to the main body about the hinge formed by the pair of hinge-like protrusion 608, 684. For purposes of explanation, a door handle (not shown) is deemed to be attached to the door latch assembly 600 via the central aperture or cavity 656 formed in the piston actuator element 650. When the door panel is closed relative to the frame, the latch element is disposed in the normally disposed engaged position. In this position, as shown in FIGS. 23A and 23D, the cam feature 654 of the piston actuator element 650 is removed from the channel formed in one of the legs of the latch piston element 610. Consequently, no linear force is applied to the latch piston element 610 to counteract the force generated by the biasing element 670. As such, the biasing element pushes the latch piston element 610 in the direction noted by the arrow. This forward movement of the latch piston element linearly moves the piston 624 and corresponding piston head 626 in the same direction. The piston head applies a force to the latch element 680, which in turn pivots into the cavity 692 formed in the door frame. The latch element extends outwardly from the main body of the door latch assembly 600 and seats within a channel or cavity 692 formed in the frame element 550. A strike plate 694 is disposed about or adjacent to the cavity for helping ensure that the latch element seats within the cavity 692 during use. This disposes the door latch assembly 600 in the engaged position. In this position, the door is closed relative to the door frame.

If a user wishes to open the door, the user rotates the door handle (not shown), which applies a rotational force to the piston actuator element 650, FIGS. 23B and 23C. The main body 652 of the piston actuator element rotates and moves the cam element 654 into the channel 620 formed in the latch guide leg 616 of the latch piston element 610. The cam feature converts the rotational motion of the door handle and corresponding piston actuator element 650 into linear movement of the latch piston element 610. The piston latch element moves linearly when the cam element 654 is disposed in the channel by the rotational movement, and then eventually contacts or engages the end portion of the channel, thus moving the latch piston element in the direction opposite to the direction of the force that is applied by the biasing element. When this counter force exceeds the force applied by the biasing element, the latch piston element 610 moves in the direction of the arrow thus compressing the biasing element. This linear movement forces the piston element 624 to move in the same direction, thus pivotably moving the latch element 680 in the same direction. This movement removes the latch element from the cavity 692, thus disengaging the door panel from the frame. This disposes the door latch assembly 600 in the retracted position. In this position, the door can be opened relative to the door frame.

The operation of the door latch assembly 600 is separate and independent from operation of the movable locking assembly. Thus, the door latch assembly 600 can move the latch element between the engaged and retracted positions independent of the position of the locking assembly. Further, selected features of the first and second embodiments of the door lock assembly illustrated herein can be shared as would be apparent to one of ordinary skill in the art.

FIGS. 30-51 illustrate various views and components of another embodiment of a door lock assembly 700. The door lock assembly 700 includes a differently configured door latch assembly 810 and deadbolt or drive assembly 720. The door lock assembly is also configured for mounting in a door panel 18, FIG. 21. Like elements are designated with like reference numerals throughout the various Figures and views. The door panel 18 can be a separately installed unit or can form part of a pre-hung or pre-mounted door assembly that includes the door frame 10, FIG. 1A. The general components of the door frame 10 have been previously described herein in connection with the first embodiment of the present invention. Those of ordinary skill in the art will readily recognize that the door lock assembly can be mounted in either side of the door panel depending on whether the door is a left or right swinging door.

The elements of the door lock assembly 700 can be essentially the same as the elements disclosed in connection with the second embodiment of the invention unless otherwise noted below. As previously shown for example in FIG. 21, the door panel 18 has a vertical groove or channel 502 that is sized and dimensioned for seating a frame element 510 that serves to securely couple the movable locking assembly or element 520 to the door panel when assembled. The frame element 510 is secured to the door panel when mounted within the channel by a pair of header plates 506 that can be fastened to the door panel 18 by known conventional fasteners, such as screws, and which seat within corresponding grooves formed in the top and bottom of the door panel.

Similarly, a channel or groove 504 can also be formed within the door jamb of the door frame 10. A frame element 550 is mounted or seated within the channel 504 and is secured therein according to known techniques. For example, the frame element can be secured therein by fasteners, by an adhesive, or by known pressure fit techniques.

The door panel 18 can also have one or more holes or apertures 505, 507 formed therein for mounting for example a door handle or latch assembly and a deadbolt assembly. The door panel apertures can be formed therein by a user or other skilled professional or can be pre-drilled by the manufacturer. As shown in FIG. 21, a first aperture 505 is formed in the door panel and is of a conventional size that is sufficient to mount a deadbolt or drive assembly 720. The deadbolt or drive assembly can be any conventional commercially available deadbolt assembly or can be a specially designed drive assembly that is customized for operation with the movable locking assembly while concomitantly providing specific additional functionality, such as one or more of the functionalities set forth above in connection with the first and second embodiments. The door panel 18 may also have a second aperture 507 formed therein. The aperture 507 is suitable for mounting any commercially available door latch assembly or the door latch assembly 810 as described below.

As illustrated in FIGS. 21, 22A and 22B, the illustrated frame element 510 of the door panel has a main body includes a relatively flat back or base portion 512 and a pair of outwardly projecting sides or leg portions 514, 515. The leg portion 514 of the frame element 510 includes a lock connector portion 516 that is sized and configured for cooperatively mounting at least a portion of the movable locking assembly 520. The lock connector portion 516 includes a curved connector element or portion 516A that extends outwardly therefrom and which forms a lock receiving groove 516B. The curved connector portion 516A can have any suitable shape sufficient to receive and engage at least a portion of the movable locking assembly and to allow movement of the assembly when coupled thereto. As shown, the curved connector portion can have a generally C-shaped design. The lock receiving groove 516B is adapted to seat and mount a portion of the movable locking assembly 520. The locking assembly portion that seats within the groove forms a pivoting portion that allows at least a portion of the locking assembly to pivot about a point corresponding to the lock connector portion between a locked position (FIGS. 22A and 24B) and an unlocked position (FIGS. 22B and 24A), as described above.

The movable locking assembly 520 according to the current embodiment can also comprise a plurality of interconnected components. The illustrated assembly includes one or more, and preferably a pair, of movable locking elements 522, 522 that are adapted to pivot into and out of the space 518 formed by the frame element 510. Each of the movable locking elements 522 has a main body 524 that includes a connecting portion 526 formed at a first end. The connecting portion 526 is sized and dimensioned for seating within the groove 516B formed in the lock connector portion 516 of the frame element 510. The connecting portion 526 can have any suitable shape or configuration that allows the connecting portion to seat within and move relative to the lock connecting portion 516. According to one practice, the lock connector portion has a shape that is complementary to the shape of the groove 516B, and preferably has a substantially C-shaped configuration.

The opposed end or an intermediate portion of the main body 524 of the locking element 522 has a groove 586 formed therein that is adapted to mount a resilient member 528. The resilient member 528 provides a sound dampening function during operation of the door lock assembly. Specifically, the resilient member 528 is adapted to contact one leg portion 515 of the frame element when the locking assembly is disposed in the locked or protruding position, as shown in FIG. 22A. The resilient member is the only portion of the locking element to contact the frame element 510, thus helping reduce the noise created when the locking assembly contacts the frame element. This substantially eliminates a loud, unwanted clicking noise when the locking element is moved between the locked and unlocked positions.

The main body 524 of the illustrated locking element 522 has opposed ends, the first end of which, as set forth above, includes the connecting portion 526 and the opposed second end wraps around to form in essence a hollow passage 590. The actuator of the deadbolt assembly 720 described below is positioned in part within this passage during operation.

The main body 524 of the illustrated locking element 522 has opposed ends, the first end of which, as set forth above, includes the connecting portion 526 and the opposed second end wraps around to form in essence a hollow passage 590. The actuator of the deadbolt assembly described below is positioned in part within this passage during operation.

The illustrated locking element 522 can have any selected size and shape, provided that the locking element is capable of contacting the frame element 550 of the door frame in order to lock or secure the door panel 18 to the frame 10. The locking element 522 can be any suitable rail-type locking element that is capable of moving when actuated between the locked and unlocked positions. According to this embodiment, the locking element can have a generally wedge-shaped configuration. The locking element can be made from any suitable material, and is preferably composed of aluminum. The resilient member can also have any selected size, shape or configuration, and can be composed of any suitable material, such as rubber.

The movable locking assembly 520 can employ a connector portion 738 that is adapted to couple to the drive portion of the deadbolt or drive assembly 720. This connector 738 serves to matingly and operatively couple the deadbolt assembly to the movable locking assembly 520 so as to move the locking assembly between the locked and unlocked positions. Further, rather than employ an intermediate coupler element 530 and a drive element 540 as in the second embodiment, the movable locking assembly of this embodiment employs a wedge coupler element 880 that can be integrated with the latch assembly 810, as described in further detail below, FIGS. 42 and 44. The wedge coupler element is adapted to couple to the locking elements 522, 522 at either end.

As shown in FIGS. 30-36 and 48-51, the illustrated deadbolt or drive assembly 720 is sized and configured to seat at least partly within the aperture 505 and any corresponding transverse bore and includes a pair of opposed housing parts 722 and 724. The housing part 724 can include for example a head plate 726 that is integrally formed therein. The head plate can include a cut-out or groove 728 that seat a portion of a drive element. The head plate 726 can also include a pair of apertures sized and dimensioned for receiving a respective fastener for mounting the deadbolt assembly to the door panel. The drive element portion or assembly of the deadbolt assembly 720 can include a hub portion 740 that is adapted to seat within and between the housing parts 722, 724. The hub element includes a main body 742 having formed along an outer surface thereof a latch element 746 that extends outwardly therefrom. The latch element 746 is adapted to engage a groove 756 formed in the slider element 750 of the deadbolt assembly 720. The hub element main body 742 further includes an opening 744 formed in a central portion thereof for receiving a manipulation element (not shown), such as a tab or a manual latch, that allows a user to manually lock and unlock the door.

The slider element 750 includes a main body 752 having a first end that is adapted to engage the hub portion 740. Specifically, the first end of the main body of the slider element has formed therein a groove 756 that is sized and dimensioned for receiving the latch element 746. The latch element when mounted within the groove serves to move the drive element assembly axially within the housing parts so as to move the lock assembly between the locked and unlocked positions. The first end also includes a pair of opposed tab portions 754 that are adapted to seat within a corresponding groove 732 formed in the housing parts 722, 724. The tab portions 754 are configured to axially move within the groove when the hub element is rotated.

The slider element 750 has a main body that includes an opposed second end that includes a hinge portion 760 that is configured to mate with, in a movable manner, an end of a drive arm 770. Specifically, the illustrated drive arm 770 includes a first end that has formed thereon a hinge portion 774 that is sized and dimensioned to mate with the hinge portion 760 of the slider element 750. The hinge portions can be interleaved together and then secured in this state by a hinge pin 792. The drive arm 770 has formed on an opposed second end a drive interface pin 778. The pin is adapted to be inserted into a connector portion 738 of the movable locking assembly. The main body of the drive arm 770 also includes an intermediate body portion disposed between the first and second ends and has an aperture 782 formed therein. The aperture is sized to seat an arm guide 790. The arm guide element can be mounted on either side of the drive arm within the aperture and is intended to restrict movement of the drive arm in that direction.

Figure 36:
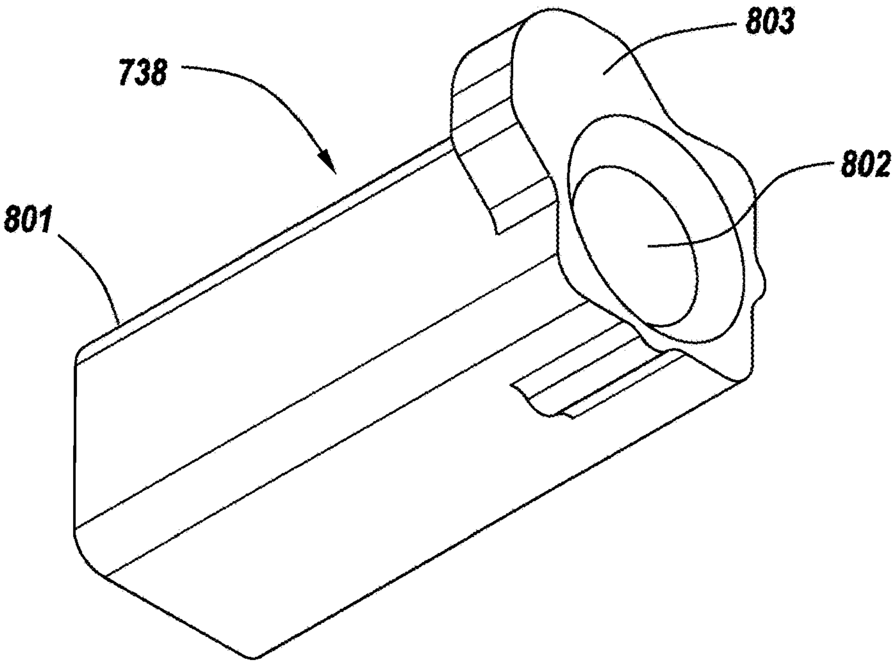
FIG. 36 is a perspective view of a connector portion used for coupling the movable locking assembly to the drive element according to one embodiment of the present invention.

As shown in FIG. 36, the illustrated connector portion 738 includes a main body 801 that is sized and configured to be mounted or coupled to the locking element 522. The connector portion can be secured within the hollow passage 590 by any suitable means, including by frictional or interference fit. The connector portion has opposed end regions, one of which has an aperture 802 formed therein. The aperture is intended to seat the drive interface pin 778 of the drive arm 770. The end of the connector portion can also include one or more radially extending flanges 803 that enable the connector portion to be retained within the locking element 522.

The deadbolt assembly 720 can be assembled as follows. The hinge portions of the slider element 750 and the drive arm 770 are assembled and secured together with the hinge pin 792 to form part of the drive assembly. The mated hinge portions allow the drive arm the ability to move in a curved or oscillating path with movement of the locking assembly 520 during use. The tab portions 754 of the slider element 750 are disposed in the grooves 732 of the housing parts 722, 724 and the second end of the drive arm 770 is disposed within the cut-out 728 of the head plate 726. The hub element 740 is then placed between the housing parts and the latch element 746 of the hub is disposed within the groove 756 of the first end of the slider element 750. The arm guide 790 is then disposed in the aperture 782 formed in the drive arm 770. If the door is a right swinging door, then the arm guide is disposed in the aperture on a particular side of the drive arm (e.g., the side can be marked "R" if needed, which is the top surface of the drive arm illustrated in FIG. 30) so as to restrict leftward movement of the drive arm 770 within the cut-out 728. Alternatively, if the door is a left swinging door, then the arm guide 790 is disposed in the aperture on the side of the drive arm marked "L" (not shown) so as to restrict rightward movement of the drive arm within the cut-out 728. The arm guide 790 serves to keep the drive arm aligned within the cut-out 728 while concomitantly allowing freedom of motion in the proper direction for the respective swing of the door panel. The housing parts 722 and 724 are then secured together by way of fasteners 796. The assembled deadbolt or drive assembly is then placed in the bore 505 formed in the door panel 18. The drive interface pin 778 is then coupled to the movable locking assembly 520. Specifically, the movable locking assembly includes at least a pair of movable locking elements 522. The upper movable locking element 522 includes a connector portion 738 mounted within the hollow 590 of one of the locking elements 522. The drive interface pin 778 is inserted within the connector portion 738, thus securing the drive assembly to the movable locking assembly 520. The deadbolt assembly 720 when mounted within the bore can have a latch portion mounted on the interior side of the door panel and a keyed interface on the exterior side of the deadbolt assembly. The latch element can be manipulated by a user.

Figure 48:
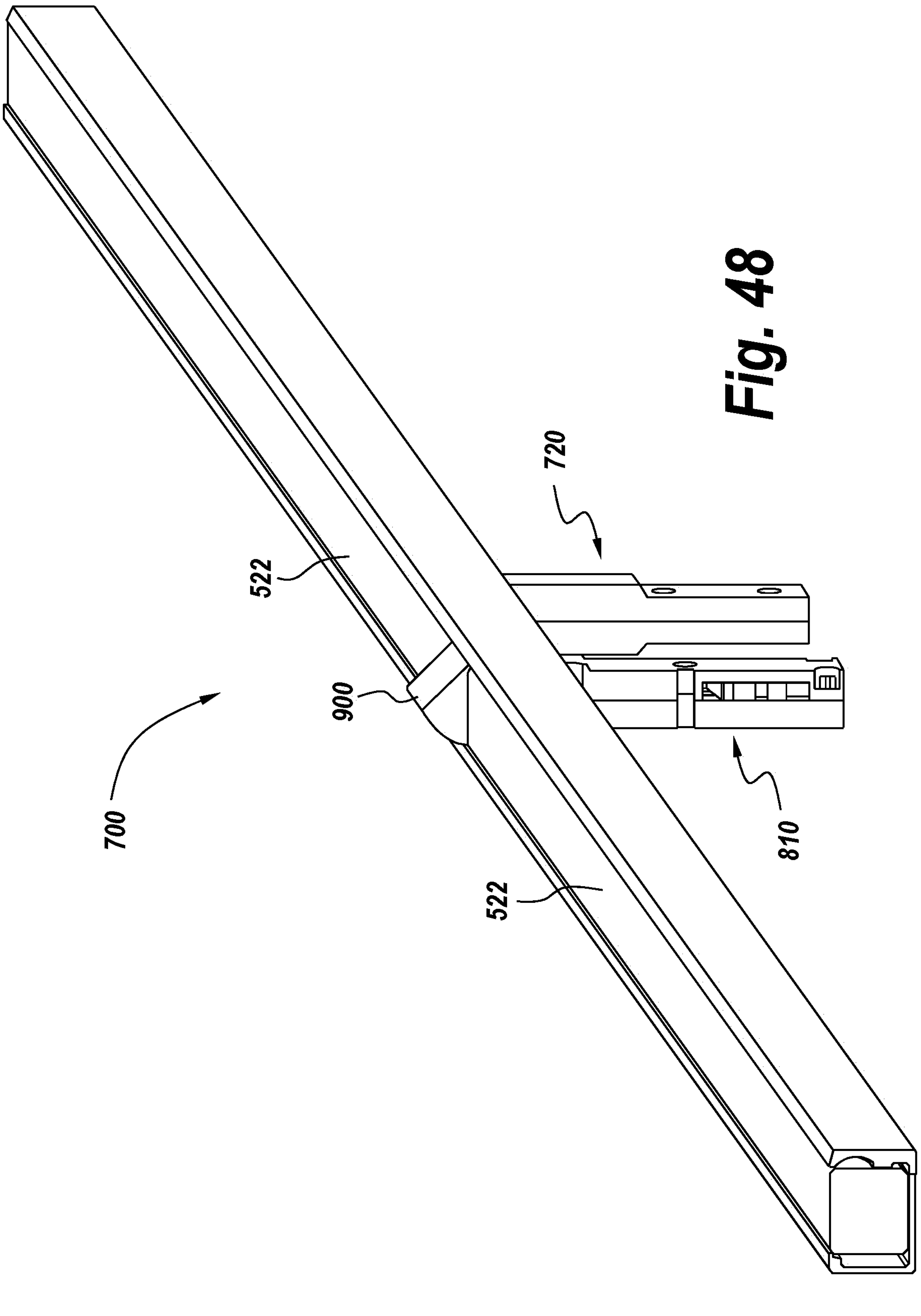
FIG. 48 is a perspective view of selected door components in isolation showing the mechanical coupling and cooperation between the drive assembly and the door latch assembly with the movable locking assembly, where the locking assembly is disposed in the unlocked position according to one embodiment of the present invention.
Figure 49:
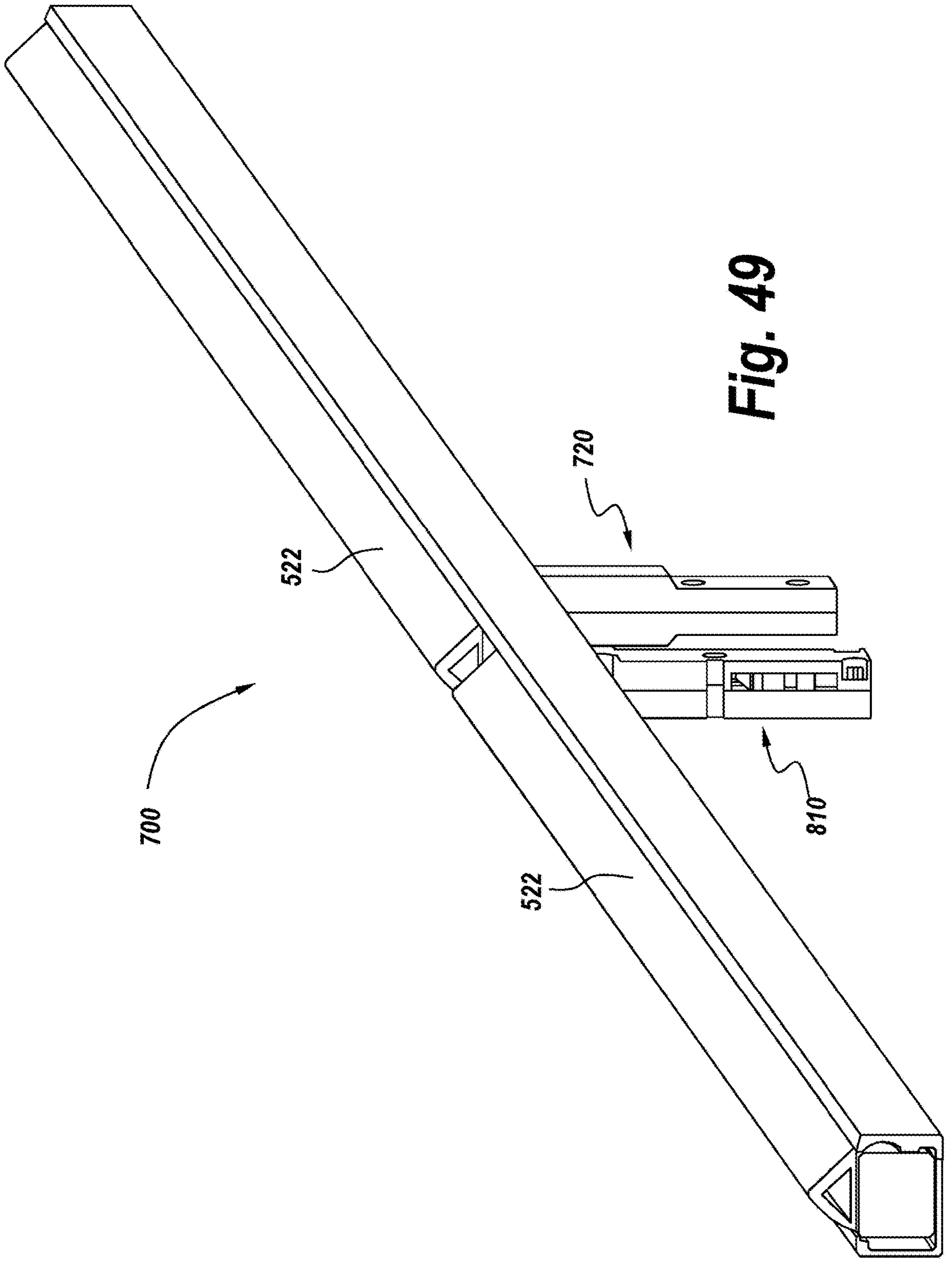
FIG. 49 is a perspective view of selected door components in isolation showing the mechanical coupling and cooperation between the drive assembly and the door latch assembly with the movable locking assembly, where the locking assembly is disposed in the locked position according to one embodiment of the present invention.
Figure 50:
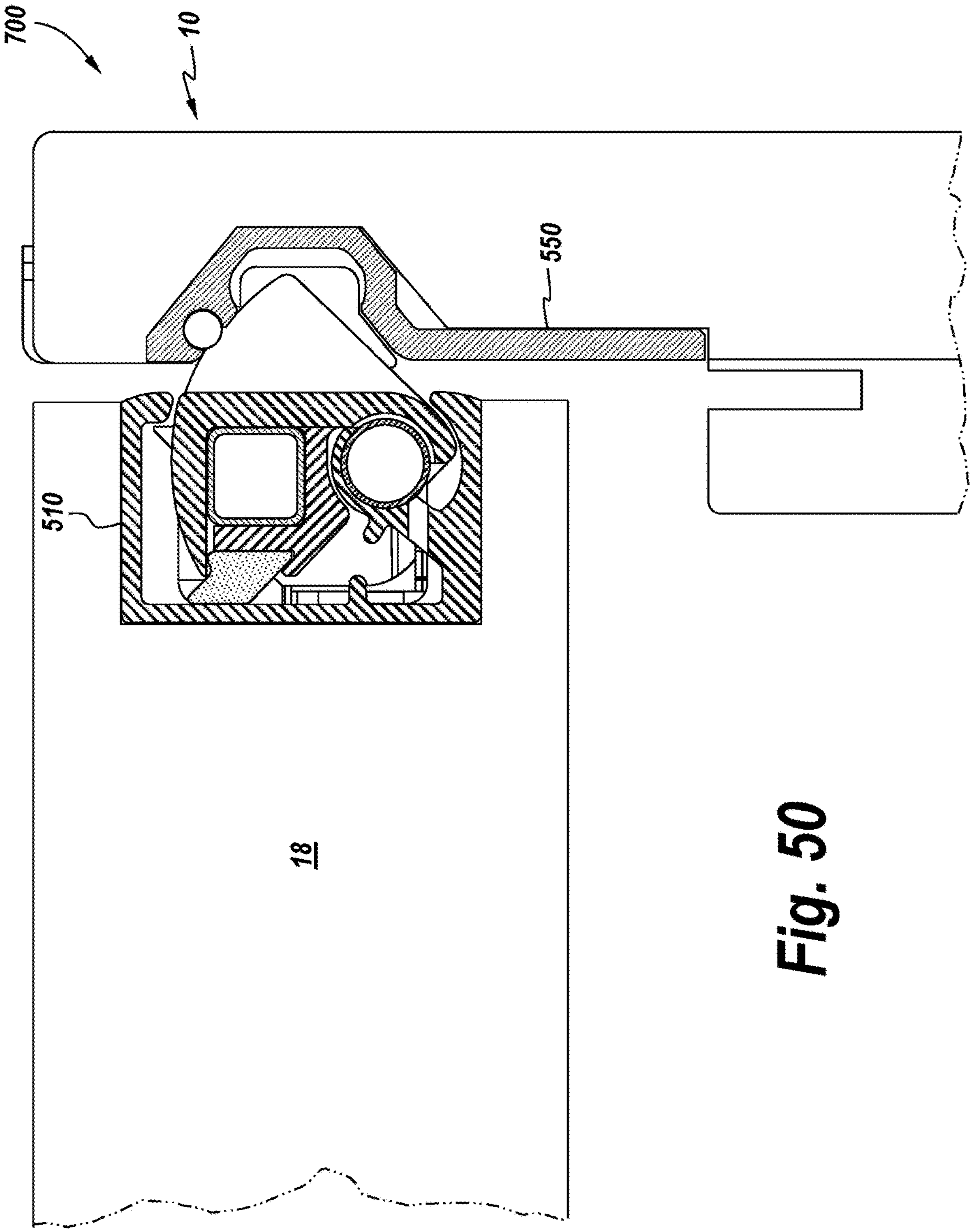
FIGS. 50 and 51 are partial views of the door locking system of one embodiment of the present invention showing the independent operation between the door latch assembly and the movable locking assembly.
Figure 51:
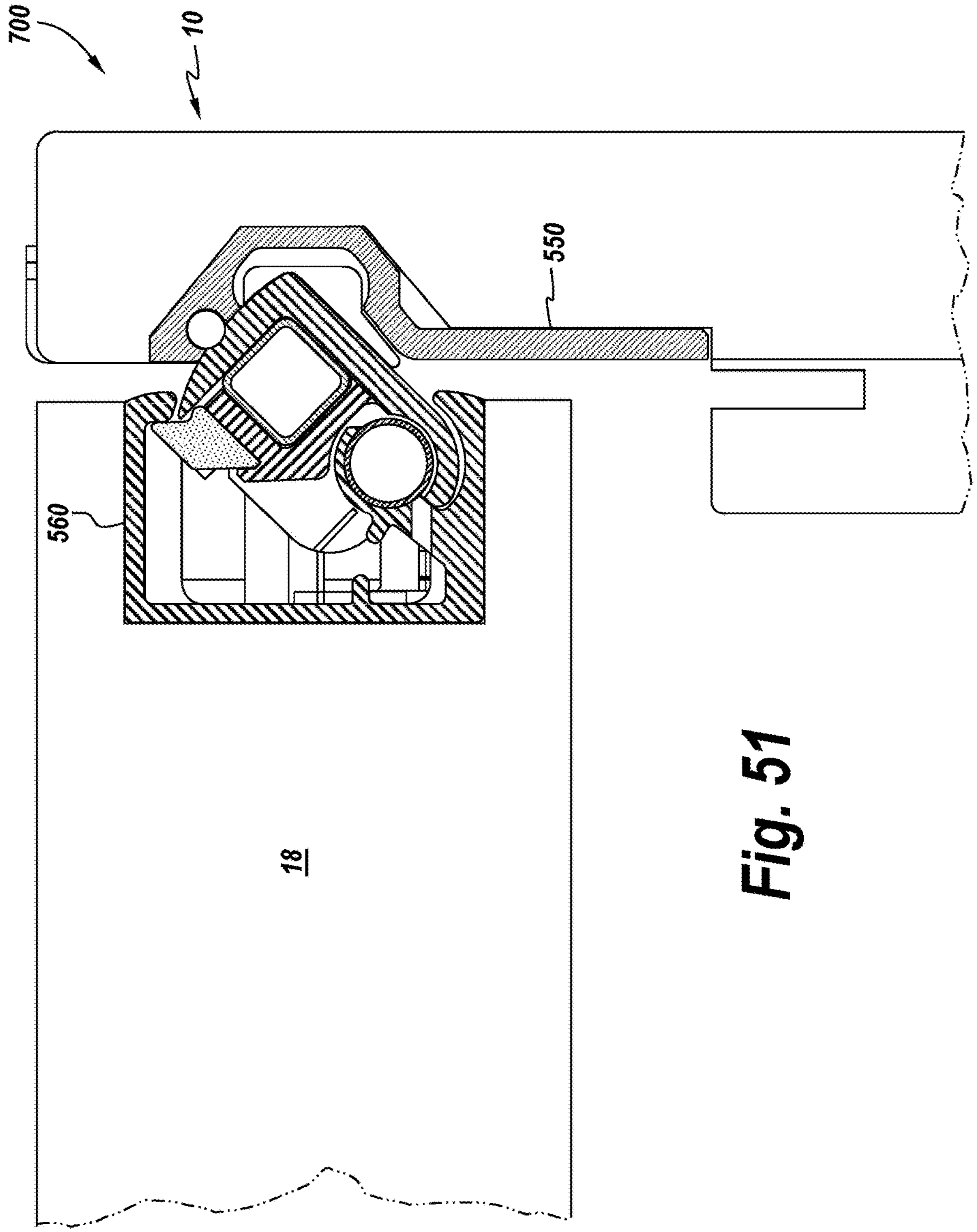
Figure 52:
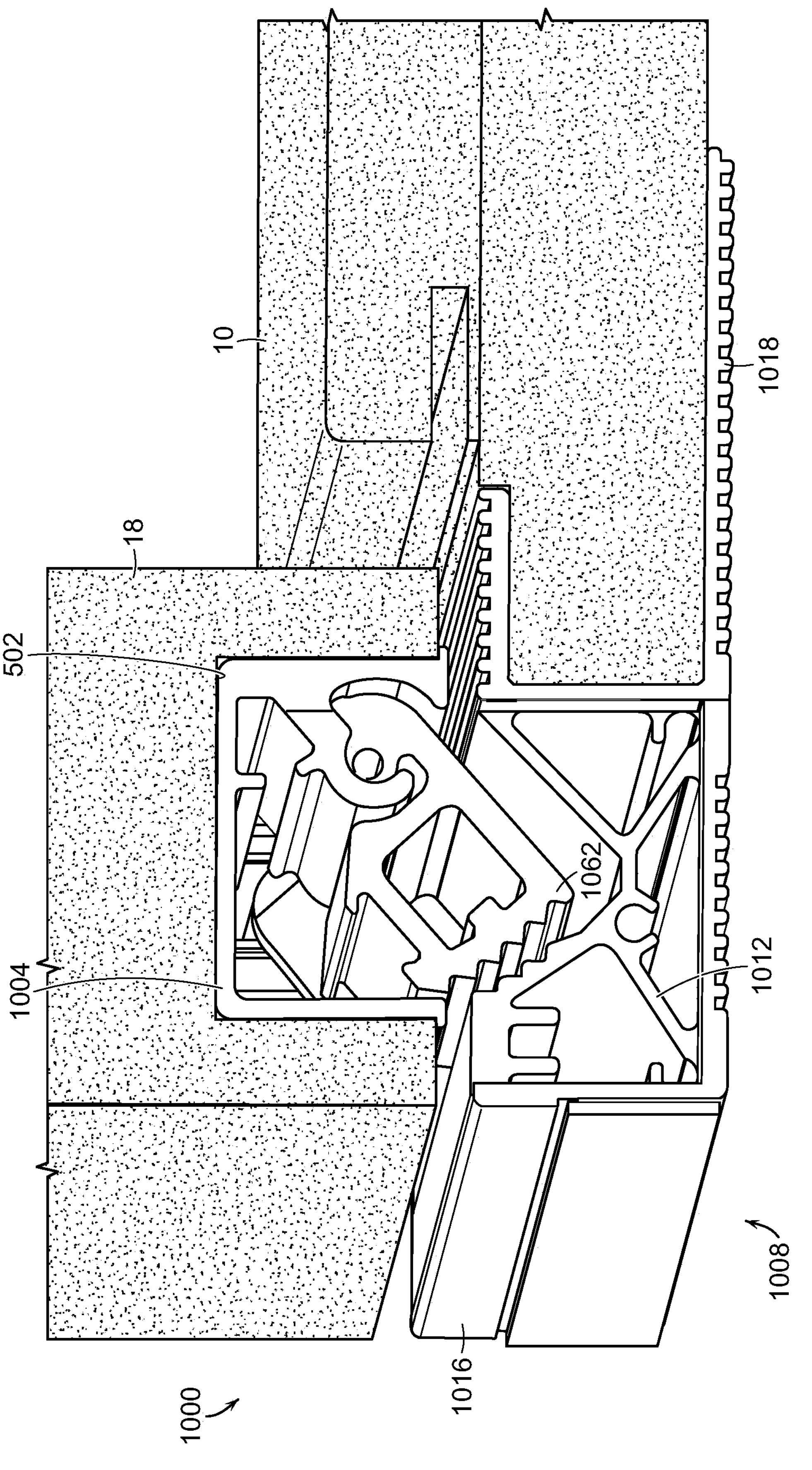
FIG. 52 is a partial cross-sectional view of a door lock assembly according to still another embodiment of the present invention.

When disposed in the unlocked position, FIG. 48, the slider element 750 and the drive arm 770 are disposed in an innermost or retracted position within the housing parts 722, 724. In this position, the tab portions 754 are disposed at one end of the grooves 732, FIG. 31. The drive interface pin 778 is coupled to the movable connector assembly and hence pulls the movable connectors into the unlocked or stowed position. When the user wishes to lock the door, the user moves the latch element portion (not shown) of the deadbolt assembly in the opposite direction. When the latch element is turned by a user, the hub element 740 which is coupled to the slider element 750 through the latch element 746 that seats within the groove 756, helps drive the slider element 750 linearly towards the door frame. The slider element 750 is hingedly or pivotably coupled to the drive arm 770 through the mating hinge portions 760, 774. The slider element drives the drive arm towards the door frame. The drive interface pin 778 which is connected to the movable locking elements through the connector portion 738 drives the movable locking assembly from the stowed or unlocked position to the deployed or locked position, FIG. 49. The connector portion 738 helps constrain and trap the drive interface pin such that when the actuator or drive elements moves the movable locking assembly into the locked position, it contacts and exerts a force on at least one of the movable locking elements. Since the movable locking elements can be generally or substantially wedge-shaped, the movement of the drive arm travels in a small arc as the wedge-shaped movable locking elements move from the unlocked to the locked position. The hinged coupling of the slider element to the drive arm allows the drive assembly to move in an axial or linear direction while concomitantly allowing the drive arm to move in an arc like motion as the arm follows the movement of the wedge-shaped locking elements.

Conversely, when the user wishes to unlock the locked door, the latch of the deadbolt assembly is moved in the opposite direction. As such, the hub element drives the slider element and in turn the drive arm in the opposite axial or linear direction. When the drive mechanism moves the movable locking assembly 520 into the unlocked position from the locked position, the drive interface pin pulls on one or more of the movable connector elements via the connector portion 738 and hence moves the movable connector assembly from the deployed position into the stowed or retracted position.

Figure 37:
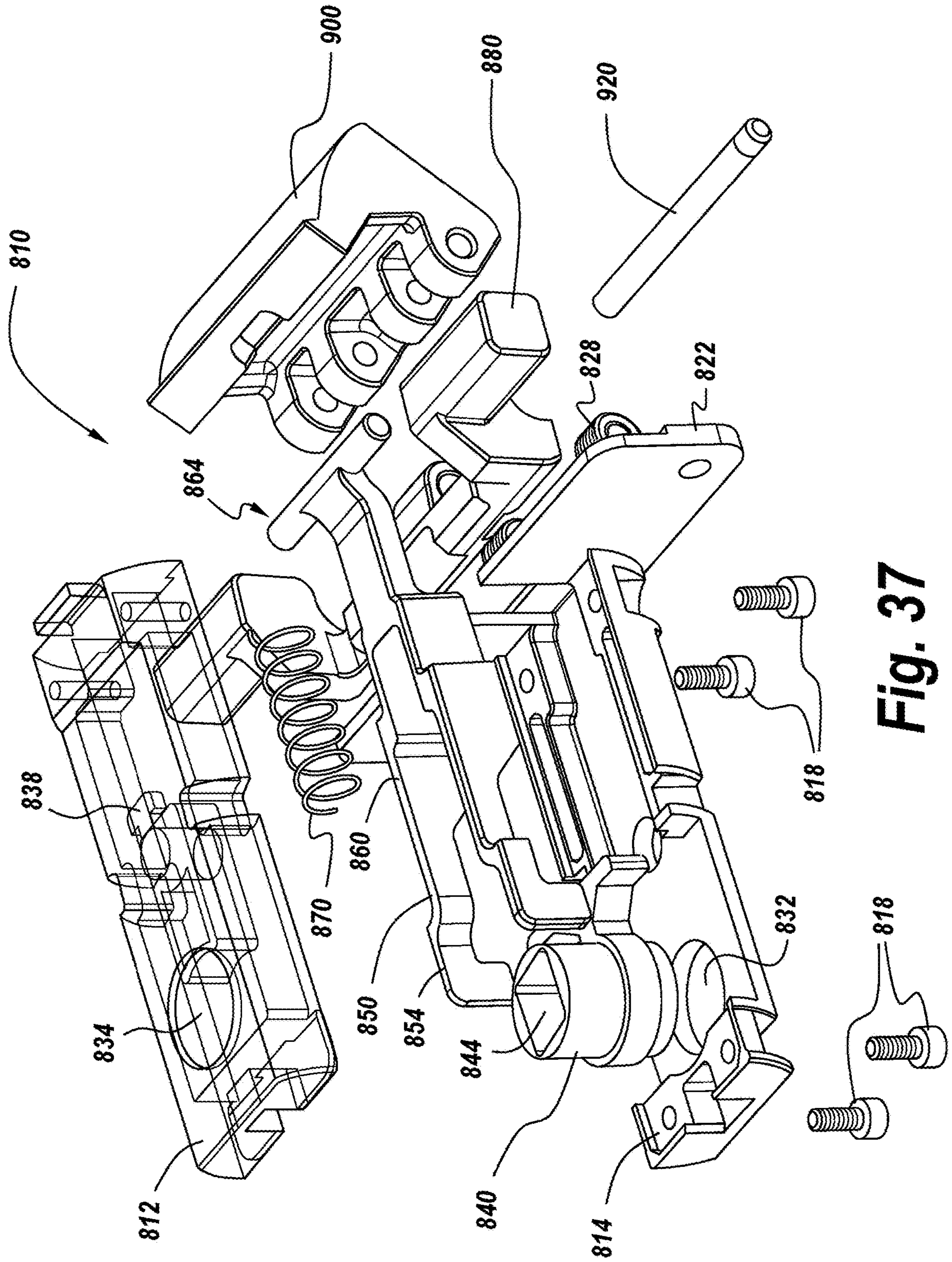
FIG. 37 is an exploded view of a latch assembly according to another embodiment of the invention.
Figure 40:
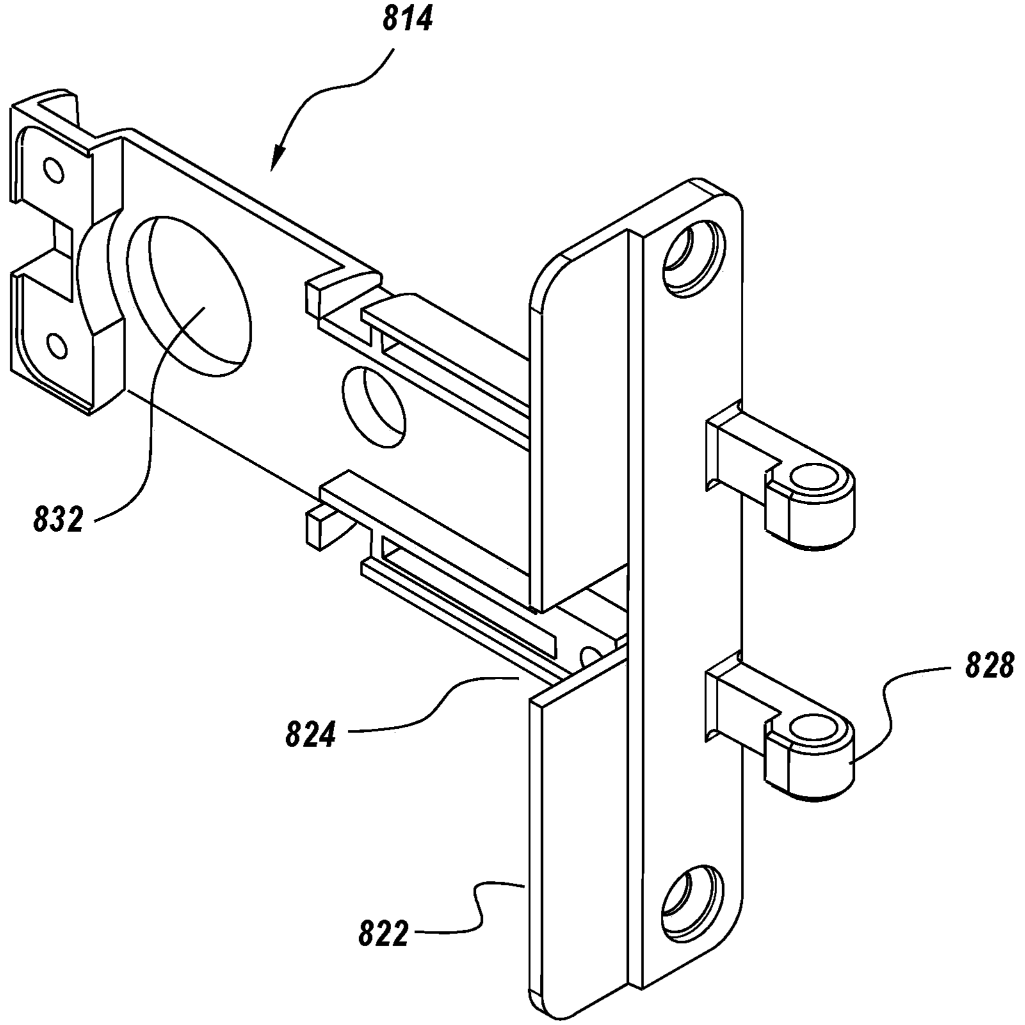
FIG. 40 is a perspective view of a housing part of the latch housing assembly according one embodiment of the present invention.
Figure 41:
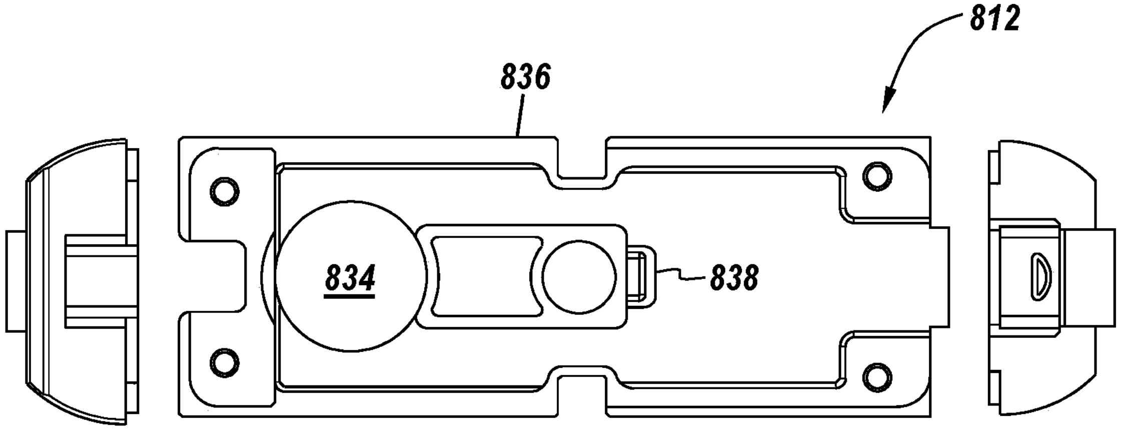
FIG. 41 is a perspective view of the other housing part of the latch housing assembly according to one embodiment of the present invention.

In some embodiments, a door latch assembly 810 suitable for use with the door lock assembly 700 may be used. The door latch assembly can, if desired, also form part of the door lock assembly 500. The door latch assembly 810 is illustrated for example in FIGS. 37-46 and 48-51. The door latch assembly 810 includes a main body that is formed of two main body housing portions, namely, a first main body housing portion 812 and a second main body housing portion 814. As shown in FIGS. 37, 40, and 41, the main body housing portions 812, 814 seat and mount the general components of the door latch assembly 810 while concomitantly functioning as a cover to essentially position and secure the components within the main body. The housing portions 812, 814 are secured together by suitable fasteners 818, such as screws.

The illustrated second main body housing portion 814 includes a head plate 822 that has a groove 824 formed therein. The groove is adapted to seat a portion of a latch arm 850. The head plate 822 also includes a hinge-like protrusion 828 which extends outwardly therefrom. The hinge-like protrusion is adapted to mate with a wedge coupler 880 and a latch element 900, as described below. The housing portion 814 also has formed therein at an end opposed to the head plate 822 an aperture 832 for seating a portion of a latch hub 840 and a latch or door handle (not shown) of a conventional handle assembly. The first main body housing portion 812 also includes at an end portion a similar aperture 834 for seating a portion of the latch hub 840. An inner surface of the housing portion 812 also has formed thereon a protruding seat element 836 that has formed on an end portion thereof a boss element 838. The boss element 838 is adapted to seat one end of the biasing element 870.

Figure 38:
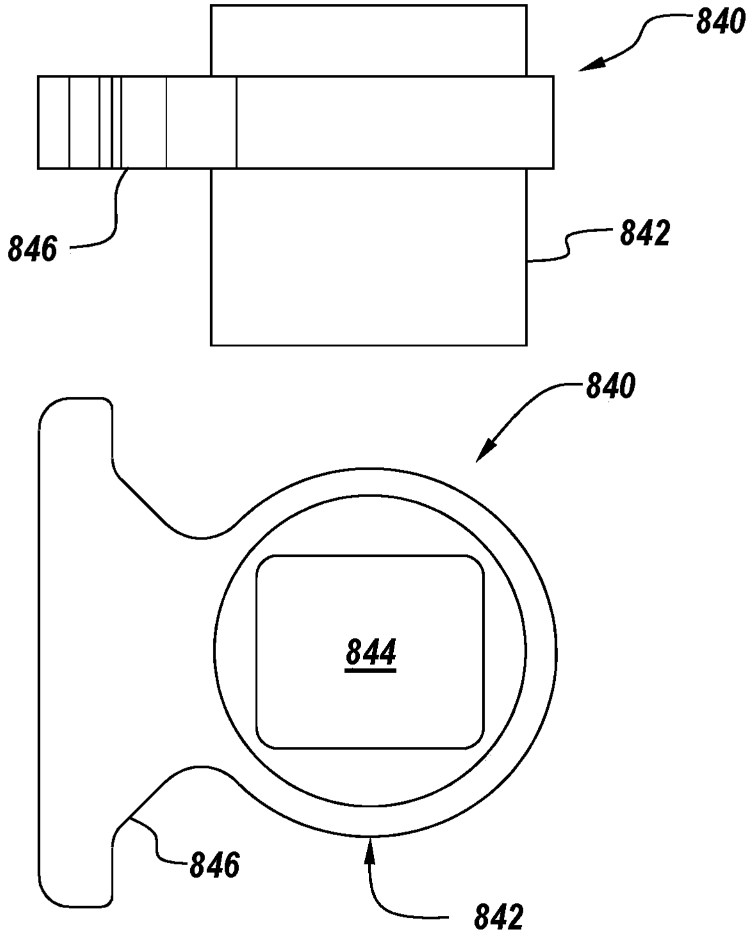
FIG. 38 is a perspective view of a latch hub of the latch assembly according to one embodiment of the present invention.

The illustrated door latch assembly 810 includes, in addition to the first and second main body housing portions, a latch hub 840, a latch arm 850, a biasing element 870, a wedge coupler 880, a latch element 900, and latch pin 920. As shown in FIGS. 37 and 38, the illustrated latch hub 840 includes a main body 842 having a central opening 844 for accommodating the handle of a door handle assembly. The main body 842 also has protruding outwardly therefrom an engagement portion 846 formed as a hook element for engaging operatively with the latch arm 850. The engagement portion 846 can be formed at any selected location along the main body, including along a terminal end, and is preferably spaced from an end by a selected distance, as illustrated. The latch hub is rotatably movable when mounted within the apertures of the housing portions 812, 814 and can be specifically rotated by rotational movement of a door handle. That is, the engagement portion 846 is adapted to convert rotational movement of a door handle into linear movement, such as by moving the latch arm 850 in a linear direction. Movement of the piston element 864 in the linear direction moves the latch element between engaged and retracted positions.

Figure 39:
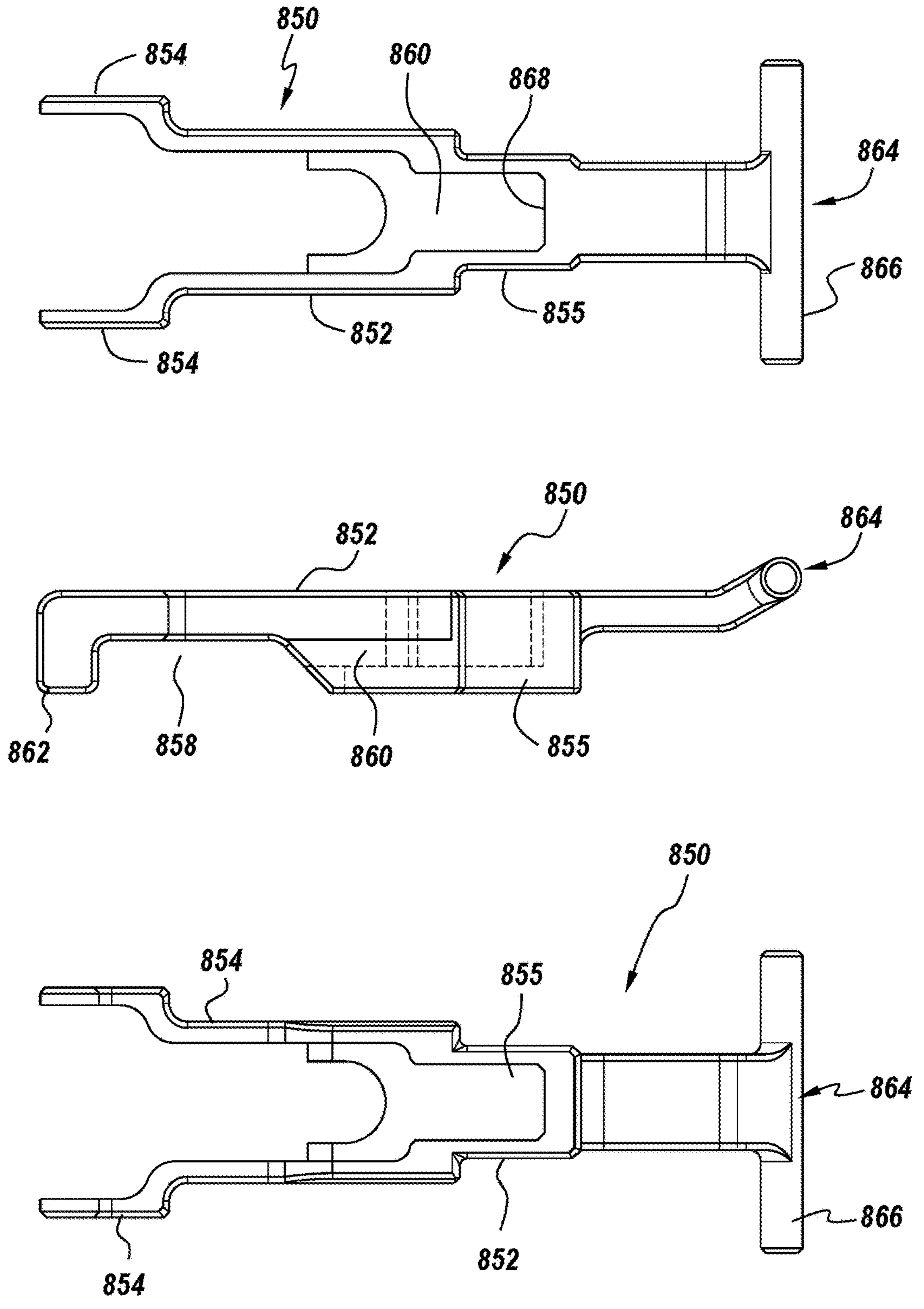
FIG. 39 is a perspective view of a latch arm of the latch assembly according to one embodiment of the present invention.

FIGS. 37 and 39 illustrate the latch arm 850 included in some embodiments of the present invention. The illustrated latch arm 850 includes a main body 852 that includes a pair of opposed legs extending from a first end, illustrated as latch guide legs 854, 854. Each of the latch guide legs has a cut-out 858 formed therein, although one of ordinary skill in the art will readily recognize that only one leg can have a cut-out formed therein. The cut-out in essence forms an outwardly extending engagement portion 862 that is adapted to operatively engage the engagement portion 846 of the latch hub 840. The legs 854, 854 are joined together at an opposed second end at a hub or junction portion 855. The illustrated junction portion has a space or cavity 860 formed therein for housing and seating the biasing element 870. Specifically, the cavity has an inner wall or surface that is formed adjacent to the hub portion for accommodating the biasing element 870. The hub 855 also has integrally formed thereon and extending outwardly therefrom a piston element 864 that terminates in a piston head 866. The illustrated latch arm 850 is seated and positioned between the housing portions 812, 814 such that the piston element seats within the groove 824 formed in the head plate 822 and extends outwardly therefrom. The latch arm is adapted to move in a linear direction during use. The linear movement of the latch arm 850 within the main body 852 moves the piston element 864 and an associated latch element 900 between an engaged position and a retracted position, as is well understood by those of ordinary skill in the art.

The biasing element 870 is mounted within the cavity 860 of the latch arm 850 and a first end is adapted to abut an inner wall 868 of the cavity 860 and the opposed end is adapted to seat about the boss element 838 of the housing portion 812. The boss element 838 thus functions as a biasing element seat during use. The biasing element 870 can be any suitable element sufficient for applying a biasing force to the latch piston element 864. According to a preferred embodiment, the biasing element is a spring.

Figure 42:
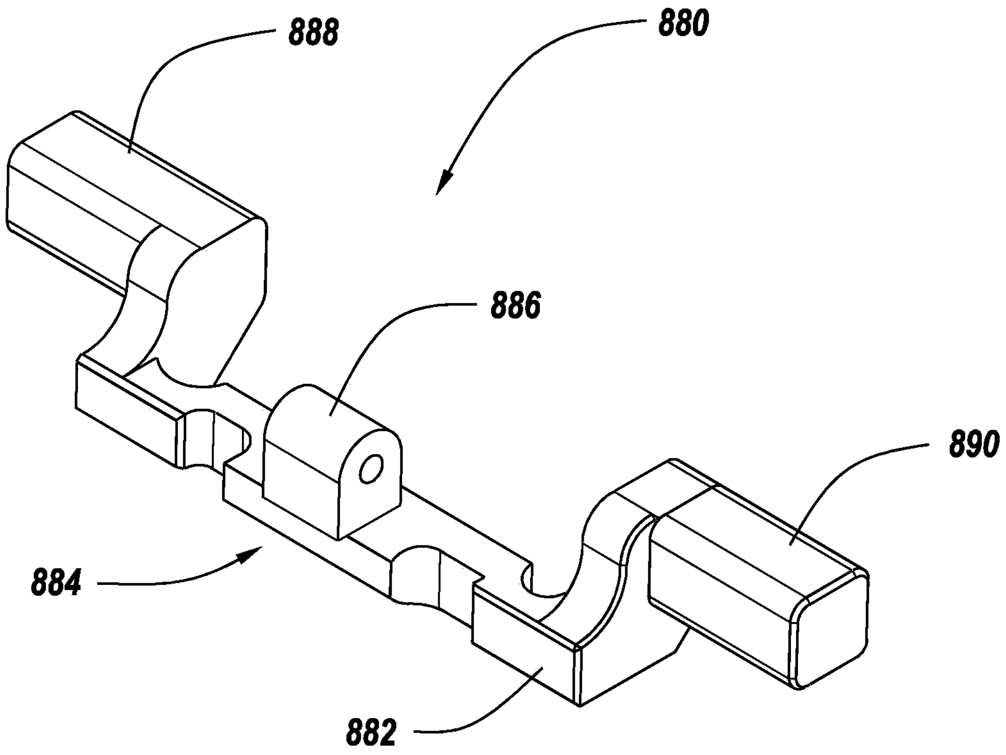
FIG. 42 is a perspective view of a wedge coupler for coupling the door latch assembly to the movable locking assembly according to one embodiment of the present invention.

The illustrated door latch assembly 810 also includes a wedge coupler 880. As shown in FIGS. 37 and 42, the wedge coupler 880 has a main body 882 that has a central portion 884 that has formed thereon a hinge element 886. The hinge element 886 is adapted to cooperate with the hinge-like protrusion or element 828 of the head plate 822. The wedge coupler 880 also includes first and second opposed ends 888 and 890, respectively, that are adapted to couple to the movable locking elements 522. The wedge coupler 880 thus enables the door latch assembly 810 to be directly assembled and hence integrally coupled with a portion of the movable locking assembly 520, such as the locking elements 522, 522. Specifically, when the wedge coupler 880 is coupled to the latch assembly 810, the end 890 of the wedge coupler 880 can be mounted to the upper locking element 522 and the other end 888 of the wedge coupler 880 can be mounted to the lower locking element 522, FIG. 21.

Figure 43A:
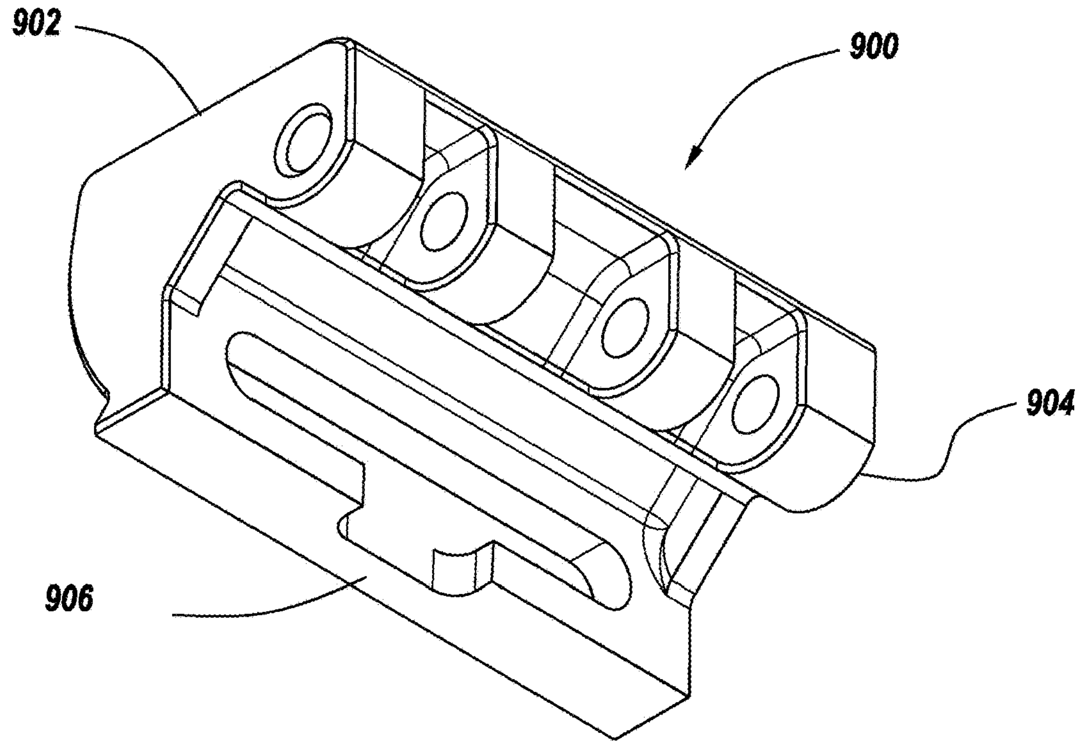
FIGS. 43A and 43B are perspective views of the latch element of the door latch assembly according to one embodiment of the present invention.
Figure 43B:
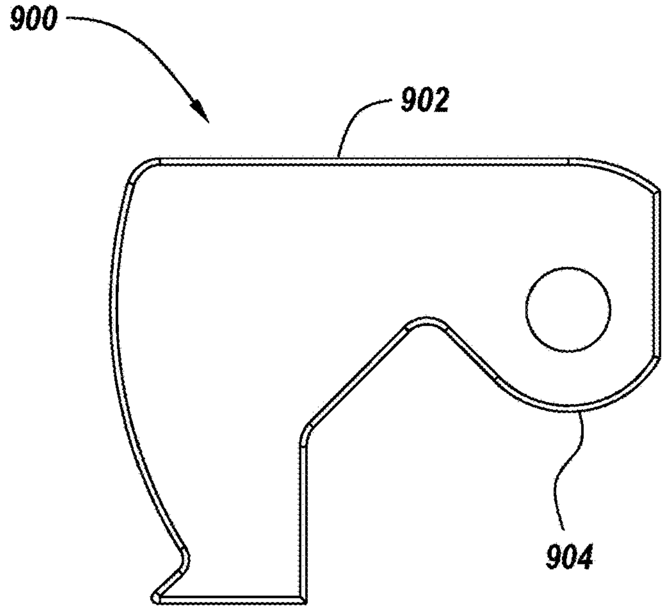

With reference to FIGS. 37, 43A, and 43B, the latch element 900 has a main body 902 having a top or front surface with a generally wedge-shaped configuration and a back or bottom surface that has a hinge portion 904 formed thereon. The hinge portion 904 is adapted to couple to the hinge element 886 of the wedge coupler and to the hinge-like protrusion 828 of the head plate in an inter-digitated manner so as to form a hinge assembly. The various hinge-like protrusions are coupled together by a hinge pin 920. The bottom surface of the latch element 900 also includes a space or channel 906 formed therein that is adapted to seat the piston head 866 of the latch arm 850.

The deadbolt assembly 720 and the door latch assembly 810 and associated components can have any selected shape or configuration, in addition to those illustrated and described herein. The various elements other than the biasing element can be formed from any suitable material, such as plastic or metal or a combination of both.

Figure 44:
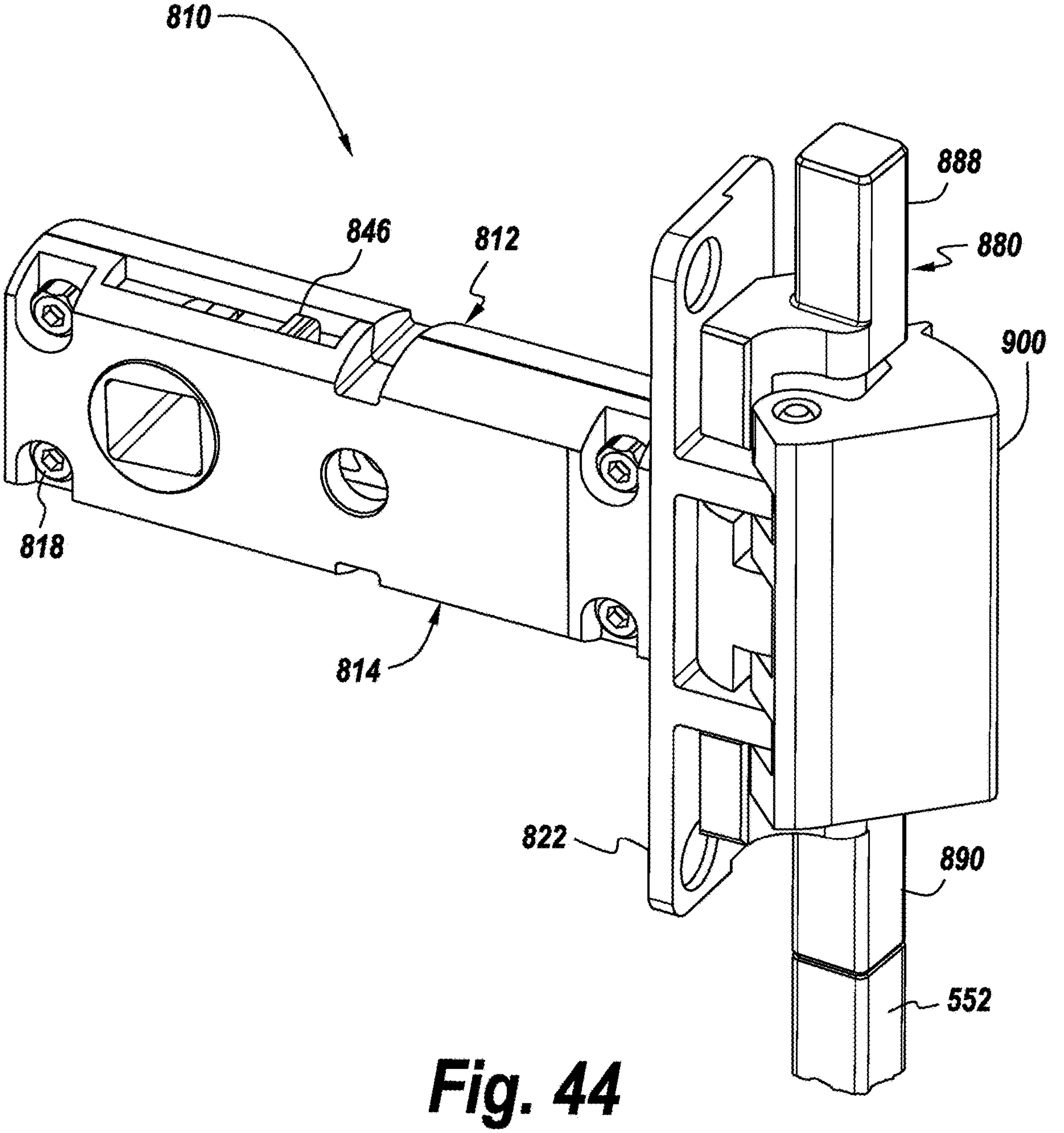
FIG. 44 is a perspective view of the assembled door latch assembly of FIG. 37 with the wedge coupler coupled thereto and hence integrated therewith according to one embodiment of the present invention.
Figure 45:
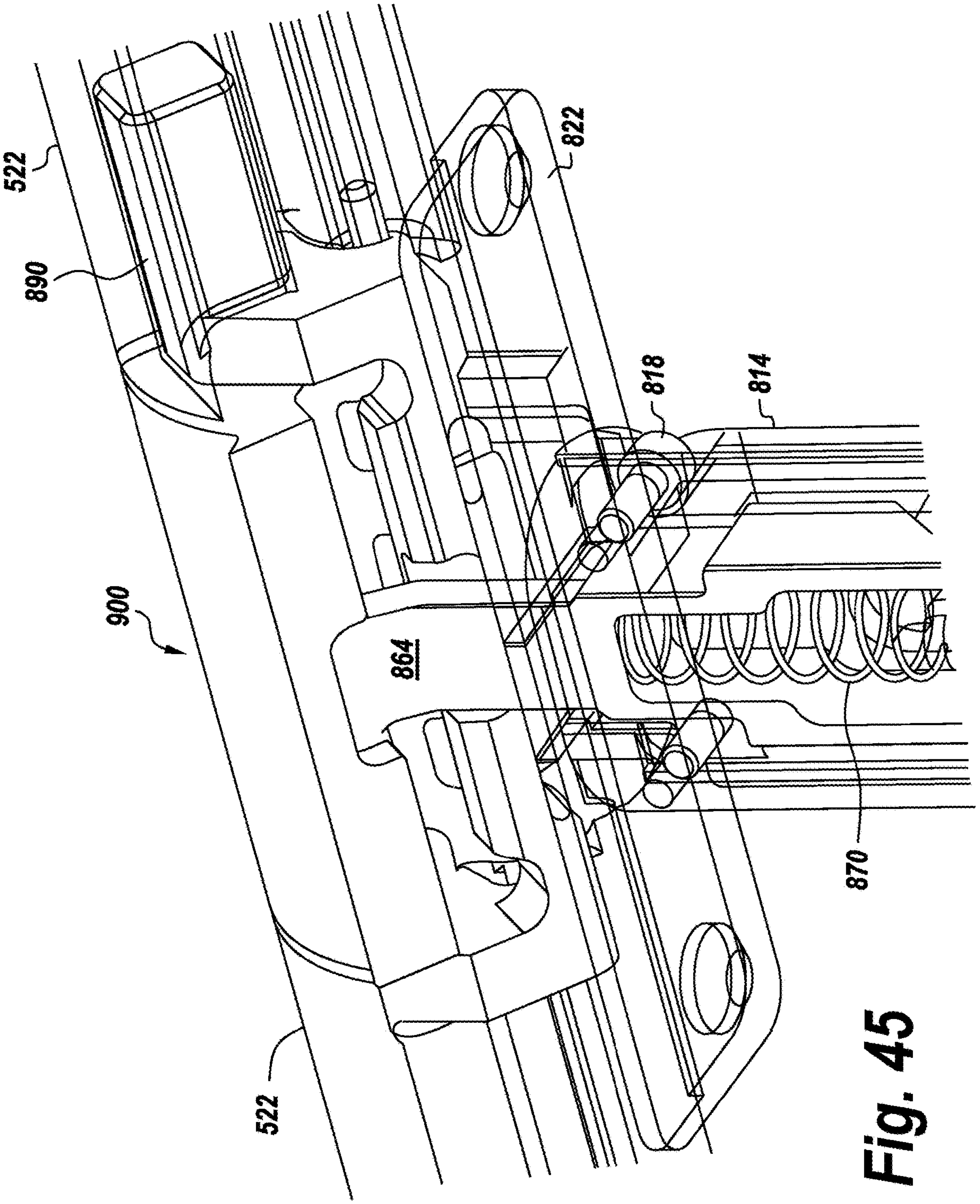
FIGS. 45 and 46 are partially broken perspective views of the door latch assembly of FIG. 37 illustrating the internal components according to one embodiment of the present invention.
Figure 46:
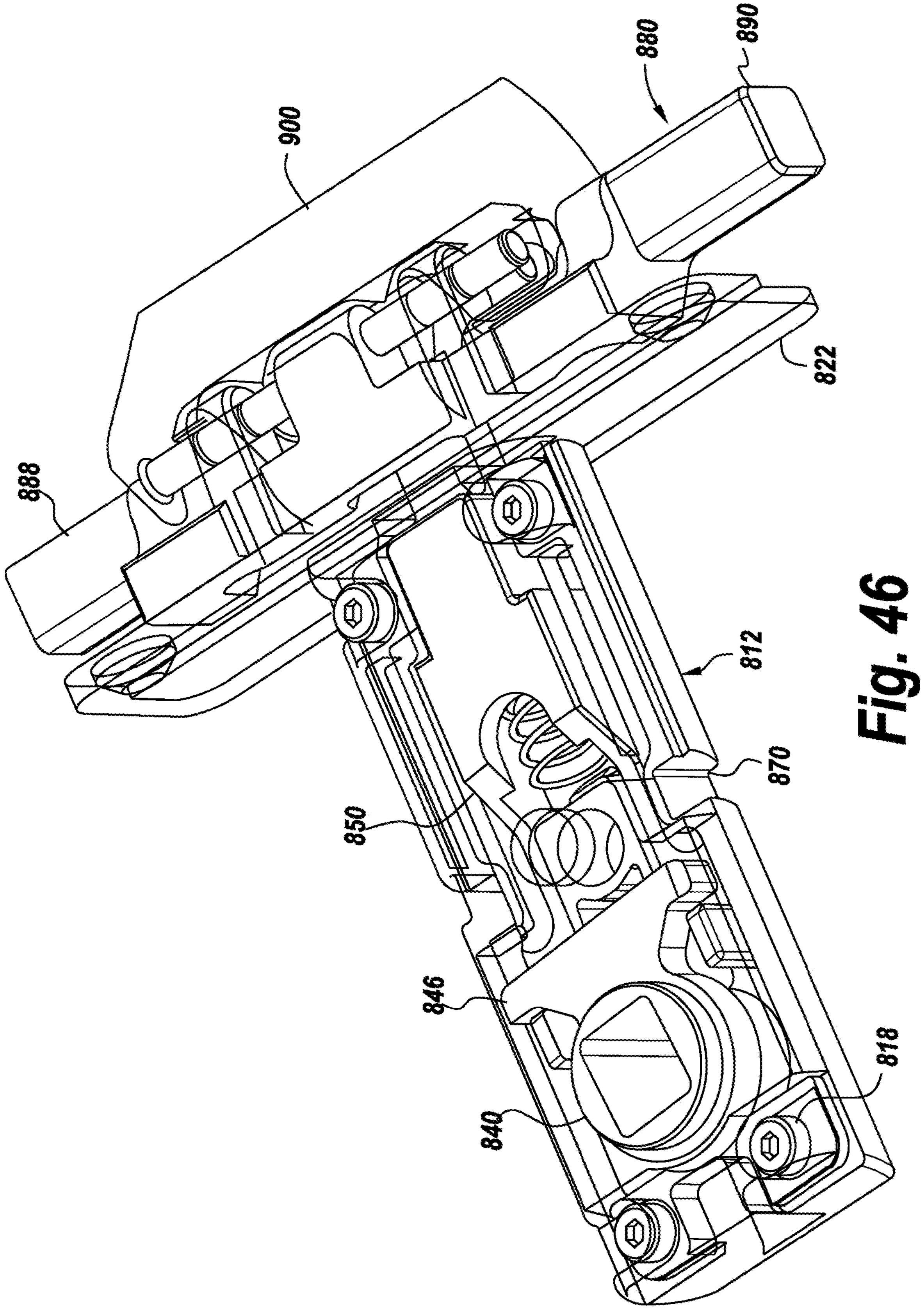

As shown in the foregoing figures, and with particular reference to FIGS. 44-46, the door latch assembly 810 may be assembled and operates as follows. The door latch assembly 810 is assembled by aligning the latch hub 840 with the apertures 832 and 834 of the housing portions 812, 814 then placing the latch hub within one of the apertures, for example, the aperture 832 of the housing portion 814. The latch arm 850 is then disposed between the housing parts and the engagement portion 846 of the latch hub is disposed so as to engage the legs 854 of the latch arm. The piston element 864 is then placed within the groove 824 of the head plate 822. The biasing element 870 is then disposed within the cavity 860 and one end of the biasing element is seated on the boss 838 of the housing portion 812 and the other end abuts the wall 868. The housing portions 812, 814 are then mounted together and secured by the fasteners 818.

The hinge portions of the head plate, wedge coupler 880 and latch 900 are assembled and the components are secured together by the hinge pin 920. When assembled together, the piston head 866 seats within the space 906 formed on the underside of the latch element 900. The mating together of the piston head 866 and the latch element 900 allows the latch arm 850 to move the latch element between selected positions, such as between an engaged or deployed position and a disengaged or retracted position. For purposes of explanation, a door handle (not shown) is deemed to be attached to the door latch assembly 810 via the central opening 844 formed in the latch hub 840 and the apertures 832, 834 formed in the housing portions 812, 814. When the door panel is closed relative to the frame, the latch element 900 is disposed in the normally disposed engaged position. In this position, the engagement portion 862 of the latch hub does not apply an axially inward force on the legs 854 of the latch arm 850. Consequently, no linear force is applied to the piston element 864 to counteract the force generated by the biasing element 870. As such, the biasing element pushes the latch piston element towards the head plate. This forward movement of the latch piston element linearly moves the piston head 866 in the same direction. The piston head 866 applies a force to the latch element 900 and since the piston head seats within the space 906, pivots the latch element into an engaged position. That is, the latch element extends outwardly from the main body of the door latch assembly 810 and seats within a channel or cavity 692 formed in the frame element 550. A strike plate, such as strike plate 694, is disposed about or adjacent to the cavity for helping ensure that the latch element seats within the cavity 692 during use. This disposes the door latch assembly 810 in the engaged position. In this position, the door is closed relative to the door frame.

If a user wishes to open the door, the user rotates the door handle (not shown), which applies a rotational force to the latch hub 840. The main body of the latch hub rotates and the engagement portion 846 engages the legs 854 of the latch arm and axially or linearly moves the latch arm in an inward linear direction, that is, in the direction opposite to the direction of the force that is applied by the biasing element 870. The engagement portion 846 converts rotational movement of the door handle and latch hub into linear movement of the latch arm 850. When this counter force exceeds the force applied by the biasing element, the latch arm moves inwardly thus compressing the biasing element. This linear movement forces the piston element 864 to move in the same direction, thus pivotably moving the latch element 900 in the same direction. This movement removes the latch element from the cavity 692, thus disengaging the door panel from the frame. This disposes the door latch assembly 810 in the retracted position. In this position, the door can be opened relative to the door frame.

The operation of the door latch assembly 810 is separate and independent from operation of the movable locking assembly. Thus, the door latch assembly 810 can move the latch element between the engaged and retracted positions independent of the position of the locking assembly. This feature is shown for example in FIGS. 50 and 51. Further, selected features of the first and second embodiments of the door lock assembly illustrated herein can be shared as would be apparent to one of ordinary skill in the art.

An advantage of employing a drive arm 770 that is hingedly or pivotably coupled to the slider element 750 is that the drive arm can better track the movement of the movable locking elements 522, which tend to move along a curved path (e.g., an arc). Further, the deadbolt assembly is compatible with both left and right swinging doors by simply switching the location of the arm guide 790. The arm guide serves to keep the drive arm aligned and at the proper location while concomitantly preventing movement of the drive arm in the incorrect direct while facilitating movement in the correct direction.

An advantage of the latch assembly 810 is that the coupler element that coupled together the separate movable locking elements 522 forms part of the door latch assembly. When integrated as such, the door lock assembly 700 is easy to assemble. Moreover, integrating the wedge coupler 880 with the other components of the latch assembly 810 allows the door handle to be rotated even when the movable locking assembly is disposed in the locked position. Specifically, the latch element 900 of the latch assembly can move freely independent of the locking position of the movable locking assembly since the coupler element for coupling together the movable locking elements does not inadvertently interfere with movement of the latch element. Further, forming a hinge-like joint between the latch arm 850, the wedge coupler 880 and the latch element 900 ensures that the elements pivot at the same location or along the same axis.

Figure 47:
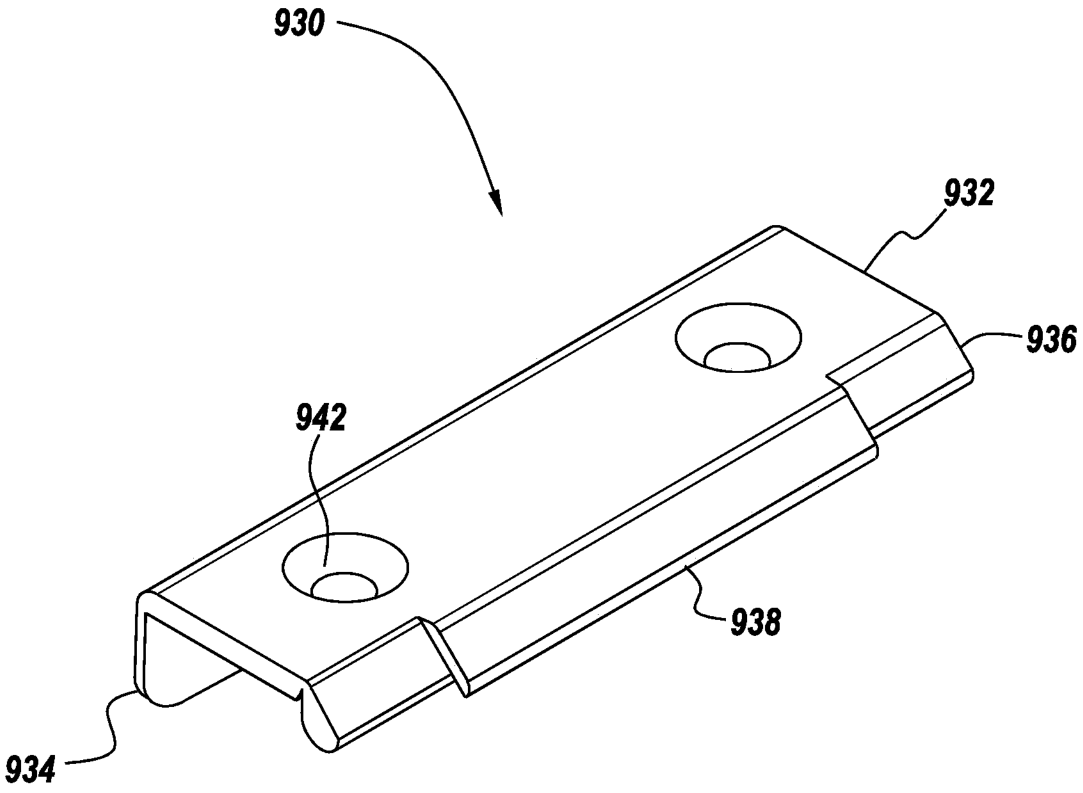
FIG. 47 is a perspective view of another embodiment of the strike plate according to one embodiment of the present invention.

FIG. 47 illustrates another embodiment of the strike plate 930. The illustrated strike plate 930 has a main body 932 that has a first flange 934 formed at one end and a second flange 936 formed at an opposite end. The second flange 936 further includes an angled protrusion 938 that extends outwardly from the flange 936. The strike plate can be mounted within a cavity formed within the door jamb. The cavity can be preferably formed in an off-set center manner in the doorjamb. The off-set positioning of the strike plate when mounted within the cavity positions the latch element and hence the door relative to the door frame such that the movable locking elements can seat within the door frame in a repeatable manner without requiring excessive force by the drive assembly to move the locking assembly from the unlocked to the locked position. Further, the angled protrusion which extends outwardly from the door frame is adapted to contact the latch element and not the movable locking element if the door is accidentally closed with the movable locking elements disposed in the deployed or locked position.

Those of ordinary skill in the art will readily recognize that the various components set forth above can have different shapes and configurations and can be formed of various well known materials. Those of ordinary skill will also recognize that the various components of the door lock assembly can be mounted within the door panel in a reverse manner.

FIGS. 52-63 illustrate yet another embodiment of the door lock assembly 1000. The illustrated door lock assembly 1000 can be employed with the above mentioned drive assemblies 570, 720 and door latch assemblies 600, 810 and associated mechanical couplers. The door lock assembly 1000 can be mounted in a door panel 18 and a door jamb 10.

As shown in FIGS. 52-56, the door panel 18 has a vertical groove or channel 502 that is sized and dimensioned for seating a frame element 1004 that serves to securely couple the movable locking assembly or element 520 to the door panel when assembled. The frame element 1004 is secured to the door panel according to any known mechanism, including by a pair of header plates that can be fastened to the door panel 18 by known conventional fasteners, such as screws, and which seat within corresponding grooves formed in the top and bottom of the door panel.

Similarly, the door jamb 10 can be configured so as to include an extruded frame element 1008. The frame element 1008 can include a portion that forms a channel 1026 that seats an end portion of the door jamb and is secured thereto according to known techniques. For example, the frame element 1008 can be secured therein by fasteners, by an adhesive, or by known pressure fit techniques.

Figure 56:
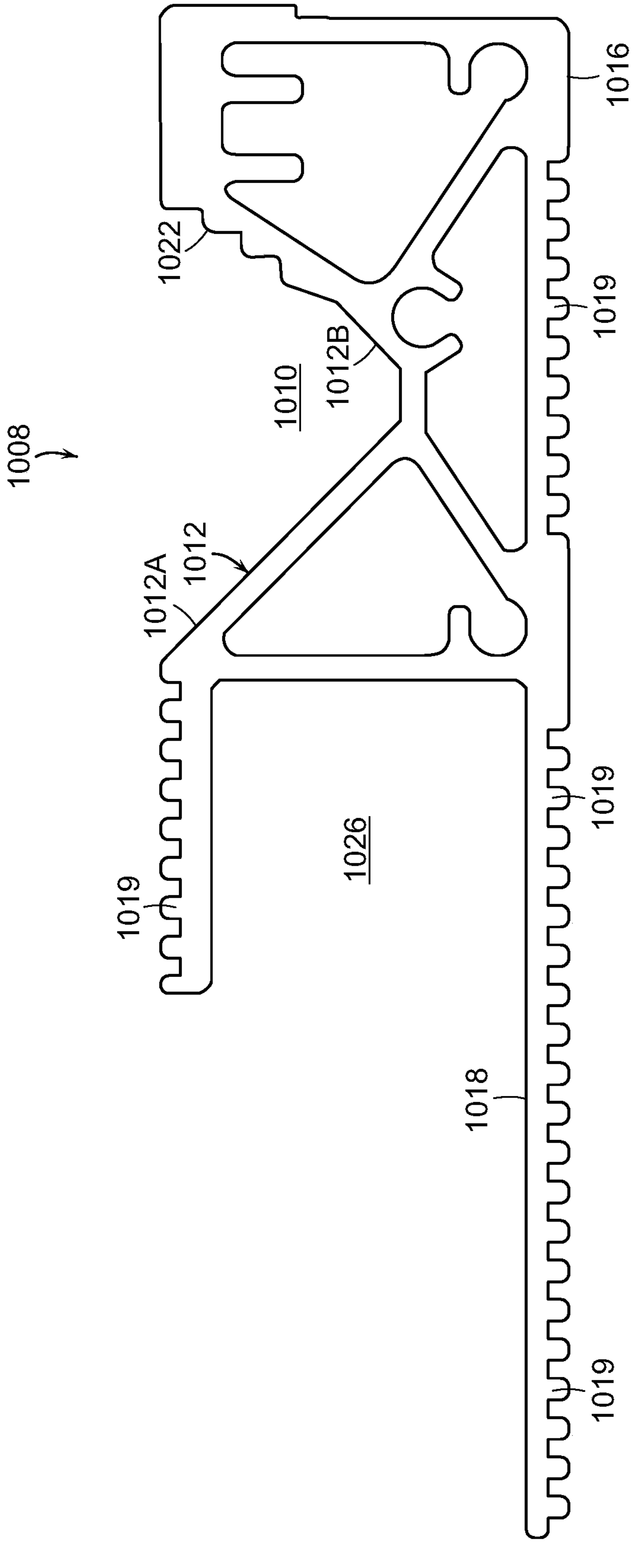
FIG. 56 is a cross-sectional view of a door jamb frame element that forms part of the door lock assembly according to one embodiment of the present invention.
Figure 57:
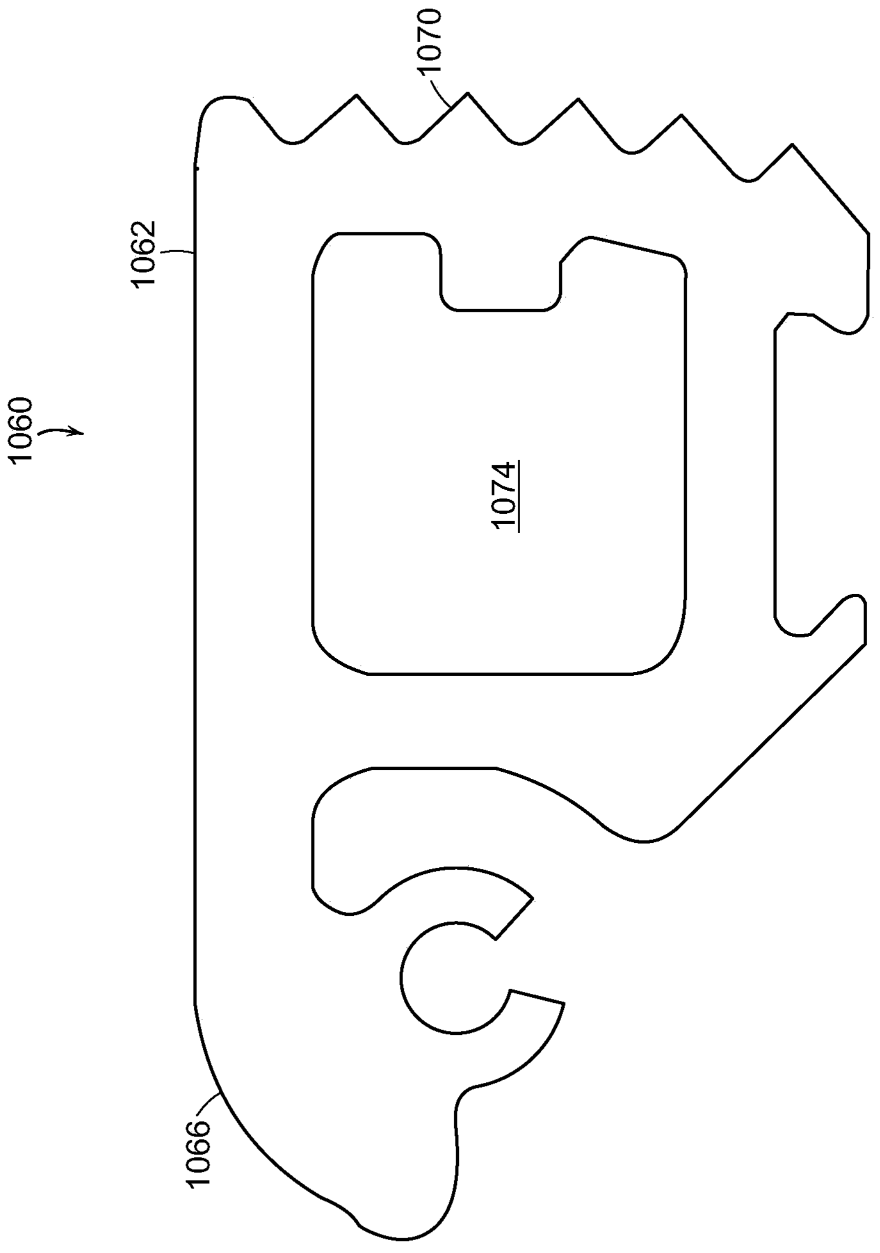
FIG. 57 is a cross-sectional view of a locking element of the door lock assembly according to one embodiment of the present invention.
Figure 58:
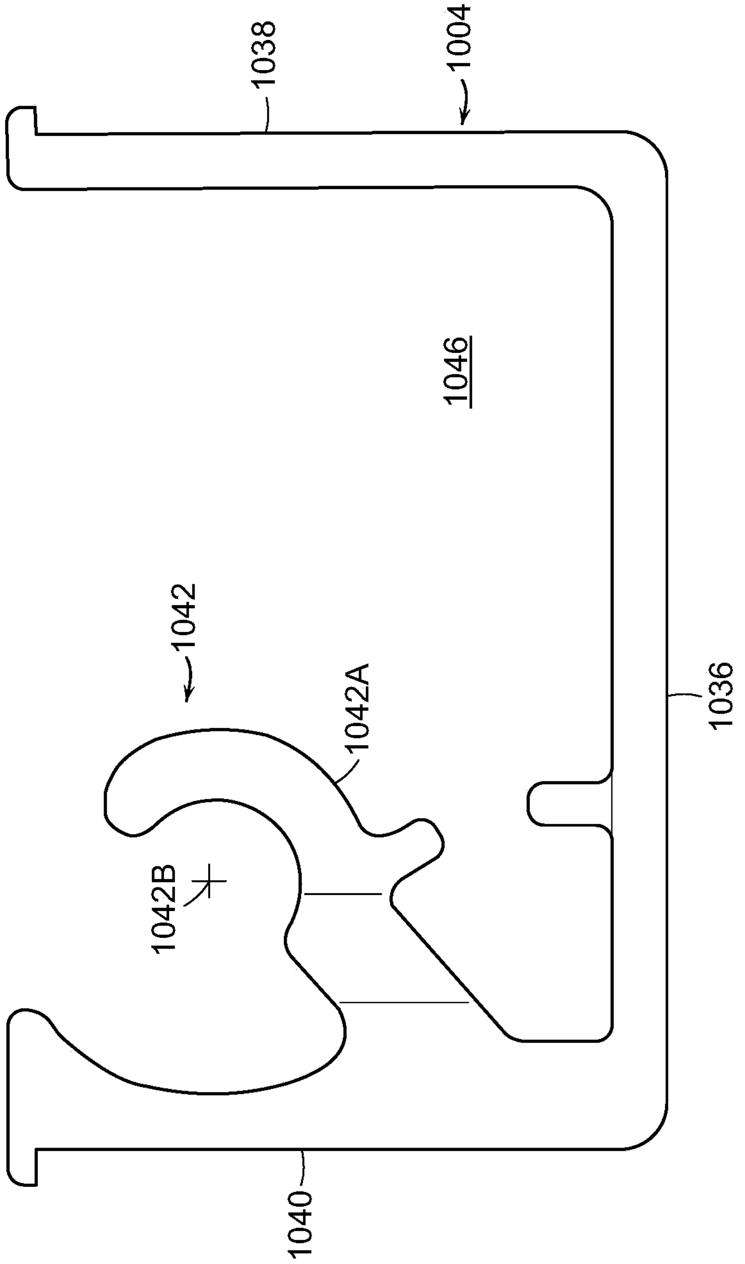
FIG. 58 is a cross-sectional view of a door panel frame element of the door lock assembly according to one embodiment of the present invention.

With reference to FIG. 56, the illustrated frame element 1008 includes a main body having a first frame portion 1016 that forms a channel 1010 for accepting a wedge lock element. The channel 1010 is formed by the first frame portion that includes a support element 1012 in the shape of a cross brace that has a substantially X-shape. The support element 1012 thus has a pair of legs forming the cross-brace, for example, arms or legs 1012A and 1012B. The support element thus includes a pair of converging legs 1012A, 1012B that are slanted or canted inwardly relative to each other. The support element 1012 has formed on a selected leg, such as leg 1012B, a series of teeth 1022. The frame element 1008 also includes a second frame portion 1018 that forms the channel 1026. The first and second frame portions 1016 and 1018 have a series of sealing nubs 1019 formed thereon.

As shown in FIGS. 52, 54-55 and 58, the illustrated door frame element 1004 of the door panel 18 has a main body that includes a relatively flat back or base portion 1036 and a pair of outwardly projecting sides or leg portions 1038, 1040. The leg portion 1040 of the frame element 1004 includes a lock connector portion 1042 that is sized and configured for cooperatively mounting at least a portion of the movable locking assembly of the invention. The lock connector portion 1042 includes a curved connector element or portion 1042A that extends outwardly therefrom and which forms a lock receiving groove 1042B. The curved connector portion 1042A can have any suitable shape sufficient to receive and engage at least a portion of the movable locking assembly as described herein and throughout and multiple embodiments and to allow movement of the locking assembly when coupled thereto. As shown, the curved connector portion 1042 can have a generally C-shaped design. The lock receiving groove 1042B is adapted to seat and mount a portion of the movable locking assembly.

With reference to FIGS. 52, 54-55 and 57, the movable locking assembly 1060 which includes one or more wedge shaped locking elements 1062 is coupled to the groove 1042B by slidingly inserting at least a connecting portion 1066 of the locking element 1062 into the groove from a top portion of the frame element. Once connecting portion 1066 of the locking element is seated within the groove 1042B, the locking element is captured and retained therein. The locking element 1062 that seats within the groove 1042B forms a pivoting portion that allows at least a portion of the locking assembly to pivot about a point corresponding to the lock connector portion between a locked position (FIGS. 55 and 59) and an unlocked position (FIGS. 54 and 60), as described in further detail below. Moreover, the spatial separation between the lock connector portion 1042 and the leg portion 1038 of the door frame element 1004 forms a channel or space 1046 that is sized and dimensioned for seating and housing the locking element 1062 of the movable locking assembly 1060.

Those of ordinary skill in the art will readily recognize that the frame elements 1004 and 1008 can have any suitable shape or configuration, provided that the shape is suitable for its intended purpose. The illustrated frame element can be made of any suitable material, and is preferably made of aluminum.

The movable locking assembly 1060 can comprise a plurality of interconnected components, as shown in FIGS. 21 and 48. The locking assembly 1060 includes one or more, and preferably a pair, of movable locking elements 1062 that are adapted to pivot into and out of the space 1046 formed by the door frame element 1004. Each of the movable locking elements 1062 has a main body that includes a connecting portion 1066 formed at a first end. The connecting portion 1066 is sized and dimensioned for seating within the groove 1042B formed in the lock connector portion 1042 of the door frame element 1004. The connecting portion 1066 can have any suitable shape or configuration that allows the connecting portion to seat within and pivotably move relative to the lock connecting portion 1042. According to one practice, the lock connector portion has a shape that is complementary to the shape of the groove 1042B, and preferably has a substantially C-shaped configuration.

The main body of the illustrated locking element 1062 has opposed ends, the first end of which, as set forth above, includes the connecting portion 1066 and the opposed second end includes a series of teeth 1070 formed on an outer surface. The locking element also includes an internal chamber 1074. According to one practice, the actuator of the deadbolt assembly described above can be positioned in part within this space during operation.

The illustrated locking element 1062 can have any selected size and shape, provided that the locking element is capable of contacting the frame element 1008 of the door frame in order to lock or secure the door panel 18 to the frame of the door jamb 10. The locking element 1062 can be any suitable rail-type locking element that is capable of moving when actuated between the locked and unlocked positions. According to this embodiment, the locking element has a generally wedge-shaped configuration. The locking element can be made from any suitable material, and is preferably composed of aluminum. The resilient member can also have any selected size, shape or configuration, and can be composed of any suitable material, such as rubber.

The illustrated door lock assembly 1000 also contemplates the use of an actuator mechanism for moving the locking assembly between the locked and unlocked positions. The actuator mechanism can optionally form part of the door lock assembly, although this element can also be separately provided, such as being formed for example as part of a deadbolt assembly. According to the current embodiment, the actuator mechanism can be a deadbolt assembly, such as the deadbolt assemblies 570, 720 described above.

Figure 55:
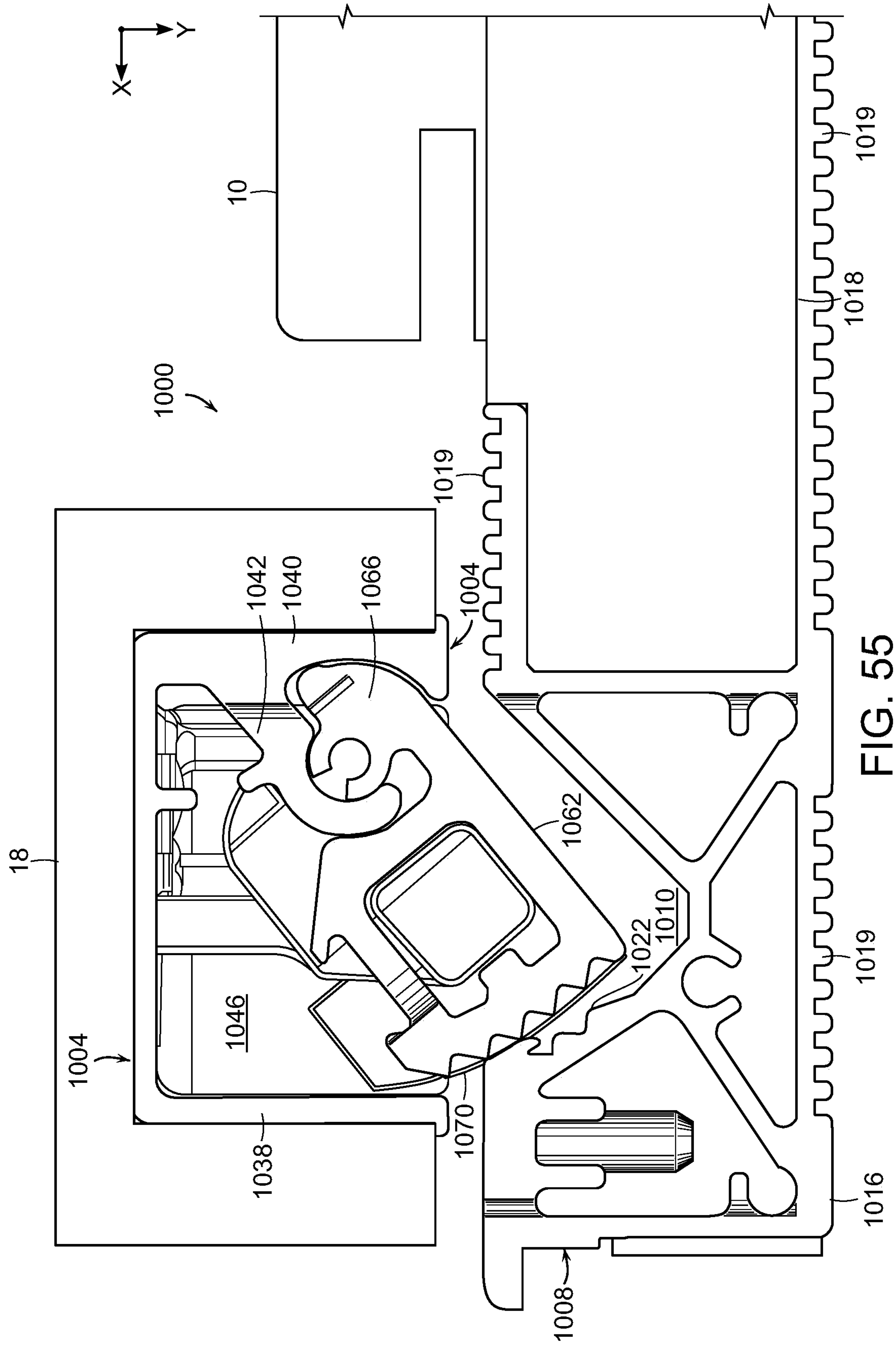
FIG. 55 is a partial cross-sectional view of the door lock assembly disposed in a locked position according to one embodiment of the present invention.
Figure 59:
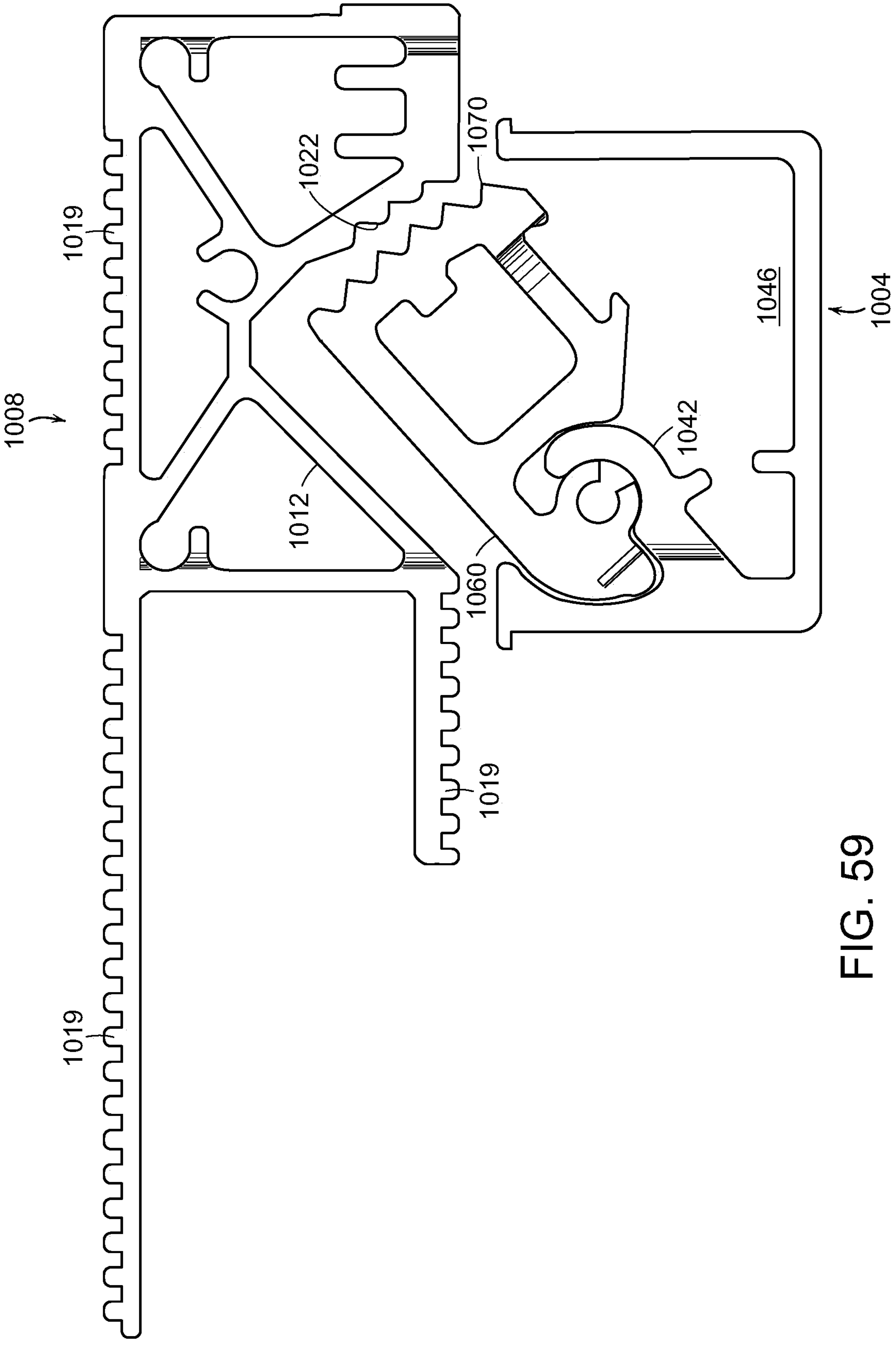
FIG. 59 is a partial cross-sectional view of selected components of the door lock assembly of one embodiment of the present invention illustrating the locking element disposed in a locked position.

As previously described, the piston or actuator of the drive assembly can be disposed in a deployed position thus moving the locking assembly and specifically the locking elements 1062 into the locked position, FIGS. 55 and 59. In this scenario, the actuator is moved transversely outwardly away from the housing of the deadbolt assembly, thus driving the locking elements 1062 outwardly so as to move them from an unlocked position, where the locking elements are housed or stowed within the space 1046 formed by the frame element 1004 into a locked position where the locking elements 1062 are moved outwardly into the channel 1010 formed in the frame element 1008 that is mounted in the door frame. As illustrated, the locking elements 1062 pivot about the connecting portion 1066 when mounted in the lock connector portion 1042 of the frame element 1004.

Figure 54:
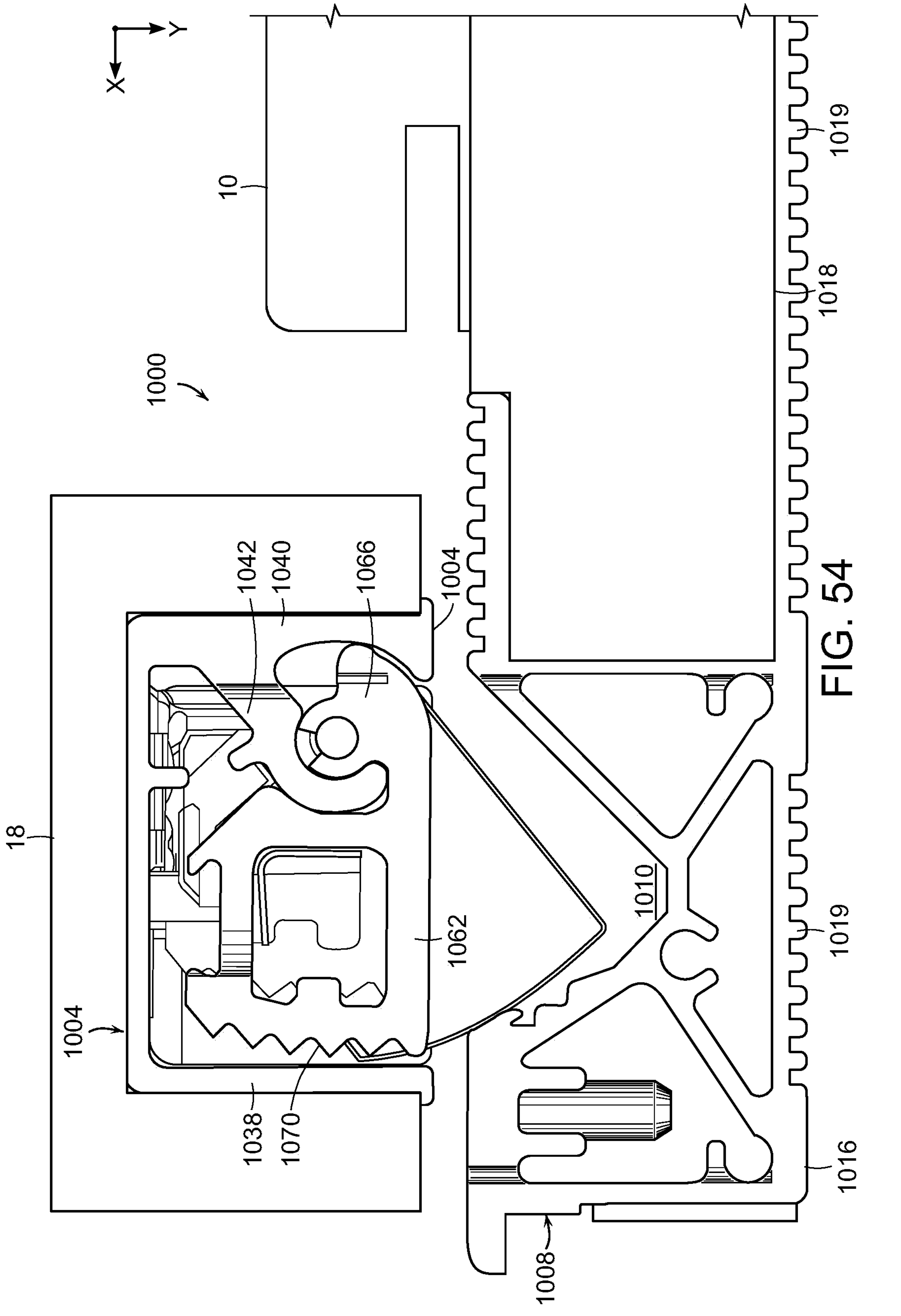
FIG. 54 is a partial cross-sectional view of the door lock assembly disposed in an unlocked position according to one embodiment of the present invention.
Figure 60:
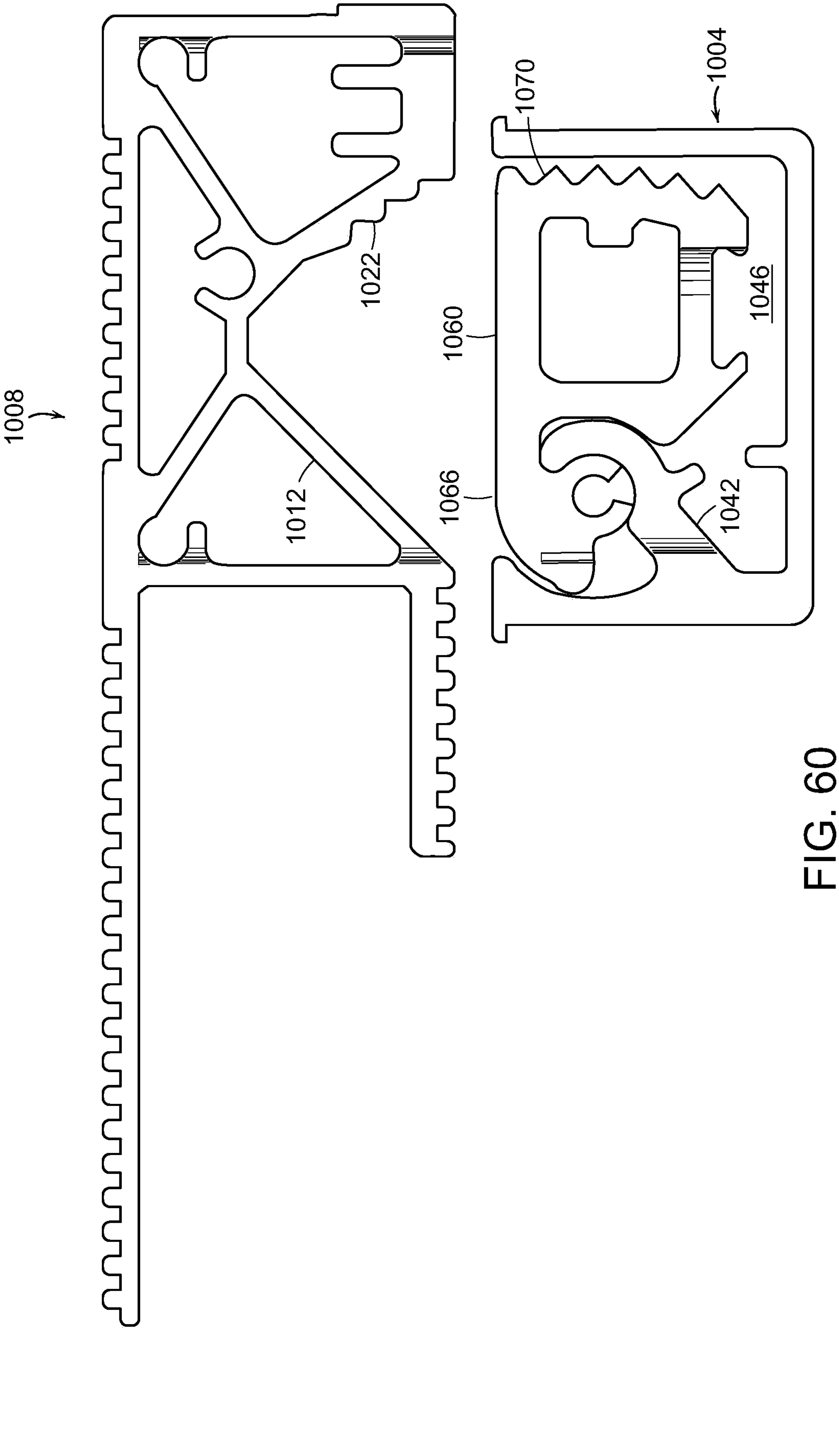
FIG. 60 is a partial cross-sectional view of selected components of the door lock assembly of one embodiment of the present invention illustrating the locking element disposed in an unlocked position.

Further, the actuator can be disposed in a retracted or stowed position thus placing the movable locking elements 1062 of the locking assembly 1060 into the unlocked position, FIGS. 54 and 60. In this scenario, the actuator is moved transversely or linearly inwardly into or towards the housing of the deadbolt assembly. When doing so, the actuator contacts the movable locking assembly, thus pulling or driving the locking elements 1062 inwardly so as to move the assembly from the locked position to the unlocked position.

Some embodiments of the present invention also contemplate the use of a door latch assembly, such as latch assemblies 600 and 810 described above. The door latch assembly can, if desired, form part of the door lock assembly 1000.

Figure 61:
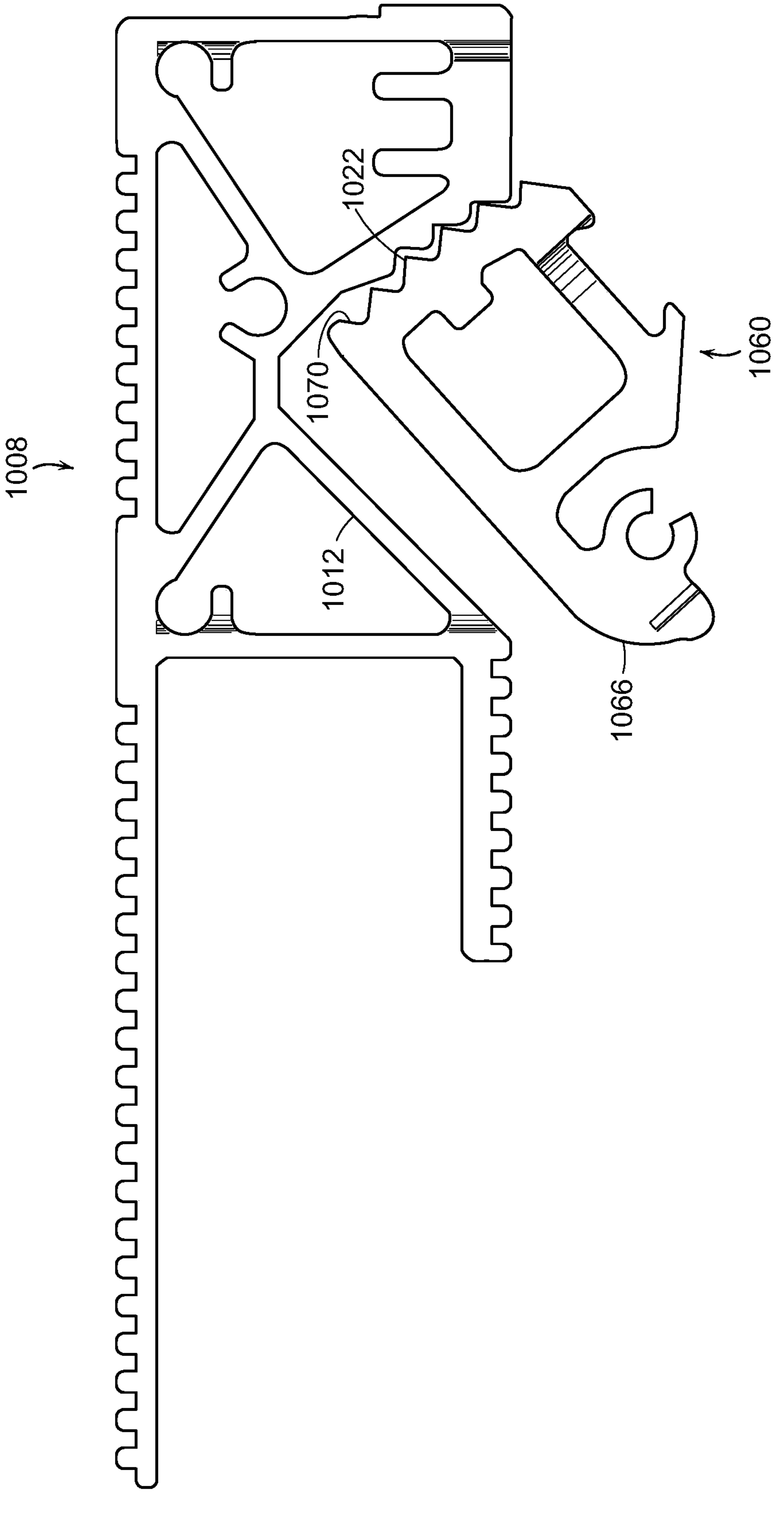
FIGS. 61-63 are partial cross-sectional views of selected components of the door lock assembly of one embodiment of the present invention illustrating the locking element disposed in various stages of a locked position as a function of force applied to the door panel.
Figure 62:
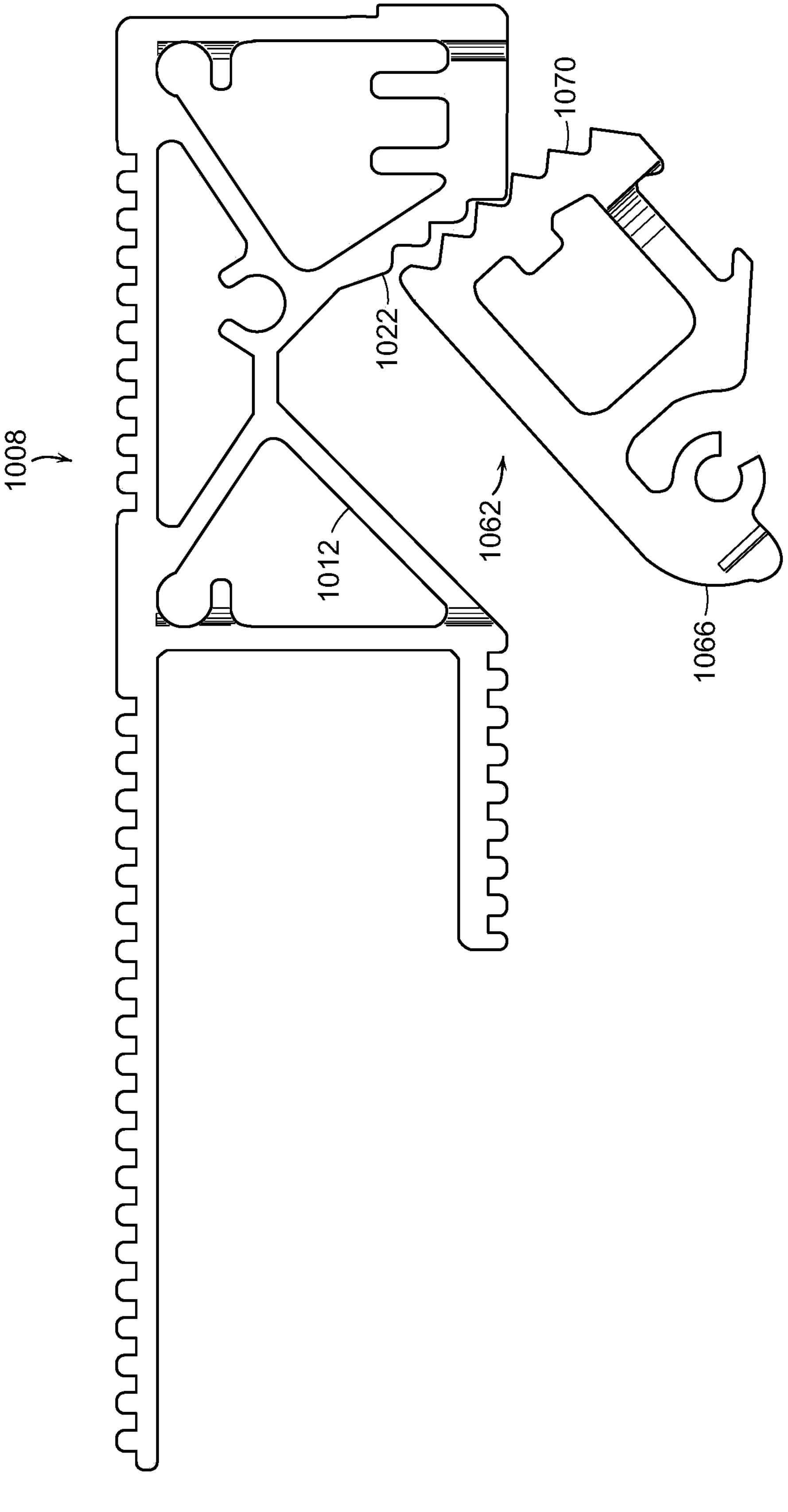
Figure 63:
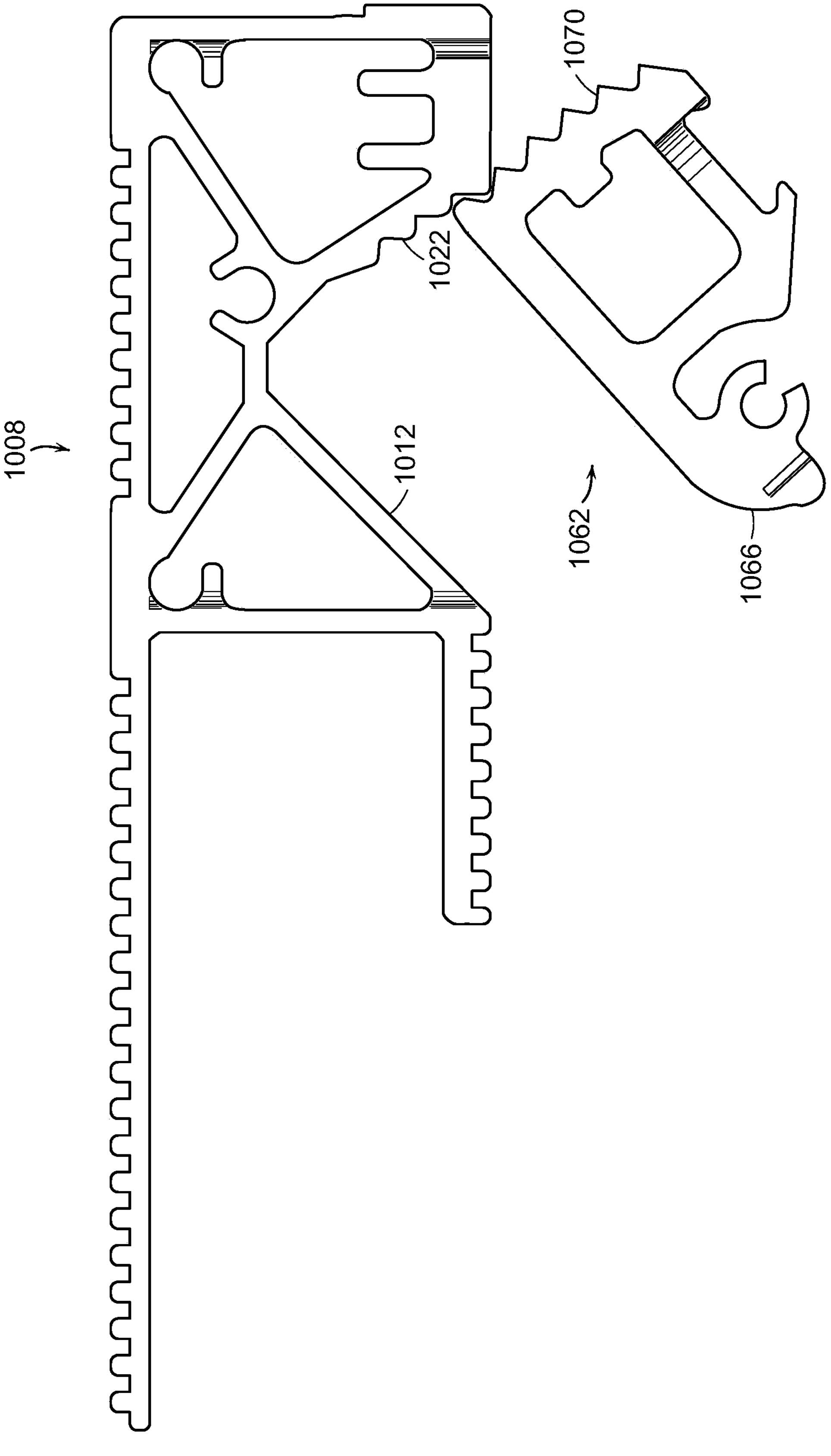

The teeth 1070 of the locking element 1062 typically do not engage with the teeth 1022 of the frame element 1008 during normal operation. However, if a force perpendicular to the plane of the door panel is applied thereto, such as when an intruder tries to force the door open, the teeth 1022, 1070 are adapted to engage with each other, thus providing additional structural integrity to the door panel to prevent the door from opening, as shown in FIG. 61. The teeth 1022 of the frame element 1008 and the teeth 1070 of the locking element 1062 are configured to keep the force transference perpendicular to the plane of the door jamb, so only the bending flex of the door panel can cause any widening of the gap between the teeth of the locking element 1062 and the frame element 1008. The teeth 1022 and 1070, which forms steps in their respective surfaces, are designed to allow the locking element 1062 to re-engage at each increment of wider gap as the door panel flexes under load, thus allowing the locking element to grab and hold several times under varying degrees of panel deformation and pressures. The angles of the stepped faces are slightly undercut beyond 90 degrees to further facilitate a bite, similar to the teeth of a ratchet. The teeth 1022, 1070 only engage under an applied load. Under load, the door panel 18 initially flexes toward the outer edge of the door jamb and the teeth 1070 of the locking element 1062 make contact with the teeth 1022 of the frame 1008. Then, as the door panel 18 flexes further and widens the gap between the door panel 18 and the frame 10, the wedge type locking element 1062 moves stepwise along the teeth 1022, 1070 until the uppermost tooth of the wedge is holding at the outermost tooth of the frame, as shown in FIGS. 61-63.

Figure 53:
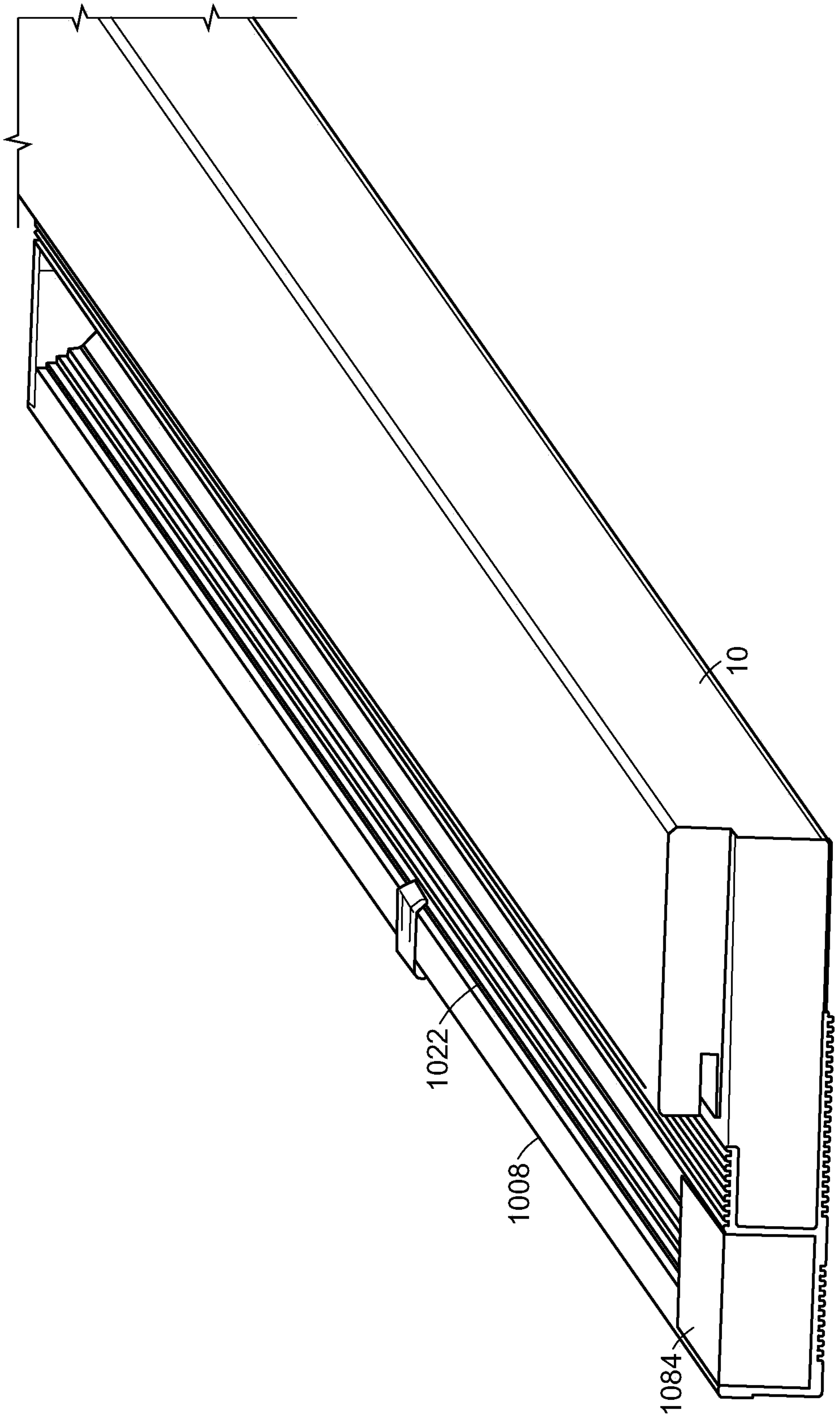
FIG. 53 is a perspective view of a door jamb frame element that forms part of the door lock assembly according to one embodiment of the present invention.

The frame element 1008 of the door jamb 10 of the illustrated embodiment is also larger relative to the other frame element 550, and hence can be sized and configured to replace the entire front side of the door jamb. This configuration allows for perfect alignment and positioning of the strike plate, as well as provides a much more solid means for attachment of the plate. This hence largely eliminates the sensitivity to plumb and square of the strike plate and frame element 550, 1008. Further, the illustrated insert-type frame element 1008 integrated with the door jamb provides for precise positioning of the frame element relative to the door frame and other components of the door lock. The frame element 1008 can also accommodate wood block inserts 1084 (FIG. 53).

Figure 67A:
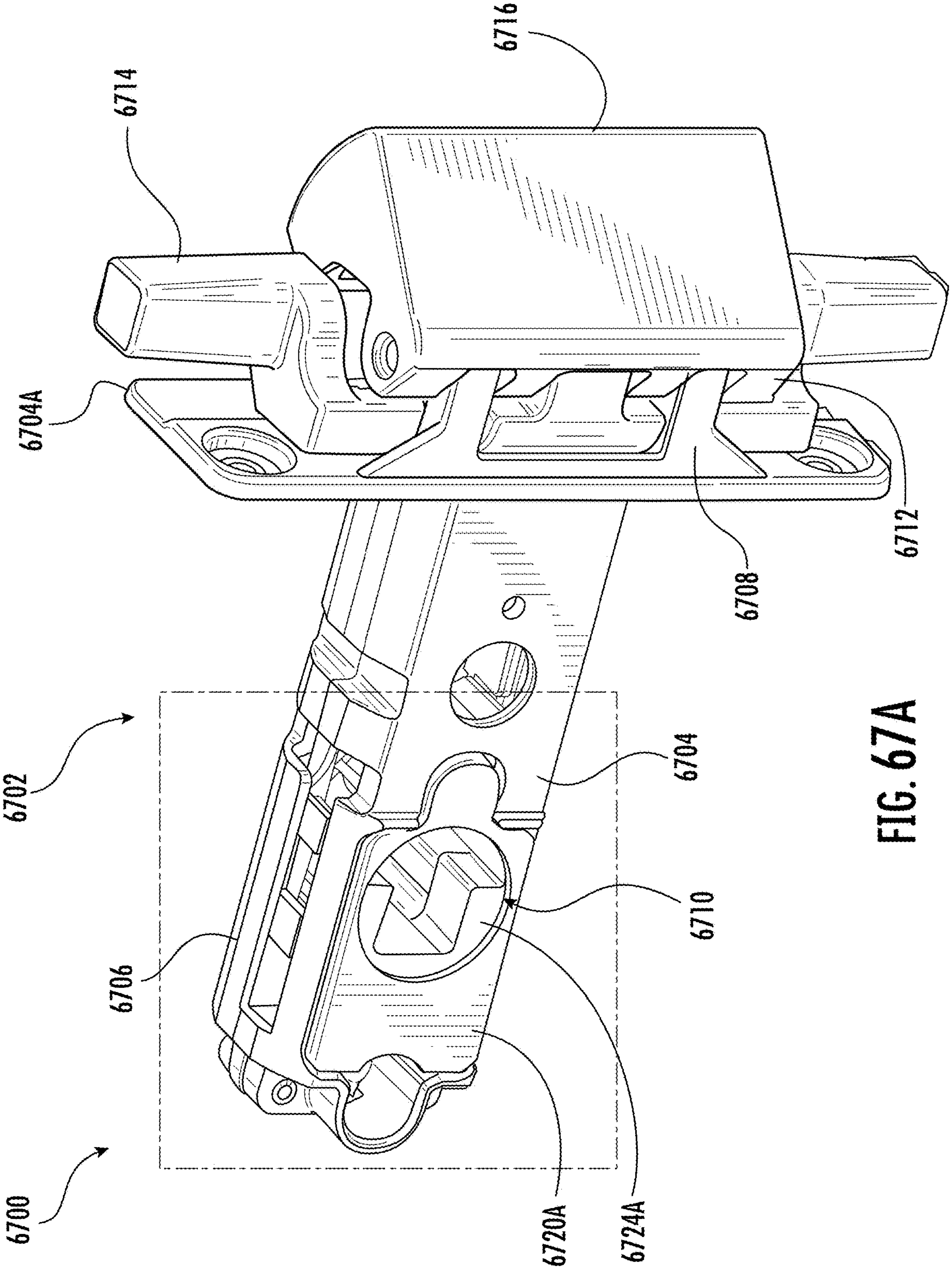
FIG. 67A is a perspective view of a latch assembly of one embodiment of the present invention where the latch assembly is configured to provide a short backset panel configuration.
Figure 67B:
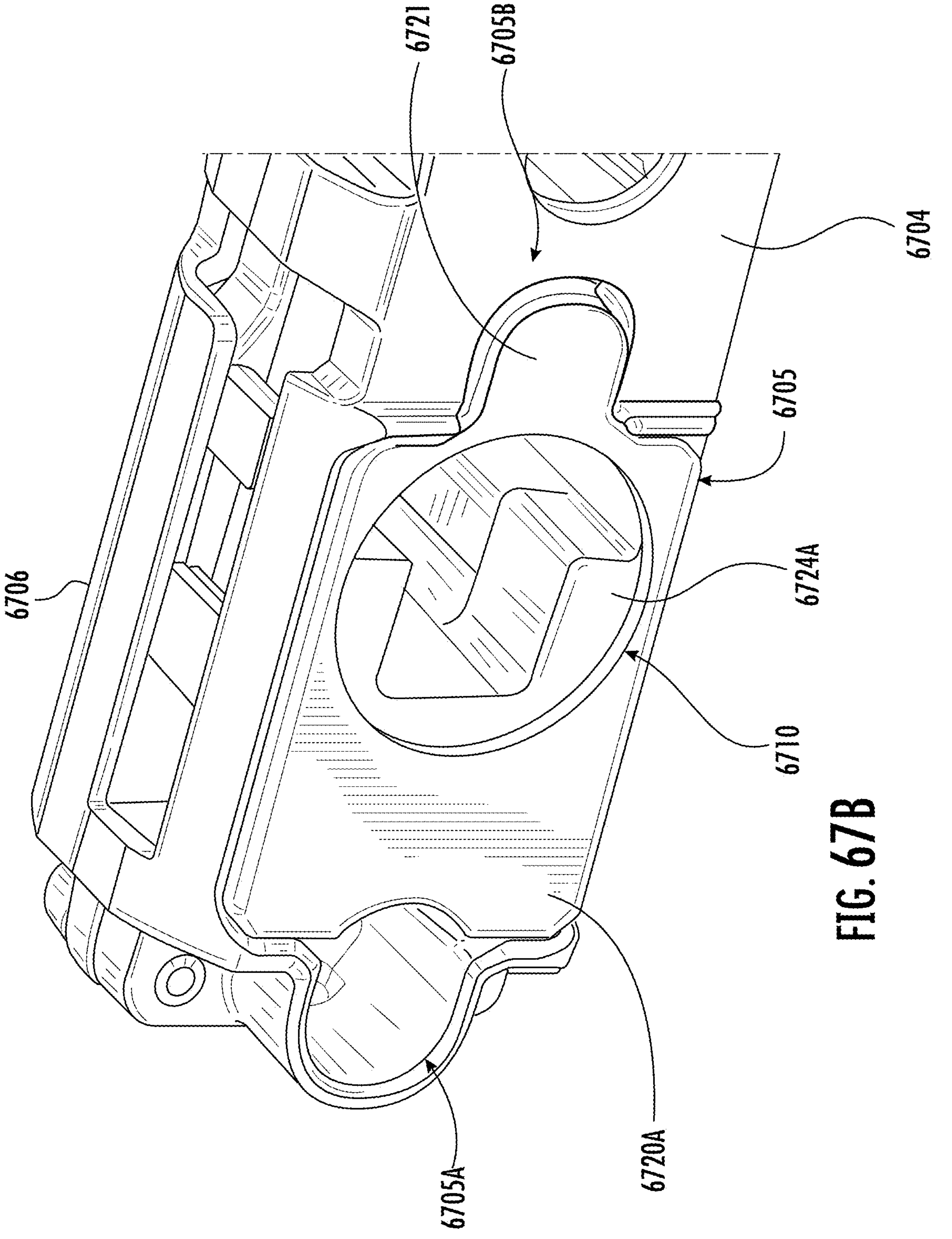
FIG. 67B is an enhanced, perspective view of a first hub cradle portion of the latch assembly of FIG. 67A with the first hub cradle portion oriented so that a short backset panel configuration is provided.

In some embodiments, latch assemblies are provided that are configured to be used with either a short backset panel configuration or with a long backset panel configuration. In a short backset panel configuration, the distance between a recess where a drive hub is received and the jamb edge of a door panel may be less than the distance between a recess where a drive hub is received and the jamb edge of a door panel in a long backset panel configuration. The same components may be used regardless of whether a short backset panel configuration or a long backset panel configuration is used, allowing for increased ease of installation for users. The ability to use the same components also reduces the costs of manufacturing as fewer parts are required to be made. It is beneficial to select the panel configuration based on the type of door that the latch assembly is being used with. For example, where a door has a large amount of glass (e.g., a French door), a short backset panel configuration may be used so that the hardware is provided closer to the edge of the door panel 18 (see FIG. 21). Alternatively, where a door has lesser amounts of glass or no glass, a long backset panel configuration may be used so that the hardware is provide farther away from the edge of the door panel 18 (see FIG. 21). An example of a latch assembly in a short backset panel configuration is illustrated in FIGS. 67A and 67B, which are discussed further below.

Figure 64A:
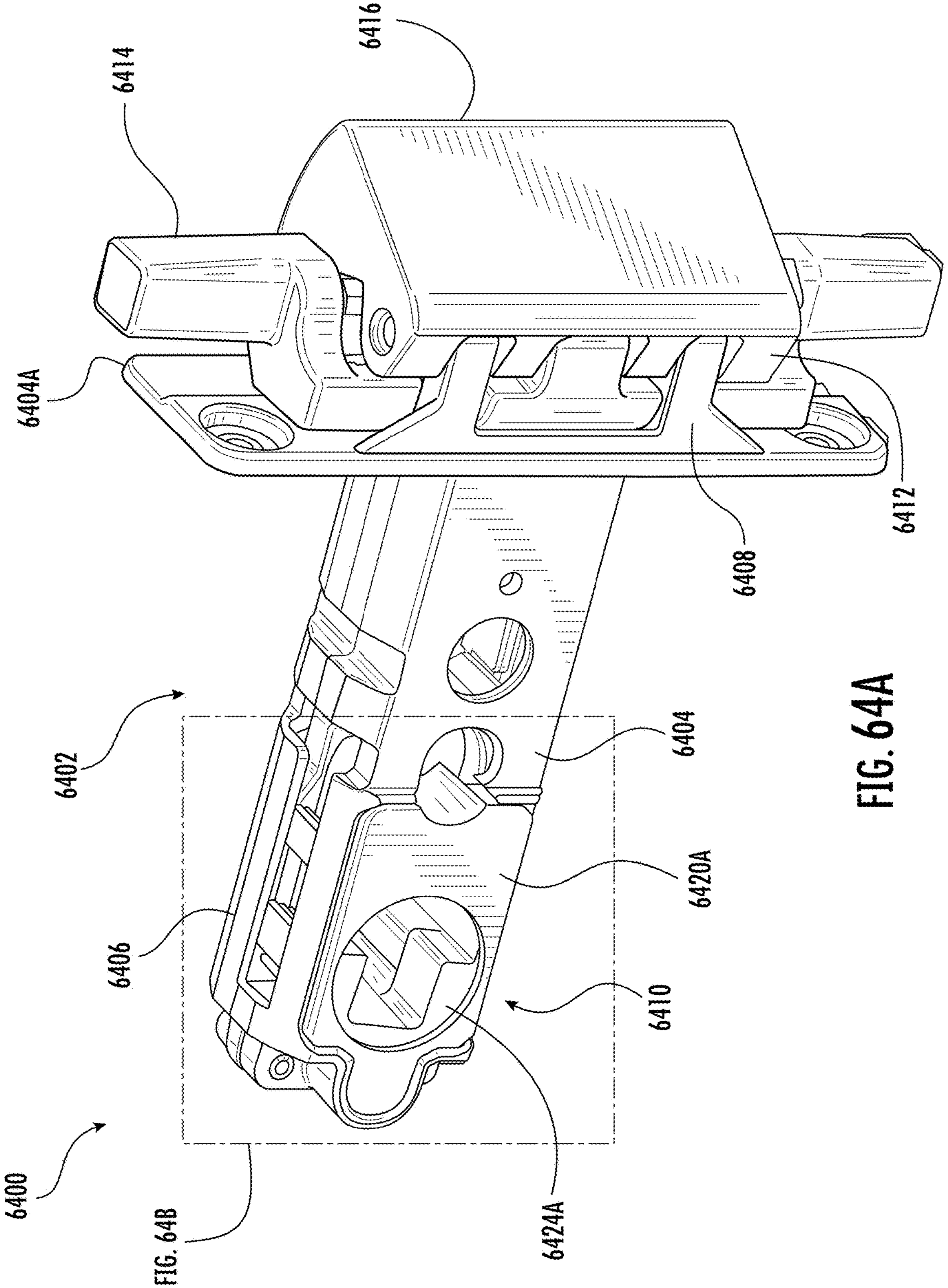
FIG. 64A is a perspective view of a latch assembly of one embodiment of the present invention where the latch assembly is configured to provide a long backset panel configuration.
Figure 64B:
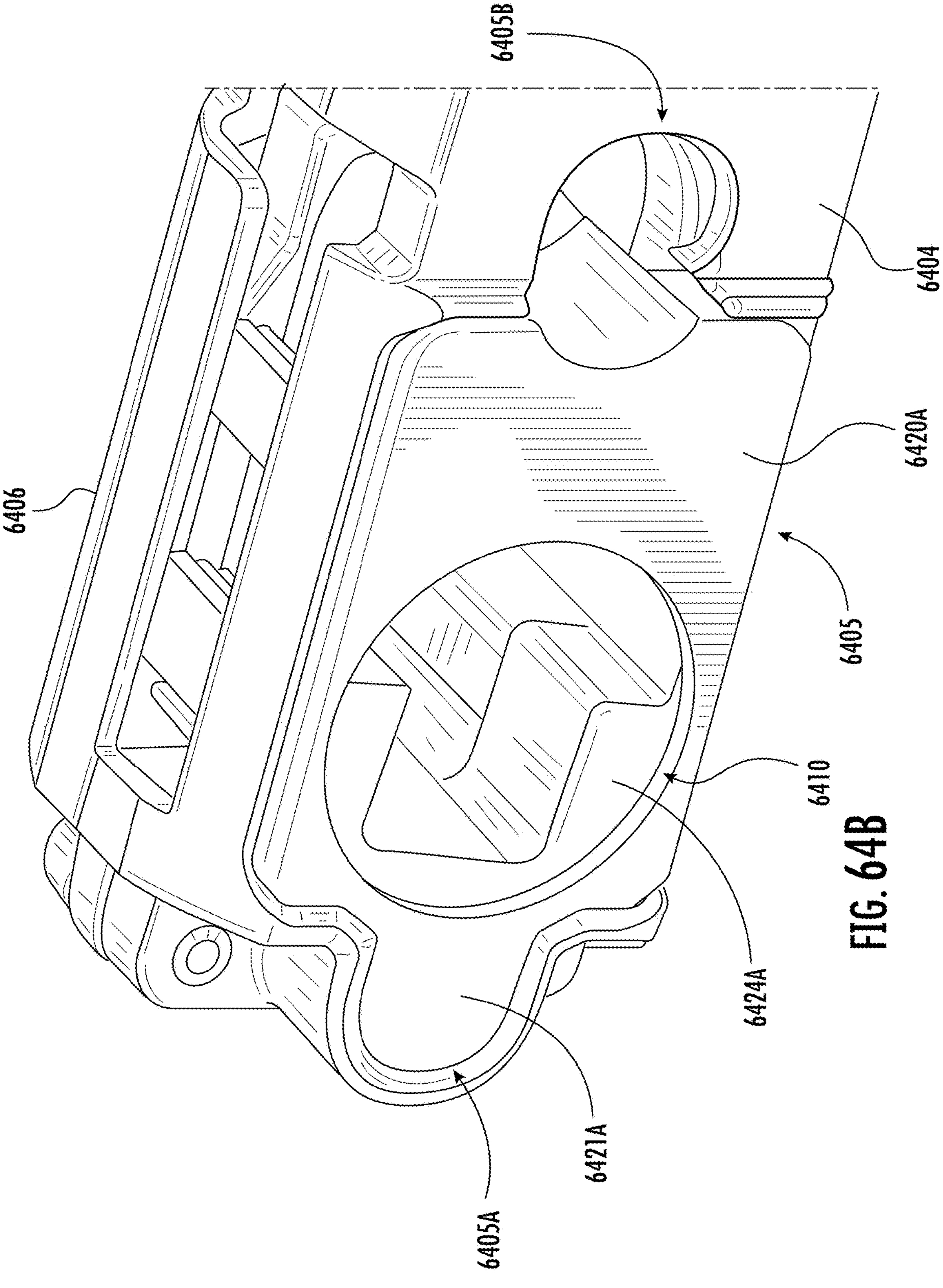
FIG. 64B is an enhanced, perspective view of a first hub cradle portion of the latch assembly of FIG. 64A with the first hub cradle portion oriented so that a long backset panel configuration is provided.

FIGS. 64A and 64B illustrate a latch assembly 6400 with a long backset panel configuration. FIG. 64A is a perspective view of a latch assembly 6400 of one embodiment of the present invention where the latch assembly 6400 is configured to provide a long backset panel configuration, and FIG. 64B is an enhanced, perspective view of a first hub cradle portion 6420A of the latch assembly 6400 of FIG. 64A with the first hub cradle portion 6420A oriented so that a long backset panel configuration is provided.

As illustrated in FIG. 64A, the latch assembly 6400 may comprise a main body 6402, with a first latch housing 6404 on a first side of the main body 6402 and with a second latch housing 6406 on a second side of the main body 6402. The latch assembly 6400 also comprises a head portion 6404A. The first latch housing 6404 and the second latch housing 6406 are both attached to the head portion 6404A, either directly or indirectly, and the first latch housing 6404 and the second latch housing 6406 may be identical in some embodiments to increase efficiency in manufacturing. The head portion 6404A includes hinge-like protrusions 6408 having a recess extending through the hinge-like protrusions 6408. Similarly, the latch assembly 6400 may comprise a wedge coupler 6414. The latch assembly 6400 also includes a latch 6416, and the latch 6416 includes hinge-like protrusions 6412 that have a recess extending through the hinge-like protrusions 6412. The wedge coupler 6414 may be similar to the wedge coupler 880 discussed herein in reference to FIG. 42, and the latch 6416 may be similar to the latch 900 discussed herein in reference to FIG. 44.

With reference to FIG. 64B, further details may be seen regarding a hub cradle formed in the latch assembly 6400. The hub cradle may be formed by a first hub cradle portion 6420A on a first side of the main body 6402 (see FIG. 64A) and a second hub cradle portion 6420B (see FIG. 65) on a second side of the main body 6402. The latch hub 6424 (see FIG. 65) may be positioned between the first hub cradle portion 6420A and the second hub cradle portion 6420B. The first hub cradle portion 6420A defines a recess 6410 that is offset from a center of the first hub cradle portion 6420A. For example, the recess 6410 is provided towards the left of the center of the first hub cradle portion 6420A in FIG. 64B. The latch hub 6424 may be aligned with the recess 6410, as illustrated in FIG. 64B where an outer component 6424A of the latch hub 6424 (see FIG. 66A) is visible.

The first hub cradle portion 6420A comprises an extension 6421A on a first side (e.g., on the left in FIG. 64B) of the first hub cradle portion 6420A, and the first hub cradle portion 6420A does not have an extension on the opposite side (e.g., on the right in FIG. 64B). In other embodiments, an extension may be provided on the opposite side. Alternatively, the first hub cradle portion 6420A may define a groove on two opposite sides, and the first latch housing 6404 may define a protrusion that extends to engage the surfaces at the grooves. A wide variety of other configurations are also possible. The second hub cradle portion 6420B (see FIG. 65) may define a geometry that mirrors the geometry of the first hub cradle portion 6420A, with an extension similar to the extension 6421A and with a recess offset from the center of the second hub cradle portion 6420B similar to the recess 6410. In some embodiments, the first hub cradle portion 6420A and the second hub cradle portion 6420B may be identical so that the efficiency of manufacturing may be increased. While the first hub cradle portion 6420A and the second hub cradle portion 6420B are illustrated as two separate components, the two portions may be integrally connected in other embodiments.

The first latch housing 6404 also defines an opening 6405. A first extended portion 6405A is provided on one side of the opening 6405 (e.g., the left side in FIG. 64B) and a second extended portion 6405B is provided on an opposite side of the opening 6405 (e.g., on the right side in FIG. 64B). The opening 6405 is configured to partially receive the first hub cradle portion 6420A so that a portion of the first hub cradle portion 6420A is permitted to extend through the opening 6405. The opening 6407 of the second latch housing 6406 may possess a similar geometry to the opening 6405, with the opening 6407 defining first and second extended portions similar to the first extended portion 6405A and the second extended portion 6405B of the opening 6405.

Due to the configuration of the opening 6405, the opening 6407, the first hub cradle portion 6420A, and the second hub cradle portion 6420B, the first hub cradle portion 6420A and the second hub cradle portion 6420B are beneficially provided in two different orientations to easily install the latch assembly 6400 in a short backset panel configuration or a long backset panel configuration. For example, the opening 6405 is configured to permit the first hub cradle portion 6420A to rest in two positions. In the position illustrated in FIG. 64B, the extension 6421A of the first hub cradle portion 6420A extends into the first extended portion 6405A of the opening 6405 so that the extension 6421A engages a wall of the opening 6405 at the first extended portion 6405A, allowing the first hub cradle portion 6420A to be effectively positioned relative to the first latch housing 6404. Additionally, the recess 6410 defined in the first hub cradle portion 6420A is offset farther away from the head portion 6404A (and from the jamb edge of a door panel). In the configuration of FIG. 64B, the latch assembly 6400 is in a long backset panel configuration, and the first hub cradle portion 6420A and the second hub cradle portion 6420B are both in long orientation rather than a short orientation. However, the first hub cradle portion 6420A may be rotated 180 degrees so that it is positioned as illustrated in FIG. 67B. In the position illustrated in FIG. 67B, the extension 6721A of the first hub cradle portion 6720A extends into the second extended portion 6705B of the opening 6705 and the recess 6710 defined in the first hub cradle portion 6720A is offset a lesser distance away from the head portion 6704A (and from the jamb edge of a door panel). In the configuration of FIG. 67B, the latch assembly 6700 is in a short backset panel configuration, and the first hub cradle portion 6720A and the second hub cradle portion 6720B are both in short orientation rather than a long orientation.

Figure 65:
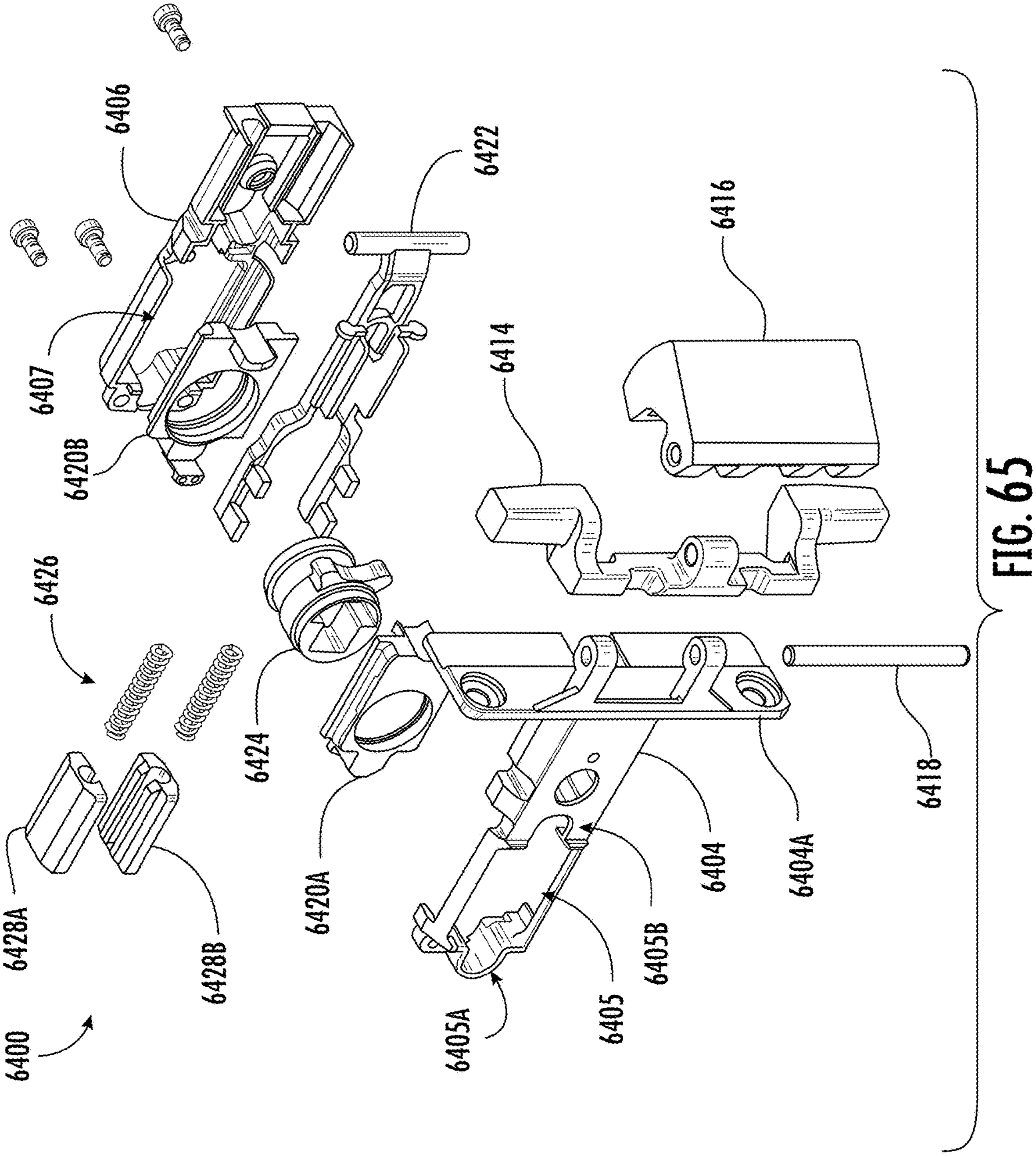
FIG. 65 is a perspective, exploded unassembled view of the latch assembly of FIG. 64A.

With reference to FIG. 65, an exploded view of the latch assembly 6400 is provided. As illustrated, the latch assembly 6400 comprises a first latch housing 6404 on a first side and a second latch housing 6406 on a second side. Various components may be positioned between the first latch housing 6404 and the second latch housing 6406, including the first hub cradle portion 6420A, the latch hub 6424, the springs 6426, the first spring tube 6428A, the second spring tube 6428B, the latch arm 6422, and the second hub cradle portion 6420B. The latch arm 6422 may be similar to the latch arm 850 discussed herein in reference to FIG. 39. The first spring tube 6428A and the second spring tube 6428B may both house a respective spring 6426 therein, and the springs 6426 may engage the latch arm 6422.

Additionally, a latch hinge pin 6418 is illustrated in the exploded view of FIG. 65. This latch hinge pin 6418 may extend through recesses formed in the hinge-like protrusions 6412 of the latch 6416 and through recesses formed in the hinge-like protrusions 6408 of the head portion 6404A. The latch hinge pin 6418 may facilitate rotation of the latch 6416 relative to the head portion 6404A.

In some embodiments, the latch hub 6424 includes an insert 6424B that is removable, and the insert 6424B may enable compatibility with a large number of spindle shapes and with a larger number of products from various hardware manufacturers. The latch hub 6424 may have a first opening size when the insert 6424B is included, and the latch hub 6424 may have a second opening size when the insert 6424B is not included. Thus, the latch hub 6424 may be configured to receive a first spindle having a first size and shape when the insert 6424B is removed, and the latch hub 6424 may be configured to receive a second spindle having a second size and shape when the insert 6424B is included.

Figure 66A:
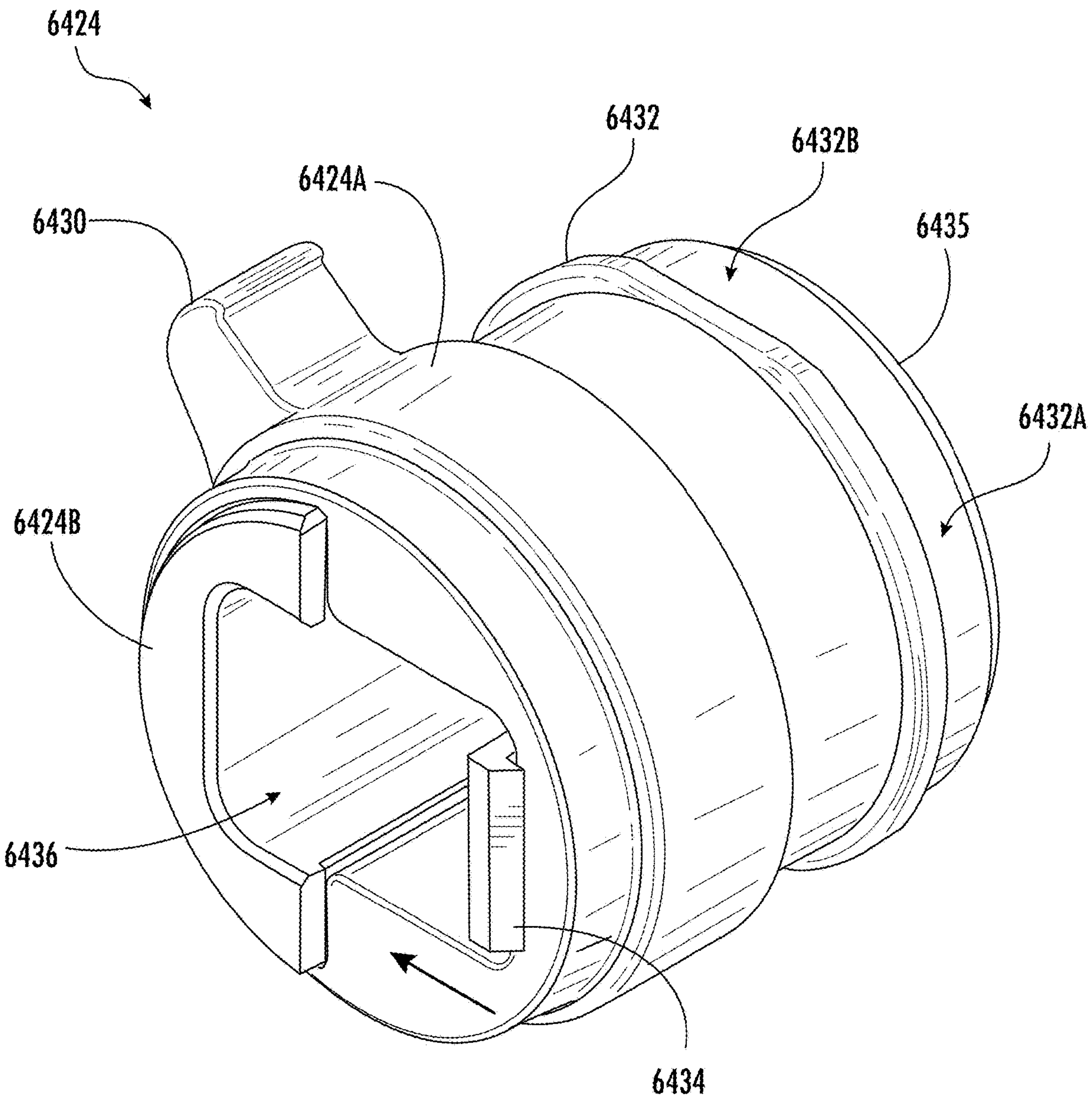
FIG. 66A is a perspective view of a latch hub that is used in the latch assembly of FIG. 64A.
Figure 66B:
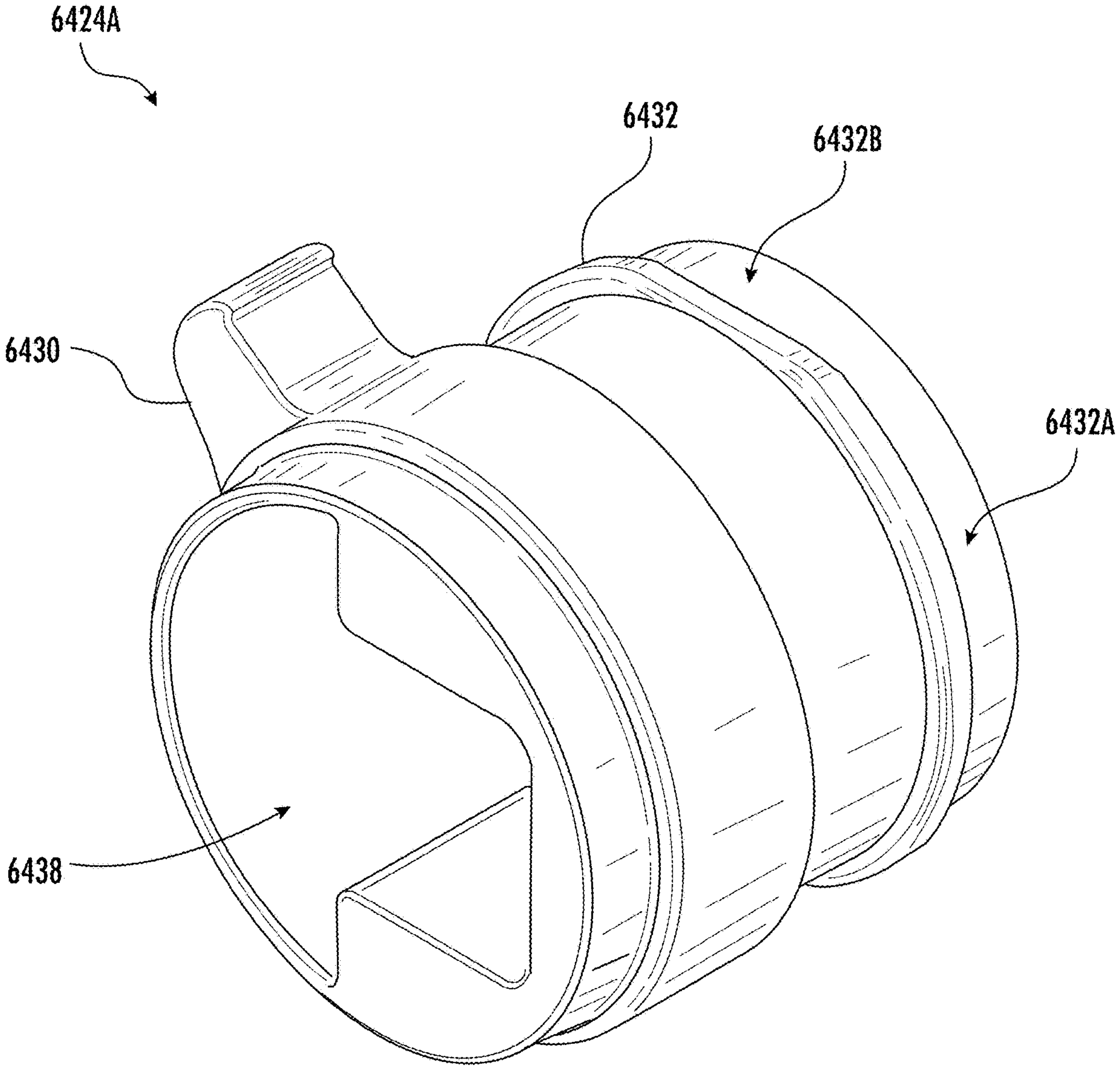
FIGS. 66B and 66C are perspective views of an outer component of the latch hub of FIG. 66A with an insert removed from the interior of the outer component.
Figure 66C:
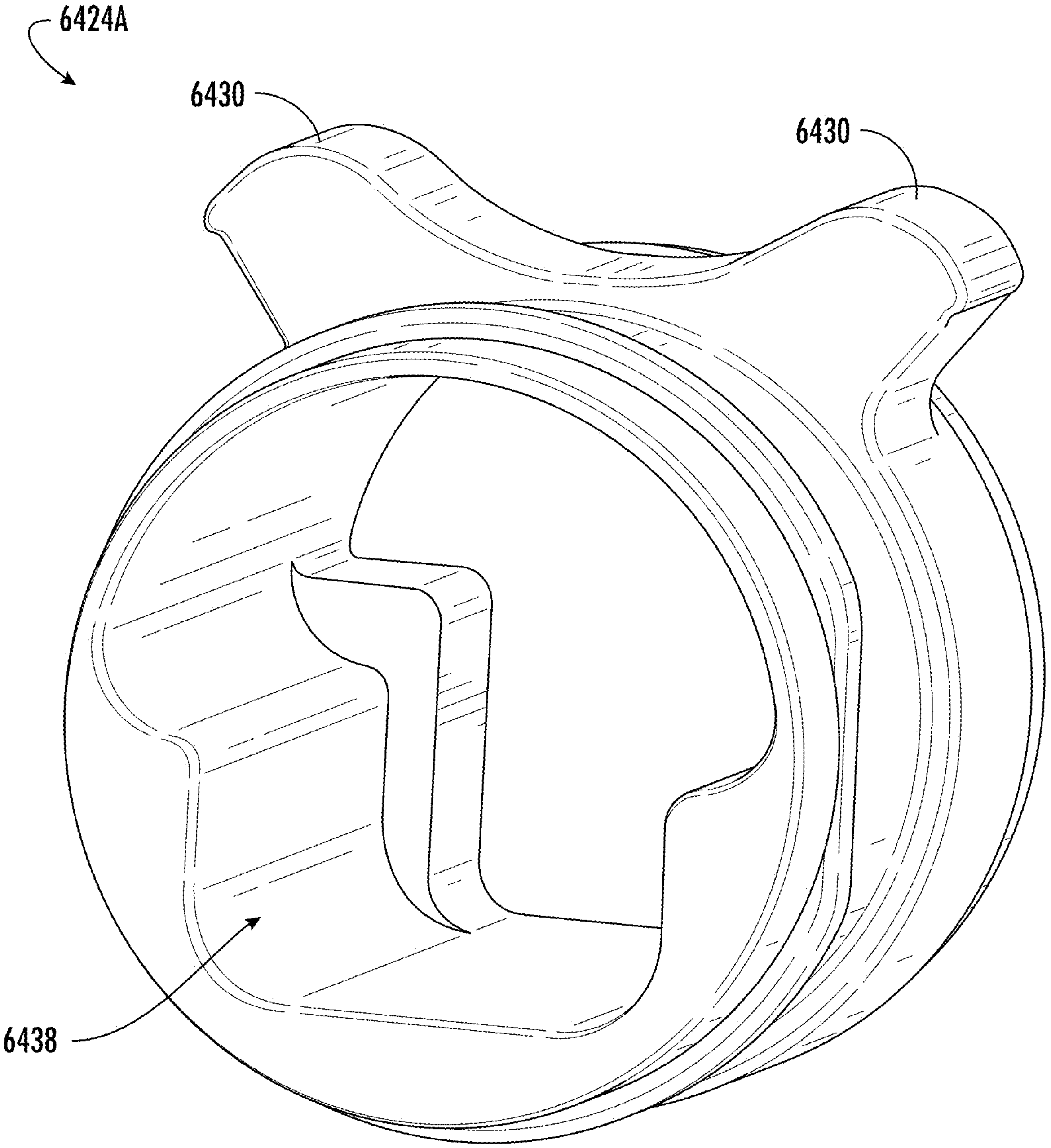
Figure 66D:
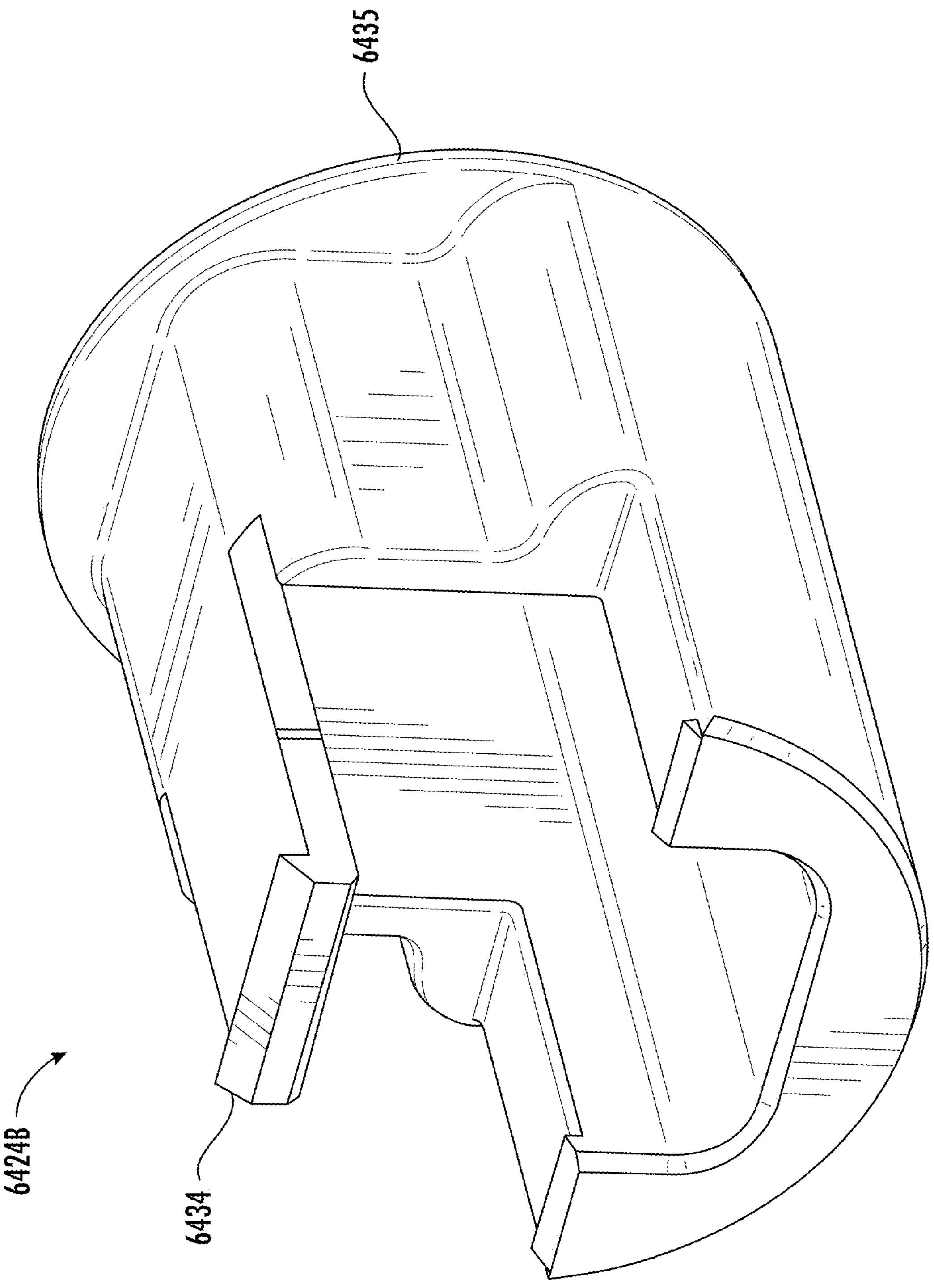
FIG. 66D is a perspective view of the insert of that is used in the latch hub of FIG. 66A.

FIGS. 66A through 66D illustrate features of the latch hub 6424 in greater detail. FIG. 66A is a perspective view of the latch hub 6424 with the insert 6424B being present, FIGS. 66B and 66C are perspective views of an outer component 6424A of the latch hub 6424 of FIG. 66A with the insert 6424B removed from the interior of the outer component 6424A, and FIG. 66D is a perspective view of the insert of that is used in the latch hub of FIG. 66A.

As illustrated in FIG. 66A, the latch hub 6424 defines an outer component 6424A and an insert 6424B. As shown in FIGS. 66B and 66C, the outer component 6424A defines a first cavity 6438 having a first size and shape. When the insert 6424B is removed as illustrated in FIG. 66B, the latch hub may be configured to receive larger spindles such as a Kwikset C-shape spindle in the first cavity 6438.

In FIG. 66A, the insert 6424B is provided inside the first cavity 6438 defined in the outer component 6424A. When the insert 6424B is being used, the latch hub 6424 defines a second cavity 6436 having a second size that is smaller than the first size of the first cavity 6438. The latch hub 6424 may be configured to receive smaller spindles such as those made by selected manufacturers, such as Schlage, Baldwin, etc. The second cavity 6436 also generally defines a rectangular shape, which is different from the shape defined by the first cavity 6438. While the second cavity 6436 generally defines a rectangular shape with filleted edges, the latch hub 6424 and the insert 6424B may be designed to include other shapes in other embodiments, and this may enable other spindles of different geometries to be used. In some embodiments, the size of the first cavity 6438 may be increased further to enable larger spindles to be received therein, and another insert may be provided that enables the latch hub 6424 to receive a Kwikset C-shape spindle or other spindles.

The insert 6424B may be easily installed and removed from the latch hub 6424. The insert 6424B may be inserted into the first cavity 6438 of the outer component 6424A, and a latch 6434 may assist in restricting movement of the insert 6424B relative to the outer component 6424A. This latch 6434 is illustrated in FIGS. 66A and 66D. To remove the insert 6424B, a user may urge the latch 6434 in the direction indicated by the arrow in FIG. 66A, and the user may urge the insert out of the recess (e.g., towards the top right from the perspective illustrated in FIG. 66A). As illustrated in FIGS. 66A and 66D, a rim 6435 may be provided on the insert 6424B to restrain motion of the insert 6424B relative to the outer component 6424A. For example, from the perspective illustrated in FIG. 66A, the rim 6435 may be in contact with a back portion of the outer component 6424A to prevent the insert 6424B from advancing further in the bottom left direction.

The latch hub 6424 includes an engagement portion 6430, and this engagement portion may be similar to the engagement portion 846 disclosed herein with reference to FIG. 38 and other associated Figures. The latch hub 6424 also includes a ring 6432, and the ring 6432 generally wraps around the latch hub 6424. The ring 6432 includes an extended portion 6432A for most portions of the ring 6432, but the ring 6432 includes a reduced portion 6432B at opposing sides of the ring 6432. The reduced portion 6432B may enable the latch hub 6424 to be avoid engagement with another component when the latch hub 6424 is in a certain orientation, and the extended portion 6432A may ensure that the latch hub 6424 will engage another component when the latch hub 6424 is in other orientations. The reduced portion 6432B may help facilitate the removal of the latch hub 6424 from the remainder of an assembly.

Other than the aforementioned features of the latch hub 6424, the latch hub 6424 may be similar to the latch hub 840 discussed herein in reference to FIGS. 37 and 38 and associated figures, and the latch hub 6424 may generally interact with other components in a manner similar to the latch hub 840.

A latch assembly 6700 having a short backset panel configuration is illustrated in FIGS. 67A and 67B. FIG. 67A is a perspective view of a latch assembly 6700 of one embodiment of the present invention where the latch assembly 6700 is configured to provide a short backset panel configuration. FIG. 67B is an enhanced, perspective view of a first hub cradle portion 6720A of the latch assembly 6700 of FIG. 67A with the first hub cradle portion 6720A oriented so that a short backset panel configuration is provided.

FIGS. 67A and 67B illustrate a latch assembly 6700 with a short backset panel configuration. FIG. 67A is a perspective view of a latch assembly 6700 of one embodiment of the present invention where the latch assembly 6700 is configured to provide a short backset panel configuration, and FIG. 67B is an enhanced, perspective view of a first hub cradle portion 6720A of the latch assembly 6700 of FIG. 67A with the first hub cradle portion 6720A oriented so that a short backset panel configuration is provided.

As illustrated in FIG. 67A, the latch assembly 6700 may comprise a main body 6702, with a first latch housing 6704 on a first side of the main body 6702 and with a second latch housing 6706 on a second side of the main body 6702. The latch assembly 6700 also comprises a head portion 6704A. The first latch housing 6704 and the second latch housing 6706 are both attached to the head portion 6704A either directly or indirectly. The head portion 6704A includes hinge-like protrusions 6708 having a recess extending through the hinge-like protrusions 6708. Similarly, the latch assembly 6700 may comprise a wedge coupler 6714. The latch assembly 6700 also comprises a latch 6716, and the latch 6716 comprises hinge-like protrusions 6712 that have a recess extending through the hinge-like protrusions 6712. The wedge coupler 6714 may be similar to the wedge coupler 880 discussed herein in reference to FIG. 42, and the latch 6716 may be similar to the latch 900 discussed herein in reference to FIG. 44.

Looking now at FIG. 67B, further details may be seen regarding a hub cradle formed in the latch assembly 6700. The hub cradle may be formed by a first hub cradle portion 6720A on a first side of the main body 6702 (see FIG. 67A) and a second hub cradle portion 6720B (see FIG. 68) on a second side of the main body 6702. The latch hub 6724 (see FIG. 68) may be positioned between the first hub cradle portion 6720A and the second hub cradle portion 6720B. The first hub cradle portion 6720A defines a recess 6710, and this recess 6710 is offset from the center of the first hub cradle portion 6720A. For example, the recess 6710 is provided towards the right of the center of the first hub cradle portion 6720A in FIG. 67B. The latch hub 6724 may be aligned with the recess 6710, as illustrated in FIG. 67B where an outer component 6724A of the latch hub 6724 (see FIG. 68) is visible. The latch hub 6724 may be similar to the latch hub 6424 discussed herein in reference to FIG. 66A.

The first hub cradle portion 6720A comprises an extension 6721A on a first side (e.g., on the right in FIG. 67B) of the first hub cradle portion 6720A, and the first hub cradle portion 6720A does not have an extension on the opposite side (e.g., on the left in FIG. 67B). In other embodiments, an extension may be provided on the opposite side. Alternatively, the first hub cradle portion 6720A may define a groove on two opposite sides, and the first latch housing 6704 may define a protrusion that extends to engage the surfaces at the grooves. A wide variety of other configurations are also possible. The second hub cradle portion 6720B (see FIG. 68) may define a geometry that mirrors the geometry of the first hub cradle portion 6720A, with an extension similar to the extension 6721A and with a recess offset from the center of the second hub cradle portion 6720B similar to the recess 6710.

The first latch housing 6704 also defines an opening 6705. A first extended portion 6705A is provided on one side of the opening 6705 (e.g., the left side in FIG. 67B) and a second extended portion 6705B is provided on an opposite side of the opening 6705 (e.g., on the right side in FIG. 67B). The opening 6705 is configured to partially receive the first hub cradle portion 6720A so that a portion of the first hub cradle portion 6720A is permitted to extend through the opening 6705. The opening 6707 of the second latch housing 6706 may possess a similar geometry to the opening 6705, with the opening 6707 defining first and second extended portions similar to the first extended portion 6705A and the second extended portion 6705B of the opening 6705.

Due to the geometry or configuration of the opening 6705, the opening 6707, the first hub cradle portion 6720A, and the second hub cradle portion 6720B, the first hub cradle portion 6720A and the second hub cradle portion 6720B may beneficially be provided in two different orientations to easily install the latch assembly 6700 in a short backset panel configuration or a long backset panel configuration. For example, the opening 6705 is configured to permit the first hub cradle portion 6720A to rest in two positions. In the position illustrated in FIG. 67B, the extension 6721A of the first hub cradle portion 6720A extends into the second extended portion 6705B of the opening 6705 and the recess 6710 defined in the first hub cradle portion 6720A is offset a smaller distance away from the head portion 6704A. In the configuration of FIG. 67B, the latch assembly 6700 is in a short backset panel configuration. However, the first hub cradle portion 6720A may be rotated 180 degrees so that it is positioned as illustrated in FIG. 64B. In the position illustrated in FIG. 64B, the extension 6421A of the first hub cradle portion 6420A extends into the first extended portion 6405A of the opening 6405 and the recess 6410 defined in the first hub cradle portion 6420A is offset a greater distance away from the head portion 6404A. In the configuration of FIG. 64B, the latch assembly 6400 is in a long backset panel configuration.

A user may easily select or switch between using a latch assembly 6400 having a long backset panel configuration and a latch assembly 6700 having a short backset panel configuration—both assemblies have an identical set of components, and selected components, such as first hub cradle portion 6720A and the second hub cradle portion 6720B, may be oriented differently to obtain the desired configuration. The ability to use the same parts where a long backset panel configuration or a short backset panel configuration is used is beneficial for various reasons. For example, this requires less parts to be manufactured, reducing the manufacturing costs. This also increases ease of use and installation for users.

Figure 68:
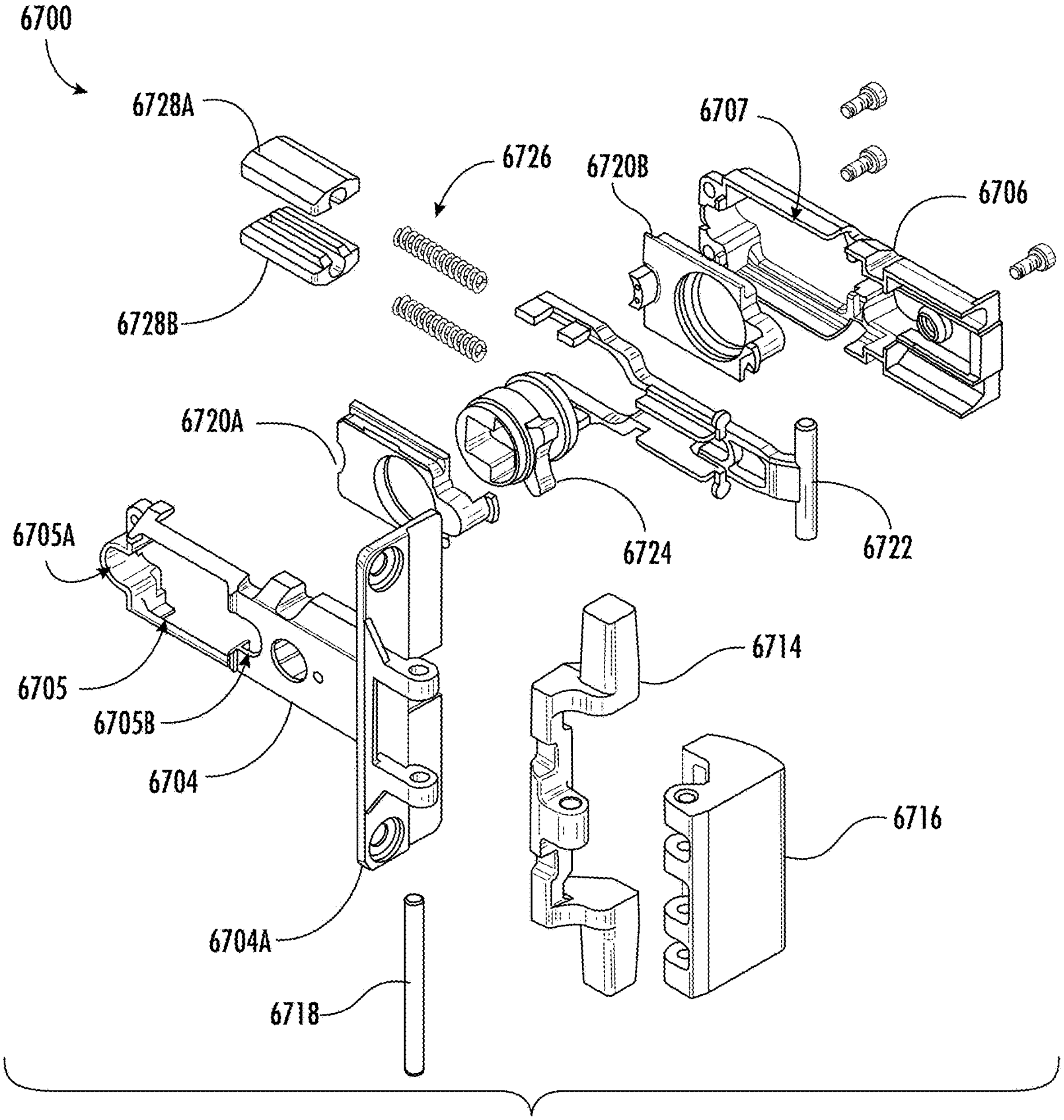
FIG. 68 is an exploded view of the latch assembly of FIG. 67A.

Turning now to FIG. 68, an exploded view of the latch assembly 6700 is provided. As illustrated, the latch assembly

6700 comprises a first latch housing 6704 on a first side and a second latch housing 6706 on a second side. Various components may be positioned between the first latch housing 6704 and the second latch housing 6706, including the first hub cradle portion 6720A, the latch hub 6724, the springs 6726, the first spring tube 6728A, the second spring tube 6728B, the latch arm 6722, and the second hub cradle portion 6720B. The latch arm 6722 may be similar to the latch arm 850 discussed herein in reference to FIG. 39. Furthermore, the first spring tube 6728A and the second spring tube 6728B may both house a respective spring 6726 therein, and the springs 6726 may engage the latch arm 6722.

Additionally, a latch hinge pin 6718 is illustrated in the exploded view of FIG. 68. This latch hinge pin 6718 may extend through recesses formed in the hinge-like protrusions 6712 of the latch 6716 and through recesses formed in the hinge-like protrusions 6708 of the head portion 6704A. The latch hinge pin 6718 may facilitate rotation of the latch 6716 relative to the head portion 6704A.

When a latch assembly 6400 is installed in the long backset panel configuration as illustrated in FIG. 64A, the distance from the head portion 6404A to the outer component 6424A of the latch hub 6424 (see FIG. 65) is greater than the distance from the head portion 6704A to the outer component 6724A of the latch hub 6724 (see FIG. 68) when a latch assembly 6700 is installed in the short backset panel configuration illustrated in FIG. 67A. Additionally, the latch hub 6424 may effectively be provided farther away from a jamb edge of a door panel where the long backset panel configuration is used.

Figure 69:
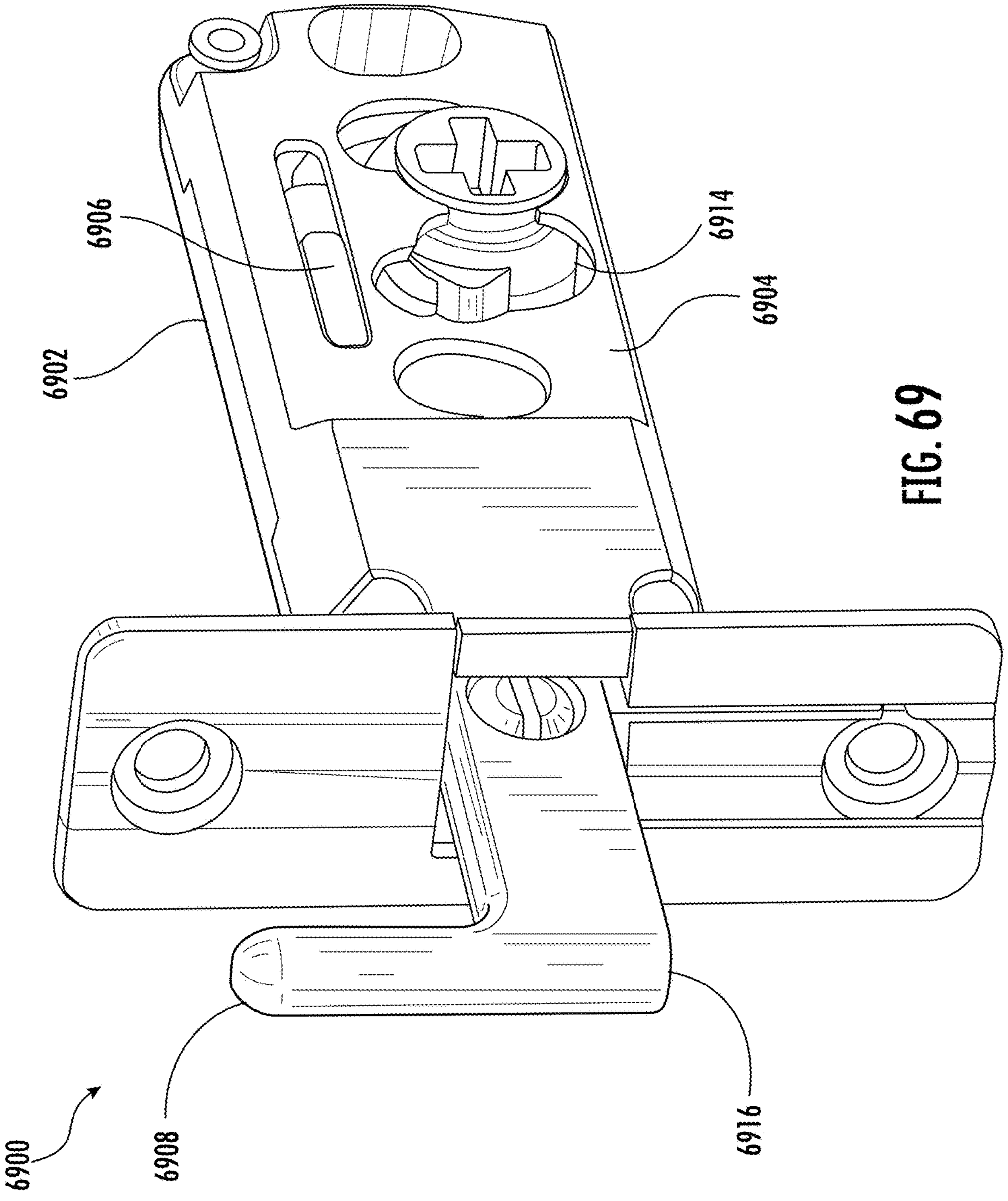
FIG. 69 is a perspective view of a drive interface assembly of one embodiment of the present invention where the drive interface assembly has a left swing configuration.
Figure 70:
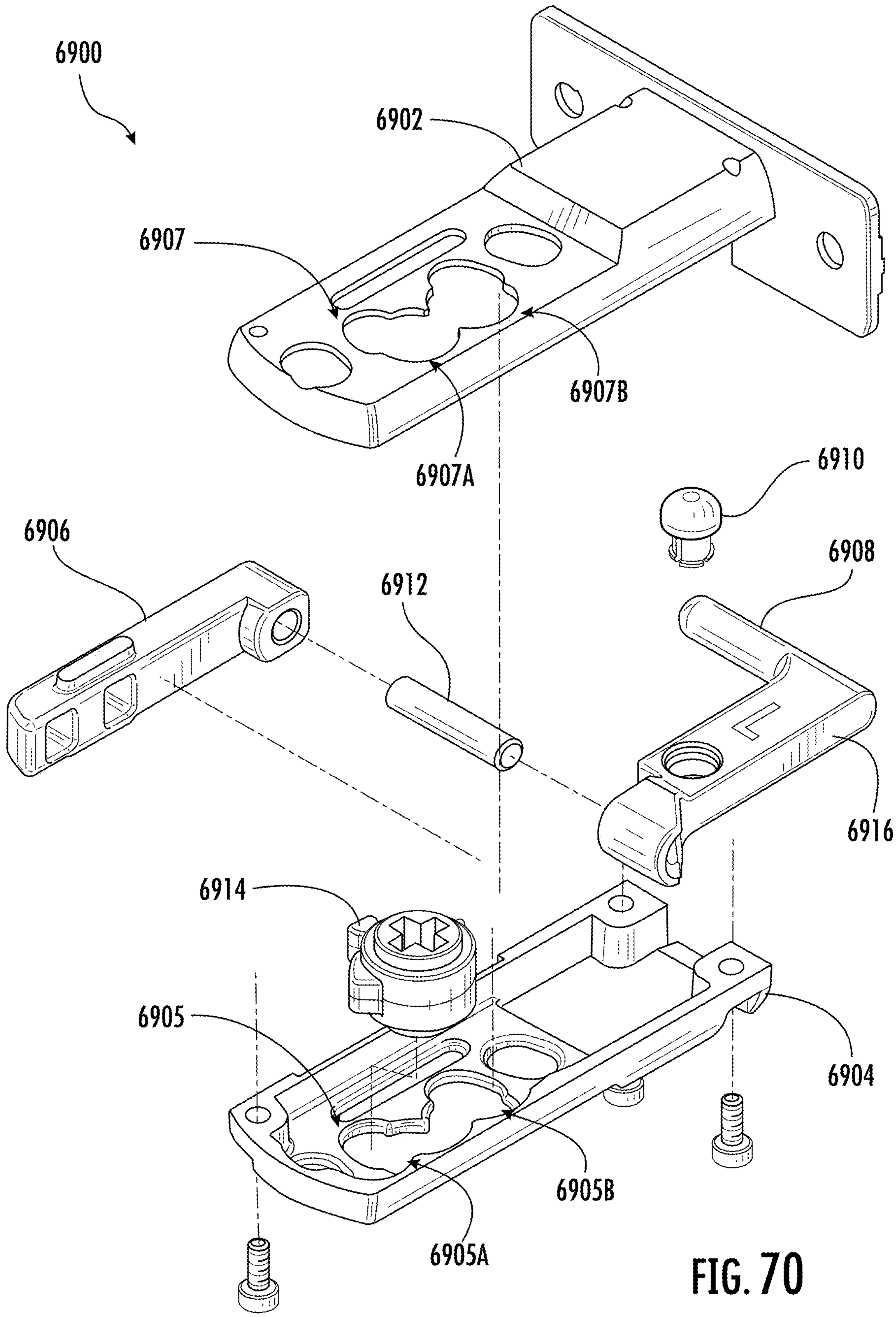
FIG. 70 is an exploded view of the drive interface assembly of FIG. 69.

A drive interface assembly 6900 having a left swing configuration is illustrated in FIGS. 69 and 70. FIG. 69 is a perspective view of a drive interface assembly 6900 of one embodiment of the present invention where the drive interface assembly 6900 has a left swing configuration, and FIG. 70 is an exploded view of the drive interface assembly 6900 of FIG. 69. As illustrated, the drive interface assembly 6900 comprises the first drive interface housing 6902 on a first side and a second drive interface housing 6904 on a second side. The first drive interface housing 6902 includes an aperture 6907, with the aperture 6907 having a first portion 6907A and a second portion 6907B. The aperture 6907 may be configured to receive a portion of the drive interface hub 6914 in either the first portion 6907A or the second portion 6907B of the aperture 6907. Additionally, the second drive interface housing 6904 includes an aperture 6905, with the aperture 6905 having a first portion 6905A and a second portion 6905B. The aperture 6905 may be configured to receive a portion of the drive interface hub 6914 in either the first portion 6905A or the second portion 6905B of the aperture 6905.

The drive interface hub 6914 may be assembled in two different positions relative to the first drive interface housing 6902 and the second drive interface housing 6904, and the position of the drive interface hub 6914 may be selected based on whether the latch assembly is being used in a long backset panel configuration or in a short backset panel configuration. In the drive interface assembly 6900 of FIG. 70, the drive interface hub 6914 is positioned in the first portion 6905A of the aperture 6905 and in the first portion 6907A of aperture 6907. However, in other embodiments, the drive interface hub 6914 may be positioned in the second portion 6905B of the aperture 6905 and in the second portion 6907B of the aperture 6907. The drive interface hub 6914 may be similar to the hub portion 740 discussed herein in reference to FIG. 31 and associated figures.

Other components of the drive interface assembly 6900 include a slider element 6906, a drive arm 6916, a drive interface pin 6908, an arm guide 6910, and a hinge pin 6912. The slider element 6906 may be similar to the slider element 750 discussed herein in reference to FIG. 33 and associated figures. The drive arm 6916 may include the drive interface pin 6908, and these features may be similar to the drive arm 770 and the drive interface pin 778 discussed herein in reference to FIG. 33 and associated figures. The arm guide 6910 may be similar to the arm guide 790 discussed herein in reference to FIG. 30 and associated figures. The hinge pin 6912 may be similar to the hinge pin 792 discussed herein in reference to FIG. 30 and associated figures.

A user may easily select or switch between using a drive interface assembly set up for a long backset panel configuration and a drive interface assembly set up for a short backset panel configuration—the drive interface assembly has an identical set of components regardless of the configuration used, and certain components such as the drive interface hub 6914 are simply positioned at different locations relative to other components to obtain the desired configuration. The ability to use the same parts where a long backset panel configuration or a short backset panel configuration is used is beneficial for various reasons. For example, this requires less parts to be manufactured, reducing the manufacturing costs. This also increases ease of use and installation for users.

Figure 71A:
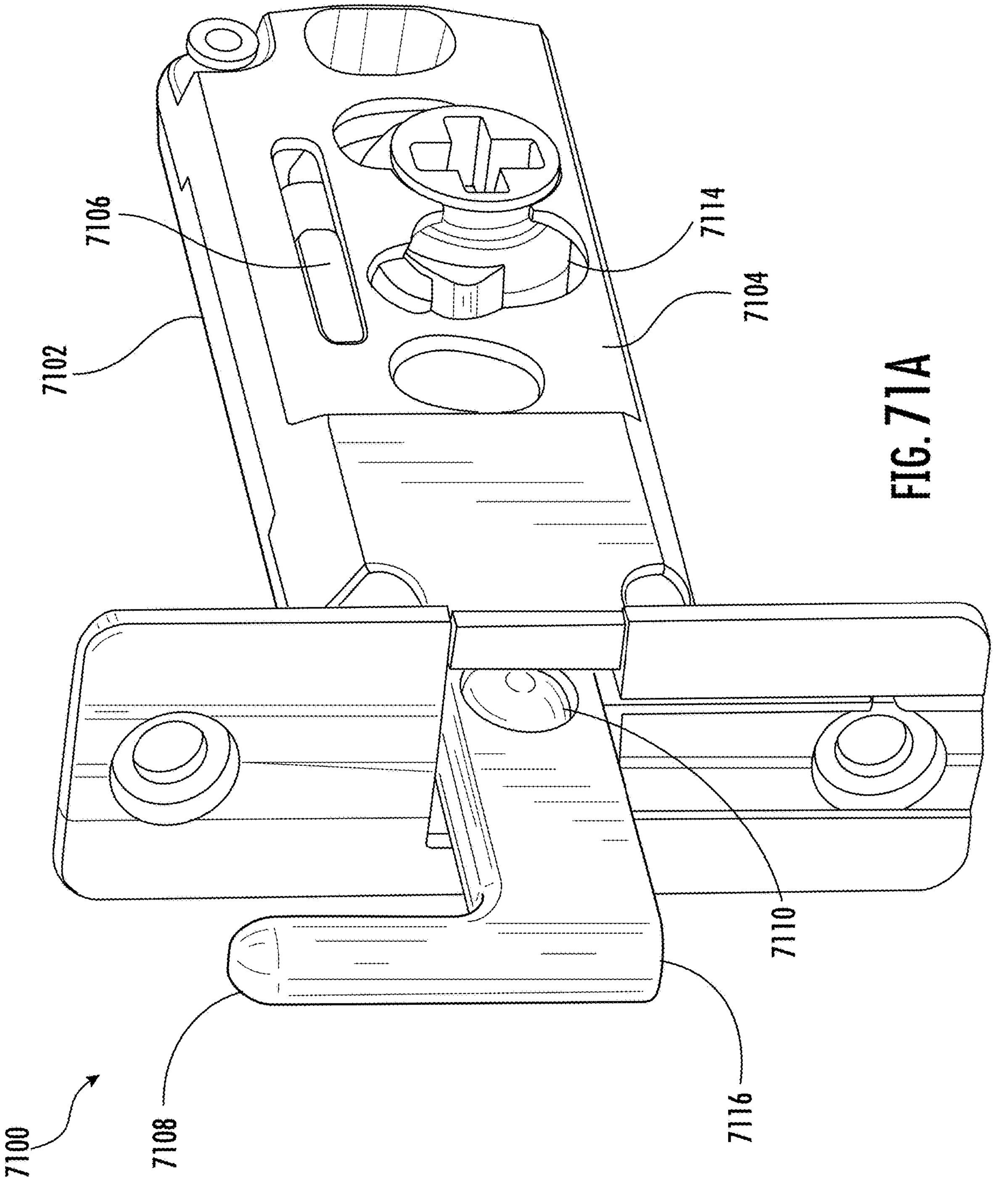
FIG. 71A is a perspective view of a drive interface assembly of one embodiment of the present invention where the drive interface assembly has a right swing configuration.
Figure 71B:
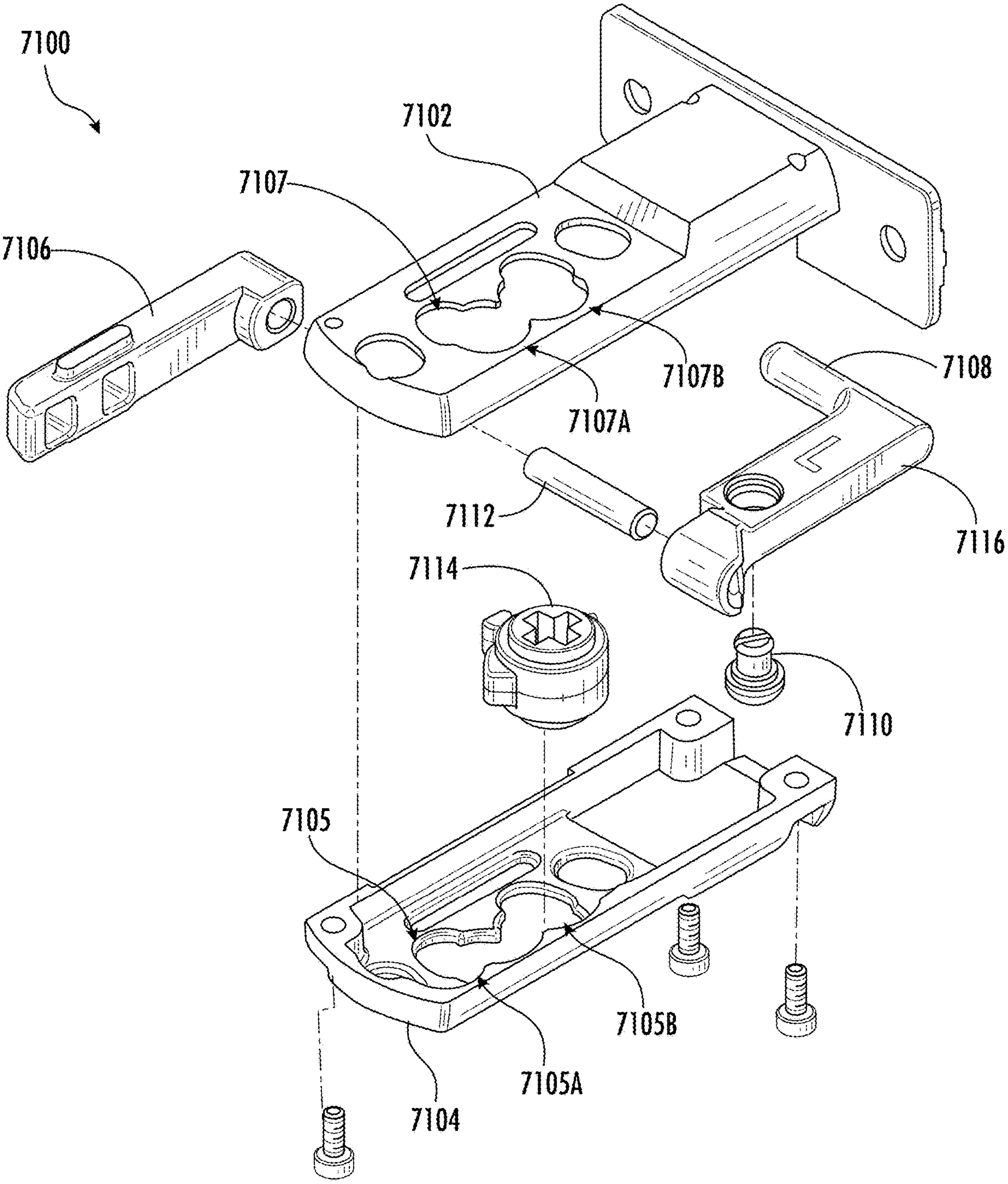
FIG. 71B is an exploded view of the drive interface assembly of FIG. 71A.

A drive interface assembly 7100 having a right swing configuration is illustrated in FIGS. 71A and 71B. FIG. 71A is a perspective view of a drive interface assembly 7100 of one embodiment of the present invention where the drive interface assembly 7100 has a right swing configuration, and FIG. 71B is an exploded view of the drive interface assembly 7100 of FIG. 71A. As illustrated, the drive interface assembly 7100 comprises the first drive interface housing 7102 on a first side and a second drive interface housing 7104 on a second side. The first drive interface housing 7102 includes an aperture 7107, with the aperture 7107 having a first portion 7107A and a second portion 7107B. The aperture 7107 may be configured to receive a portion of the drive interface hub 7114 in either the first portion 7107A or the second portion 7107B of the aperture 7107. Additionally, the second drive interface housing 7104 includes an aperture 7105, with the aperture 7105 having a first portion 7105A and a second portion 7105B. The aperture 7105 may be configured to receive a portion of the drive interface hub 7114 in either the first portion 7105A or the second portion 7105B of the aperture 7105.

The drive interface hub 7114 may be assembled in two different positions relative to the first drive interface housing 7102 and the second drive interface housing 7104, and the position of the drive interface hub 7114 may be selected based on whether the latch assembly is being used in a long backset panel configuration or in a short backset panel configuration. In the drive interface assembly 7100 of FIG. 71B, the drive interface hub 7114 is positioned in the second portion 7105B of the aperture 7105 and in the second portion 7107B of the aperture 7107. However, in other embodiments, the drive interface hub 7114 may be positioned in the first portion 7105A of the aperture 7105 and in the first portion 7107A of the aperture 7107. The drive interface hub 7114 may be similar to the hub portion 740 discussed herein in reference to FIG. 31 and associated figures.

Other components of the drive interface assembly 7100 include a slider element 7106, a drive arm 7116, a drive interface pin 7108, an arm guide 7110, and a hinge pin 7112. The slider element 7106 may be similar to the slider element

Figure 33:
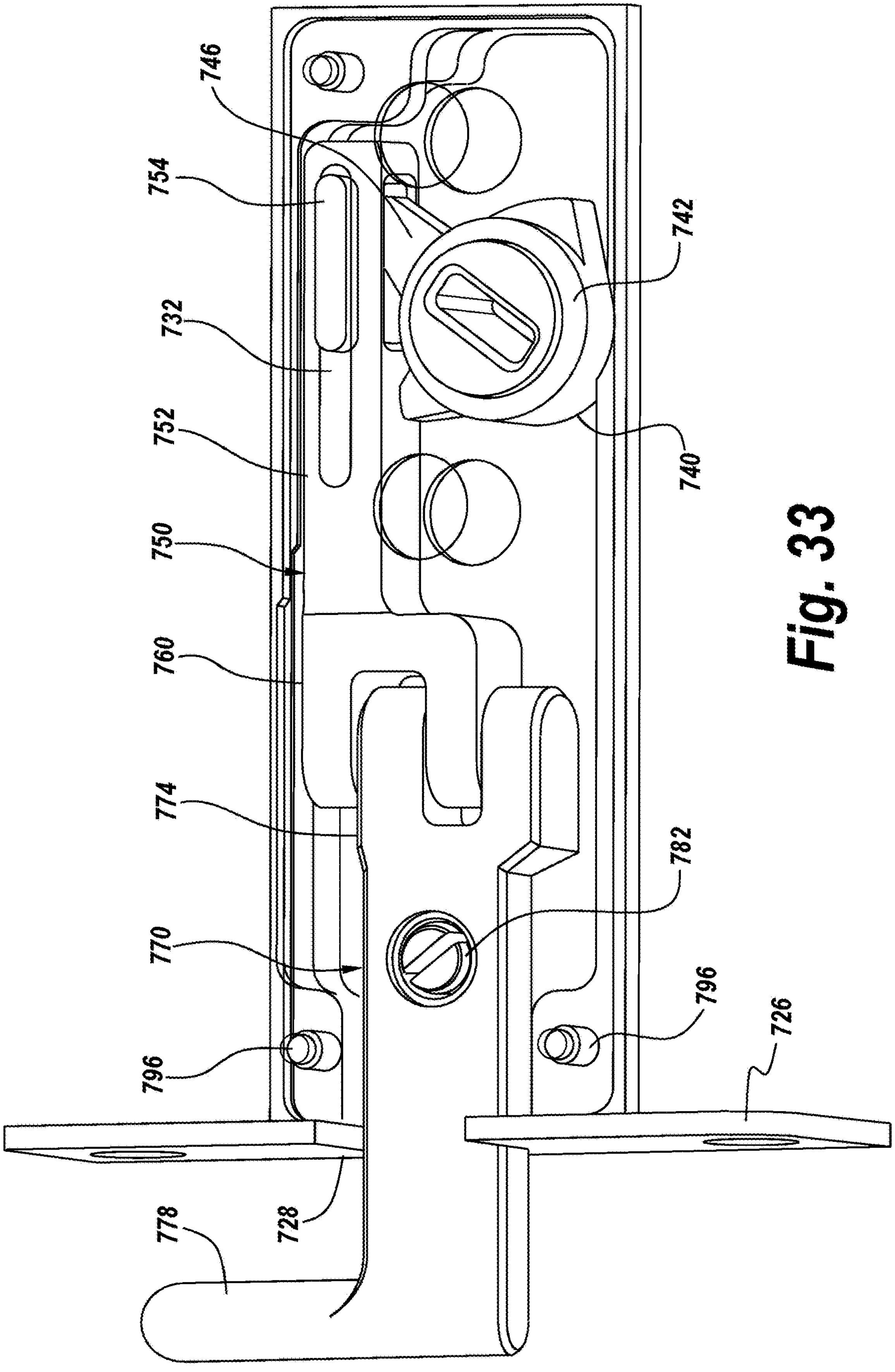
FIG. 33 is another perspective view of the components of the drive assembly of FIG. 30 according to one embodiment of the present invention.
Figure 34:
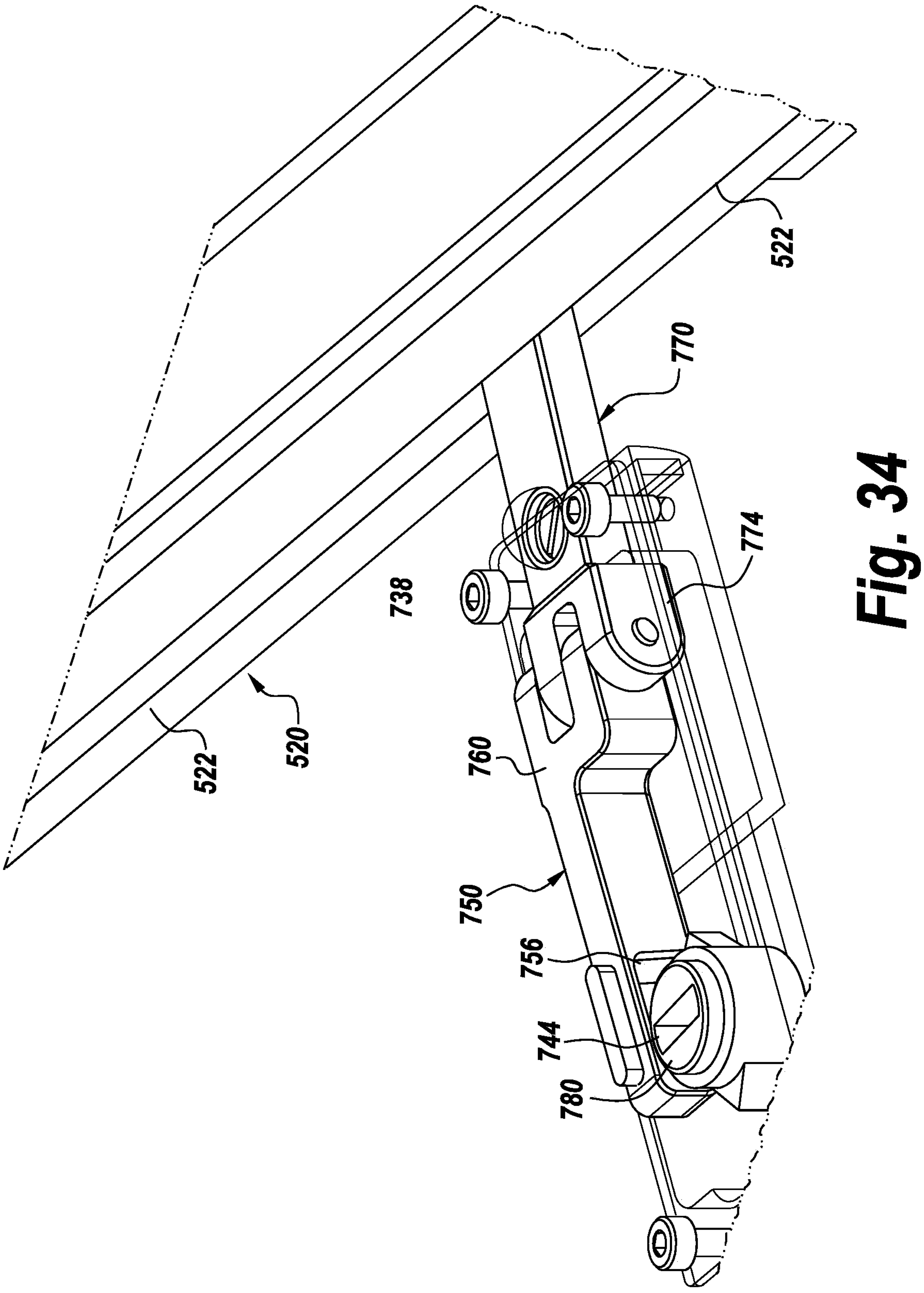
FIG. 34 is a partial perspective view of the drive assembly with a housing part removed to show the inner components and coupled to a movable locking assembly according to one embodiment of the present invention.
Figure 35:
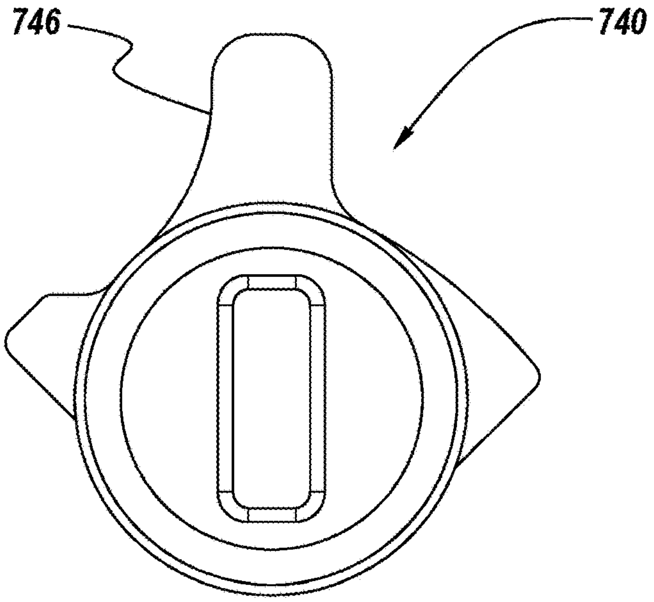
FIG. 35 is a front view of a hub element of the drive assembly according to one embodiment of the present invention.

750 discussed herein in reference to FIG. 33 and associated figures. The drive arm 7116 may include the drive interface pin 7108, and these features may be similar to the drive arm 770 and the drive interface pin 778 discussed herein in reference to FIG. 33 and associated figures. The arm guide 7110 may be similar to the arm guide 790 discussed herein in reference to FIG. 30 and associated figures. The hinge pin 7112 may be similar to the hinge pin 792 discussed herein in reference to FIG. 30 and associated figures.

In the drive interface assembly 7100 of FIG. 71B, the drive interface hub 7114 is positioned in the second portion 7105B of the aperture 7105 and is not positioned in the first portion 7105A. However, in other embodiments, the drive interface hub 7114 may be positioned in the first portion 7105A.

In the drive interface assembly 7100 of FIG. 71A, the arm guide 7110 is positioned on the right side of the drive arm 7116, and this may be appropriate where the right swing configuration is being used. By contrast, in the drive interface assembly 6900 of FIGS. 69 and 70, the arm guide 6910 is positioned on the left side of the drive arm 6916, which may be appropriate where the left swing configuration is being used. A user may easily select or switch between using a drive interface assembly 6900 having a left swing configuration and a drive interface assembly 7100 having a right swing configuration—both assemblies have an identical group of components, and certain components such as the arm guide are simply positioned in different location relative to other components to obtain the desired configuration.

Figure 72:
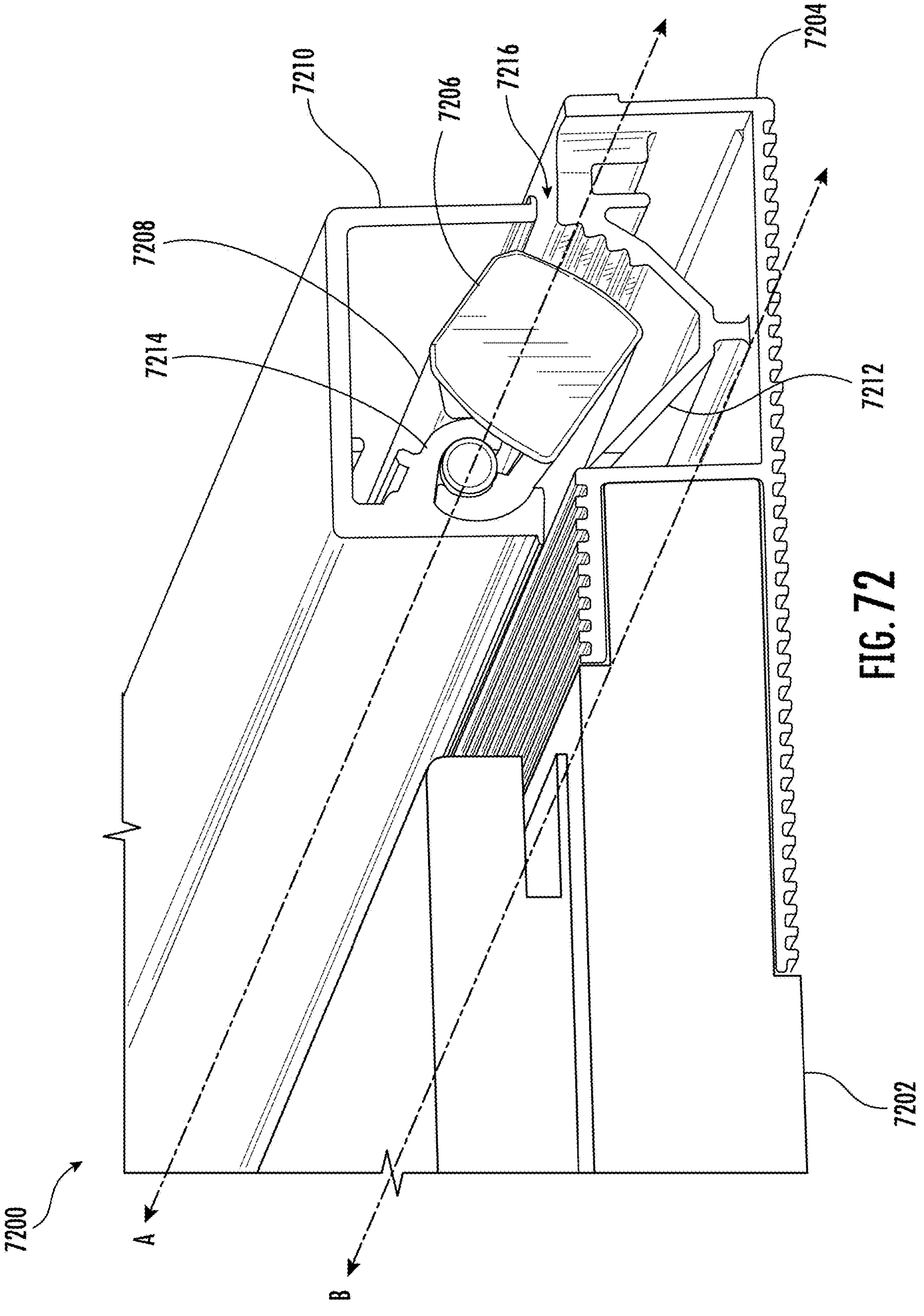
FIG. 72 is a perspective view of an example frame assembly of one embodiment of the present invention.
Figure 73:
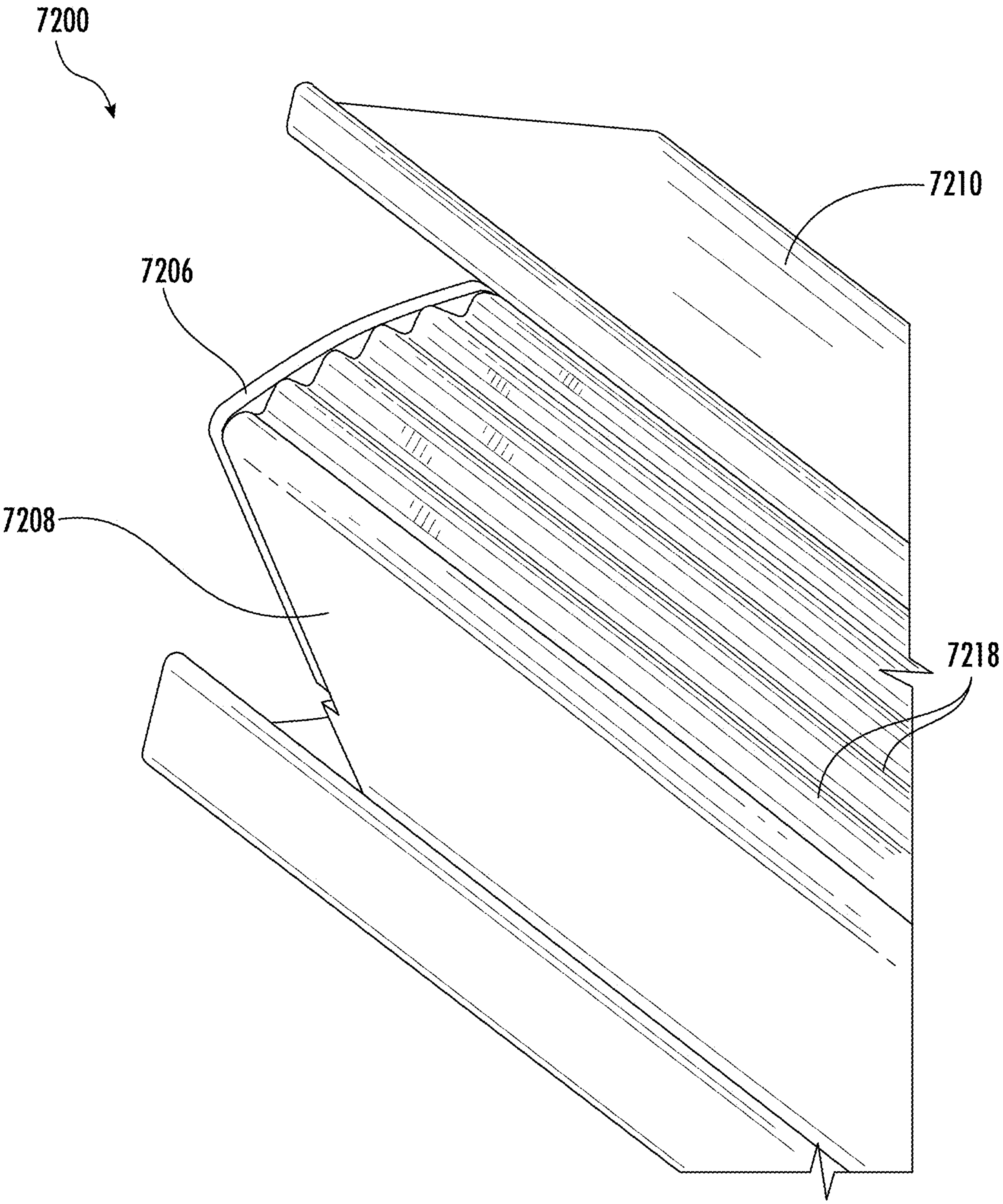
FIG. 73 is a perspective view of the example frame assembly of FIG. 72.

An example frame assembly 7200 of one embodiment of the present invention is presented in the perspective views of FIGS. 72 and 73. The frame assembly 7200 comprises a door jamb 7202, a frame element 7204, a wedge guide 7206, a locking element 7208, a door frame element 7210, a support element 7212, and a lock connector portion 7214. The locking element 7208 defines a locking element axis A extending from a first end of the locking element 7208 to a second end of the locking element 7208, and the support element 7212 defines a support element axis B extending from a first end of the support element 7212 to the second end of the support element 7212. Where the locking element 7208 and the support element 7212 are aligned appropriately, the locking element axis A and the support element axis B are substantially parallel. Additionally, the locking element 7208 includes teeth 7218 extending from the first end of the locking element 7208 to the second end of the locking element 7208, and the frame element 7204 includes teeth 7216 extending from the first end of the frame element 7204 to the second end of the frame element 7204.

Figure 74:
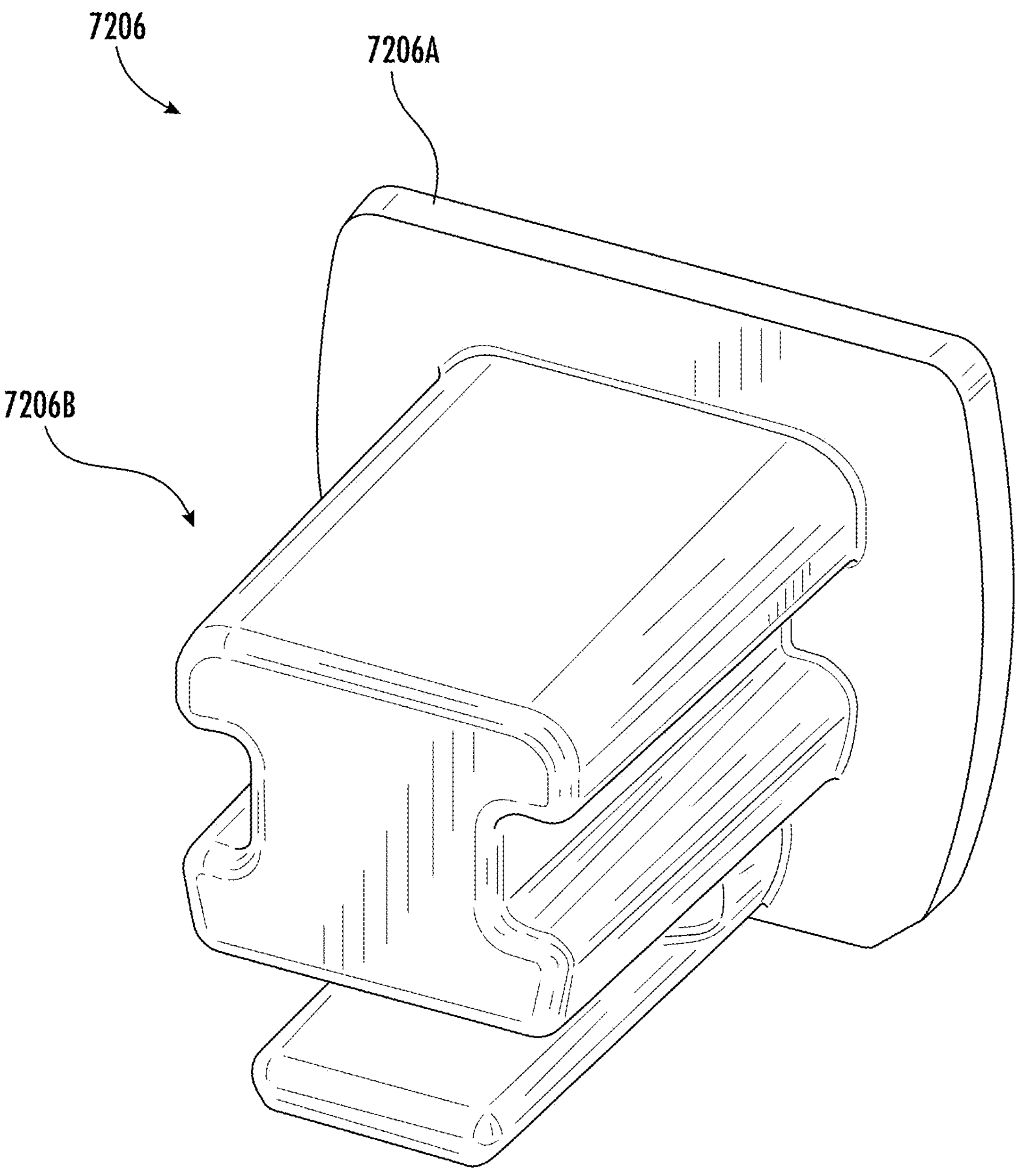
FIG. 74 is a perspective view of a wedge guide that is used in the example frame assembly of FIG. 72 in one embodiment of the present invention.

As illustrated in FIGS. 73 and 74, the head portion 7206A of the wedge guide 7206 may extend past the teeth 7218 of the locking element 7208. In the event that a misalignment is present between the locking element 7208 and the frame element 7204 so that the locking element axis A and the support element axis B are not substantially parallel, the head portion 7206A of the wedge guide 7206 may contact the teeth 7216 of the frame element 7204 before any teeth 7218 of the locking element 7208 come in contact with the teeth 7216 on the frame element 7204. In some embodiments, the wedge guide 7206 may prevent contact between the teeth 7216, 7218 altogether. However, in other embodiments, the wedge guide 7206 simply comes in contact with the teeth 7216 before the teeth 7216 and the teeth 7218 come in contact, and the wedge guide 7206 may help guide the contact between the teeth 7216 and 7218 to improve this contact. Without any wedge guide 7206 provided, the teeth 7218 of the locking element 7208 and the teeth 7216 of the frame element 7204 may contact each other in a manner that causes a grating sound when the locking element axis A and the support element axis B are not substantially parallel. Consequently, the inclusion of the wedge guide 7206 may help reduce or prevent entirely any grating sound resulting from such rubbing contact between the teeth 7216, 7218. Where the locking element axis A and the support element axis B are aligned appropriately, the teeth 7216 of the frame element 7204 and the teeth 7218 of the locking element 7208 may contact each other without the wedge guide interfering with such contact. The wedge guide 7206 may also allow for the locking element 7208 to engage smoothly when a deadbolt lever is thrown. The wedge guide 7206 does not prevent teeth 7216, 7218 from contacting each other where force is applied to the door as the door panel 18 (see FIG. 21) may bend slightly where force is applied so that the teeth 7216, 7218 are brought into contact.

The door jamb 7202 may be similar to the door jamb 10 discussed elsewhere herein. The frame element 7204 may be similar to the frame element 1008 of FIG. 72 and may have teeth 7216 similar to the teeth 1022 of FIG. 59. The locking element 7208 may be similar to the locking element 1062 of FIG. 57 and may have teeth 7218 similar to the teeth 1070 of FIG. 57. The frame element 7210 may be similar to the door frame element 1004 of FIG. 58. The support element 7212 may be similar to the support element 1012 of FIG. 56. The lock connector portion 7214 may be similar to the lock connector portion 1042 of FIG. 58.

A wedge guide 7206 that is used in the example frame assembly 7200 of FIG. 72 is illustrated in the perspective view of FIG. 74. As illustrated, the wedge guide 7206 comprises a head portion 7206A and a body portion 7206B, and the head portion 7206A has a larger cross-sectional size than the body portion 7206B. The body portion 7206B of the wedge guide 7206 may be received in the locking element 7208. The body portion 7206B may be received at an internal chamber at a first end or a second end the locking element 7208, with the internal chamber being similar to the internal chamber 1074 of FIG. 57.

As illustrated in FIG. 74, the wedge guide 7206 is symmetrical, with the geometry on the left side of the wedge guide 7206 in FIG. 74 mirroring the geometry on the right side of the wedge guide 7206. The symmetrical geometry of the wedge guide 7206 may enable the wedge guide 7206 to be inserted into the top and/or the bottom of the locking element 7208 regardless of whether the locking element 7208 is assembled in a left swing configuration or a right swing configuration. The wedge guide 7206 may comprise plastic material. In some embodiments, a wedge guide 7206 may be provided at each end of the locking element 7208, with the body portion 7206B of each wedge guide 7206 being received in a respective internal chamber 1074 of the locking element 7208 (in some embodiments, the locking element 7208 may include a single internal chamber extending lengthwise from a first end to a second end of the locking element 7208).

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

We claim:

1. A door assembly, comprising:

a latch assembly including:

a head portion;

a first latch housing defining a first opening, wherein the first latch housing is attached to the head portion;

a second latch housing defining a second opening, wherein the second latch housing is attached to the head portion;

a latch hub;

a hub cradle comprising a first hub cradle portion and a second hub cradle portion, wherein the first hub cradle portion defines a first recess that is offset from a center of the first hub cradle portion, and wherein the second hub cradle portion defines a second recess that is offset from a center of the second hub cradle portion, wherein the first hub cradle portion and the second hub cradle portion are positioned between the first latch housing and the second latch housing, wherein the first opening of the first latch housing is configured to partially receive the first hub cradle portion with the first hub cradle portion in either a short orientation or a long orientation, wherein the second opening of the second latch housing is configured to partially receive the second hub cradle portion with the second hub cradle portion in either a short orientation or a long orientation, wherein the latch hub is positioned between the first hub cradle portion and the second hub cradle portion, wherein the latch hub is aligned with the first recess and the second recess, wherein the latch assembly is configured to operate in a short backset panel configuration when the first hub cradle portion is in the short orientation and when the second hub cradle portion is in the short orientation, and wherein the latch assembly is configured to operate in a long backset panel configuration when the first hub cradle portion is in the long orientation and when the second hub cradle portion is in the long orientation, and wherein a distance from the head portion to the latch hub in the long backset panel configuration is larger than a distance from the head portion to the latch hub in the short backset panel configuration, wherein the latch hub includes an outer component and an insert, wherein the outer component defines a first cavity in an internal portion of the outer component, wherein the outer component is configured to receive the insert within the first cavity, wherein the latch hub defines a second cavity when the insert is received within the first cavity of the outer component, wherein the second cavity is smaller in cross-sectional size relative to the first cavity, wherein the latch hub is configured to receive a first spindle in the first cavity when the insert is removed, and wherein the latch hub is configured to receive a second spindle in the second cavity when the insert is added.

2. The door assembly of claim 1, wherein the latch assembly is configured to be assembled in either the short backset panel configuration or the long backset panel configuration using an identical set of components.

3. The door assembly of claim 1, wherein the first hub cradle portion comprises an extension that extends from other portions of the first hub cradle portion, wherein the extension is configured to engage a wall of the first opening to position the first hub cradle portion relative to the first latch housing.

4. The door assembly of claim 3, wherein the first opening defines a first extended portion on a first side of the first opening and a second extended portion on a second side of the first opening, wherein the first side is opposite to the second side, wherein the first opening is configured to receive a portion of the first hub cradle portion so that the extension of the first hub cradle portion extends into one of the first extended portion or the second extended portion.

5. The door assembly of claim 1, wherein the first spindle is a C-shape spindle.

6. The door assembly of claim 1, further comprising:

a drive interface assembly including:

a first drive interface housing defining a first aperture therein, wherein the first aperture defines a first portion and a second portion;

a second drive interface housing defining a second aperture therein, wherein the second aperture defines a first portion and a second portion; and a drive interface hub positioned between the first drive interface housing and the second drive interface housing, wherein the drive interface hub is positioned at the first portion of the first aperture and at the first portion of the second aperture when the door assembly is operating in the long backset panel configuration, and wherein the drive interface hub is positioned at the second portion of the first aperture and at the second portion of the second aperture when the door assembly is operating in the short backset panel configuration.

7. The door assembly of claim 6, wherein the drive interface assembly is configured to be assembled in either a left swing configuration or a right swing configuration using an identical group of components.

8. The door assembly of claim 7, wherein the drive interface assembly comprises a drive arm and an arm guide, wherein the arm guide is positioned at a first position relative to the drive arm in the left swing configuration, and wherein the arm guide is positioned at a second position relative to the drive arm in the right swing configuration.

9. The door assembly of claim 1, further comprising:

a frame assembly including:

a locking element defining a first end and a second end, wherein a locking element axis extends from the first end of the locking element to the second end of the locking element, wherein the locking element comprises locking element teeth extending between the first end of the locking element and the second end of the locking element;

a support element defining a first end and a second end, wherein a support element axis extends from the first end of the support element to the second end of the support element, wherein the support element comprises support element teeth extending between the first end of the support element and the second end of the support element;

at least one wedge guide that is configured to be provided at the locking element;

wherein, when the locking element axis and the support element axis are misaligned, a wedge guide of the at least one wedge guide is configured to contact the support element teeth before the locking element teeth come in contact with the support element teeth.

10. The door assembly of claim 9, wherein the at least one wedge guide comprises a first wedge guide and a second wedge guide, wherein the first wedge guide is configured to be partially received at the first end of the locking element, and wherein the second wedge guide is configured to be partially received at the second end of the locking element, wherein each wedge guide of the at least one wedge guide is configured to prevent a grating sound caused by contact between the support element teeth and the locking element teeth where the locking element axis and the support element axis are misaligned.

* * * * *